United States Patent

Hara et al.

[11] Patent Number: 6,167,201
[45] Date of Patent: Dec. 26, 2000

[54] CAMERA HAVING A POWER ZOOM FUNCTION

[75] Inventors: Yoshihiro Hara, Kishiwada; Kenji Ishibashi, Sakai; Kimiharu Akahoshi, Osaka; Norihiko Akamatsu, Suita, all of Japan

[73] Assignee: Minolta Camera Kabushiki Kaisha, Osaka, Japan

[21] Appl. No.: 08/903,309

[22] Filed: Jul. 30, 1997

Related U.S. Application Data

[62] Division of application No. 08/283,667, Aug. 1, 1994, Pat. No. 5,697,000, which is a continuation of application No. 07/889,608, May 27, 1992, abandoned.

[51] Int. Cl.[7] .................................................. G03B 17/00
[52] U.S. Cl. .............................................. 396/77; 396/72
[58] Field of Search ................................ 396/77, 78, 135, 396/137, 153, 222, 223, 265, 266, 76, 378, 379, 380, 461, 509, 148, 147, 52, 53, 54, 55, 72

[56] References Cited

U.S. PATENT DOCUMENTS

| | | | |
|---|---|---|---|
| 5,019,852 | 5/1991 | Yamamoto et al. | 396/461 |
| 5,065,172 | 11/1991 | Ooawa | 396/222 |
| 5,134,432 | 7/1992 | Kohmoto et al. | 354/412 |
| 5,146,261 | 9/1992 | Soshi | 396/121 |
| 5,196,880 | 3/1993 | Ishibashi et al. | 396/222 |
| 5,305,049 | 4/1994 | Miyazaki et al. | 354/412 |
| 5,384,615 | 1/1995 | Hsieh et al. | 396/461 |
| 5,572,279 | 11/1996 | Ohsawa | 396/52 |
| 5,697,000 | 12/1997 | Hara et al. | 396/77 |
| 5,721,981 | 2/1998 | Kosaka et al. | 396/265 |
| 5,832,313 | 11/1998 | Ishibashi et al. | 396/79 |

*Primary Examiner*—Russell Adams
*Assistant Examiner*—Christopher E. Mahoney
*Attorney, Agent, or Firm*—Burns, Doane, Swecker & Mathis, LLP

[57] ABSTRACT

A camera is provided with a varifocal lens including a zoom lens system driven by a motor and by a zoom lens drive control section and a focusing lens system driven by a motor and by a focusing lens drive control section for performing focusing before the zoom lens system is driven or while the zoom lens system is being driven. The camera is also provided with a lens switch sensor for determining whether an operation member for starting an exposure operation has been operated and a body control section and a lens control section for halting the driving of the zoom lens system when it is determined that the operation member has been operated by the sensor to re-start the driving of the focusing lens system.

4 Claims, 91 Drawing Sheets

FD1: FINDER FRAME
FD2: PHOTOGRAPHING FRAME
FD3: FOCUS DETECTION AREA
FD4: SHUTTER SPEED DISPLAY
FD5: CONTROL APERTURE VALUE DISPLAY

WIDE FINDER CONDITION

NORMAL FINDER CONDITION

Fig. 70

| | | | | | | | |
|---|---|---|---|---|---|---|---|
| LENS SWITCH INFORMATION | MLREQ | | | | | | |
| | LReq | | | | | | |
| Zmf (SPECIFY ZOOM) | MZmf | ZspB | REVNOW | ft | | | |
| (PERMIT MPZ) | MMPZ | ZspB | REVNOW | | | | |
| ZOOM STOP (ZOOM STOP REQUEST) | MSTPZ | | | | | | |
| ZOOM DATA (READ-IN ZOOM DATA) | MSndZD | Zstat | ZspL | REVVF | fnow | | |
| LATCH AFD (AF DATA LATCH TIMING) | MlatAFD | | | | | | |
| AF DATA (READ-IN AF DATA) | MSndAFD | AFDFIN | KL | KN | ΔSB | fflat | |
| ALL LENS DATA (READ-IN ALL LENS DATA) | MLALL | AV0 | AVMAX | KL | fnow | LON | KN | ΔSB | fmin | fmax |

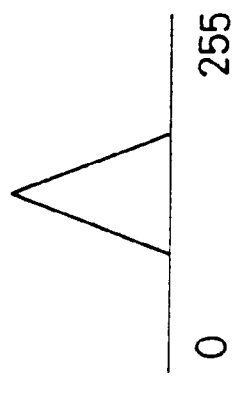
Fig. 76A
1. NB (NEGATIVE BIG)
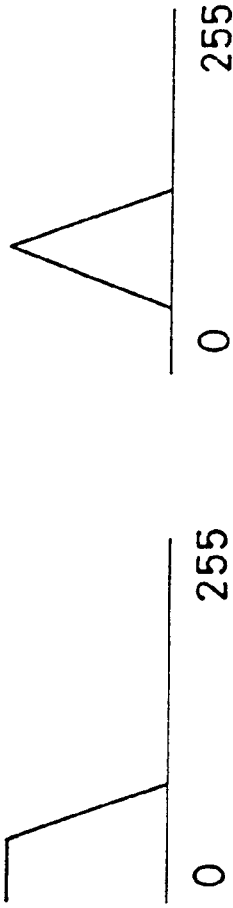
Fig. 76B
2. NS (NEGATIVE SMALL)
Fig. 76C
3. ZO (ZERO)
Fig. 76D
4. PS (POSITIVE SMALL)
Fig. 76E
5. PB (POSITIVE BIG)

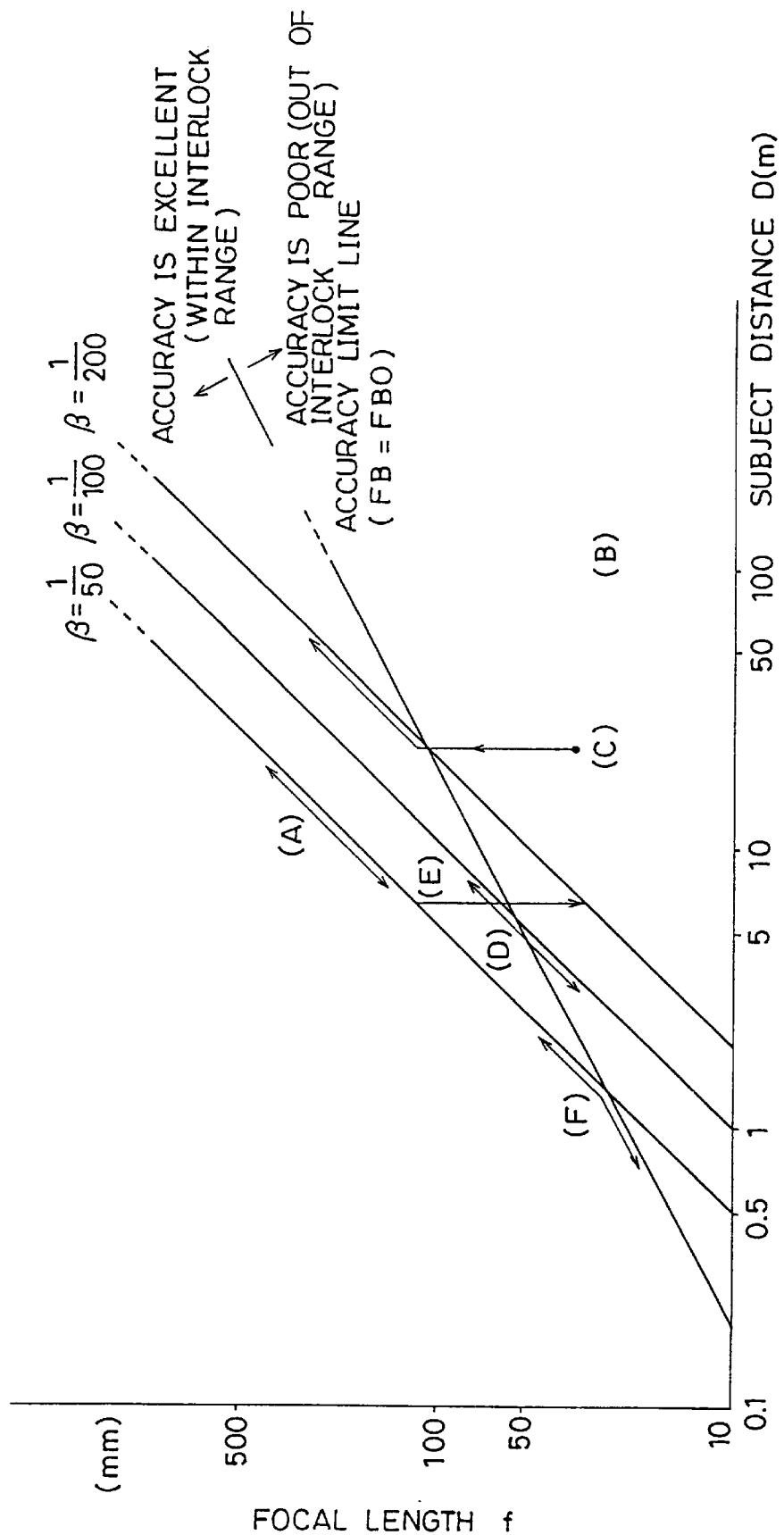

CAMERA HAVING A POWER ZOOM FUNCTION

This application is a divisional of application Ser. No. 08/283,667, filed Aug. 1, 1994 now U.S. Pat. No. 5,697,000, which is a continuation of application Ser. No. 07/889,608, filed May 27, 1992 now abandoned.

BACKGROUND OF THE INVENTION

1. Field of the Invention

The present invention relates to a camera where zooming of a taking lens is electromotively performed in accordance with a manual operation.

2. Description of the Prior Art

Conventionally, a camera has been proposed where zooming of a taking lens is electromotively performed in accordance with a manual operation. Further, concerning the camera of this type, a camera has conventionally been proposed where a zooming operation is given priority over a shutter release operation. In performing photographing with this conventional camera, if a chance to release a shutter occurs while zooming is being performed in order to set a desired angle of view, it is necessary to halt the zooming and then to perform a release operation. Consequently, release time lag is large and the shutter release chance may be lost.

On the other hand, in a case where a varifocal lens which is relatively compact as a zoom lens is employed, since the focus position of the varifocal lens shifts during zooming, it is necessary to correct the focus position every time it shifts. Concerning the correction of the focus position, various methods have conventionally been proposed. With any of the conventional methods, however, correction accuracy is low and there is a possibility that in-focus condition is not obtained even after the correction.

SUMMARY OF THE INVENTION

An object of the present invention is to provide a camera where the above-mentioned problem has been solved and the release time lag is small.

Another object of the present invention is to provide a camera with which an in-focus photograph can always be taken even when the above-mentioned varifocal lens is employed.

According to the present invention, since zooming is halted when an operation is performed for starting an exposure control even during zooming, it is unnecessary to reset zooming, and the release time lag is small. Further, since a confirmation is made whether the in-focus condition has been obtained while zooming is being halted, photography can always be performed under an in-focus condition.

BRIEF DESCRIPTION OF THE DRAWINGS

These and other objects and features of this invention will become clear from the following description taken in conjunction with the preferred embodiments with reference to the accompanied drawings in which:

FIG. 70 is a flow chart showing SIO data of each mode of the intra-lens microcomputer of the camera system embodying the present invention;

FIGS. 76A to 76E show membership functions representing adaptations of five labels, respectively of the variation of the embodiment of the present invention;

FIG. 87 is a view for explaining an intra-interlocking-range determination operation of the variation of the embodiment of the present invention;

DESCRIPTION OF THE PREFERRED EMBODIMENT

An embodiment of the present invention will hereinafter be described with reference to the drawings.

Before describing the embodiment, functions employed for the embodiment will briefly be explained.

AF (automatic focusing) is a function of automatically adjusting the deviation of the focal point.

FA (focal aid) is a function of displaying a focus aid, i.e. the deviation amount of the focal point by a changeover of a switch. By this function, the in-focus or out-of-focus condition is indicated (in-focus: a focus lamp is turned on, out-of-focus: the focus lamp is turned off, and low contrast: the focus lamp blinks).

ISL(image size lock) is a function of locking an image size (i.e. magnification) by zooming. Specifically, the focal length is automatically and continuously set with respect to a subject moving toward or away from the camera in order to maintain the image size obtained the moment a predetermined button is pressed.

APZ (auto program zoom) is a function of automatically determining a focal length f with respect to a subject distance D by a turning on of an intra-body switch to perform zooming until the focal length f is attained. Specifically, the focal length f is calculated from the subject distance D obtained by a distance measurement based on a pre-set program line D-f to automatically and continuously set the focal length to the focal length f.

ASZ (auto stand-by zoom) is a function of automatically determining a focal length f with respect to a subject distance D by a first-time turning on of a focus switch to perform zooming until the focal length f is attained.

This embodiment is provided with an eye-start automation function, where the moment a user looks through the finder, the APZ or ASZ function is activated. Moreover, an APZ switch (see FIG. 2) for setting and releasing the APZ mode is provided to a camera body. When it is sensed that the user is looking through the finder under an ON condition of an APZ switch, the APZ function is activated. When it is sensed that the user is looking through the finder under an OFF condition of the APZ switch, the ASZ is activated.

Wide view finder (wide finder) is a function of displaying a finder frame FD1 (a finder field of 150%) under an ON condition of a subsequently-described switch S0 (a condition where it is sensed that the user is looking through the finder) and displaying a photographing frame (a finder frame of 100%) to be actually photographed by a zoom up under an ON condition of a subsequently-described switch S1 (a condition where a photographing switch is depressed halfway). A subject located within the photographing frame under an ON condition of a subsequently-described switch S2 (a condition where the photographing switch is depressed all the way down) is exposed.

Figure 7A:
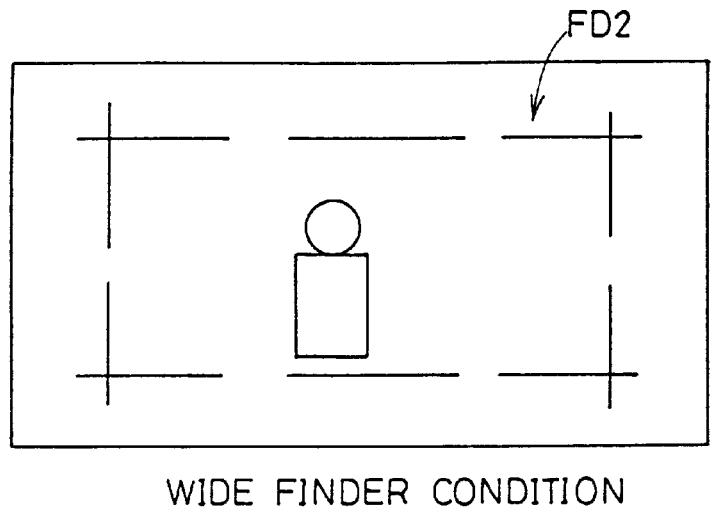
FIGS. 7A and 7B are wide finder image views showing a wide finder condition and a normal condition of the camera system embodying the present invention, respectively.
Figure 7B:
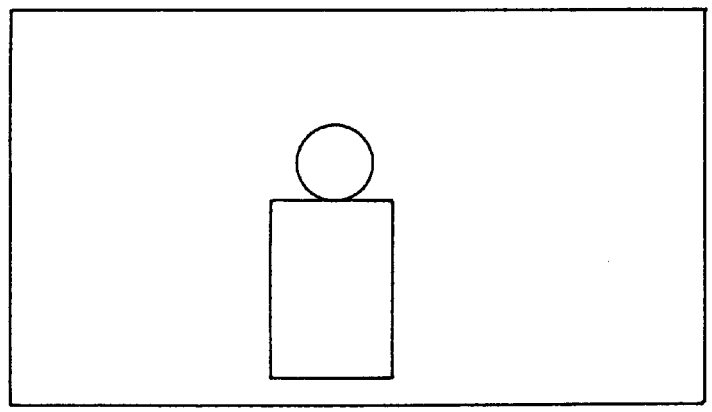

Specifically, a finder field is viewed under a wide finder condition (shown in FIG. 7A) or a normal finder condition (shown in FIG. 7B).

Figure 6:
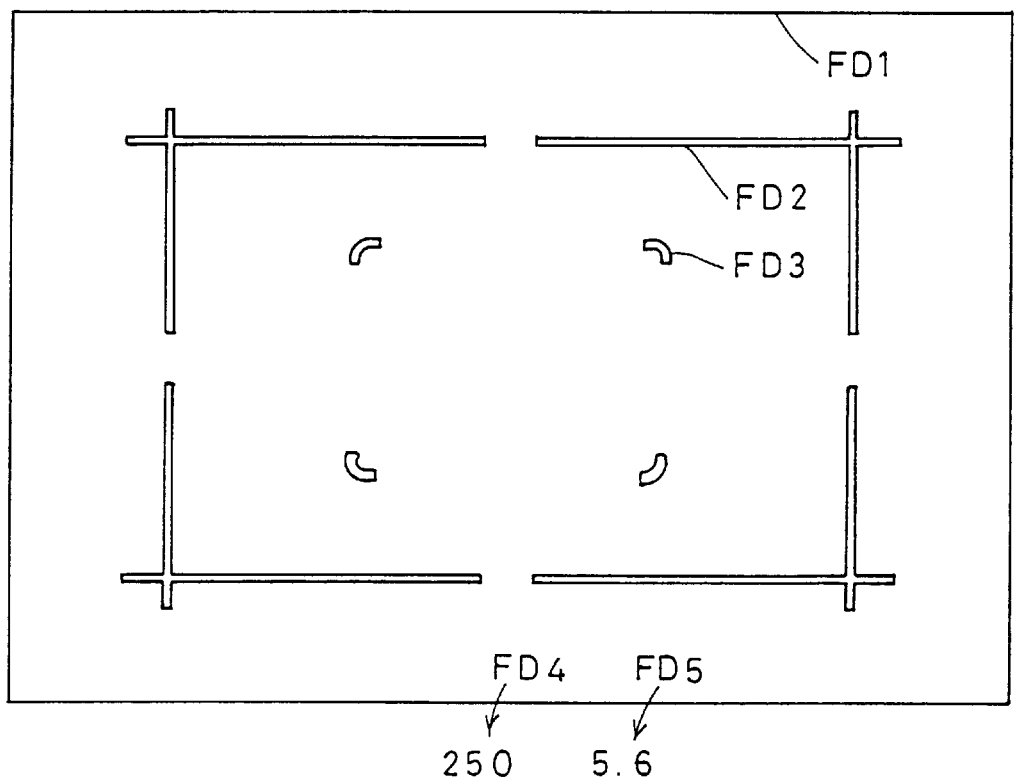
FIG. 6 shows a display in the finder of the camera system embodying the present invention.

Moreover, a subsequently-described first to fourth (focus detection) islands a to d (see FIG. 8) are provided within a focus detection area shown in FIG. 6. The islands a to d are controlled as shown in Table 9 when the switches S1 and S2 are simultaneously depressed under the wide finder condition.

Figure 73:
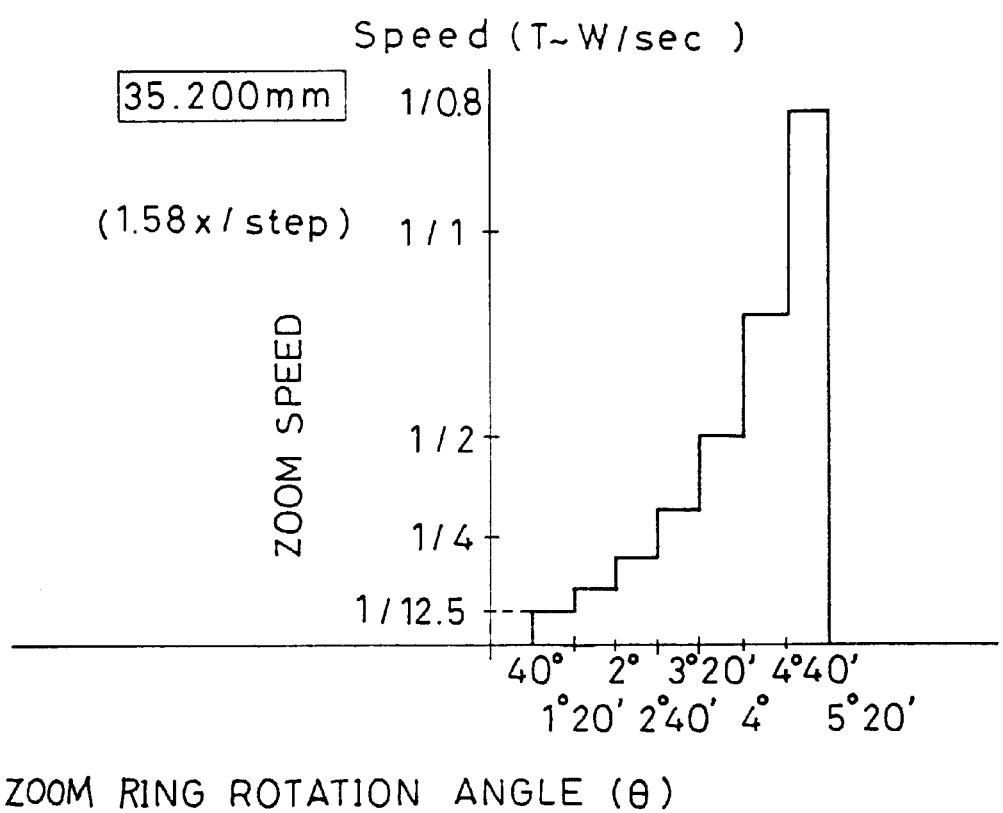
FIG. 73 is a graph showing a relationship between a zoom ring rotation angle and a zoom speed in the camera system embodying the present invention.

Power zoom is a function of driving a zoom lens by use of a motor. According to the conventional power zoom, patterns are provided on the entire zoom ring so that the driving of the zoom lens is controlled by reading-out a rotation angle and a rotation speed obtained by an operation of the zoom ring. In this embodiment, however, the rotation angle of the zoom ring and a zoom speed correspond to each other (rotation angle corresponding method) and zooming is stopped when the zoom ring is turned to a neutral position. That is, as shown in the graph of FIG. 73, the zoom speed increases as the rotation angle is increased.

Subsequently, a single-lens reflex camera provided with an interchangeable lens where a focal length can be varied by a motor will be described as an example of the present invention.

Figure 1:
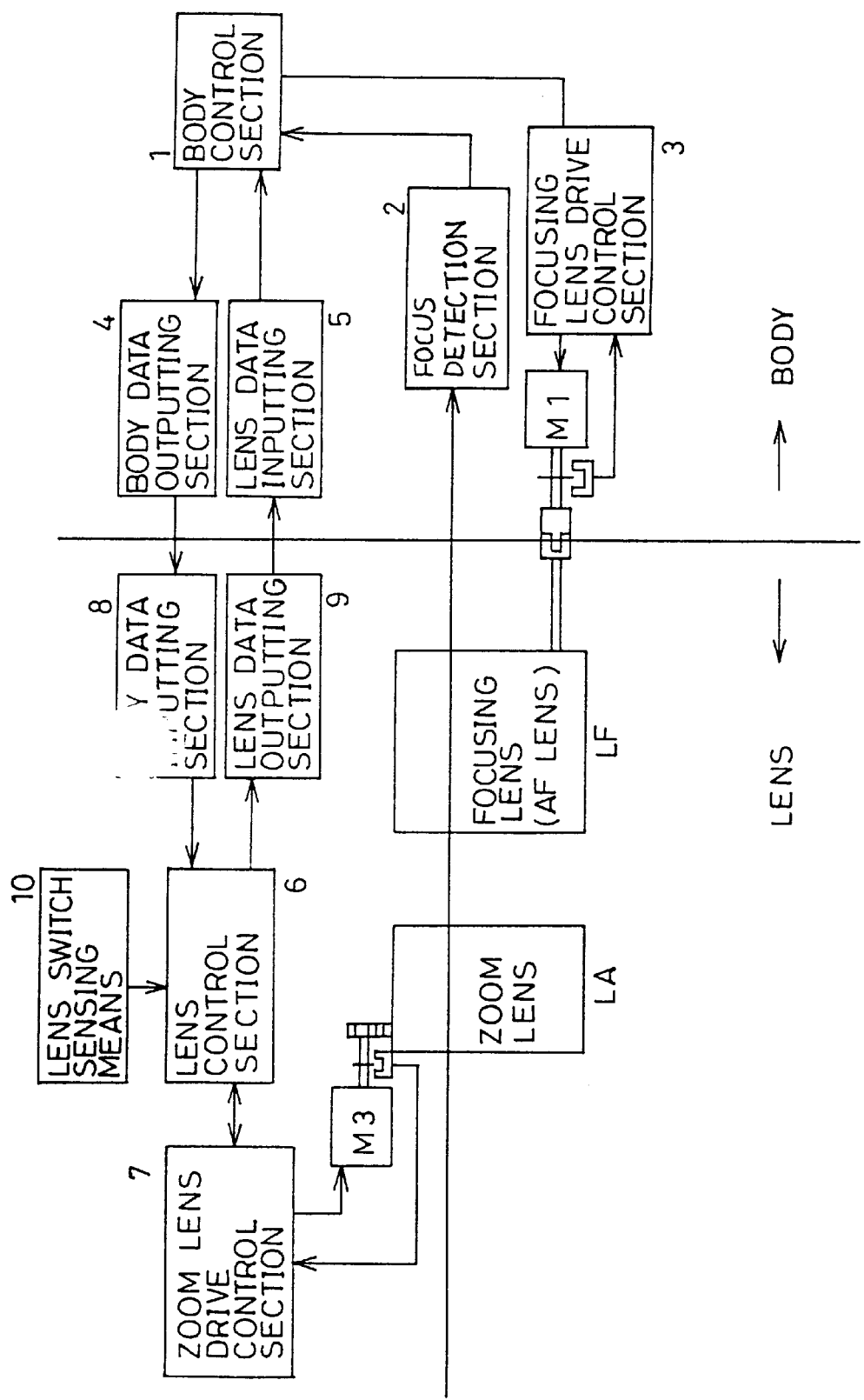
FIG. 1 is a block diagram of a camera system embodying the present invention.

FIG. 1 is a block diagram of this system. As shown in the figure, a camera body is provided with a function of calculating a lens movement amount for focusing by inputting a data from a distance measuring section 2 to a body control section 1 and driving a focusing lens (AF lens) LF by activating a motor M1 through a focusing lens drive control section 3 and a function of causing an interchangeable lens to operate in response to an instruction from the camera body by a communication with the interchangeable lens through a body data outputting section 4 and a lens data inputting section 5.

The interchangeable lens is provided with a function of performing zooming by driving the zoom lens LA by activating a motor M3 through a zoom lens drive control section 7 when an operation of an image size lock button 28 or a zoom operation ring 80 to be subsequently-described is sensed by a lens switch sensing means 10 (the power zoom function), a function of outputting lens data to the camera body by a communication with the camera body through a body data inputting section 8 and a lens data outputting section 9, and a function of operating in response to data from the camera body.

This embodiment employs a varifocal lens where a focus position is shifted during zooming. The varifocal lens comprises the zoom lens LA for performing zooming by varying an angle of view and the AF lens LF for correcting an out-of-focus condition. Employing the varifocal lens enables a realization of a compact, lightweight camera.

Figure 71:
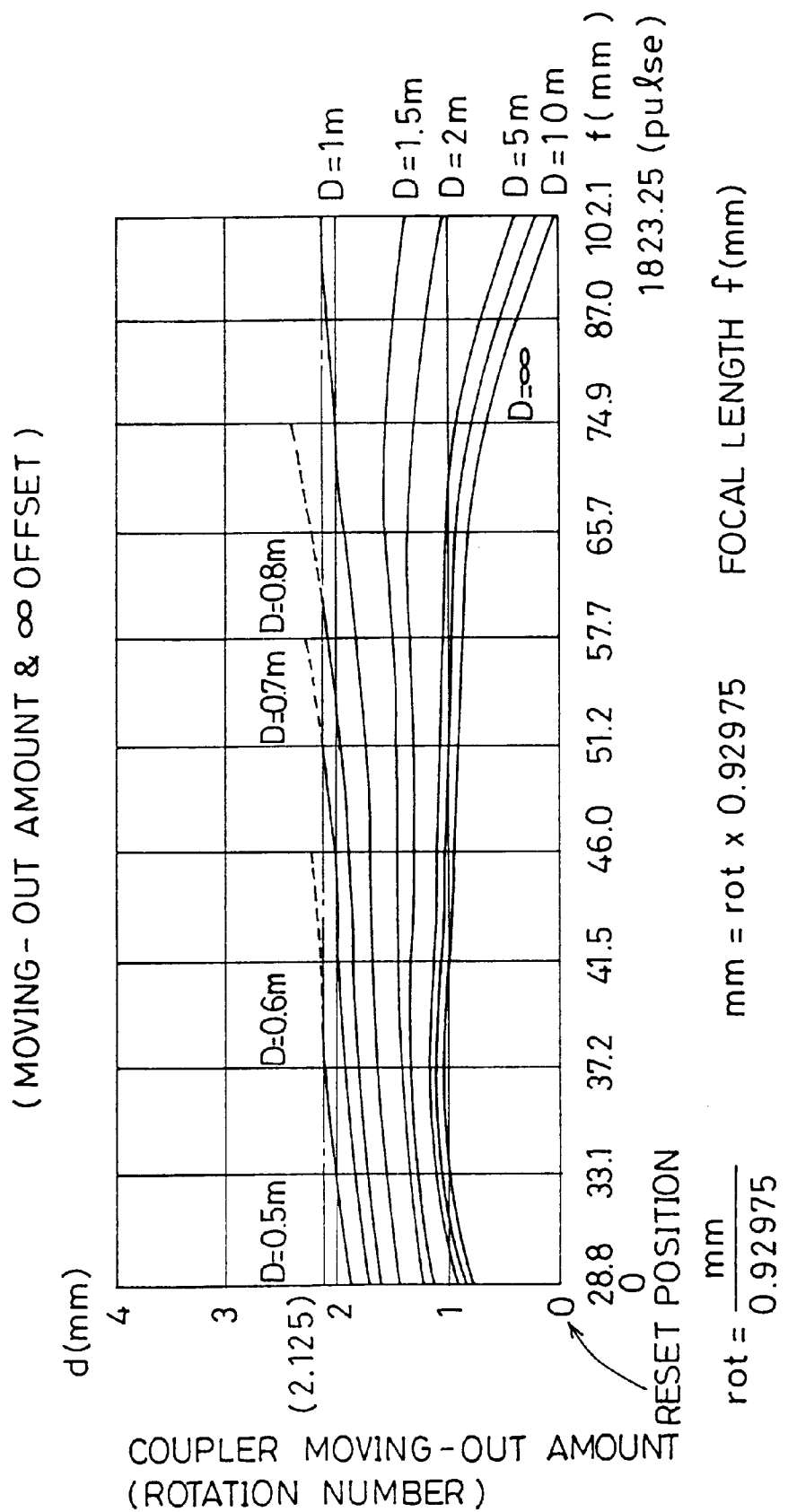
FIG. 71 is a graph showing a relationship between a focal length and a coupler moving-out amount in the camera system embodying the present invention.

FIG. 71 shows a relationship between a focal length f (=28.8 to 102.1) and a coupler moving-out amount (rotation number) with respect to a varifocal lens employed for this embodiment. The relationship between a rotation number rot and a moving-out amount d is dmm=rot×0.92975.

When automatic focusing (AF) is performed, the coupler moving-out amount is determined after focusing is performed with respect to a subject at infinity ∞ and the lens is reset. When the moving-out amount under the reset condition of the lens is 0 mm, a subject located 0.5 m from the camera is in focus under the most moved-out condition of the lens, while a subject at infinity ∞ is in focus under the most moved-in condition of the lens. As shown in FIG. 71, however, a focus position is varied even if a subject distance is fixed when the focal length f is varied by the APZ, with a result that the subject is out of focus. In the varifocal lens, the out-of-focus condition is corrected by moving the AF lens LF.

As described above, this embodiment is characterized by automatic zooming and the employment of the varifocal lens. That is, automatic focusing is performed in the camera body, by using a photometry value, and on initiation of the power zoom, the out-of-focus condition caused by the zooming is corrected.

Next, the external arrangements of the camera body and the interchangeable lens will be described.

Figure 2:
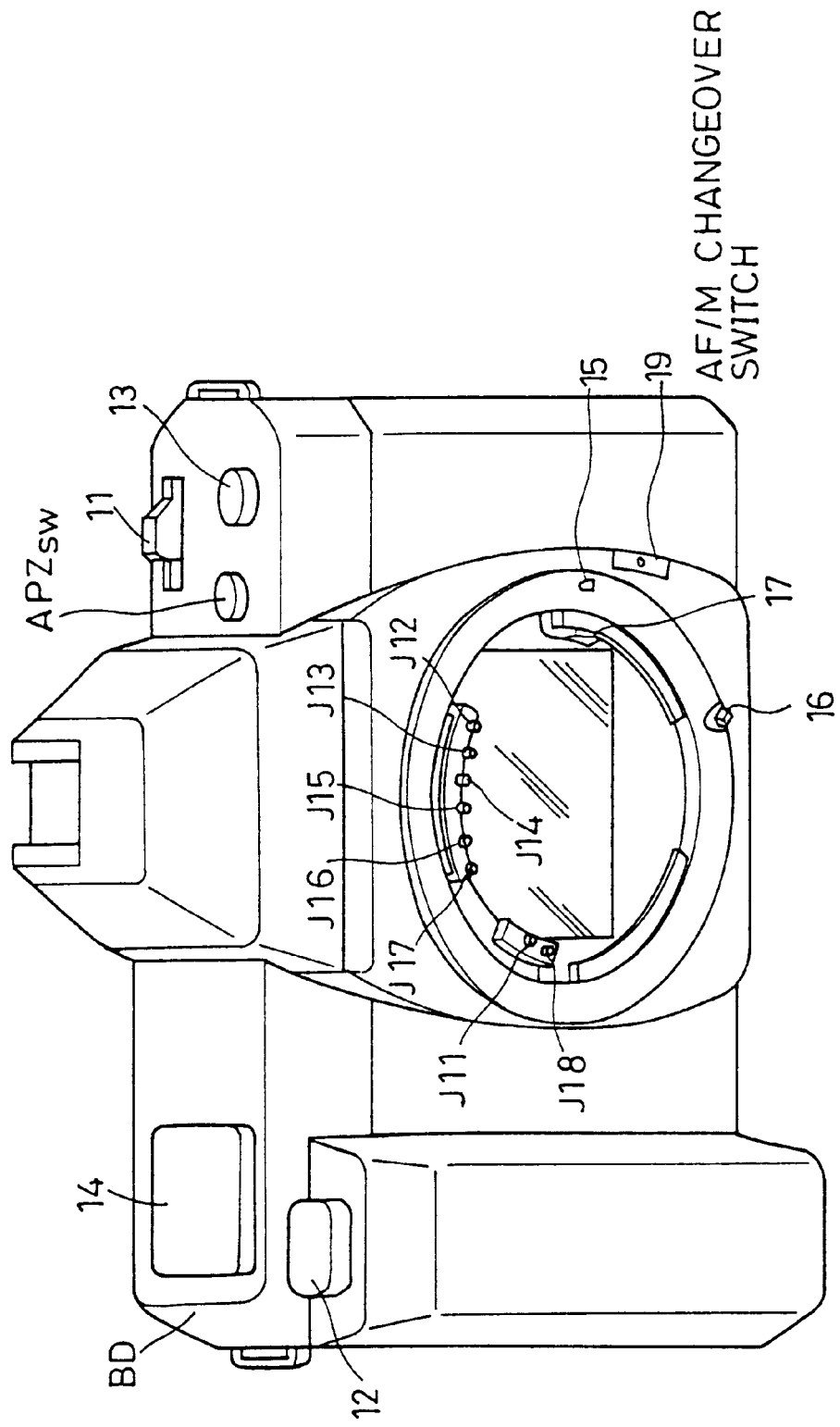
FIG. 2 shows the appearance of a body of the camera system embodying the present invention.
Figure 3:
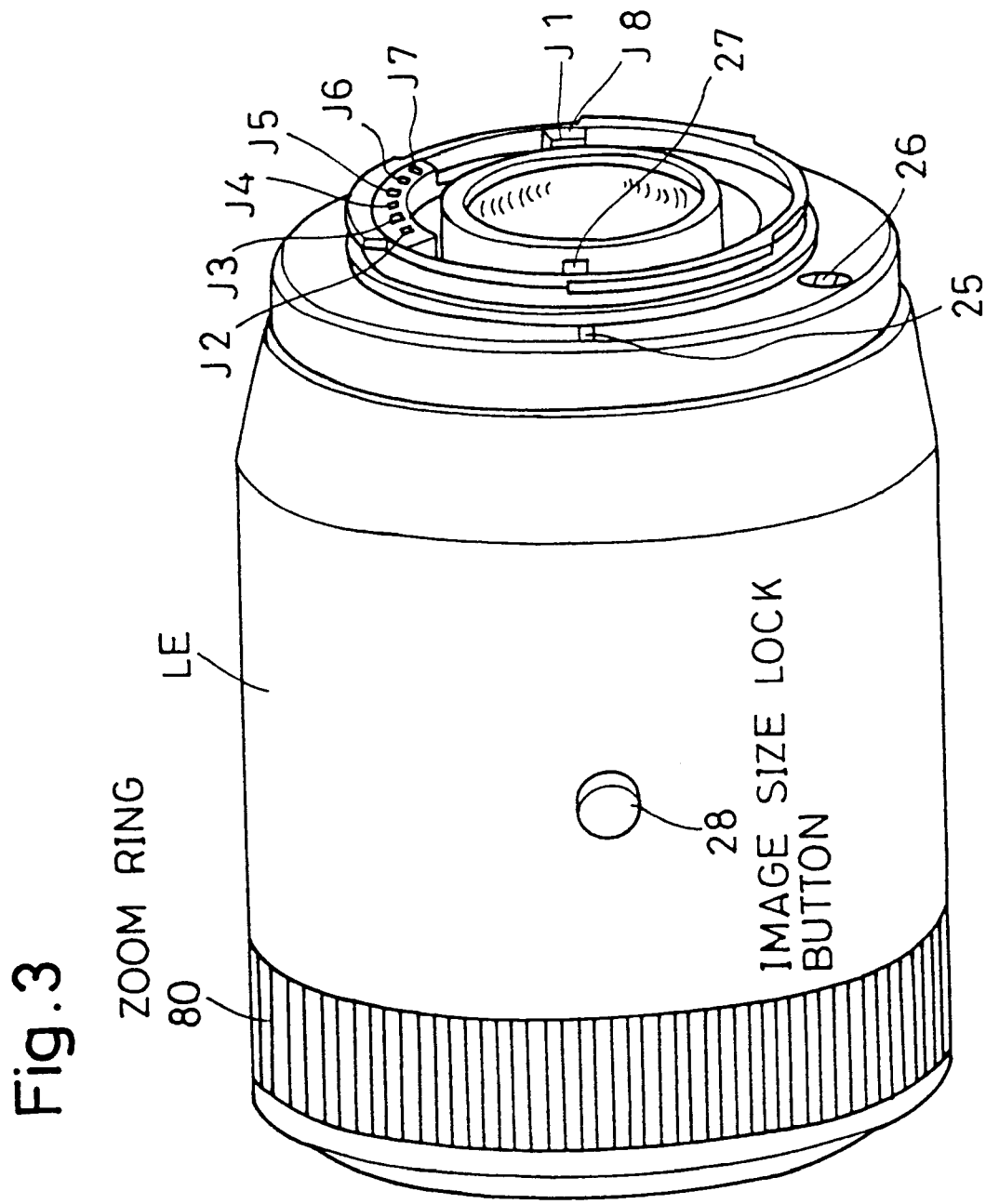
FIG. 3 shows the appearance of an interchangeable lens attached to the body of the camera system embodying the present invention.

FIG. 2 shows the external arrangement of a camera body BD (hereinafter referred to as body BD) embodying the present invention. FIG. 3 shows the external arrangement of an interchangeable lens LE interchangeably attached to the body BD. The name and function of each portion thereof will hereinafter be described with reference to FIGS. 2 and 3.

The numeral 11 is a slider for turning on and off a main switch SM. When the slider 11 is at ON position, the body BD is in an operable condition. When the slider 11 is at OFF position, the body BD is in an inoperable condition.

The numeral 12 is a release button. By depressing the release button 12 halfway, the subsequently-described photographing switch S1 is turned on to start a photometry, exposure calculation and automatic focusing operations. When the release button 12 is depressed all the way down, the subsequently-described switch S2 is turned on to start an exposure control operation.

The numeral 13 is a wide view key for obtaining a finder field larger than an actual photographing area before photographing (before release). That is, the wide view key 13 is used for turning on and off a function of zoom up during release a photographing area viewed through a subsequently-described photographing frame FD2 (see FIG. 6) so that it corresponds to an area to be printed onto film (the wide view function).

The numeral 14 is a body display section, where a shutter speed, an aperture value, information on switches, a battery condition and other information are displayed. Moreover, in a finder display section shown in FIG. 6, a shutter speed and a photographing frame are displayed (at FD4 and at FD2, respectively).

The numeral 15 is a mount lock pin. When the interchangeable lens LE is attached to the body BD, a subsequently-described lens attachment switch SLE is OFF under a mount lock condition. Under other conditions, the lens attachment switch SLE is ON.

The numeral 16 is an AF coupler, which is rotated according to the rotation of an AF motor provided in the body BD.

The numeral 17 is a stop down lever for closing an aperture of the interchangeable lens LE by a stop down amount obtained by the body BD.

The numeral 19 is an AF/M changeover switch for a change-over between an AF condition and a FA condition.

The numeral 20 is an APZ switch. When the APZ switch 20 is ON, the APZ mode is set. When the APZ switch is OFF, the ASZ mode is set.

Next, a name and function of each portion of the interchangeable lens LE of FIG. 3 will be described.

The numerals 25, 26 and 27 are a mount lock groove, an AF coupler and a stop down lever, respectively. When the interchangeable lens LE is attached to the body BD, the mount lock pin 15 of the body BD engages with the mount lock groove 25 of the interchangeable lens LE and a convex portion of the AF coupler 16 of the body BD engages with a concave portion of the AF coupler 26 of the interchangeable lens LE. Consequently, the rotation of the AF motor of the body BD is transmitted to the interchangeable lens LE through the AF couplers 16 and 26 to move the AF lens to perform focusing. Further, terminals J1 to J8 of the interchangeable lens LE are connected to terminals J1 to J18 of the body BD, respectively. Moreover, the stop down lever 17 of the body BD engages with the stop down lever 27 of the interchangeable lens LE. As the stop down lever 17 of the body BD moves, the stop down lever 27 of the interchangeable lens LE also moves by a movement amount of the stop down lever 17 to control an aperture value so as to correspond to the movement amount of the stop down levers 17 and 27.

The numeral 28 is an image size lock button. When the button 28 is depressed, the ISL function is activated.

The numeral 80 is a zoom ring, which is rotated to specify a direction and a speed for power zoom.

Subsequently, the circuit arrangement of the camera system will be described.

Figure 4:
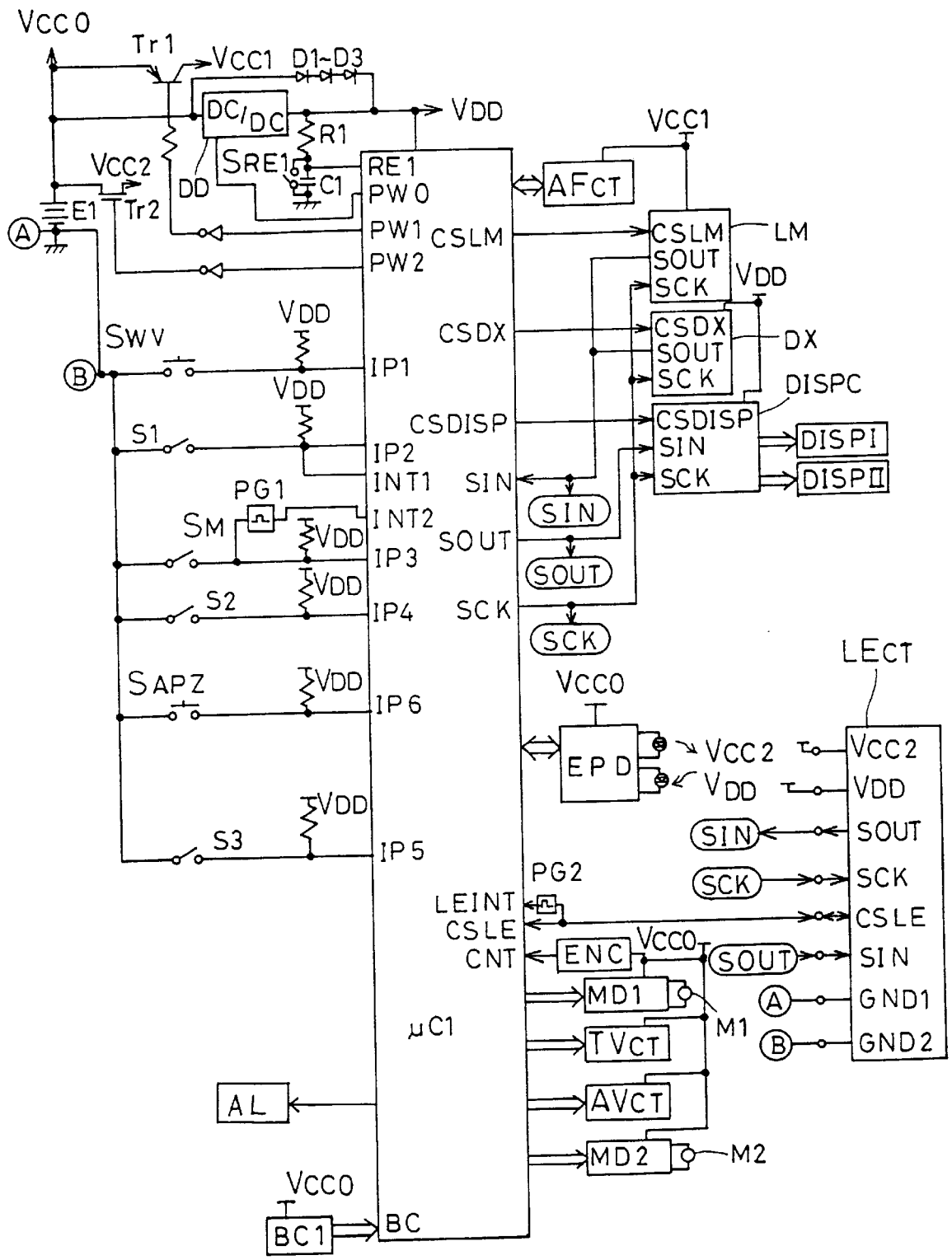
FIG. 4 is a circuit diagram of an intra-body circuit incorporated in the body of the camera system embodying the present invention.

FIG. 4 is a circuit diagram of an intra-body circuit incorporated in the body BD. First, the intra-body circuit will be described with reference to FIG. 4.

$\mu$C1 is an intra-body microcomputer for controlling the entire camera system and performing various calculations.

AFCT is a focus detection light receiving circuit, which is provided with a CCD (charge coupled device) serving as an integration-type optical sensor for focusing where an optical charge is accumulated for a predetermined period of time, a drive circuit for the CCD and a circuit for processing and A/D (analog to digital)-converting the output of the CCD to supply it to the intra-body microcomputer $\mu$C1 (data dump). The focus detection light receiving circuit AFCT is connected to the intra-body microcomputer $\mu$C1 through a data bus. Information on a defocus amount of a subject located in a focus detection area is obtained through the focus detection light receiving circuit AFCT.

LM is a photometry circuit provided on the finder optical path. A photometry value thereof is A/D-converted and provided to the intra-body microcomputer $\mu$C1 as luminance information.

DX is a film sensitivity reading circuit for reading a film sensitivity data provided to a film holder to serially output the data to the intra-body microcomputer $\mu$C1.

DISPC is a display control circuit for receiving a display data and a display control signal from the intra-body microcomputer $\mu$C1 to cause a display section DISPI on the upper surface of the body BD (the display section 14 of FIG. 2) and a display section DISPII (FD4 and FD2 of FIG. 6) in the finder to provide a predetermined display.

Figure 8:
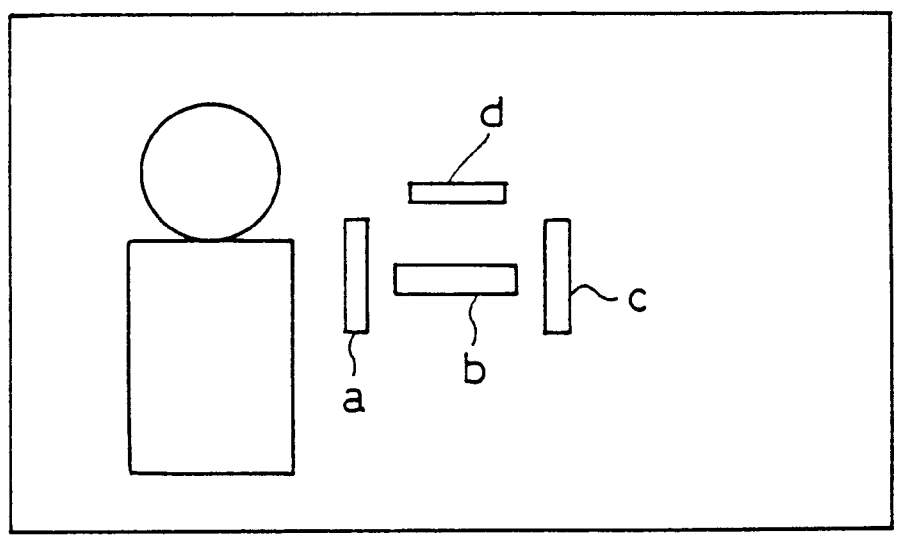
FIG. 8 is a multi-point focus detection image view of the camera system embodying the present invention.

Here, the display in the finder shown in FIG. 6 will be explained. In the figure, FD1 is a finder frame showing an area where a subject can be actually viewed. FD2 is a photographing frame which is displayed when the wide view finder function is activated by an operation of the wide view key 13. A subject located within the photographing frame FD2 can be photographed. FD3 shows a focus detection area. A subject within the frame FD3 can be focused on. Practically, the focus detection islands a to d as shown in FIG. 8 are provided in the focus detection area FD3, and a subject located in these focus detection islands is focused on. FD4 and FD5 are a shutter speed and a control aperture value, respectively, which are obtained by a photometry calculation.

EPD is an eye sensing circuit for sensing that the user is looking through the finder (this sensing will hereinafter be referred to as "eye sensing").

LECT is an intra-lens circuit incorporated in the interchangeable lens LE (hereinafter referred to as lens LE) for supplying information particular to the lens LE to the intra-body microcomputer $\mu$C1. The intra-lens circuit LECT will be described later in detail.

M1 is an AF motor for driving an AF lens provided in the lens LE through the AF couplers 16 and 26.

MD1 is a motor drive circuit for driving the AF motor M1 based on focus detection information. A normal or a reverse rotation and stopping of the motor drive circuit MD1 is controlled by an instruction from the intra-body microcomputer $\mu$C1.

ENC is an encoder for monitoring the rotation of the AF motor M1. The encoder ENC inputs a pulse to a counter input terminal CNT of the intra-body microcomputer $\mu$C1 every predetermined rotation angle. The intra-body microcomputer $\mu$C1 counts the pulse to detect a lens movement amount from infinity position to the current lens position and calculates an object distance (subject distance) for a subject from the lens movement amount (i.e. moving-out pulse count CT).

TVCT is a shutter control circuit for controlling a shutter in response to a control signal from the intra-body microcomputer $\mu$C1.

AVCT is an aperture control circuit for controlling an aperture based on a control signal from the intra-body microcomputer $\mu$C1.

M2 is a motor for winding and rewinding film and charging an exposure control mechanism. MD2 is a motor drive circuit for driving the motor M2 based on an instruction from the intra-body microcomputer $\mu$C1.

Subsequently, arrangements relating to the power source will be explained.

E1 is a battery which is the power source of the body BD.

Tr1 is a first power supply transistor for supplying power to a part of the above-described circuit. Tr2 is a second power supply transistor for supplying power for driving a zoom motor in the lens LE. The transistor Tr2 is of MOS (metal oxide semiconductor) structure.

DD is a DC/DC (direct current to direct current) converter for stabilizing a voltage VDD to be supplied to the intra-body microcomputer $\mu$C1, and operates when the level of a power control terminal PW0 is "High". VDD is a power supply voltage for the intra-body microcomputer $\mu$C1, the intra-lens circuit LECT, the film sensitivity reading circuit DX and the display control circuit DISPC. VCC1 is a power supply voltage for the focus detection light receiving circuit AFCT and the photometry circuit LM, and is supplied from the battery E1 through the first power supply transistor Tr1 under control of a signal outputted from a power control terminal PW1. VCC2 is a power supply voltage for the zoom motor in the lens LE, and is supplied from the battery E1 through the second power supply transistor Tr2 under control of a signal outputted from a power control terminal PW2. VCC0 is a power supply voltage for the motor drive circuit MD1, the shutter control circuit TVCT, the aperture control circuit AVCT and the motor drive circuit MD2, and is supplied directly from the battery E1.

D1 to D3 are diodes for, in order to reduce power consumption providing a voltage lower than the voltage VDD to the intra-body microcomputer $\mu$C1 when the DC/DC converter DD halts its operation. The lower voltage is set to a minimum power supply voltage at which the intra-body microcomputer $\mu$C1 can operate. When the DC/DC converter DD halts its operation, only the intra-body microcomputer $\mu$C1 can be operated.

BC1 is a battery check circuit for detecting the voltage VCC0 of the battery E1 and sending the detection result to the intra-body microcomputer µC1.

GND1 is a ground line for a small-power-consumption portion. Between the lens LE and the body BD is connected through the terminals J17 and J7. Although it is necessary to provide different ground lines to an analog portion and a digital portion in the body BD, the lines are represented by a single line in the figure for convenience.

GND2 is a ground line for a large-power-consumption portion. Between the lens LE and the body BD is connected through the terminals J18 to J8.

Subsequently, switches will be described. SWV is a normally-open push switch for a changeover between ON and OFF of a wide view mode, and is turned on when the previously-mentioned wide view key 13 is depressed.

SAPZ is a normally-open push switch for a changeover between ON and OFF of the APZ function, and is turned on when the previously-mentioned APZ switch 20 is depressed.

S1 is a photographing switch which is turned on when the release button 12 is depressed halfway. When the switch S1 is turned on, an interrupt signal is inputted into an interrupt terminal INT1 of the intra-body microcomputer µC1 to perform preparation operations such as photometry, focus detection, driving of the AF lens which are required for photographing.

SM is a main switch which is turned on when the slider 11 for enabling the operation of the camera is at ON position and turned off when the slider 11 is at OFF position.

PG1 is a pulse generator which outputs a "Low" level pulse every time the switch SM is turned from on to off or from on to off. The output of the pulse generator PG1 is inputted into an interrupt terminal INT2 of the intra-body microcomputer µC1 as an interrupt signal.

S2 is a release switch which is turned on when the release button 12 is depressed all the way down. When the switch S2 is turned on, a photographing operation is performed.

S3 is a mirror up switch which is turned on when a mirror up operation is completed and turned off when a shutter mechanism is charged and a mirror down operation is completed.

SRE1 is a battery attachment detecting switch which is turned off when the battery E1 is attached to the body BD. When the battery E1 is attached and the battery attachment detecting switch SRE1 is turned off, a capacitor C1 is charged through a resistor R1 to change the level of a reset terminal RE1 of the intra-body microcomputer µC1 from "Low" to "High". Then, the intra-body microcomputer µC1 executes a reset routine to be described later.

Subsequently, arrangements for serial data communication will be described.

The photometry circuit LM, the film sensitivity reading circuit DX and the display control circuit DISPC perform serial data communication with the intra-body microcomputer µC1 through each of the following signal lines: a serial input SIN, a serial output SOUT and a serial clock SCK. The communication partner of the intra-body microcomputer µC1 is selected based on the levels of chip select terminals CSLM, CSDX and CSDISP. That is, when the level of the terminal CSLM is "Low", the photometry circuit LM is selected; when the level of the terminal CSDX is "Low", the film sensitivity reading circuit DX is selected; and when the level of the terminal CSDISP is "Low", the display control circuit DISPC is selected. Moreover, three signal lines SIN, SOUT and SCK for serial communication are connected to the intra-lens circuit LECT through the terminals J15, J5; J14, J4; and J16, J6. By these signal lines, the level of the terminal CSLE is changed to "Low" when the intra-lens circuit LECT is selected as the communication partner. The signal is transmitted to the intra-lens circuit LECT through the terminals J3 and J13.

Figure 5:
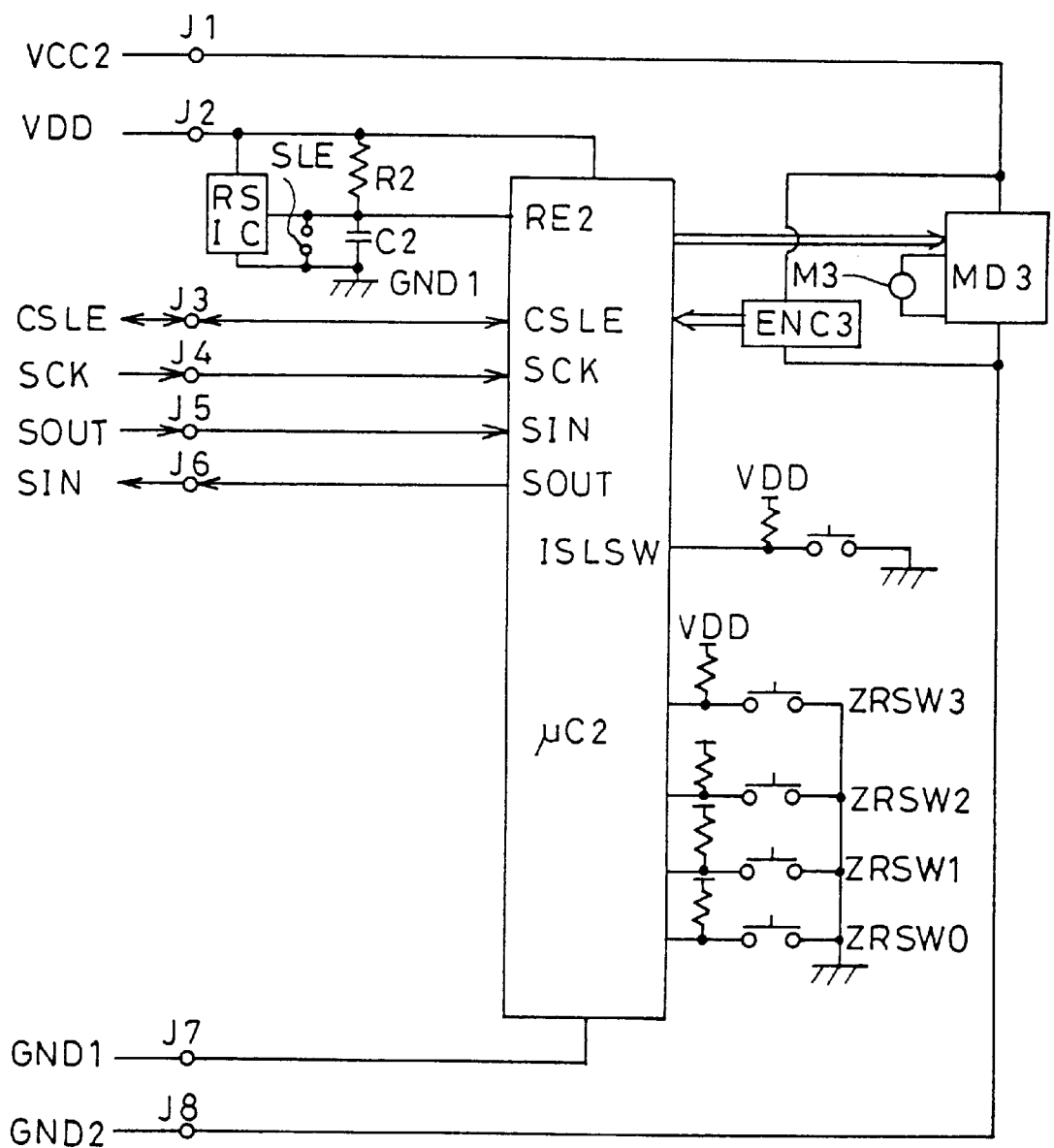
FIG. 5 is a circuit diagram of an intra-lens circuit incorporated in the interchangeable lens attached to the camera system embodying the present invention.

Subsequently, the intra-lens circuit LECT will be described with reference to FIG. 5. FIG. 5 is a circuit diagram of the intra-lens circuit LECT incorporated in the lens LE. In the figure, µC2 is an intra-lens microcomputer for control of the zoom motor incorporated in the lens LE, data communication with the body BD and other control such as mode setting.

Here, the terminals J1 to J8 to be connected to the body BD will be explained. J1 is a power supply terminal for supplying the power supply voltage VCC2 for driving the zoom motor from the camera body BD to the lens LE. J2 is a power supply terminal for supplying the power supply voltage VDD used for other than the driving of the zoom motor from the body BD to the lens LE. J3 is a terminal for inputting and outputting a signal representative of a request for data communication. J4 is a clock terminal for inputting a clock for data communication from the body BD. J5 is a serial input terminal for inputting a data from the body BD. J6 is a serial output terminal for outputting a data to the body BD. J7 is a ground terminal for circuits other than motor drive circuits. J8 is a ground terminal for the motor drive circuits.

A signal line with respect to the terminal CSLE transmitted through the terminals J3 and J13 provided between the lens LE and the body BD is a bidirectional signal line. When a signal is transmitted through this signal line from the intra-body microcomputer µC1 to the intra-lens microcomputer µC2, an interrupt is applied to the intra-lens microcomputer µC2, so that the intra-lens microcomputer µC2 is activated and the lens LE is selected as the communication partner of the body BD. On the contrary, when a signal is transmitted through this signal line from the intra-lens microcomputer µC2 to the intra-body microcomputer µC1, an interrupt signal is inputted to a lens interrupt terminal LEINT of the intra-body microcomputer µC1 by a pulse generator PG2 (see FIG. 4), so that the intra-body microcomputer µC1 is activated. The intra-body microcomputer µC1 does not accept the interrupt LEINT while a data is being transmitted from the intra-body microcomputer µC1 to the intra-lens microcomputer µC2.

RSIC is a reset IC (integrated circuit) for resetting the intra-lens microcomputer µC2 when the voltage VDD supplied from the body BD is lower than a normal operation voltage of the intra-lens microcomputer µC2. R2 and C2 are a reset resistor and a reset capacitor, respectively, for resetting the intra-lens microcomputer µC2.

RE2 is a reset terminal of the intra-lens microcomputer µC2. The voltage VDD for driving the intra-lens circuit is supplied thereto from the body BD. When the level of the terminal RE is changed from "Low" to "High" by the resistor R2 and the capacitor C2, the intra-lens microcomputer µC2 performs a reset operation.

M3 is a zoom motor for driving the zoom lens. The driving of the zoom lens by the zoom motor M3 allows the focal length to continuously change.

MD3 is a motor drive circuit for driving the zoom motor M3, and controls the rotation of the zoom motor M3 in response to a control signal representative of a motor drive direction and a motor drive speed provided by the intra-lens microcomputer µC2. Moreover, the motor drive circuit MD3 shorts both terminals of the zoom motor M3 and stops the application of the voltage in response to a motor stop signal and a motor halt signal provided by the intra-lens microcomputer μC2.

ENC3 is an encoder for detecting a rotation amount of the zoom motor M3. The encoder ENC3 is also used for detecting a focal length.

SLE is a lens attachment detecting switch which is turned off when the lens LE is attached to the body BD and mount-locked. When the lens LE is detached from the body BD, the switch SLE is turned on to short both terminals of the capacitor C2. Thereby, the charge accumulated in the capacitor C2 is discharged, and the level of the terminal RE2 of the intra-lens microcomputer μC2 is changed to "Low". Thereafter, on attachment of the lens LE to the body BD, the switch SLE is turned off. Consequently, the capacitor C2 is charged through the power line VDD, and the level of the terminal RE2 is changed to "High" after a predetermined period of time determined by the resistor R2 and the capacitor C2. Then, the intra-lens microcomputer μC2 performs a reset operation as previously described.

Switches ZRSW0 to ZRSW3 are set in correspondence with each operation as shown in Table 1, and turned on and off by an operation of the zoom ring. The switches ZRSW0 to ZRSW3 determine a zoom direction and a zoom speed.

An ISL switch ISLSW is a switch for initiating an operation of the ISL function by a depression of the image size lock button 28 of FIG. 3.

Subsequently, features by which the present invention is characterized will be explained.

First, a treatment coping with an operation of the switch S2 during zooming will be explained.

In conventionally-known zoom lenses, an out-of-focus condition is not caused even if release is performed during zooming since a focus position is not shifted even if the focal length is varied. In a case, however, where zooming is performed by use of the varifocal lens like in this embodiment, a correction is required to obtain an in-focus condition.

In conventional camera systems employing the varifocal lens, during zooming such as the APZ, a release operation is not accepted even when the switch S2 is turned on, or even if the release operation is accepted, a focus detection operation is started at that time for the first time. As a result, a picture which the user intended to take may not be taken, and release time lag may increase.

To avoid this, in this embodiment, zooming is halted for a while when the switch S2 is turned on during zooming (such as the APZ), and focus detection is again performed thereafter to perform release based on a correction value obtained at that time.

Next, determination of distance measurement accuracy of the ASZ will be explained.

In order to obtain the subject distance D (distance measurement data), in-focus condition is obtained with respect to a subject through AF, and the position of the AF lens at that time is detected. This operation is called distance measurement. The ASZ is a function of performing zooming until a focal length f corresponding to the subject distance D is attained.

In the ASZ, the lens is naturally moved from the wide side (shorter focal length side) to the telephoto side (longer focal length side) if the user intends to photograph a subject located at a long distance from the camera at the wide angle end (the shortest focal length condition). However, since distance measurement accuracy is low at the wide side, zooming may be performed based on a distance measurement data of the low accuracy if the lens is moved from the wide side to the telephoto side by the ASZ.

To avoid this, in this embodiment, when the lens is moved from the telephoto side to the wide side by the ASZ, zooming is performed based on the distance measurement data (since the distance measurement accuracy is high), and when the lens is moved from the wide side to the telephoto side, distance measurement is repeated while zooming is being performed (since the distance measurement accuracy is low). Continuously varying the focal length by repeating distance measurement, the distance measurement accuracy improves as the focal length increases. When the focal length exceeds a pre-set focal length corresponding to the distance measurement accuracy, zooming is performed based on a distance measurement data obtained at that time. That is, whether or not the current focal length exceeds the pre-set focal length corresponding to the distance measurement accuracy is determined every time distance measurement is being performed, and zooming is stopped after performed based on the distance measurement data obtained when the focal length exceeds the pre-set focal length.

With such an arrangement, the accuracy of the stop position of the lens does not vary, and moreover, neither a plurality of huntings are generated until zooming is stopped nor multi-step driving is necessary. That is, in either of the cases where the lens is moved from the wide side to the telephoto side and where the lens is moved from the telephoto side to the wide side, the ASZ can be completed by a single movement of the lens.

Figure 9:
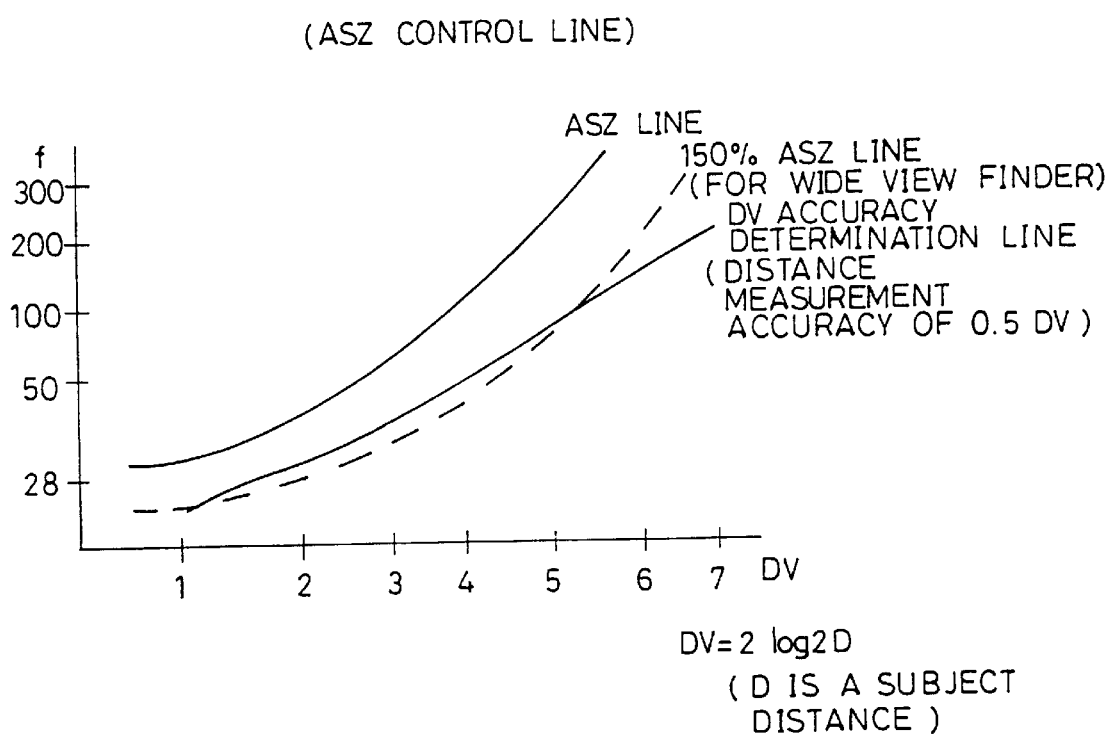
FIG. 9 shows an ASZ control line of the camera system embodying the present invention.

FIG. 9 is an ASZ control line showing a relationship between a DV (=2log2D, where D is a subject distance) and a focal length f. The above-mentioned pre-set distance measurement accuracy is indicated by a DV accuracy determination line in the figure. An ASZ line and a 150% ASZ line (for the wide view finder) are also shown in the figure.

Next, treatments copying with operations of the ASZ, APZ and ISL in the wide view finder will be explained.

In the wide view finder, under a condition where the user is looking through the finder, zooming up and release are performed by operations of the switch S1 and the switch S2, respectively. In a camera to which a lens of 28 to 105 mm is attached through which a 150% finder field (1.5 times the photographing frame) is viewed when a wide finder mode is ON, it is naturally impossible to perform zooming up in accordance with the photographing frame during photographing, for example, at the telephoto limit (the longest focal length condition) (105 mm) when it is sensed that the user is looking through the finder (i.e. S0 is ON).

To avoid this, in this embodiment, the focal length is limited up to (the longest focal length for normal photographing)/(the diagonal length of the finder frame/the diagonal length of the photographing frame) while the wide finder mode is ON. In the above example, the longest focal length obtained in the wide finder mode is 105 mm/1.5). With such an arrangement, the focal length is limited up to the longest focal length to which zooming up is possible in the ASZ, APZ and ISL. As a result, it can be avoided that zooming up in accordance with the photographing frame cannot be performed during operations of these functions.

In addition, the ASZ, APZ and ISL operations between frames in a low speed continuous photography mode will be explained.

In the low speed continuous photography mode, the number of release operations per second is smaller (e.g. two frames per second), while in a high speed continuous photography mode, the number of release operations per second is greater (e.g. four frames per second). The time required for a single release operation is 250 ms.

In the high speed continuous photography mode, only performing AF is possible; there is no time for performing zooming. In the low speed continuous photography mode, however, since 250 ms is available per frame, it is possible to perform zooming according to a movement of a subject in automatic modes such as the APZ and ISL. In this embodiment, zooming is performed at a high speed during the 250 ms in the low speed continuous photography mode. According to conventional automatic zooming, the zoom speed is limited so that the lens is moved smoothly.

Subsequently, software employed for this embodiment will be described.

Specific operations will hereinafter be described with reference to flow charts. The reference designations such as those of flags used in the flow charts are listed in FIG. 71 and Tables 2 to 8, while they will be described together with the description of the operations associated therewith.

Figure 11:
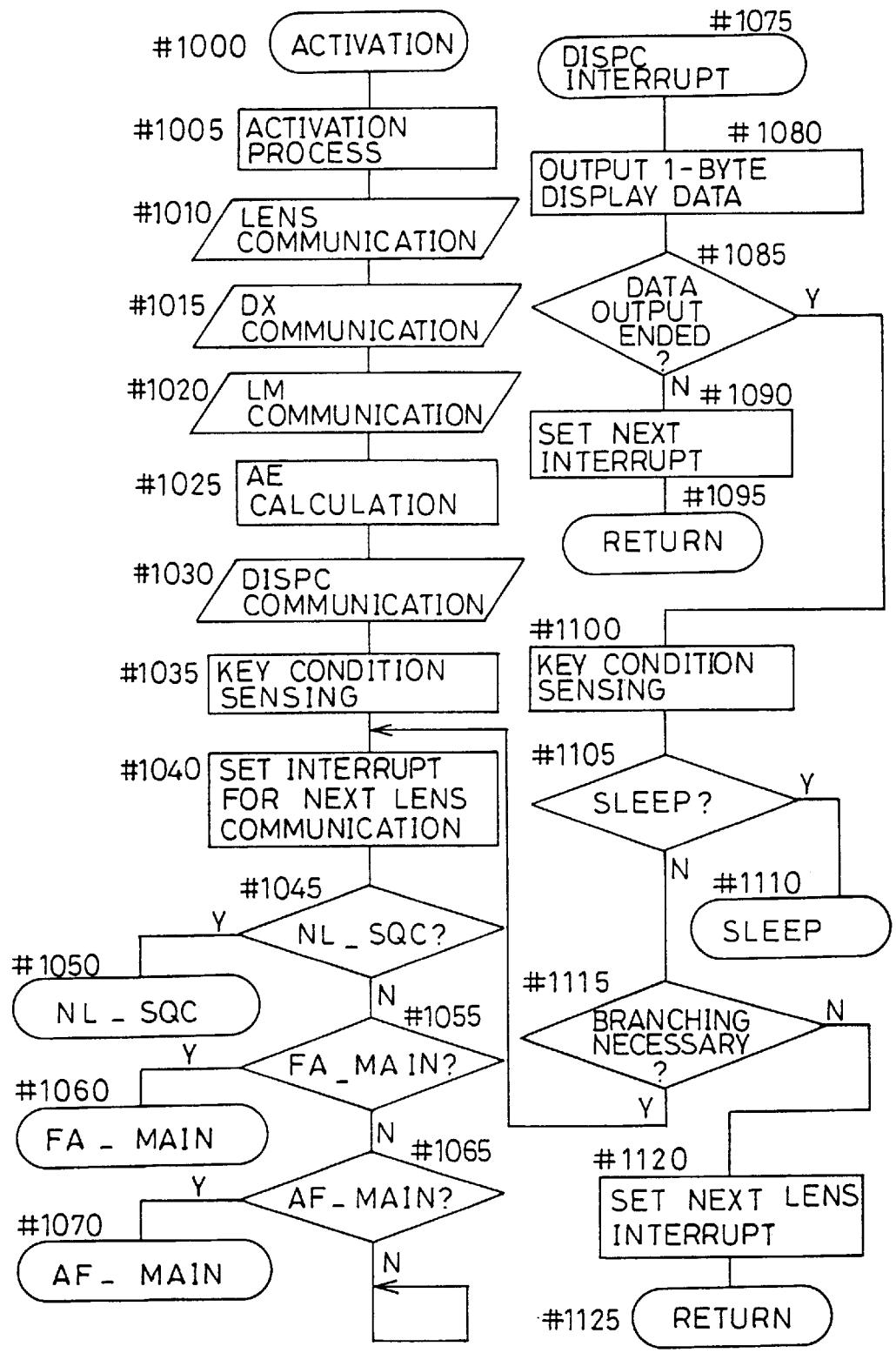
FIG. 11 is a flow chart of an activation routine of an intra-body microcomputer of the camera system embodying the present invention.

A flow chart of a main routine (activation routine) of the intra-body microcomputer $\mu$C1 is shown in FIG. 11.

First, when a switch such as the switch S0 for eye sensing and the switch S1 is turned on after the main switch 11 of the camera is turned on, a control program of the intra-body microcomputer $\mu$C1 is activated at step #1000. At step #1005, activating process such as initialization of flags is executed. Sequentially, at step #1010, a lens data such as an open aperture value and a data on the lens switch is read-in, and at step #1015, film information such as an ISO sensitivity is read-in. At step #1020, a photometry data is read-in by communicating with a photometry IC (integrated circuit). At step #1025, AE calculation for setting an exposure control condition is performed. At step #1030, a communication is performed with a display apparatus (a display microcomputer) to display the aperture value and the shutter speed which are set at step #1025. At step #1035, conditions of each key (switches of the body BD and the lens LE) are sensed to set a flag according thereto. At step #1040, an interrupt of communication with the intra-lens microcomputer $\mu$C2 is set (specifically, a timer for allowing a next interrupt is set). At step #1045, whether or not it is sensed that the keys are set so as to perform an NL (new lens) process such as the ISL and APZ at step #1035 is determined. When the result of the determination is yes, the process proceeds to step #1050, where an NL_SQC process is executed. Similarly, when it is determined at step #1055 that the keys are set so as to perform an FA process, the process proceeds to step #1060, where an FA_MAIN process is executed; when it is determined at step #1065 that the keys are set so as to perform an AF process, the process proceeds to step #1070, where an AF_MAIN process is executed. When it is determined at step #1065 that the keys are not set so as to perform the AF process (i.e. when the program is activated by an operation of a switch not associated with the AF operation), the intra-body microcomputer $\mu$C1 enters a sleep state, and waits for the interrupt of communication with the intra-lens microcomputer $\mu$C2 which is set at step #1040.

When a DISPC interrupt routine is activated by a DISPC interrupt which is set in a subsequently-described LM interrupt routine (step #1075), one byte of display data is outputted at step #1080. At step #1085, whether the outputting of the display data has ended or not is determined. When it has not ended, the DISPC interrupt for the next operation is set (the above-described setting of the timer) at step #1090, and the process returns at step #1095. When the outputting of the display data has ended at step #1085, conditions of the switches of the body BD and the lens LE are sensed at step #1100. At step #1105, whether or not the intra-body microcomputer $\mu$C1 enters the sleep state in accordance with a turn-off of the power is determined. When it enters the sleep state, the intra-body microcomputer $\mu$C1 sleeps at step #1110. When it does not enter the sleep state, at step #1115, whether branching is necessary or not is determined based on the result of the sensing of the key conditions. When branching is not necessary, a lens interrupt for the next operation is set at step #1120. When branching is necessary, the process proceeds to step #1040 of the activation routine and the succeeding process is executed. The latter is a case where setting of the power zoom (specifically, an operation of the zoom ring) is sensed at step #1100 while, for example, a normal AF operation is being performed. The process proceeds to step #1040 to executed the NL_SQC process.

Figure 12:
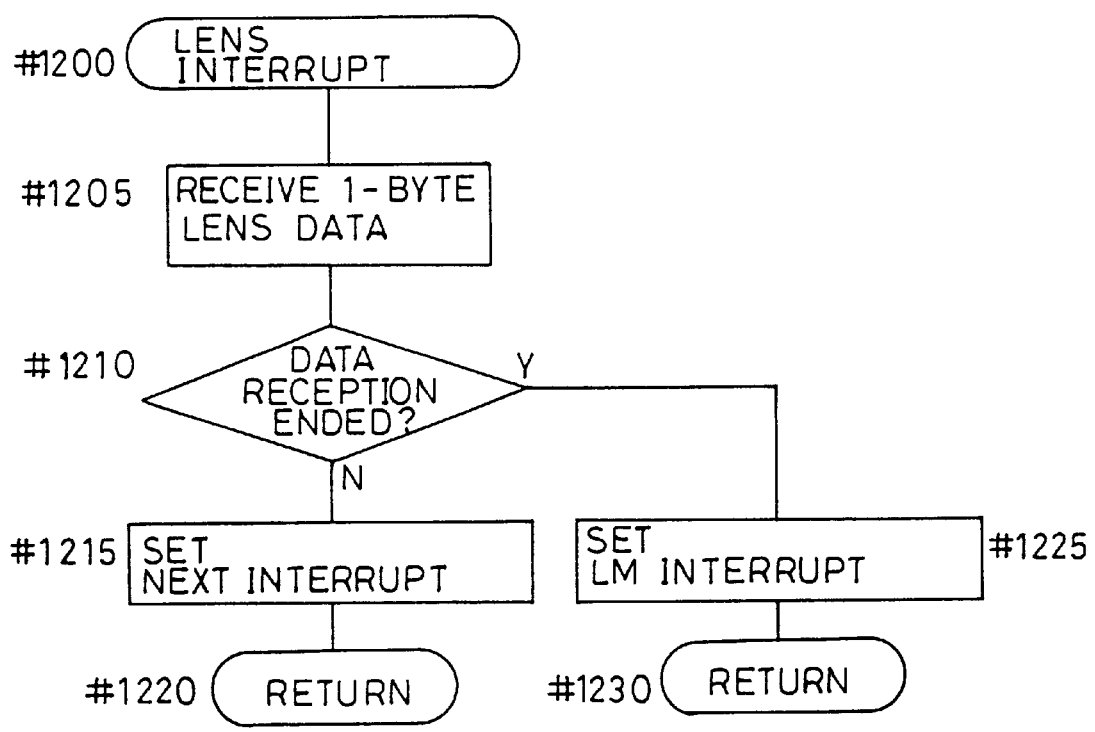
FIG. 12 is a flow chart of a lens interrupt routine of the intra-body microcomputer of the camera system embodying the present invention.

A flow chart of the above-mentioned lens interrupt routine is shown in FIG. 12.

When the lens interrupt routine is activated by the lens interrupt (step #1200), one byte of lens data is received at step #1205. The lens data includes all the data required by the intra-body microcomputer $\mu$C1. At step #1210, whether the receiving of all the lens data has ended or not is determined. When it has not ended, the lens interrupt for the next operation is set at step #1215, and the process returns at step #1220. When it has ended, an LM interrupt is set at step #1225, and the process returns at step #1230. The lens interrupt routine is a routine for receiving one byte of lens data, and is activated by applying the interrupt by the number of bytes of all the lens data.

Figure 13:
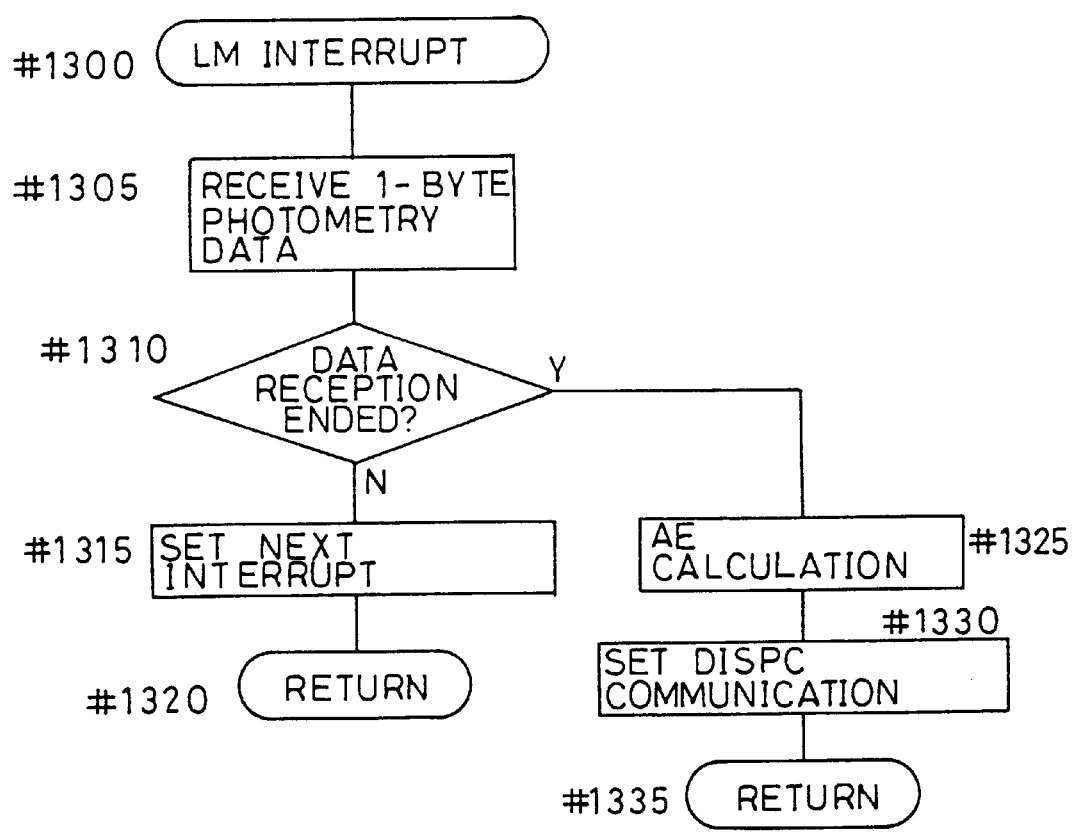
FIG. 13 is a flow chart of an LM interrupt routine of the intra-body microcomputer of the camera system embodying the present invention.

A flow chart of the LM interrupt routine executed when the LM interrupt set in the lens interrupt routine is applied is shown in FIG. 13.

When the LM interrupt routine is activated (step #1300), one byte of photometry data is received at step #1305. At step #1310, whether the receiving of all the photometry data has ended or not is determined. When it has not ended, the LM interrupt for the next operation is set at step #1315, and the process returns at step #1320. When it has ended, an exposure control value is calculated at step #1325. Then, at step #1330, the previously-mentioned DISPC interrupt is set, and the process returns at step #1335. Similarly to the lens interrupt routine, the LM interrupt routine is activated by applying the interrupt by the number of bytes of the photometry data.

Figure 14:
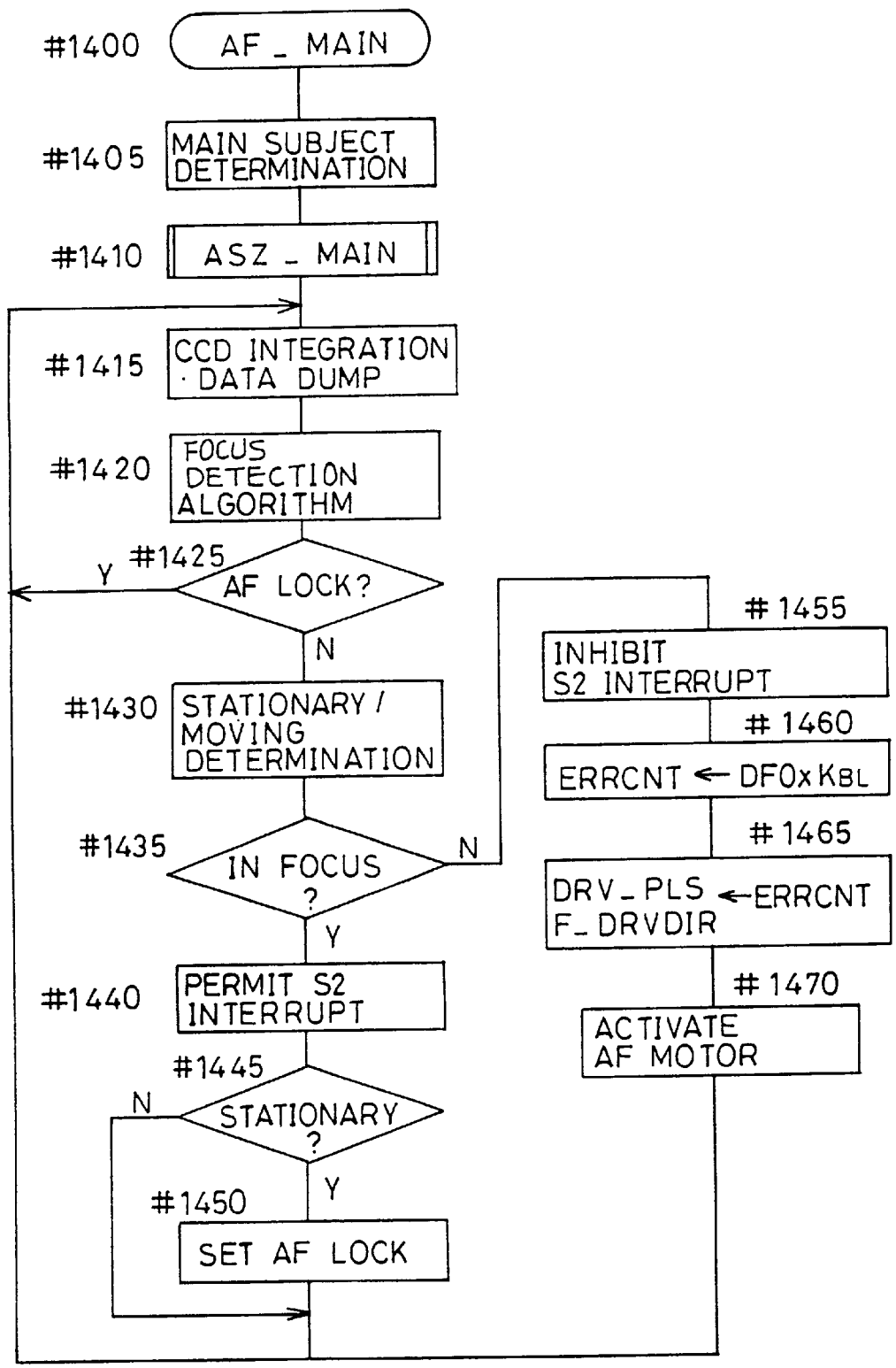
FIG. 14 is a flow chart of an AF_MAIN routine of the intra-body microcomputer of the camera system embodying the present invention.

A routine of the AF_MAIN process of step #1070 of the activation routine is shown in FIG. 14. This process is a conventionally-known normal AF process and is executed by a turning on of the switch S0 or S1 when the AF is set by the AF/M changeover switch 19 of the camera. In this routine, an ASZ process is automatically executed.

When this routine is activated (step #1400), determination of a main subject is made at step #1405. This is for determining a subject the user intends to photograph after waiting until the image is stabilized by waiting for a while or averaging in a case where the subject the user intends to photograph cannot be exactly determined when the user starts to look through the finder (i.e. when the switch S0 is turned on). A subject determined in this manner is referred to as a main subject. Sequentially, at step #1410, an ASZ_MAIN routine (to be described later) is executed where zooming and AF are performed in order to obtain an optimal angle of view for the main subject.

At step #1415, a CCD integration of the image of the subject is performed (in this specification, CCD integration means optical charge accumulation), and the data thereof is dumped. At step #1420, a focus detection algorithm is performed based on the data. At step #1425, whether an AF lock is ON or not is determined. When the AF lock is ON under a condition where the subject has already been in focus, the process returns to step #1415 and the succeeding process is repeated. When the AF lock is not ON, at step #1430, a stationary/moving determination is made where whether the subject is stationary or moving is determined.

At step #1435, whether the subject is in focus or not is determined. When the subject is in focus, an interrupt of the switch S2 (i.e. release) is permitted at step #1440, and at step #1445, whether or not the subject is determined to be stationary in the above-mentioned stationary/moving determination. When it is stationary, the AF lock is set at step #1450, and the process returns to step #1415. When it is not stationary, the process returns to step #1415 without executing any more process. When the subject is not in focus at step #1435, the interrupt of the switch S2 is inhibited at step #1455. At step #1460, a defocus amount DFO of an island selected among the four islands is multiplied by a coefficient KBL and the result is converted into a defocus amount ERRCNT. At step #1465, a drive pulse amount DRV_PLS of the AF lens (drive pulse amount of the motor) and a direction F_DRVDIR are set from the defocus amount ERRCNT. At step #1470, the motor for driving the AF lens is activated. Then, the process returns to step #1415, and the subsequent process is executed.

The driving of the AF motor is controlled by an interrupt according to the drive pulse amount DRV_PLS and the direction F_DRVDIR, and is automatically finished when the motor is driven by the drive amount.

Figure 15:
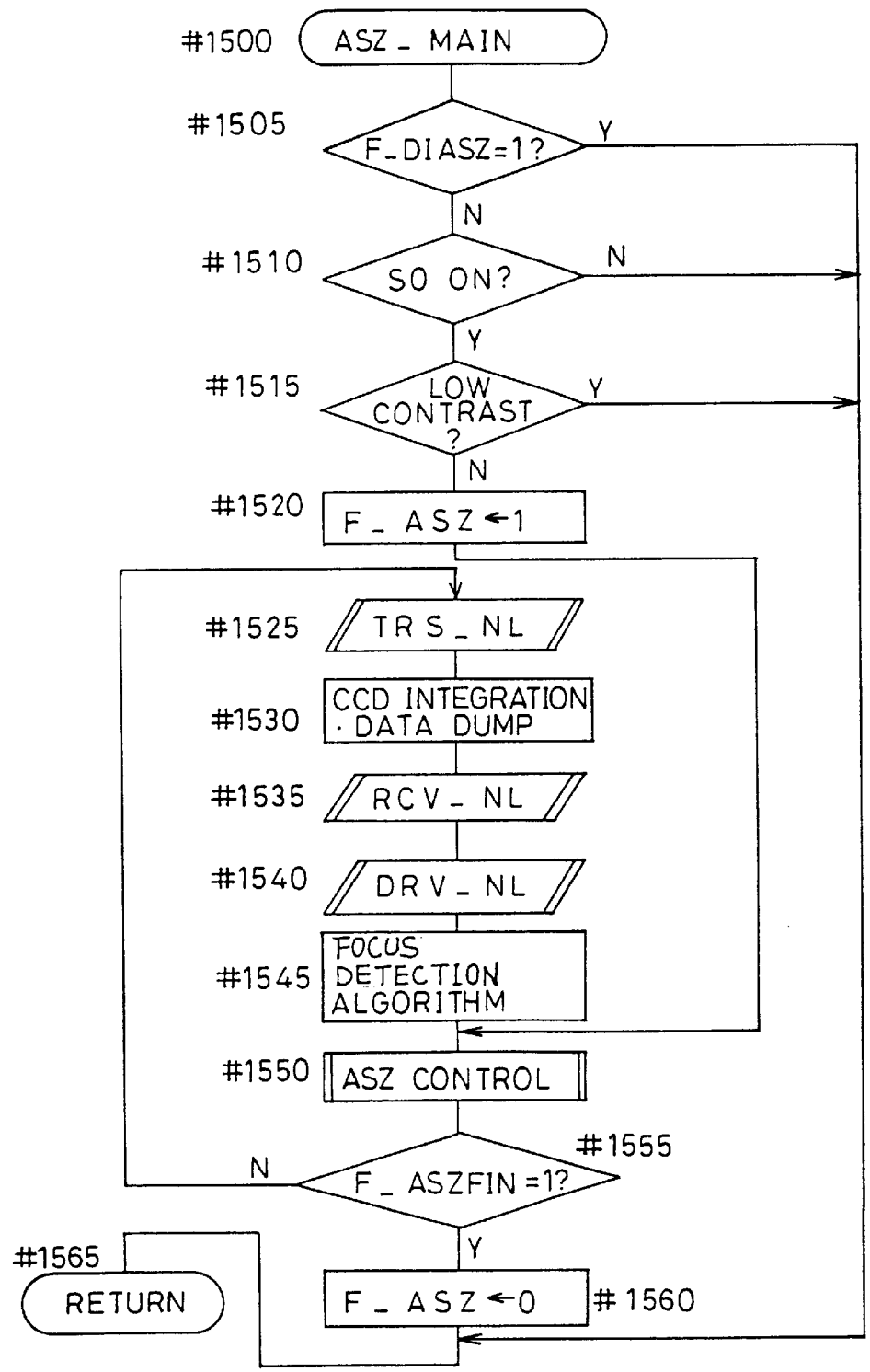
FIG. 15 is a flow chart of an ASZ_MAIN routine of the intra-body microcomputer of the camera system embodying the present invention.

A flow chart of the ASZ_MAIN routine of step #1410 of the AF_MAIN routine is shown in FIG. 15.

When the ASZ_MAIN routine is activated in the AF_MAIN routine (step #1500), first, determination of a flag F_DIASZ is made at step #1505. The flag F_DIASZ is for inhibiting the driving of the ASZ when it is set to 1. The ASZ is inhibited while the power zoom is being performed under the ON condition of the switch S0 or S1. When the flag F_DIASZ is 1 at step #1505, since the ASZ is inhibited, the process returns at step #1565 without executing any more process. When it is not 1, whether the switch S0 is ON or not is determined at step #1510. The ASZ process is to be executed just before photographing, and can be executed when the switch S0 is ON, i.e. when the user is looking through the finder. The ASZ process is not to be executed in a case where this routine is activated when the switch S0 is OFF and only the switch S1 is ON. Therefore, when the switch S0 is not ON at step #1510, the process returns at step #1565 without executing any more process. When the switch S0 is ON, a low-contrast determination, i.e. determination of whether or not focusing is impossible because of low luminance or low contrast is made at step #1515. When the contrast is low at step #1515, the process returns at step #1565. When the contrast is not low, the process proceeds to step #1520.

The ASZ process is executed when the ASZ is not inhibited, the eye sensing is performed and the contrast is not low. A flag F_ASZ showing that the ASZ process is being executed is set to 1 at step #1520, and the process proceeds to an ASZ control routine of step #1550. The ASZ control routine will be described later. At step #1555, whether a flag F_ASZFIN showing that the ASZ is finished is 1 or not is determined. When it is not 1, the process from step #1525 is repeated. When it is 1, determining that the ASZ process is finished, the flag F_ASZ showing that the ASZ process is being performed is reset to 0 at step #1560, and the process returns at step #1565.

Figure 67:
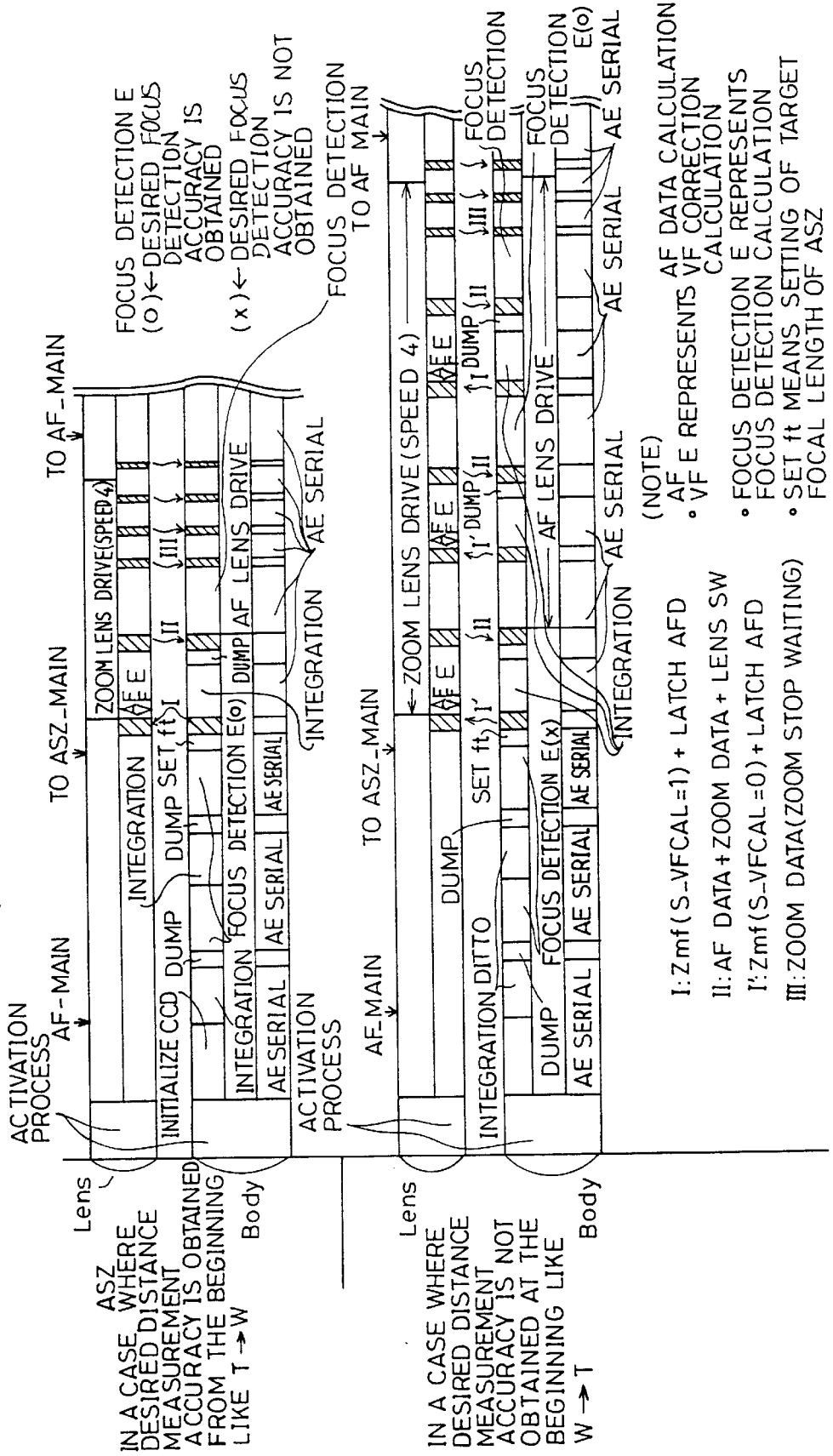
FIG. 67 is a timing chart under control of the APZ of the camera system embodying the present invention.

At step #1525, a TRS_NL routine for performing a communication cation from the intra-body microcomputer $\mu$C1 to the intra-lens microcomputer $\mu$C2 before the CCD integration is executed. After the CCD integration and the data dump are performed at step #1530, an RCV_NL routine for performing a communication from the intra-lens microcomputer $\mu$C2 to the intra-body microcomputer $\mu$C1 is executed at step #1535. At step #1540, a DRV_NL routine for actually driving the lens is executed. Then, the focus detection algorithm is performed at step #1545, and the process proceeds to the ASZ control routine of step #1550. The TRS_NL routine, the RCV_NL routine and the DRV_NL routine will be described later. A timing chart of the ASZ process is shown in FIG. 67.

Figure 16:
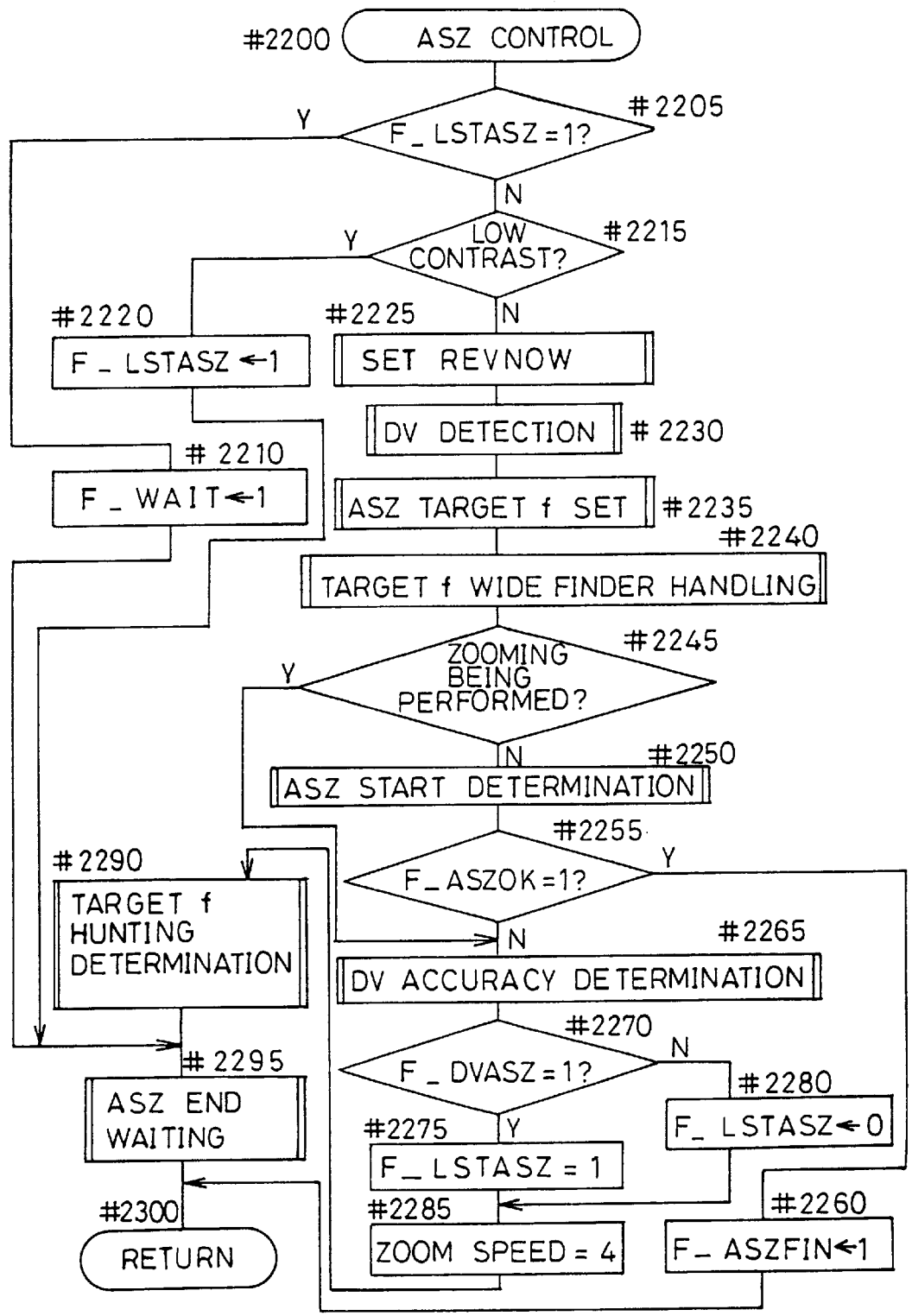
FIG. 16 is a flow chart of an ASZ control routine of the intra-body microcomputer of the camera system embodying the present invention.

A flow chart of the ASZ control routine of step #1550 of the ASZ_MAIN routine is shown in FIG. 16.

Figure 17:
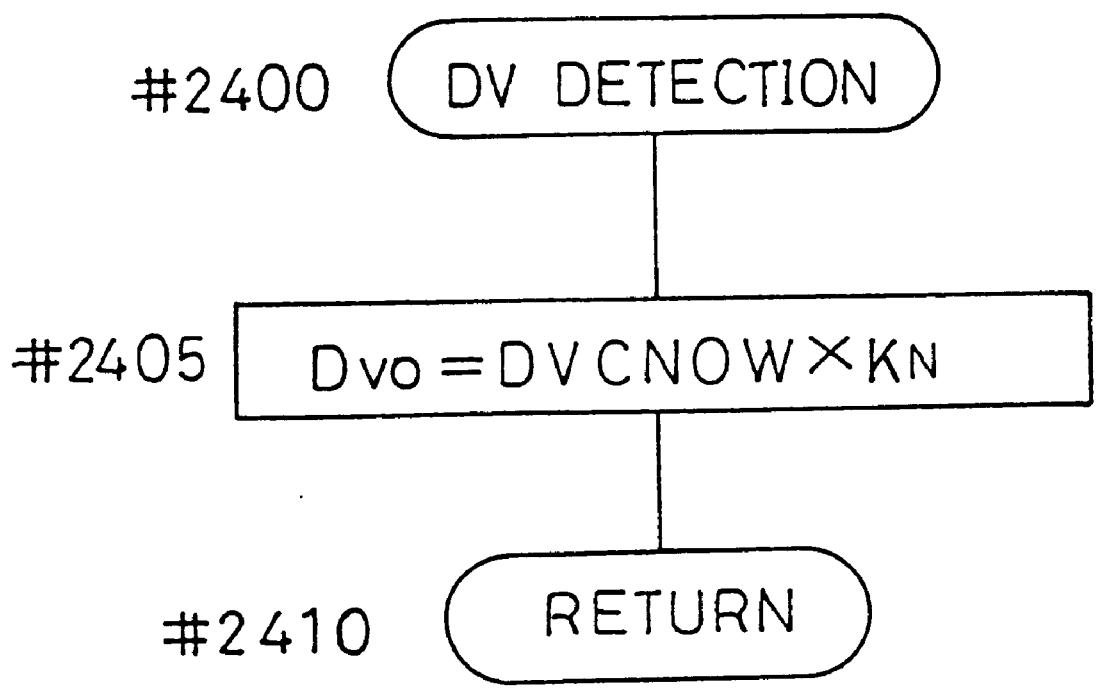
FIG. 17 is a flow chart of a DV detection routine of the intra-body microcomputer of the camera system embodying the present invention.

First, at step #2205, whether a flag F_LSTASZ showing that the current one is the last ASZ zooming is 1 or not is determined. When it is 1, since the current one is the last zooming, in order to stop zooming, an ASZ stop waiting flag F_WAIT is set to 1 at step #2210, and an ASZ end waiting routine of step #2295 is executed. Then, the process returns at step #2300. When the flag F_LSTASZ is not 1 at step #2205, whether the contrast is low or not is determined at step #2215. When the contrast is low, the flag F_LSTASZ is set to 1 at step #2220, and after the ASZ end waiting routine of step #2295 is executed, the process returns at step #2300. When the contrast is not low, a REVNOW set routine (to be described later) for setting a current moving-out amount REVNOW is executed at step #2225. At step #2230, a DV detection routine of FIG. 17 is executed. DV is a logarithmic value represented by 2log2D where D is a subject distance. At step #2405 of. FIG. 17, a DV0 obtained based on the current distance measurement result is calculated by multiplying the current AF lens position (current moving-out pulse count) DVCNOW by a DV conversion coefficient KN.

Figure 18:
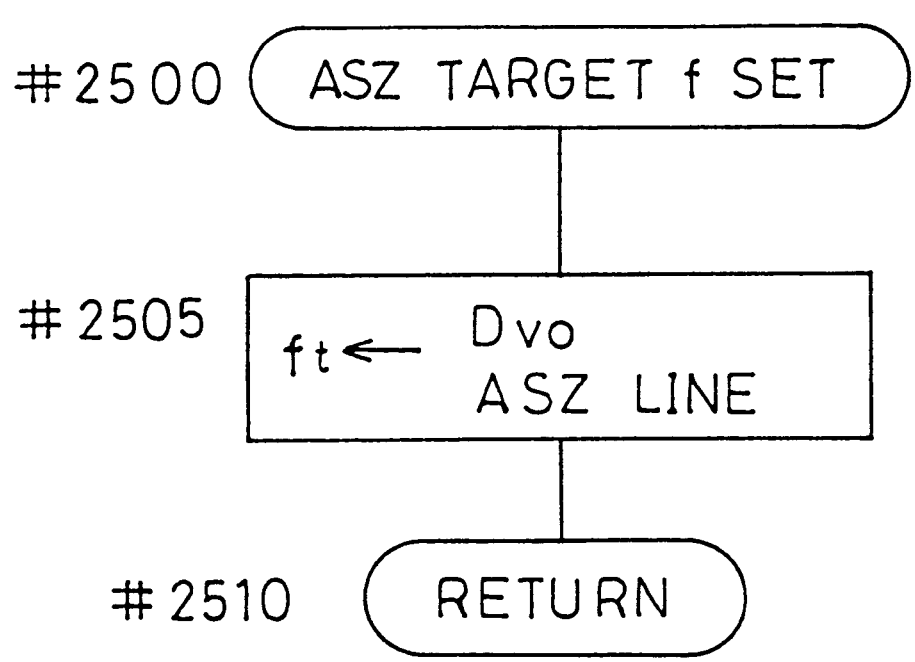
FIG. 18 is a flow chart of an ASZ target f set routine of the intra-body microcomputer of the camera system embodying the present invention.

Returning to FIG. 16, at step #2235, an ASZ target f (focal length) set routine of FIG. 18 is executed. At step #2505 of FIG. 19, a target focal length ft is calculated based on the DV0 obtained in the above-described DV detection routine and the ASZ line. The ASZ line is a line for determining a focal length f for the DV.

At step #2240 of FIG. 16, a target f wide finder handling routine for sending a focal length for the wide finder is executed. At step #2245, whether zooming is being performed or not is determined. When zooming is being performed, the process proceeds to step #2265. When zooming is not being performed, an ASZ start determination routine is executed at step #2250.

Figure 19:
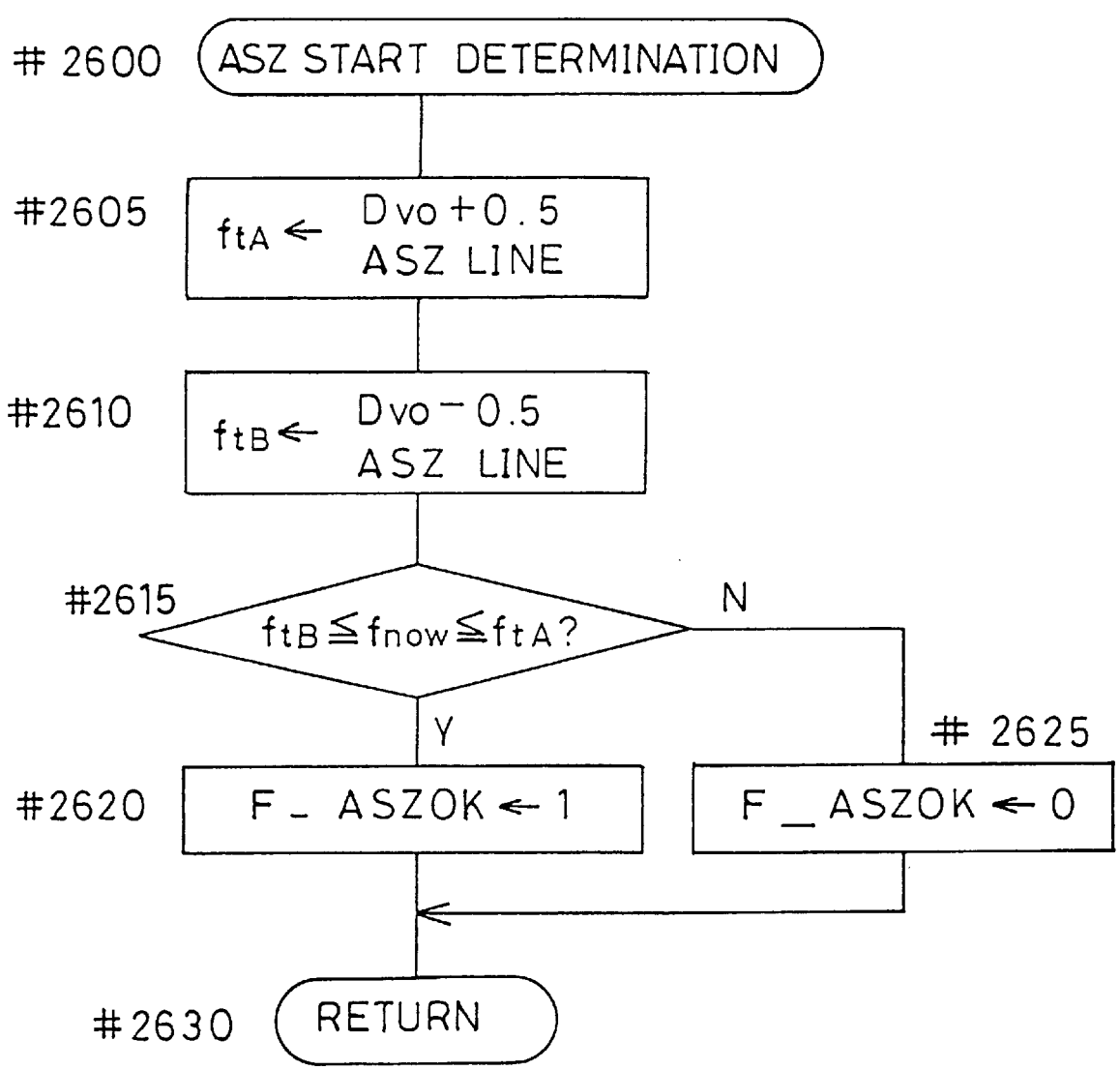
FIG. 19 is a flow chart of an ASZ start determination routine of the intra-body microcomputer of the camera system embodying the present invention.

A flow chart of the ASZ start determination routine is shown in FIG. 19. In this routine, a current focal length and a target focal length are compared, and a flag is set so that the ASZ process is not performed if the difference therebetween is within a predetermined range, i.e. the difference is very small. This prevents a slight movement caused by focusing from giving inconvenience to the user. At step #2605, a target focal length ftA is calculated by DV0+0.5 according to the ASZ line. At step #2610, a target focal length ftB is calculated by DV0−0.5 according to the ASZ line. At step #2615, whether or not a current focal length fnow is between the target focal lengths ftA and ftB. When the fnow is therebetween, determining that the ASZ is not necessary, a flag F_ASZOK for determining the necessity of the ASZ is set to 1 at step #2620, and the process returns at step #2630. When the current focal length fnow is not between the target focal lengths ftA and ftB, since the ASZ is necessary, the flag F_ASZOK is reset to 0 at step #2625, and the process returns at step #2630.

Returning to FIG. 16, after the ASZ start determination routine is completed, whether the flag F_ASZOK (set in the ASZ start determination routine) is 1 or not is determined at step #2255. When the F_ASZOK is 1 and the ASZ process is not necessary, an ASZ end flag F_ASZFIN is set to 1 at step #2260, and the process returns at step #2300. When the ASZ process is necessary at step #2255, a DV accuracy determination routine is executed at step #2265.

Figure 20:
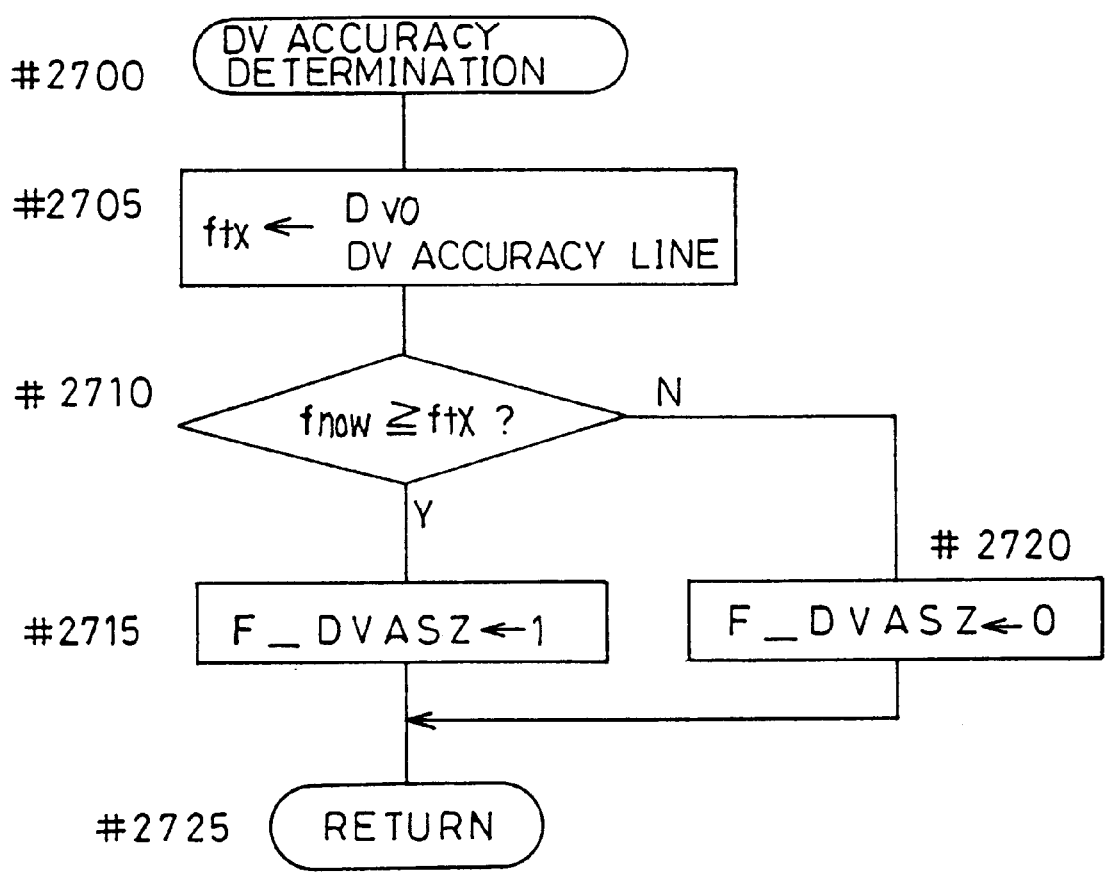
FIG. 20 is a flow chart of a DV accuracy determination routine of the intra-body microcomputer of the camera system embodying the present invention.

A flow chart of the DV accuracy determination routine is shown in FIG. 20. This is a routine for making determination of the distance measurement accuracy. As previously mentioned, the intra-lens microcomputer $\mu C2$ has two lines of a target focal length calculation line and the DV accuracy determination line, and can determine whether or not a desired distance measurement accuracy is obtained for a target focal length. At step #2705, a focal length ftX for DV accuracy is calculated based on the current object distance DV0 and the DV accuracy determination line. At step #2710, whether the current focal length fnow is equal to or larger than the focal length ftX or not is determined. When it is equal to or larger than the ftX, since the desired distance measurement accuracy is obtained on the telephoto side of the ftX, a flag F_DVASZ for the determination of the distance measurement accuracy is set to 1 at step #2715, and the process returns at step #2725. When the fnow is smaller than the ftX at step #2710, since the desired distance measurement accuracy is not obtained on the wide side of the ftX, the flag F_DVASZ is reset to 0 at step #2720, and the process returns at step #2725.

At step #2270 of FIG. 16, whether or not the flag F_DVASZ set in the DV accuracy determination routine is 1 is determined. When it is 1, since the desired accuracy is obtained, the flag F_LSTASZ is set to 1 at step #2275 in order to make the current zooming the last zooming. When it is not 1, the flag F_LSTASZ is reset to 0 at step #2280 so that the distance measurement is performed during the next zooming. At step #2285, the zoom speed is set to 4 which is a middle speed in both cases where the lens is moved toward the wide side and where the lens is moved toward the telephoto side. At step #2290, a target f hunting determination routine is executed to prevent hunting of the lens. At step #2295, the ASZ end waiting routine is executed, and the process returns at step #2300.

Figure 21:
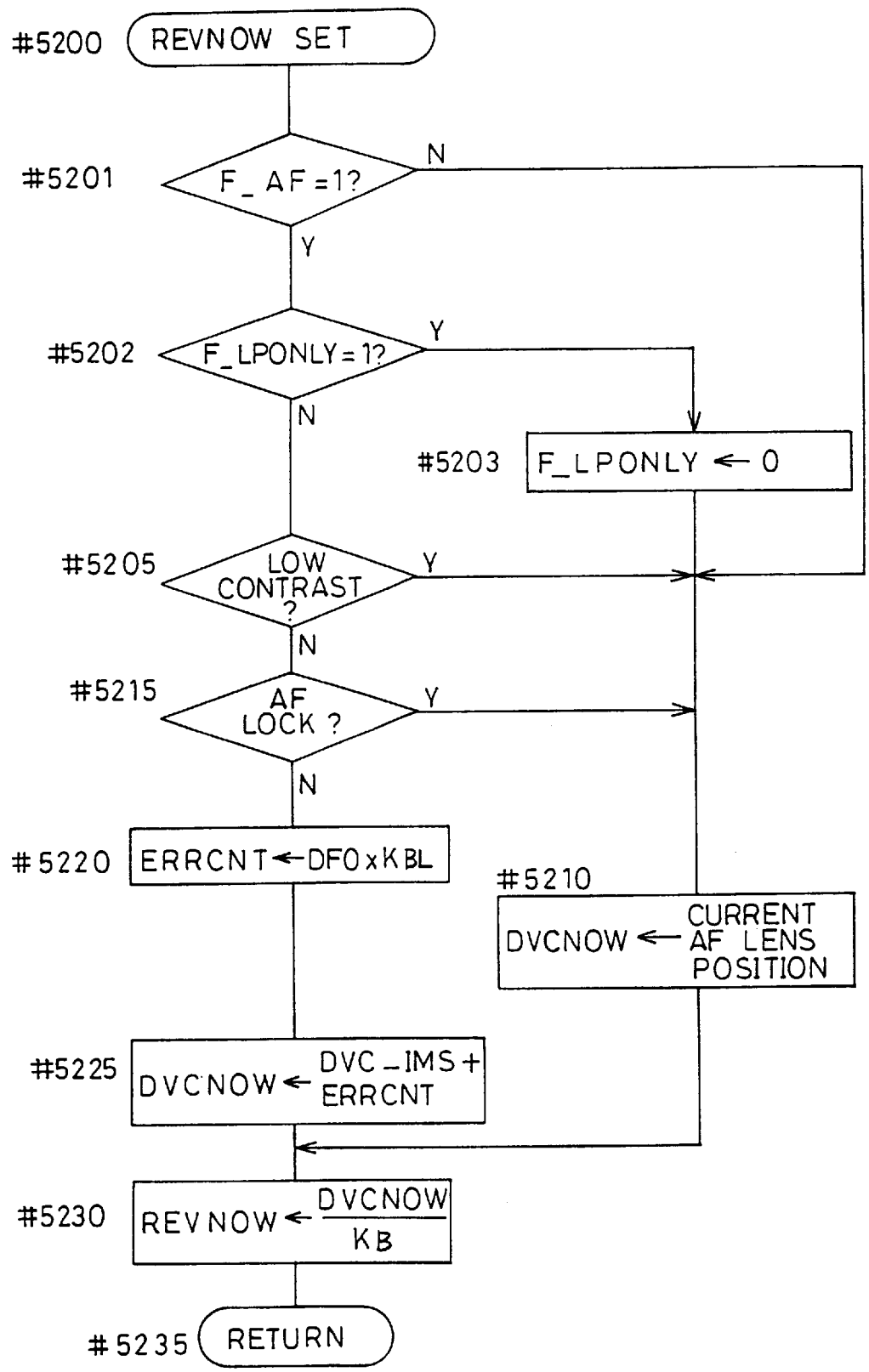
FIG. 21 is a flow chart of a REVNOW set routine of the intra-body microcomputer of the camera system embodying the present invention.

A flow chart of the previously-mentioned REVNOW set routine is shown in FIG. 21. The REVNOW set routine is a routine for calculating a current moving-out amount (the rotation number of the coupler) REVNOW of the AF lens for a correction of the varifocal lens.

When the REVNOW set routine is activated (step #5200), first, determination of a flag F_AF for setting the AF or the FA is made at step #5201, When the flag F_AF is not 1 and the FA is ON, the process proceeds to step #5210. When the flag F_AF is 1, determination of a flag F_LPONLY is made at step #5202. The flag F_LPONLY is a flag for determining whether or not the current moving-out amount REVNOW is to be calculated only from the current AF lens position. When the flag F_LPONLY is 1 at step #5202, the flag F_LPONLY is reset to 0 at step #5203, and the process proceeds to step #5210. When the flag F_LPONLY is not 1, whether the contrast is low or not is determined. When the contrast is low, the process proceeds to step #5210. When the contrast is not low, whether the AF lock is ON or not is determined at step #5215. When the AF lock is ON, i.e. when the subject is stationary and in focus, the process proceeds to step #5240. When the AF lock is not ON, since zooming is being continuously performed, the defocus amount ERRCNT is calculated from the defocus amount DFO of the selected island and the conversion coefficient KBL at step #5220. At step #5225, the current pulse position DVCNOW of the AF lens is calculated from the defocus amount ERRCNT and a lens position DVC_IMS in the center of the CCD integration. On the other hand, at step #5210, the pulse position DVCNOW is calculated from the current AF lens position. After the pulse position DVCNOW is calculated at either step, at step #5230, the moving-out amount REVNOW is obtained by DVCNOW/KB where KB is a coefficient for converting a coupler rotation number into a pulse count. Then, the process returns at step #5235.

Figure 22:
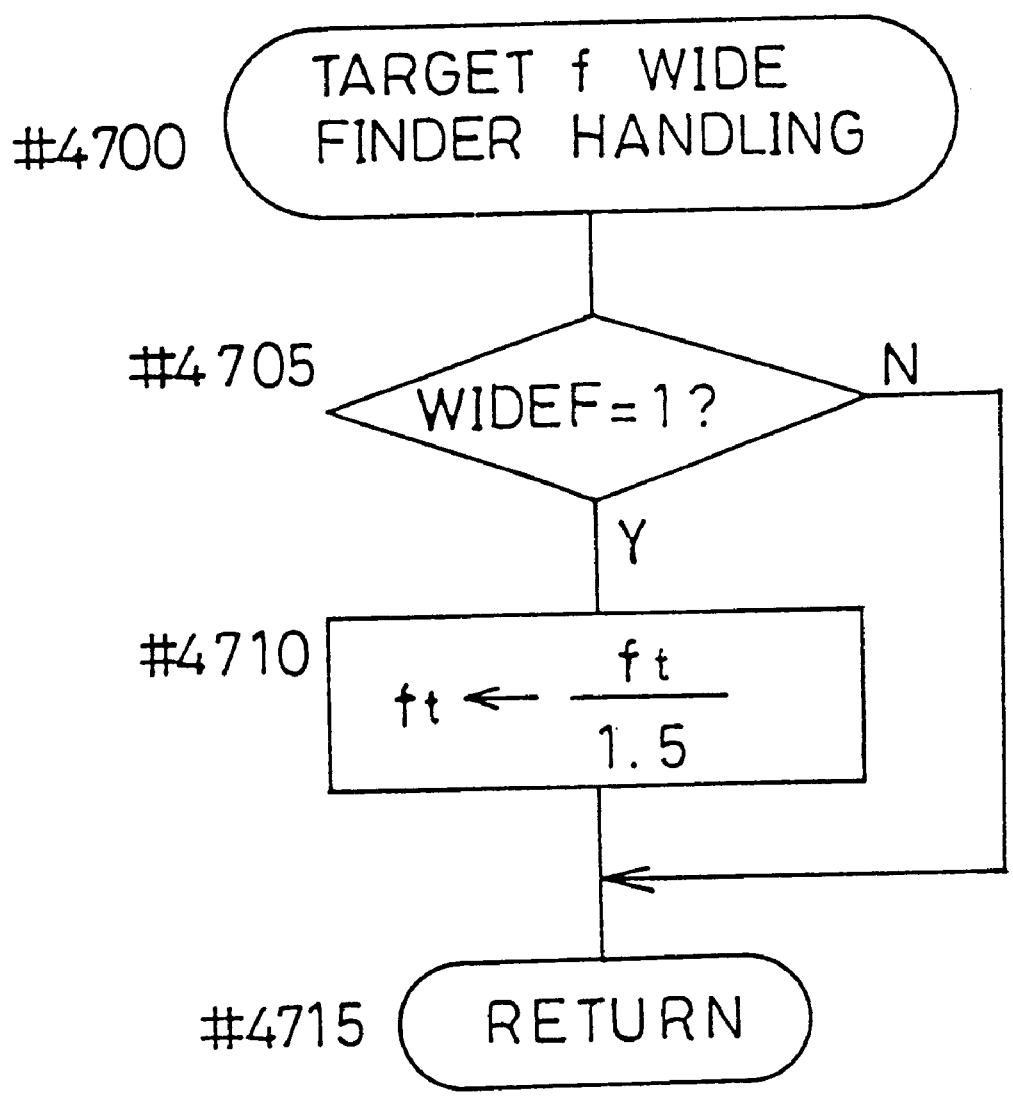
FIG. 22 is a flow chart of a target f wide finder handling routine of the intra-body microcomputer of the camera system embodying the present invention.

A flow chart of the previously-mentioned target f wide finder handling routine is shown in FIG. 22. This is a routine for calculating a focal length in order to perform zooming for the wide finder when the wide finder is set.

At step #4705, whether a flag WIDEF showing that the wide finder is ON is 1 or not is determined. When the flag WIDEF is not 1, since the wide finder is not ON, the process returns at step #4715 without executing any more process. When the flag WIDEF is 1, since the wide finder is ON and a 150% finder field has been set in this embodiment, the target focal length is calculated by ft/1.5 at step #4710, and the process returns at step #4715.

Figure 23:
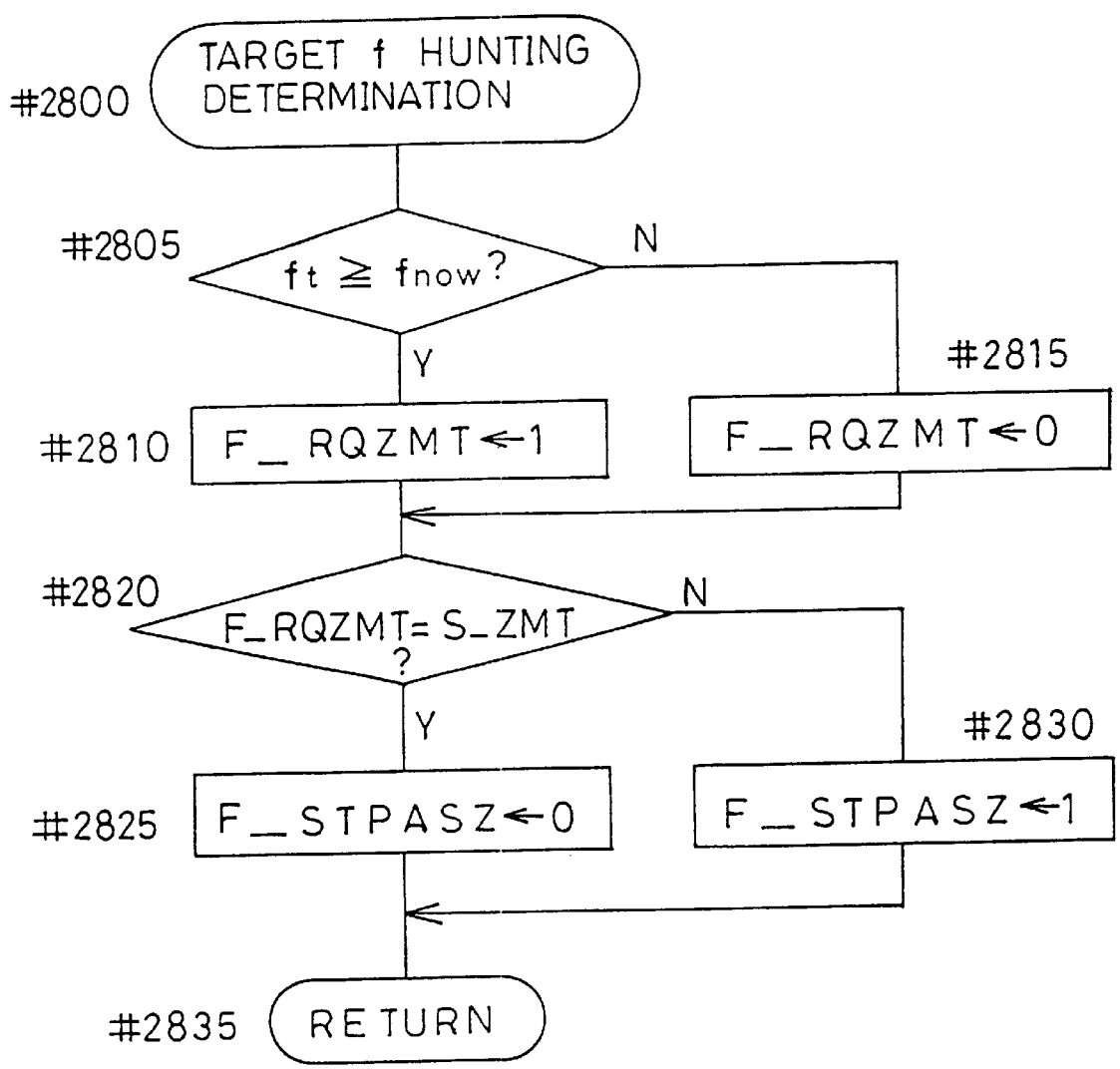
FIG. 23 is a flow chart of a target f hunting determination routine of the intra-body microcomputer of the camera system embodying the present invention.

A flow chart of the previously-mentioned target f hunting determination routine is shown in FIG. 23. This is a routine for preventing hunting, i.e. preventing the drive direction of the lens from frequently changing between the telephoto and wide directions during zooming.

At step #2805, the target focal length ft and the current focal length faow are compared. When the target focal length ft is equal to or larger than the current focal length fnow, since the drive direction is the telephoto direction, an ASZ drive request flag F_RQZMT is set to 1 at step #2810. When the target focal length ft is smaller than the current focal length fnow, since the drive direction is the wide direction, the flag F_RQZMT is reset to 0 at step #2815. At step #2820, whether the condition of the flag F_RQZMT coincides with the condition of an actual drive direction flag S_ZMT. Similarly to the flag F_RQZMT, the flag S_ZMT is set to 1 when the drive direction is the telephoto direction and reset to 0 when the drive direction is the wide direction. When the conditions of the two flags coincide, an ASZ stop flag F_STPASZ is reset to 0 (the driving is not stopped) at step #2825, and the process returns at step #2835. When the conditions of the two flags do not coincide (i.e. when the drive direction is reverse), the flag F_STPASZ is set to 1 in order to request the stopping of driving of the lens at step #2830, and the process returns at step #2835.

Figure 24:
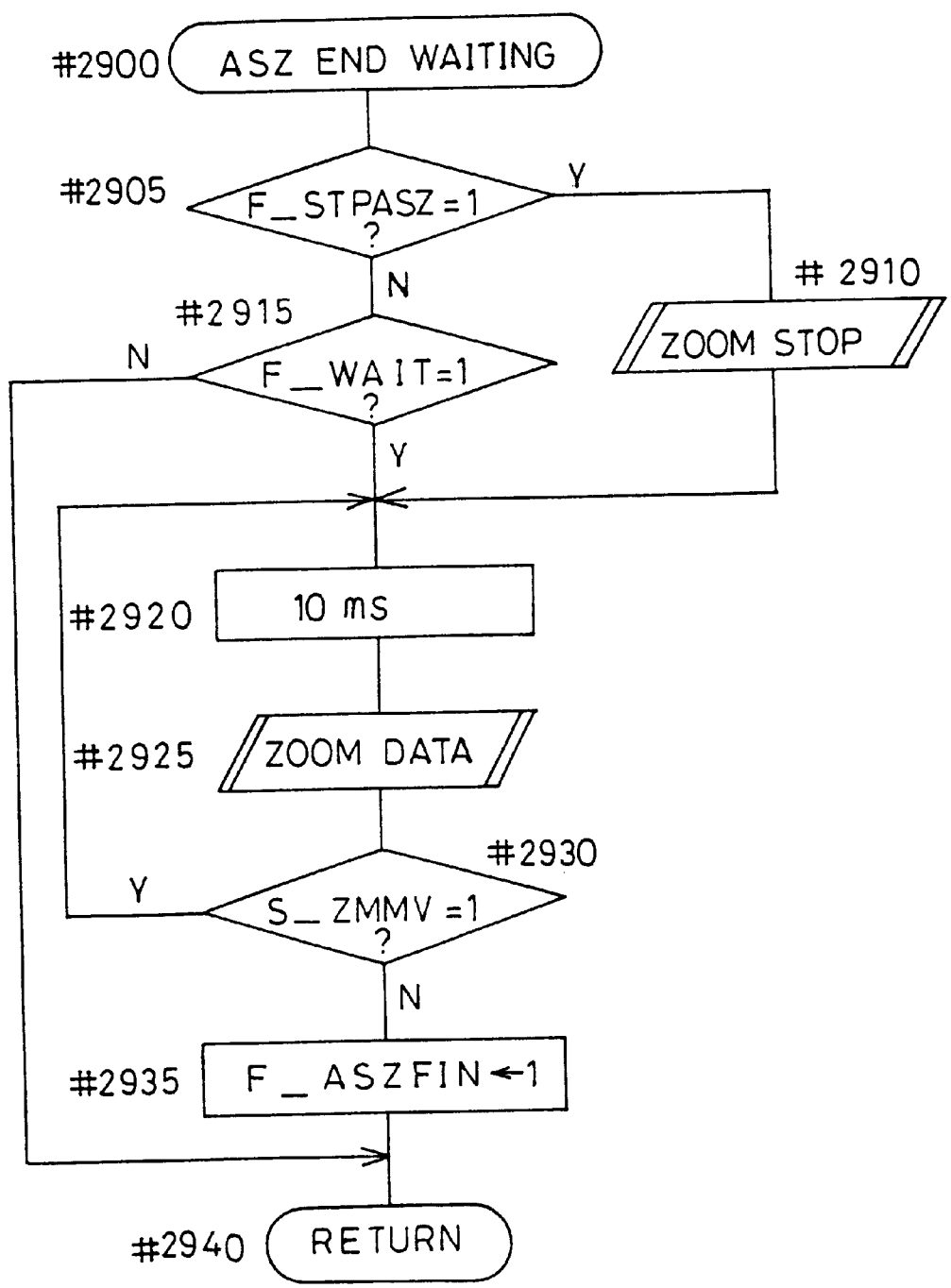
FIG. 24 is a flow chart of an ASZ end waiting routine of the intra-body microcomputer of the camera system embodying the present invention.

A flow chart of the ASZ end waiting routine executed in the ASZ control routine is shown in FIG. 24.

At step #2905, determination of the flag F_STPASZ (set in the target f hunting determination routine) is made. When the flag F_STPASZ is 1, a zoom stop routine (to be described later) is executed at step #2910, and the process proceeds to step #2920. When the flag F_STPASZ is not 1, whether the ASZ stop waiting flag F_WAIT is 1 or not is determined at step #2915. When the flag F_WAIT is not 1, the process returns at step #2940 without executing any more process. When the flag F_WAIT is 1, the process waits 1oms at step #2920, and a zoom data routine (to be described later) is executed at step #2925. At step #2930, whether or not a flag S_ZMMV showing whether zooming is being performed or stopped is 1 is determined. When the flag S_ZMMV is 1, since zooming is being performed, the process returns to step #2920 and waits until zooming is stopped. When the flag S_ZMMV is 0 and zooming has been stopped at step #2930, the ASZ end flag F_ASZFIN is set to 1 at step #2935, and the process returns at step #2940.

The above is a description of the normal AF process including the ASZ which is the AF_MAIN process at step #1070 of the activation routine shown in FIG. 11. The FA_MAIN process at step #1060 will not be described with reference to a flow chart, since it is manually executed. The NL_SQC process at step #1050 will hereinafter be described.

Figure 45:
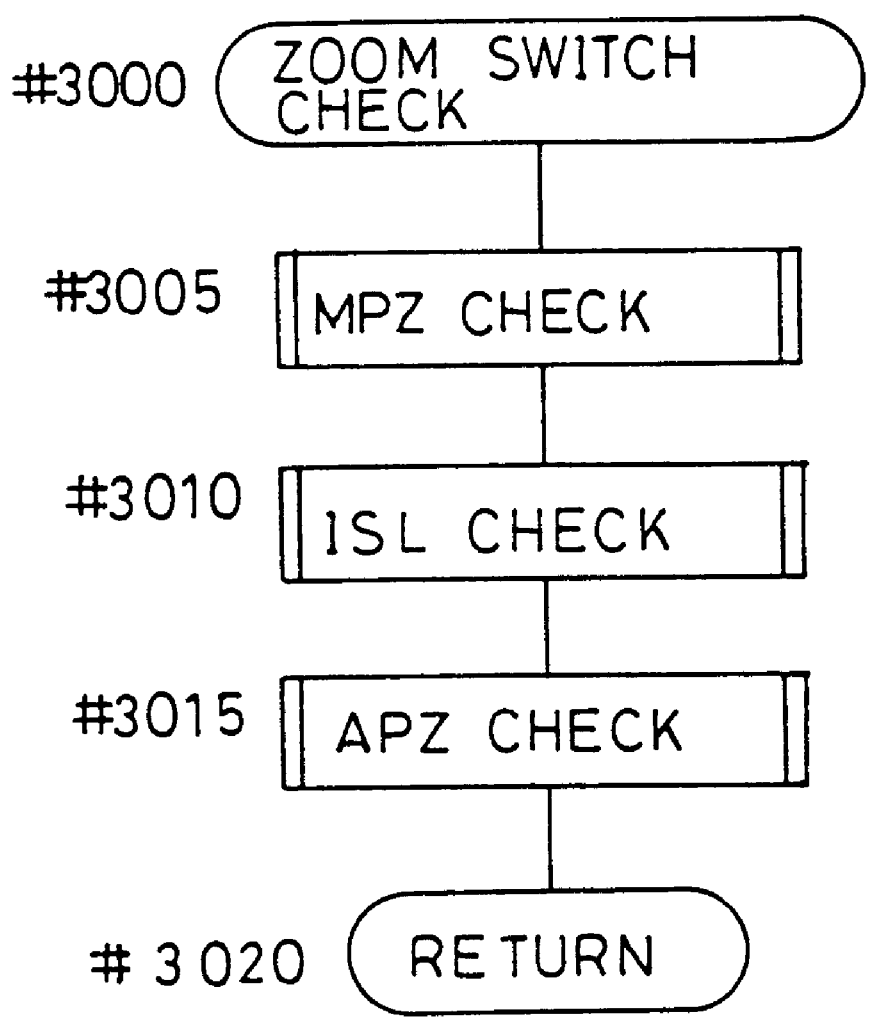
FIG. 45 is a flow chart of a zoom switch check routine of the intra-body microcomputer of the camera system embodying the present invention.

First, a zoom switch check routine will be described with reference to FIG. 45. This routine is a switch check routine for causing the process to jump to a zoom control routine when the AF or the FA is ON.

First, the zoom switch check is started at step #3000. At step #3005, an MPZ (manual power zoom) check subroutine is executed. At step #3010, an ISL check subroutine is executed. At step #3015, an APZ check subroutine is executed. At step #3020, the process returns.

In the MPZ check subroutine and the ISL check subroutine, the switches of the lens LE are checked, while in the APZ check subroutine, the switches of the body BD are checked.

Figure 46:
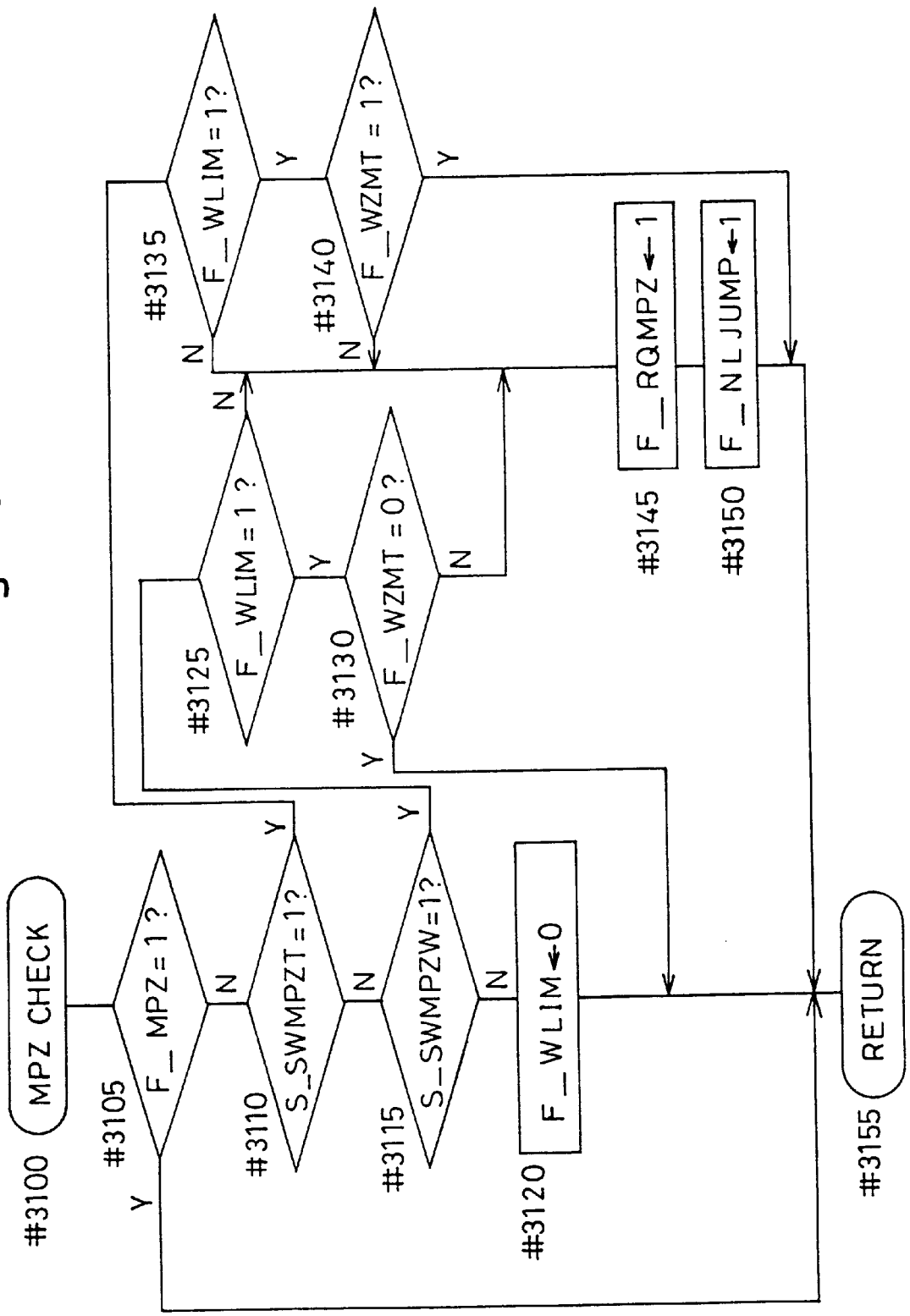
FIG. 46 is a flow chart of an MPZ check routine of the intra-body microcomputer of the camera system embodying the present invention.

Next, the MPZ check routine of step #3005 will be described with reference to the subroutine of FIG. 46.

First, the MPZ check is started at step #3100. At step #3105, whether the switch for the power zoom is being depressed or not, i.e. whether a flag F_MPZ is 1 or not is determined. When the flag F_MPZ is 1, the process proceeds to step #3155 and returns. When the flag F_MPZ is not 1, the process proceeds to step #3110, where whether a flag S_SWMPZT is 1 or not, i.e. whether a telephoto side switch is ON or not is determined. When the flag S_SWMPZT is 1, the process proceeds to step #3135. When the flag S_SWMPZT is not 1, the process proceeds to step #3115.

At step #3115, whether a flag S_SWMPZW is 1 or not, i.e. whether a wide side switch is ON or not is determined. When the flag S_SWMP2 is 1, the process proceeds to step #3125. When the flag S_WMP2 is not 1, the process proceeds to step #3120. At step #3120, a flag F_WLIM showing that zooming in the same direction is inhibited when the zoom lens reaches the drive limit is reset to 0. Then, the process returns at step #3155.

At step #3125, whether the flag F_WLIM is 1 or not i.e. whether a lens drive limit waiting flag is 1 or not is determined. When the flag F_WLIM is 1, the process proceeds to step #3130. When the flag F_WLIM is not 1, the process proceeds to step #3145. At step #3130, whether a flag F_WZMT is 1 or not, i.e. whether or not it is being waited that the lens is driven to the wide limit. When the flag F_WZMT is 1, i.e. when it is being waited that the lens is driven to the wide limit, the process returns at step #3155 (the process does not jump to the MPZ). When the flag F_WZMT is not 1, the process proceeds to step #3145.

At step #3145, a flag F_RQMPZ is set to 1. Then, after setting a flag F_NLJUMP to 1 at step #3150, the process returns at step #3155.

At step #3135, whether the flag F_WLIM is 1 or not is determined, i.e. whether the lens drive limit waiting flag is 1 or not is determined. When the flag F_WLIM is not 1, the process proceeds to step #3145. When the flag F_WLIM is 1, the process proceeds to step #3140. At step #3140, whether the flag F_WZMT is 1 or not, i.e. whether or not it is being waited that the lens is moved to the telephoto limit is determined. When the flag F_WZMT is 1, i.e. when it is being waited that the lens is moved to the telephoto limit, the process returns at step #3155 (the process does not jump to the MPZ). When the flag F_WZMT is not 1, the process proceeds to step #3145.

As described above, in the MPZ check routine, the power zoom request flag F_RQMPZ and the flag F_NLJUMP for causing the process to jump to the NL control are set to 1 when the power zoom switch is turned from off to on.

Moreover, once an OFF condition N of power zoom switch is set, the drive limit waiting condition is released. When zooming is manually stopped during zooming in the telephoto direction, the a flag for the telephoto limit is set and therefore, the operation of the switch for further driving the lens in the same direction is not accepted (zooming in the telephoto direction is not accepted). As this time, however, if the power zoom switch is turned off or the switch changing the zoom direction to the reverse direction is operated, the operation of these switches are accepted to release the drive limit waiting condition.

Figure 47:
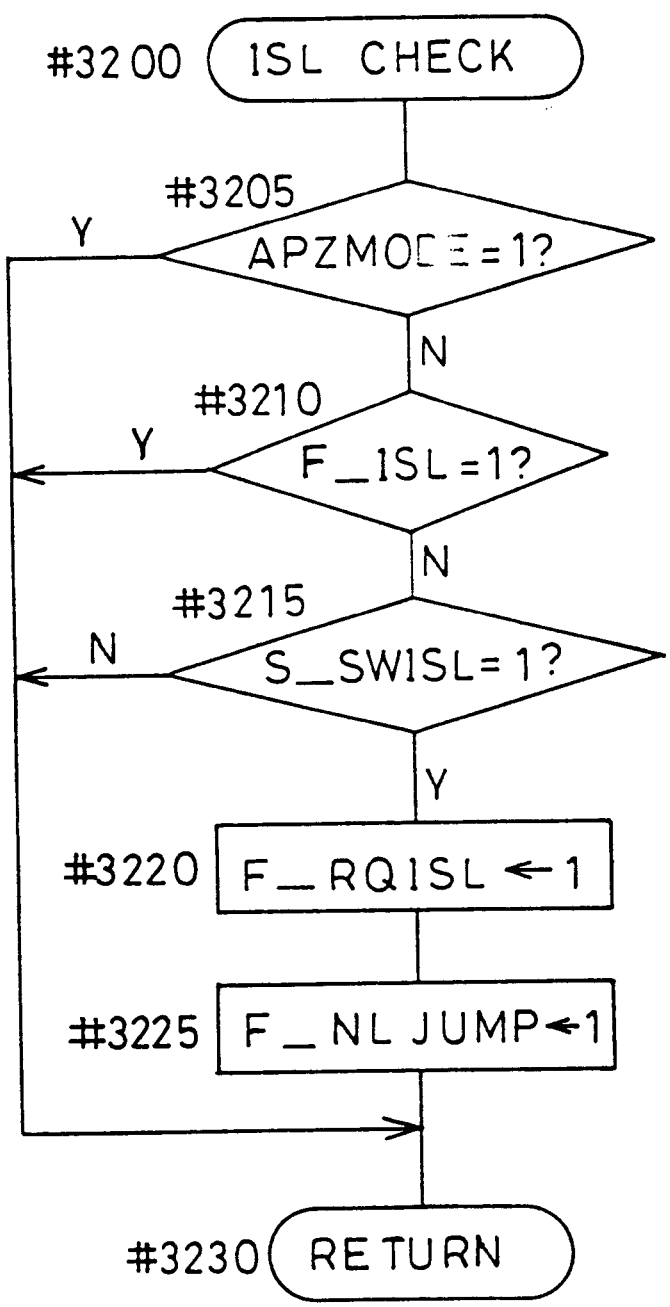
FIG. 47 is a flow chart of an ISL check routine of the intra-body microcomputer of the camera system embodying the present invention.

Next, the ISL check of step #3010 of FIG. 45 will be described with reference to the subroutine of FIG. 47.

First, the ISL check is started at step #3200. At step #3205, whether the APZ mode is ON or not, i.e. whether a flag APZMODE is 1 or not is determined. When the flag APZMODE is 1, the process proceeds to step #3230 and returns. When the flag APZMODE is not 1, the process proceeds to step #3210, where whether the image size lock is ON or not, i.e. whether a flag F_ISL is 1 or not is determined. When the flag F_ISL is 1, the process proceeds to step #3230 and returns. When the flag F_ISL is not 1, the process proceeds to step #3215, where whether a flag S_SWISL is 1 or not is determined. When the flag S_SWISL is not 1, the process proceeds to step #3230 and returns. When the flag S_SWISL is 1, the process proceeds to step #3220, where a flag F_RQISL is set to 1. Then, after setting the flag F_NLJUMP to 1 at step #3225, the process returns at step #3155.

As described above, in the ISL check routine, the image size lock request flag F_RQISL and the flag F_NLJUMP for causing the process to jump to the NL control are set to 1 when not the APZ mode switch but the image size lock switch is depressed.

Figure 48:
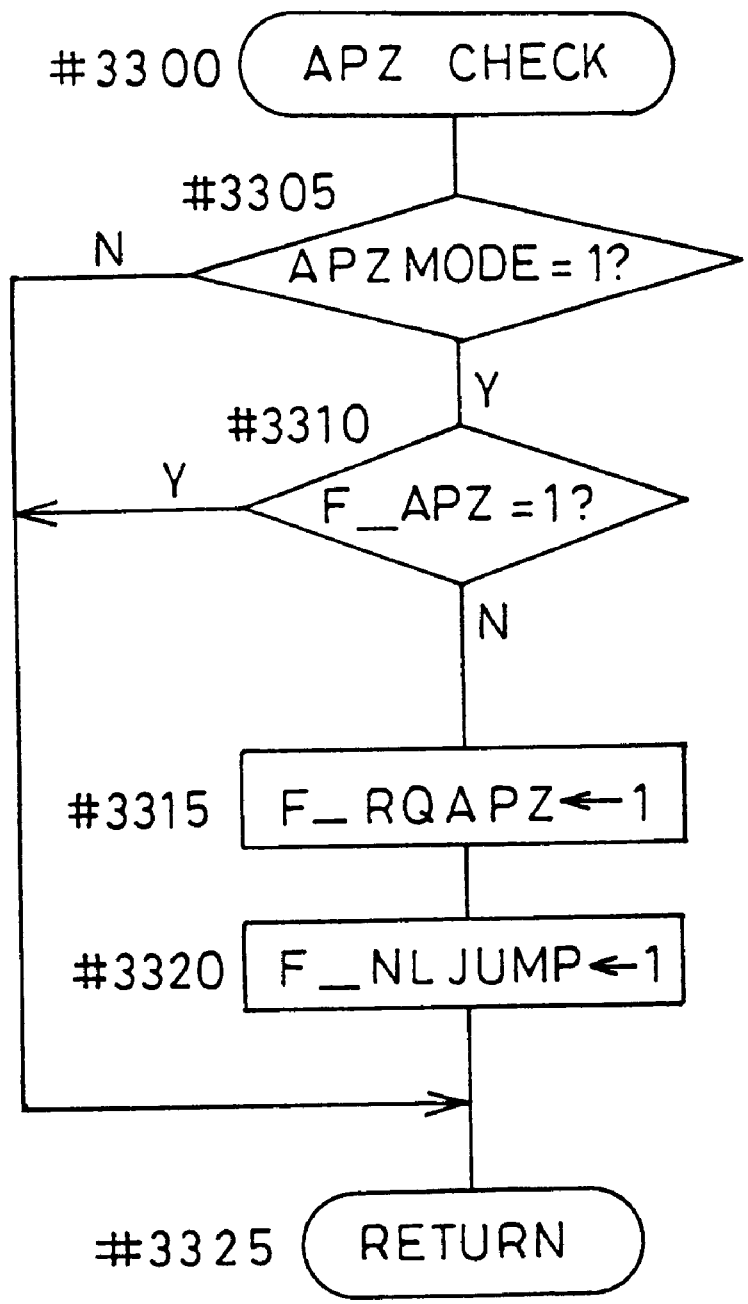
FIG. 48 is a flow chart of an APZ check routine of the intra-body microcomputer of the camera system embodying the present invention.

Next, the APZ check of step #3010 of FIG. 45 will be described with reference to the subroutine of FIG. 48.

First, the APZ check is started at step #3300. At step #3305, whether the APZ mode is ON or not, i.e. whether the flag APZMODE is 1 or not is determined. When the flag APZMODE is not 1, the process proceeds to step #3325 and returns. When the flag APZMODE is 1, the process proceeds to step #3310, where whether the APZ is being performed or not, i.e. whether a flag F_APZ is 1 or not is determined. When the flag F_APZ is 1, the process proceeds to step #3325 and returns. When the flag F_APZ is not 1, the process proceeds to step #3315, where the flag F_RQAPZ is set to 1. Then, after setting the flag F_NLJUMP to 1 at step #3320, the process returns at step #3325.

As described above, in the APZ check routine, the APZ request flag F_RQAPZ and the flag F_NLJUMP for causing the process to jump to the NL control are set to 1 not under control of the APZ but when the APZ switch is depressed.

After the branching to the NL control is thus performed, the NL_SQC routine is executed.

Figure 25:
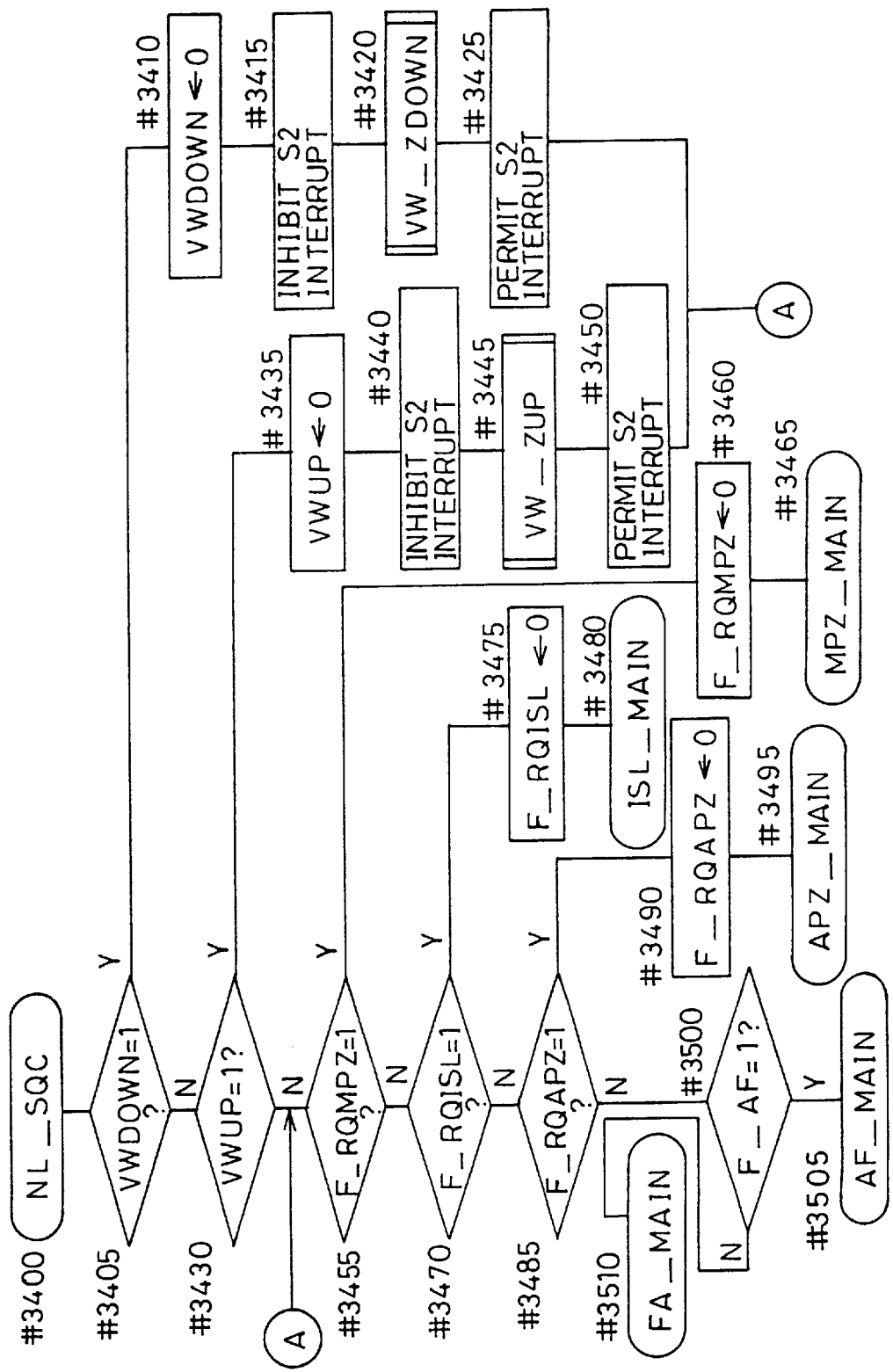
FIG. 25 is a flow chart of an NL_SQC routine of the intra-body microcomputer of the camera system embodying the present invention.

A flow chart of the NL_SQC process is shown in FIG. 25. In the NL_SQC routine, a zoom up and a zoom down for the wide finder, the MPZ process, the ISL process and the APZ process are executed.

When the NL_SQC routine is activated from the activation routine (step #3400), first, whether or not a flag VWDOWN for requesting for a zoom down for the wide finder is 1 is determined at step #3405. The flag VWDOWN is set to 1 when the wide finder is set or when a changeover from S1 to S0 is made while the wide finder is ON. When the flag VWDOWN is 1, after the flag VWDOWN is reset to 0 at step #3410 and an S2 interrupt is inhibited at step #3415, a VW_ZDOWN routine (to be described later) is executed at step #3425. Then, the S2 interrupt is permitted at step #3425, and the process proceeds to step #3455.

When the flag VWDOWN is not 1 at step #3405, whether or not a flag VWUP for requesting a zoom up for the wide finder is 1 is determined at step #3430. The flag VWUP is set to 1 when the wind finder setting is released or when a changeover from S0 to S1 is made while the wide finder is ON. When the flag VWUP is 1, after the flag VWUP is reset to 0 at step #3435 and the S2 interrupt is inhibited at step #3440, a VW_ZUP routine (to be described later) is executed at step #3445. Then, the S2 interrupt is permitted at step #3450, and the process proceeds to step #3455. That is, after a process for the wide zoom is executed, the MPZ process, the ISL process and the APZ process are executed.

When the flag VWUP is not 1 at step #3430 or after the zooming process for the wide finder, whether or not the MPZ request flag F_RQMPZ is 1 is determined at step #3455. When the flag F_RQMPZ is 1, it is reset to 0 at step #3460 and an MPZ_MAIN routine (to be described later) is executed at step #3465.

Similarly, when the flag F_RQMPZ is not 1 at step #3455, whether the ISL request flag F_RQISL is 1 or not is determined at step #3470. When the flag F_RQISL is 1, the flag F_RQISL is reset to 0 at step #3475, and an ISL_MAIN routine (to be described later) is executed at step #3480.

Moreover, when the flag F_RQISL is not 1 at step #3470, whether the APZ request flag F_RQAPZ is 1 or not is determined at step #3485. When the flag F_RQAPZ is 1, the flag F_RQAPZ is reset to 0 at step #3490, and an APZ_MAIN routine (to be described later) is executed at step #3495.

When the flag F_RQAPZ is not 1 at step #3485, whether the AF/FA determination flag F_AF is 1 or not is determined at step #3500. When the flag F_AF is 1, the AF_MAIN routine is executed at step #3505. When the flag F_AF is not 1, an FA_MAIN routine is executed at step #3510.

Figure 26:
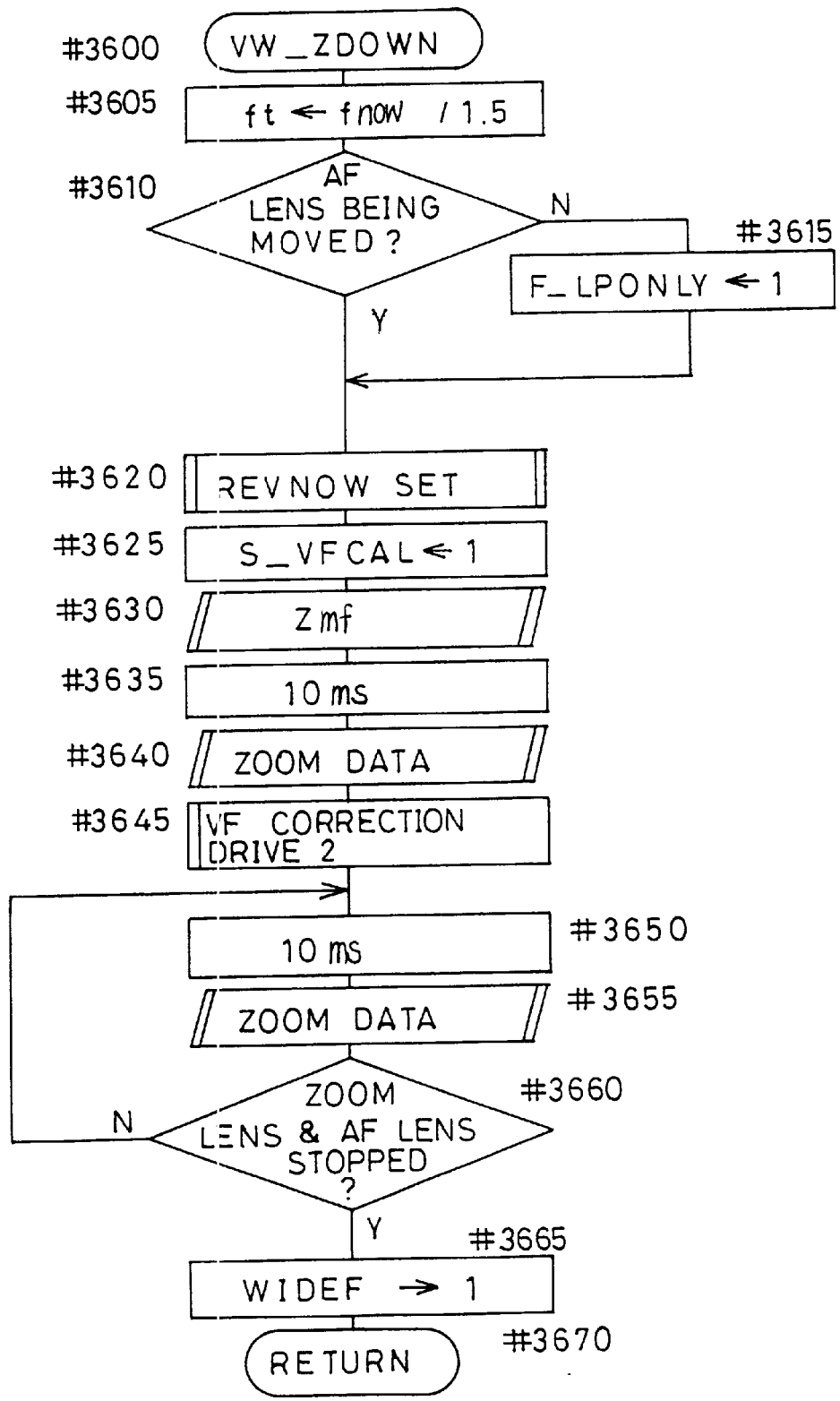
FIG. 26 is a flow chart of a VW_ZDOWN routine of the intra-body microcomputer of the camera system embodying the present invention.

A flow chart of the previously-mentioned VW_ZDOWN routine is shown in FIG. 26. This is a routine for performing a 1/1.5 time zoom down in order to enlarge the current finder field by 150% when the wide finder is set or when a changeover from S1 to S0 is made while the wide finder is ON.

When the VW_ZDOWN routine is activated from the NL_SQC routine (step #3600), the target focal length ft is calculated by driving the current focal length by 1.5 (fnow/1.5) at step #3605. At step #3610, whether the AF lens is being moved or not is determined. When the AF lens is being moved, no process is executed. When the AF lens is not being moved, determining that the subject is stationary, at step #3615, the flag F_LPONLY showing that the correction amount for a VF (varifocal lens) correction is calculated only by the current AF lens position is set to 1.

At step #3620, the REVNOW set routine is executed to calculate the current moving-out amount REVNOW. At step #3625, a one-shot calculation flag S_VFCAL is set to 1 in order to complete the driving of the AF lens by a single operation. At step #3630, a Zmf routine (to be described later) for communication between the intra-body microcomputer μC1 and the intra-lens microcomputer μC2. The process waits 10 ms at step #3635, and the zoom data routine for communication is executed at step #3640. At step #3645, a VF correction drive 2 routine (to be described later) for driving the lens for the VF correction is executed. The process waits 10 ms at step #3650, and the zoom data routine (to be described later) for zoom data communication is executed at step #3655. At step #3660, whether the driving of the zoom lens and the AF lens has been stopped or not is determined. When the driving has not been stopped, the process returns to step #3650, and the above process is repeated until the driving is stopped. When the driving is stopped at step #3660, the flag WIDEF showing that the wide finder is ON is set to 1 at step #3665, and the process returns at step #3670.

Figure 27:
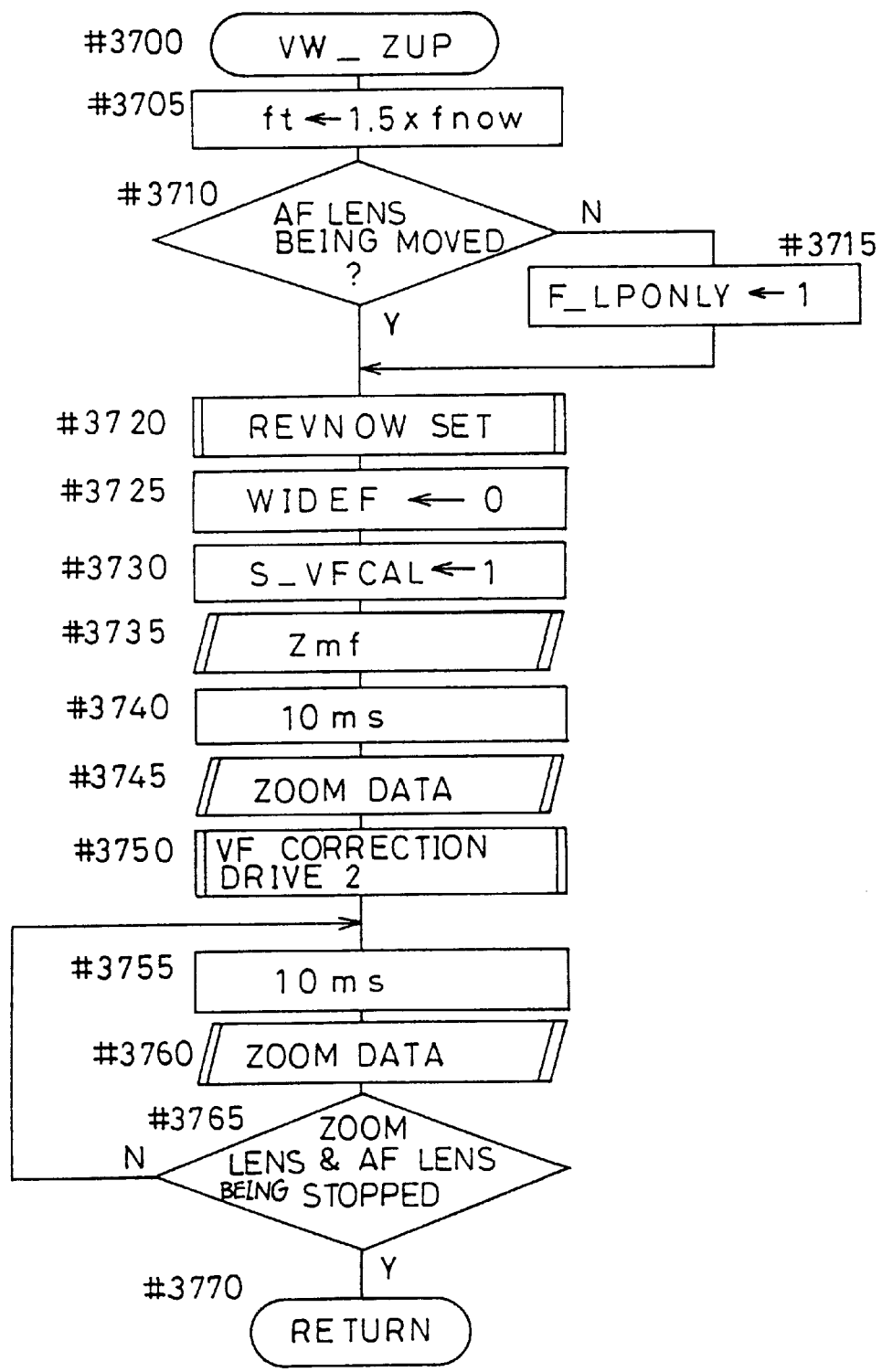
FIG. 27 is a flow chart of a VW_ZUP routine of the intra-body microcomputer of the camera system embodying the present invention.

A flow chart of the previously-mentioned VW_ZUP routine is shown in FIG. 27. This is a routine for performing a 1.5 time zoom up in order to return the finder field to 100% when the wide finder setting is released or when a changeover from S0 to S1 is made while the wide finder is ON.

The description of the VW_ZUP routine is omitted since it is the same as the VW_ZDOWN routine except that the target focal length ft is calculated by fnow×1.5 and that the flag WIDEF is reset to 0 before the zoom up.

Figure 28A:
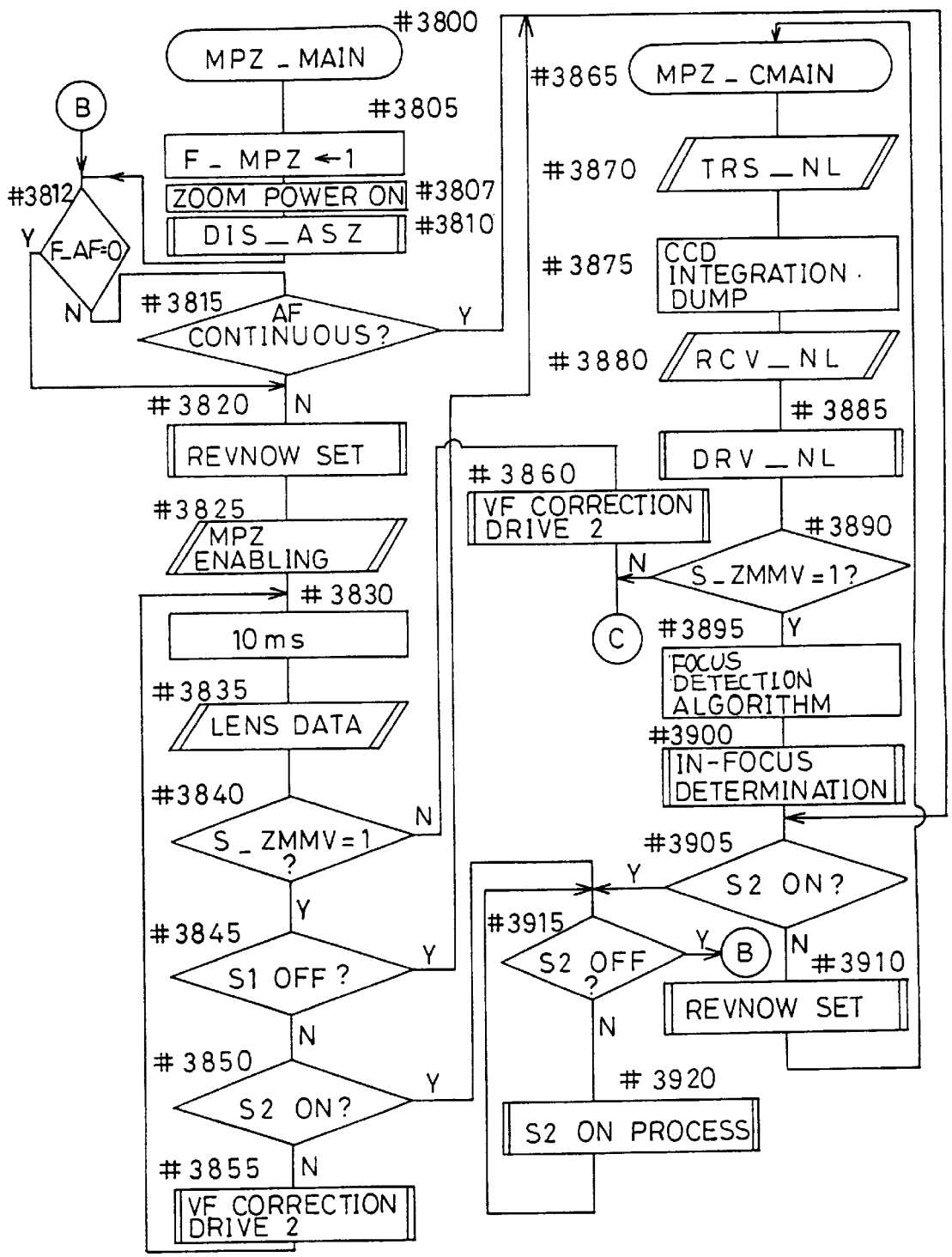
FIGS. 28A and 28B show a flow chart of an MPZ_MAIN routine of the intra-body microcomputer of the camera system embodying the present invention.
Figure 28B:
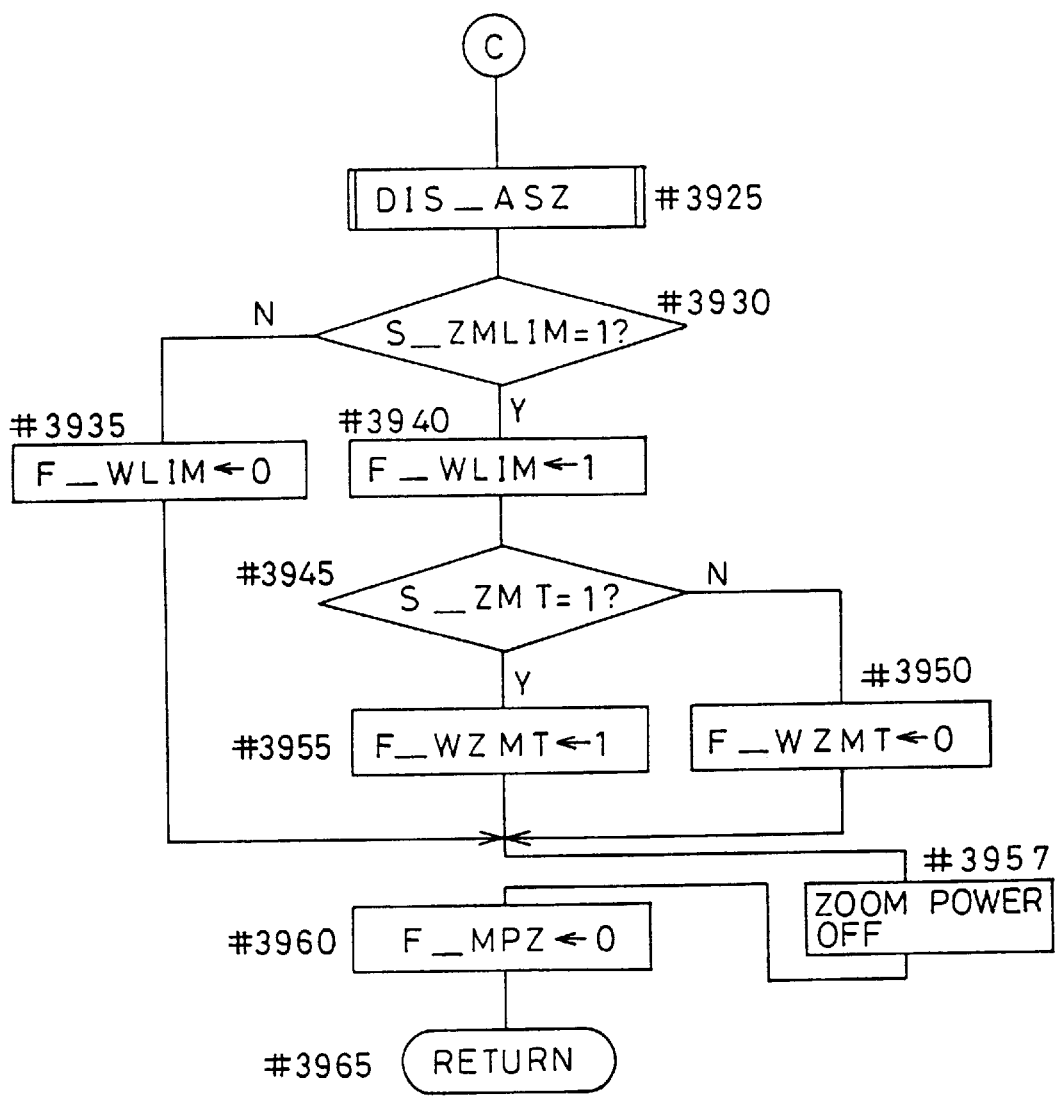

A flow chart of the MPZ_MAIN routine which is a power zoom process in the NL process is shown in FIGS. 28A and 28B.

When the MPZ_MAIN routine is activated at step #3800, first, the flag F_MPZ showing that the MPZ is being performed is set to 1 at step #3805. The zoom power is turned on at step #3807. The zoom power is turned on only while the MPZ control is ON. At step #3810, a DIS_ASZ routine (to be described later) for inhibiting the ASZ process is executed. At step #3812, whether the AF is continuous or not is determined. When the AF is continuous, the process proceeds to step #3905. When the AF is not continuous, the REVNOW set routine is executed at step #3820. At step #3825, an MPZ enabling routine for sending from the intra-body microcomputer μC1 a signal representing that the MPZ is enabled is executed. In response to this signal, the operation of the zoom lens is started by the intra-lens microcomputer μC2. The process waits 10 ms at step #3830, and at step #3835, a lens data routine for reading-in lens data is executed. At step #3840, whether or not the flag S_ZMMV showing whether zooming is being performed or stopped is 1 is determined. When the flag S_ZMMV is 1, since zooming is being performed, whether the switch S1 is OFF or not is determined at step #3845. When the switch S1 is OFF, the process proceeds to step #3905. When the switch S1 is ON, whether the switch S2 is ON or not is determined at step #3850. When the switch S0 is ON, the process proceeds to step #3915. When the switch S0 is OFF, the VF correction drive 2 routine is executed at step #3855 in order to make the VF correction. Then, the process returns to step #3830. When the flag S_ZMMV is not 1 and zooming has been stopped at step #3840, the VF correction drive 2 routine is executed in order to make the last VF correction at step #3860. Thereafter, the DIS_ASZ routine is executed at step #3925 (FIG. 28B), and the ASZ is inhibited if the switch S0 or the switch S1 is ON after the power zoom is completed.

The process from step #3930 is a zoom lens drive limit process. At step #3930, whether or not a flag S_ZMLIM showing that the zoom lens is at the drive limit is 1 is determined. When the flag S_ZMLIM is not 1, since the lens is not at the drive limit, the flag F_WLIM for inhibiting the driving of the zoom lens in the same direction is reset to 0 (the driving is not inhibited) at step #3935 in order to move the lens to the drive limit, and the process proceeds to step #3960. When the flag S_ZMLIM is 1, since the lens is at the drive limit, the flag F_WLIM is set to 1 at step #3940, and further zooming is inhibited. At step #3945, whether a flag S_ZMT showing a zoom direction is 1 or not is determined. When the flag S_ZMT is 1, since the zoom direction is the telephoto direction, the zoom inhibition direction flag F_WZMT is set to 1 at step #3955. When the flag S_ZMT is not 1, since the drive direction is the wide direction, the flag F_WZMT is reset to 0 at step #3950. At step #3957, the zoom power is turned off. At step #3960, the flag F_MPZ showing that the MPZ control is being performed is reset to 0. At step #3965, the process branches to the NL_SQC routine.

The process from step #3865 is an AF continuous process and an S2 interrupt process. The process therefrom is referred to as an MPZ_CMAIN process. At step #3870, the TRS_NL routine for data communication is executed. At step #3875, the CCD integration and data dump are performed. At step #3880, the RCV_NL routine for communication is executed. At step #3885, the DRV_NL routine for driving the VF correction is executed. At step #3890, whether zooming is being performed or not is determined by the flag S_ZMMV. When the flag S_ZMMV is not 1, since the zooming has been stopped, the process proceeds to step #3925. When the flag S_ZMMV is 1 and zooming is being performed, the focus detection algorithm is performed at step #3895 based on the AF data read-in in the RCV_NL routine. At step #3900, an in-focus determination routine is executed. At step #3905, whether the switch S2 is ON or not is determined. When the switch S2 is not ON, after executing the REVNOW set routine at step #3910, the process returns to step #3865 to repeat the succeeding process. When the switch S2 is ON at step #3905, whether the switch S2 is maintained ON or not is determined at step #3915. When the switch S2 is not maintained ON, the process proceeds to step #3910. When the switch S2 is maintained ON, an S2 ON process routine (to be described later) is executed at step #3920, and the process returns to step #3915. The AF continuous operation is for controlling the power zoom while continuing the focus detection.

Figure 29:
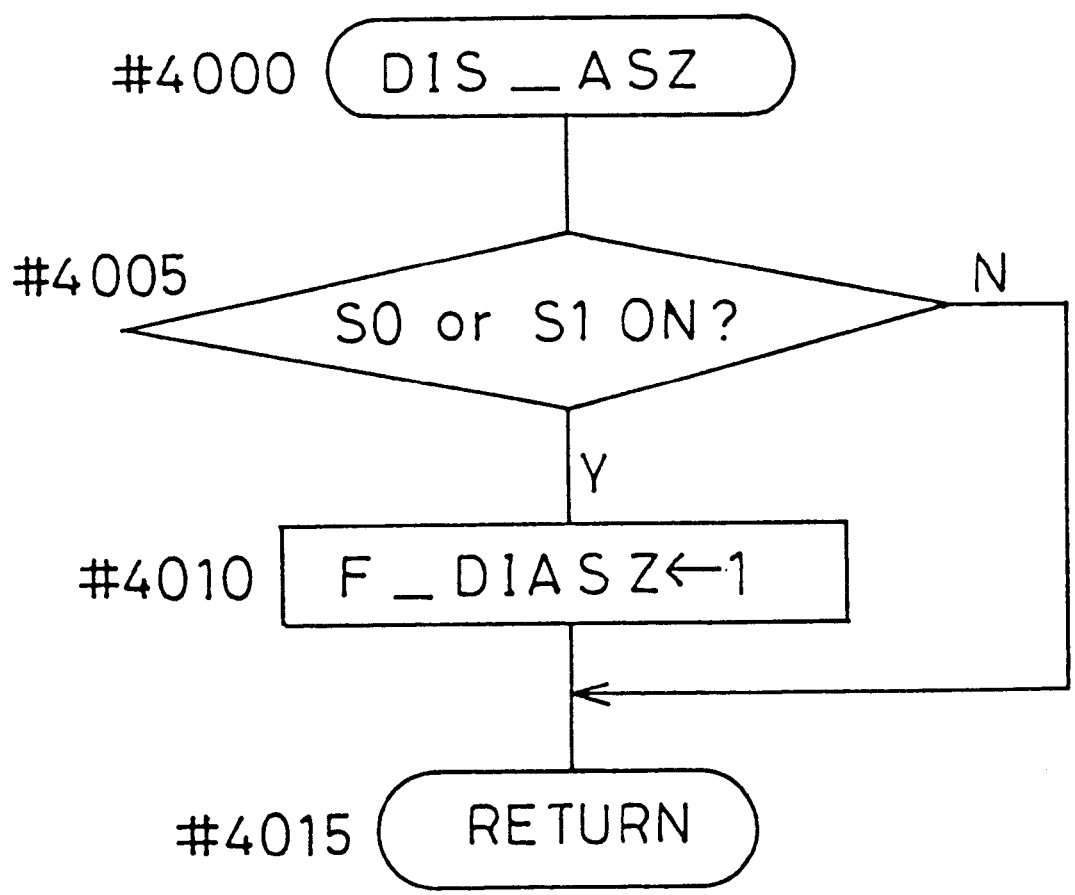
FIG. 29 is a flow chart of a DIS_ASZ routine of the intra-body microcomputer of the camera system embodying the present invention.

A flow chart of the above-mentioned DIS_ASZ routine is shown in FIG. 29. This is a routine for inhibiting the ASZ.

At step #4005, whether the switch S0 or S1 is ON or not is determined. When the switch S0 or S1 is not ON, no process is executed. When the switch S0 or S1 is ON, the ASZ inhibition flag F_DIASZ is set to 1 at step #4010. Then, the process returns at step #4015.

If the switch S0 or S1 is ON while the power zooming is being performed, the subsequent ASZ is inhibited. The ASZ is not inhibited when this routine is activated only by the intra-lens microcomputer $\mu$C2 not by the switch S0 or S1.

Figure 30:
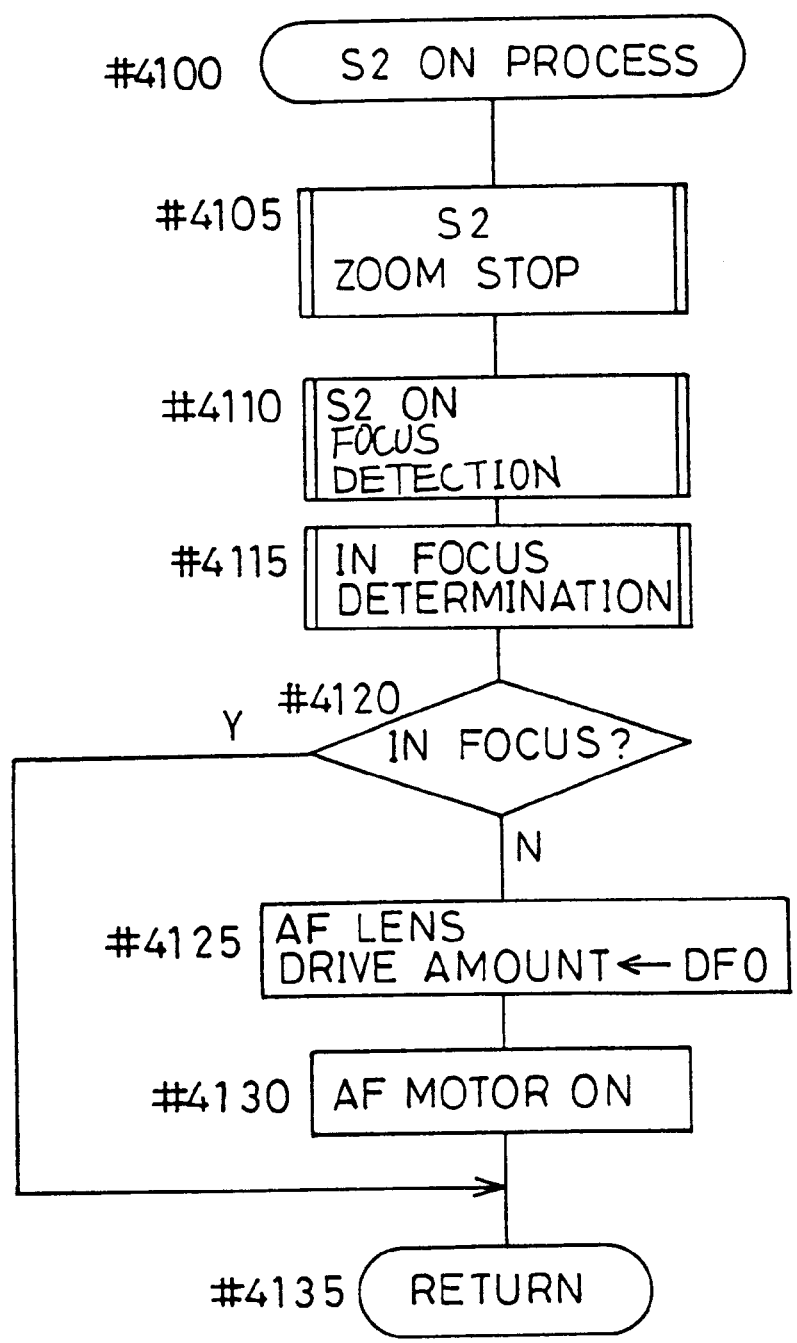
FIG. 30 is a flow chart of an S2 ON process routine of the intra-body microcomputer of the camera system embodying the present invention.

A flow chart of the S2 ON process routine is shown in FIG. 30.

Since zooming has to be stopped when the switch S2 is ON, an S2 zoom stop routine is executed at step #4105. At step #4110, an S2 ON focus detection routine is executed. At step #4115, a focus determination routine is executed. At step #4120, whether the subject is in focus or not is determined. When the subject is in focus, the process returns at step #4135 without executing any more process. When the subject is out of focus, a drive amount of the AF lens is calculated from the defocus amount DFO at step #4125. Then, after driving the AF lens at step #4130, the process returns at step #4135.

Figure 31:
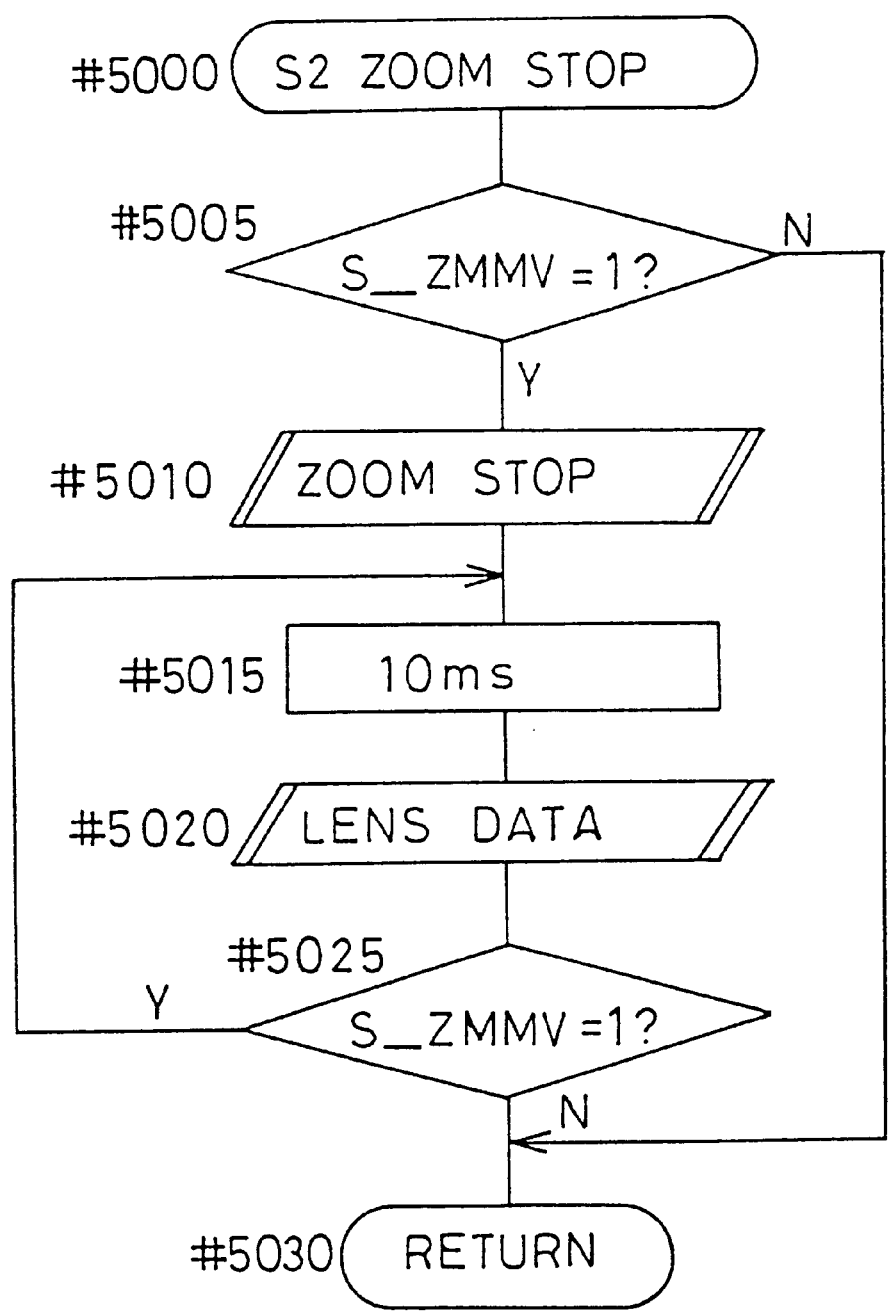
FIG. 31 is a flow chart of an S2 zoom stop routine of the intra-body microcomputer of the camera system embodying the present invention.

A flow chart of the S2 zoom stop routine is shown in FIG. 31.

At step #5005, whether or not the flag S_ZMMV for determining whether zooming is being performed or not is 1 is determined. When the flag S_ZMMV is not 1, since zooming has been stopped, the process returns without executing any more process (step #5030). When the flag S_ZMMV is 1 and zooming is being performed, the zoom stop routine is executed (step #5010). The process waits 10 ms at step #5015. Then, the lens data routine is executed at step #5020, and the process from step #5015 is repeated until zooming is stopped (determined at step #5025). The process returns at step #5030.

Figure 32:
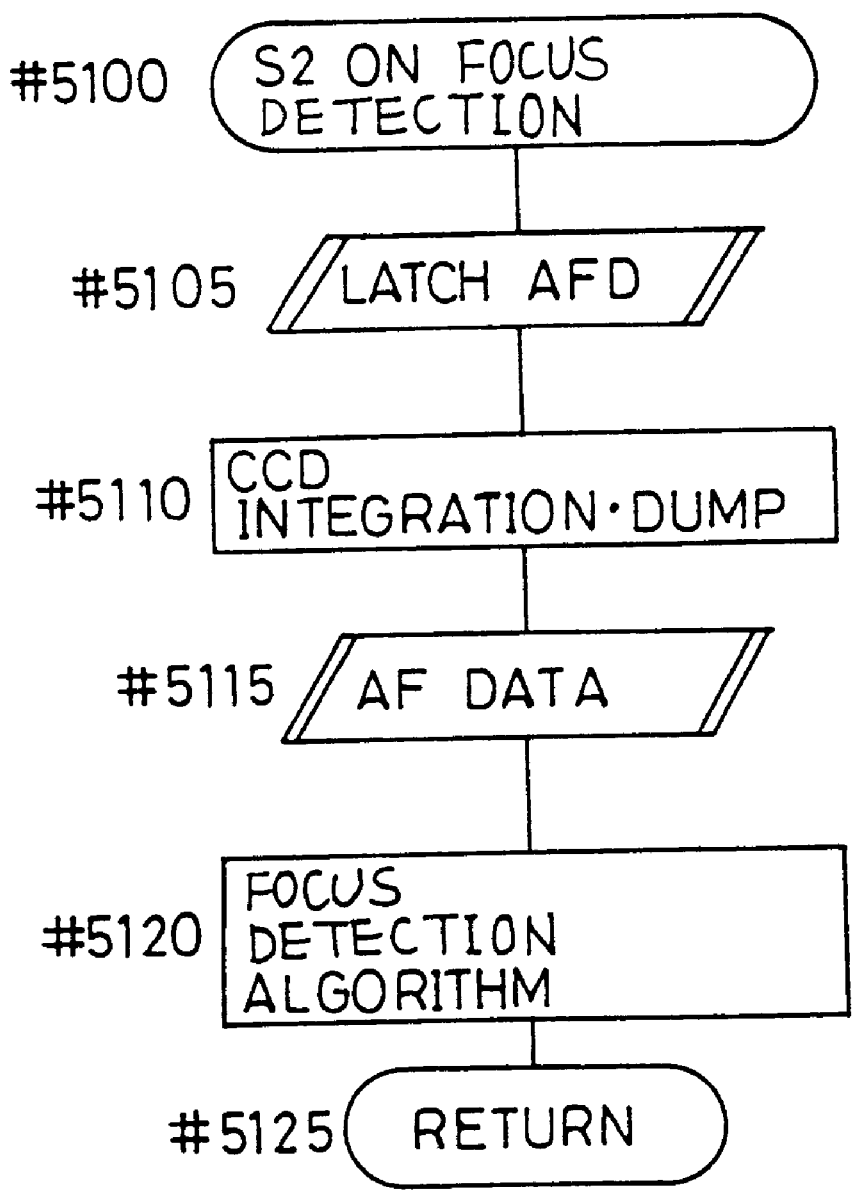
FIG. 32 is a flow chart of an S2 ON focus detection routine of the intra-body microcomputer of the camera system embodying the present invention.

A flow chart of the S2 ON focus detection routine is shown in FIG. 32. In the focus detection under the ON condition of the switch S2, since there are occasions when the zoom lens is still being moved, after zooming is stopped, the AF data is latched, the CCD integration is performed, and the focus detection is performed by reading-in the AF data obtained after zooming is stopped.

In the flow, a latch AFD routine is executed at step #5105, and the CCD integration and data dump are performed at step #5110, an AF data routine is executed at step #5115, the focus detection algorithm is performed by use of the data at step #5120, and the process returns at step #5125.

Figure 33:
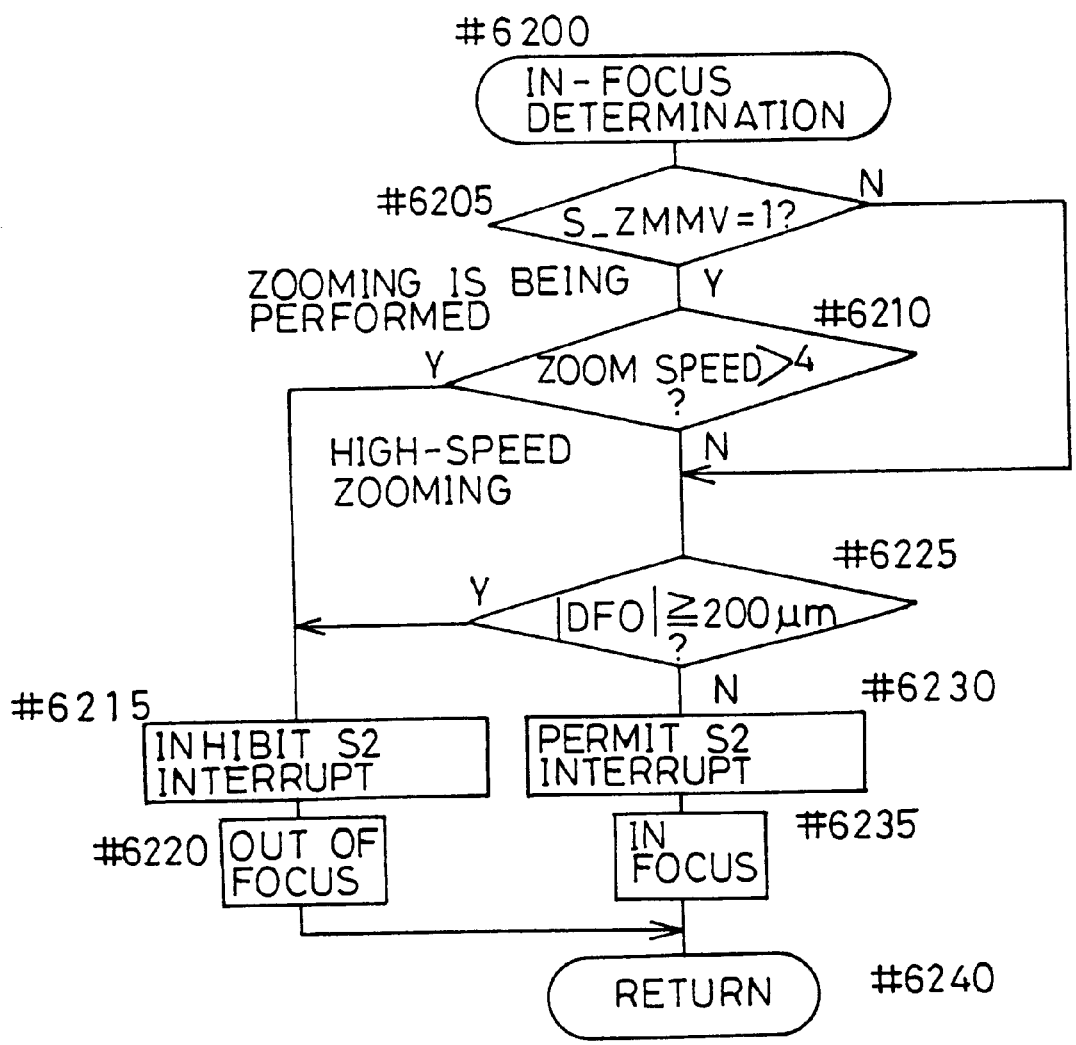
FIG. 33 is a flow chart of an in-focus determination routine of the intra-body microcomputer of the camera system embodying the present invention.

A flow chart of the above-mentioned in-focus determination routine is shown in FIG. 33. The in-focus determination in this routine is made when zooming is stopped or when the zoom speed is low in a case where zooming is being performed. This is because the focus detection accuracy of the varifocal lens is poor and the focus detection result is not reliable since a subject image largely varies while zooming is being performed.

At step #6205, whether zooming is being performed or not is determined (by the flag S_ZMMV). When zooming is being performed, the zoom speed is determined at step #6210. When the zoom speed is higher than 4, the S2 interrupt is inhibited at step #6215, and it is determined that the subject is out of focus at step #6220. Then, the process returns at step #6240. When zooming is not being performed at step #6205 or when the zoom speed is lower than 4 at step #6210, whether or not the defocus amount DFO of the selected island is equal to or larger than 200 $\mu$m is determined at step #6225. When the defocus amount PV0 is equal to or larger than 200 $\mu$m, since the subject is out of focus, the process proceeds to step #6215. When the defocus amount DV0 is smaller than 200 $\mu$m, the S2 interrupt is permitted at step #6230, and it is determined that the subject is in focus at step #6235. Then, the process returns at step #6240.

The ISL process executed in the NL_SQC routine will hereinafter be described. This process is for continuing the driving of the zoom lens in order to maintain a magnification $\beta$ obtained when the ISL switch is turned on.

Figure 34:
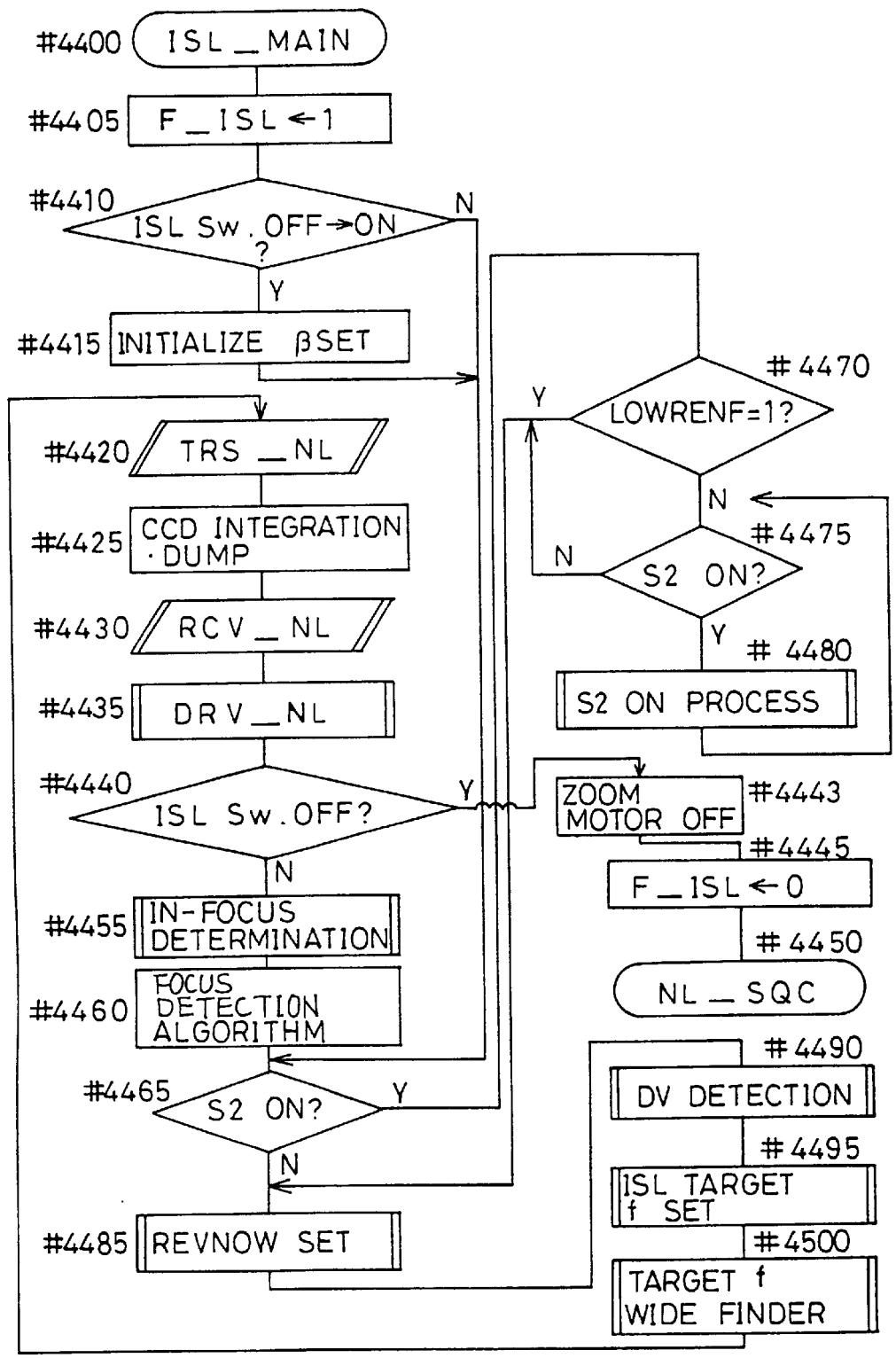
FIG. 34 is a flow chart of an ISL_MAIN routine of the intra-body microcomputer of the camera system embodying the present invention.

A flow chart of the ISL_MAIN routine is shown in FIG. 34.

When the ISL switch is turned on or when the ISL_MAIN routine is activated from the NL_SQC routine after release is performed (step #4400), the flag F_ISL showing that the ISL is ON is set to 1 at step #4405. At step #4410, whether or not this routine is activated by the turning on of the ISL switch is determined. When this routine is activated by the turning on of the ISL switch, a magnification βSET which is set while the ISL is ON is initialized. When this routine is not activated by the turning on of the ISL switch, no process is executed, and the process proceeds to step #4465.

At step #4465, whether the S2 switch is ON or not is determined. When the switch S2 is ON, whether a flag LOWRENF showing that a low speed continuous photography mode is ON is 1 or not is determined at step #4470. When the flag LOWRENF is 1, the process proceeds to step #4485. When the flag LOWRENF is not 1, whether the switch S2 is ON or not is determined at step #4475. When the switch S2 is not ON, the process proceeds to step #4485. When the switch S2 is ON, the S2 ON process is executed at step #4480. Then, the process returns to step #4475, and the process therefrom is repeated until the switch S2 is turned off.

When the switch S2 is OFF at step #4465, the REVNOW set routine and the DV detection routine are executed at steps #4485 and #4490, respectively. Thereafter, an ISL target f set routine, a target f wide finder routine, the TRS_NL routine, the CCD integration and data dump, the RCV_NL routine, the DRC_NL routine, and the focus detection and VF correction operations are performed. Then, at step #4440, whether the ISL switch is OFF or not is determined. When the ISL switch is OFF, the zoom power is turned off at step #4443, the flag F_ISL is reset to 0 at step #4445, and the process branches to the NL_SQC routine at step #4450. When the ISL switch is not OFF at step #4440, the in-focus determination routine is executed at step #4455, the focus detection algorithm is performed at step #4460, and the process from step #4465 is repeated.

The magnification βSET is set in the ISL target f set routine. Moreover, the S2 interrupt is permitted when it is determined that the subject is in focus in the in-focus determination routine. Setting of the target focal length is continued while the ISL switch is ON.

Figure 35:
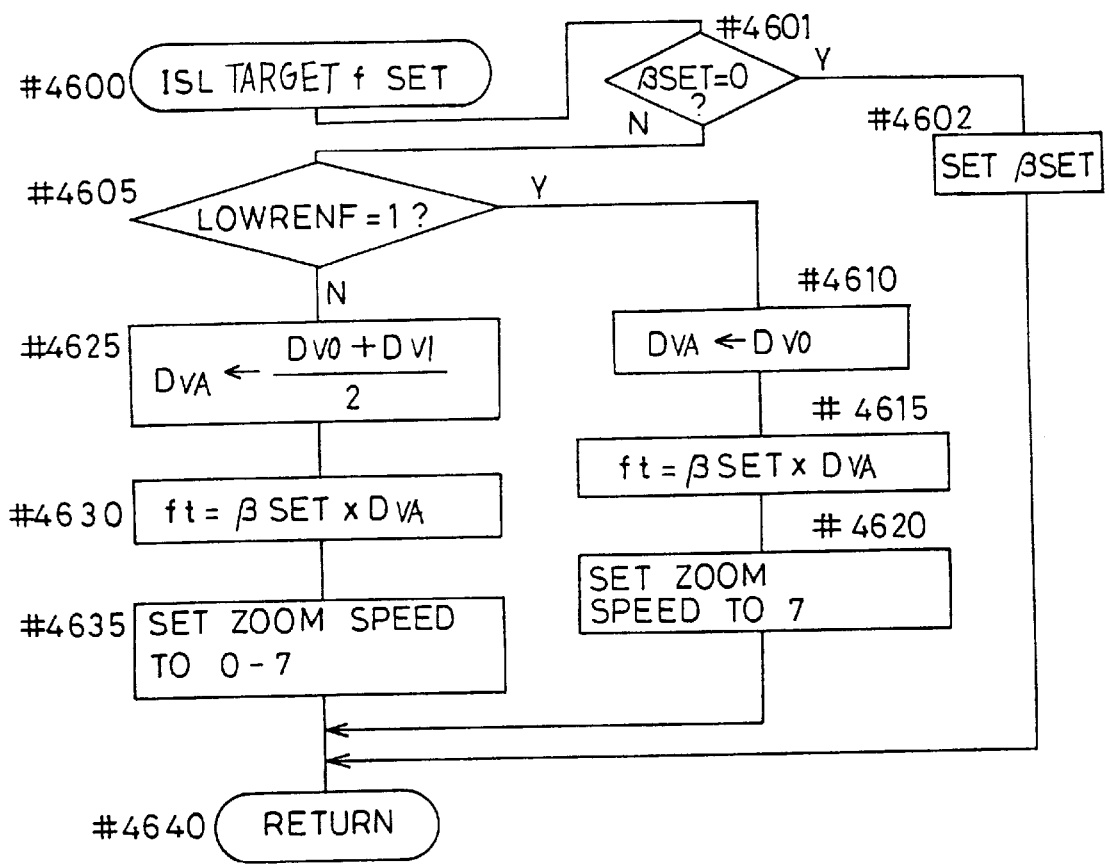
FIG. 35 is a flow chart of an ISL target f set routine of the intra-body microcomputer of the camera system embodying the present invention.

A flow chart of the above-mentioned ISL target f set routine is shown in FIG. 35.

At step #4601, whether the magnification βSET has been initialized or not is determined. When the magnification βSET has been initialized, a magnification β to be locked is set at step #4602. Then, the process returns at step #4640. In this process, the variation in distance measurement values is removed, for example, by averaging the previous DV and the current DV to set the magnification βSET.

When the magnification βSET has already been set at step #4601, determination of the flag LOWRENF showing that low speed continuous photographing is being performed is made at step #4605. When the flag LOWRENF is 1 and low speed continuous photographing is being performed, an average DV value DVA is set to the DV0 which is the DV value (the latest value) obtained from the current distance measurement values at step #4610, and the target focal length ft is calculated from the magnification βSET and the average DV value DVA at step #4615. At step #4620, the zoom speed is set to 7 which is the highest speed, and the process returns at step #4640. When it is determined that low speed continuous photographing is not being performed at step #4605, the average value of the previous distance measurement value and the current distance measurement value is set to the DVA in order to remove the variation in distance measurement values, the target focal length ft is calculated at step #4630, and a zoom speed in accordance with the subject is set at step #4635. Then, the process returns at step #4640.

Figure 10:
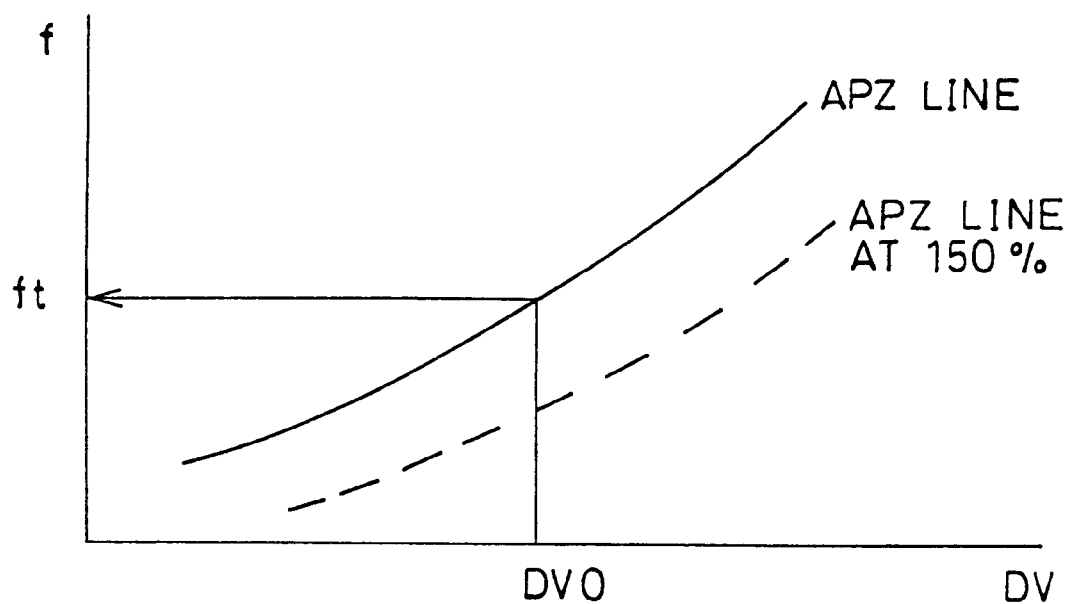
FIG. 10 shows an APZ line of the camera system embodying the present invention.

The APZ process executed in the NL_SQC routine will hereinafter be described. This process is for continuously adjusting focus on a subject while continuously performing zooming when the APZ switch is turned on. As shown in FIG. 10, setting of the focal length f corresponding to the subject distance DV is continued. The dotted line indicates the APZ line of the wide finder.

Figure 36:
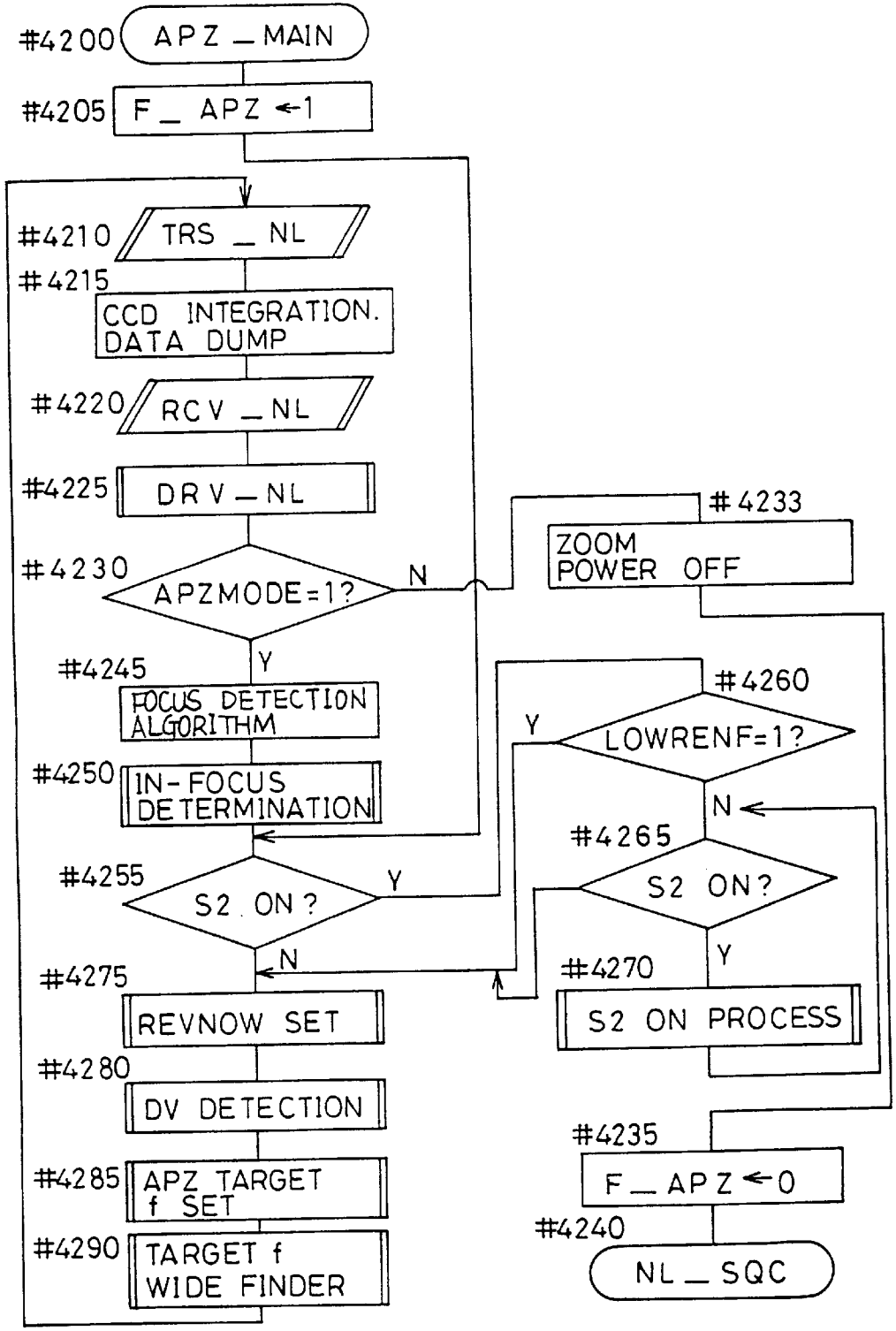
FIG. 36 is a flow chart of an APZ_MAIN routine of the intra-body microcomputer of the camera system embodying the present invention.

A flow chart of the APZ_MAIN is shown in FIG. 36.

The APZ_MAIN routine is activated from the NL_SQC routine when the APZ switch of the body BD is turned on (step #4200). Under control of the APZ, the flag F_APZ is 1.

Figure 37:
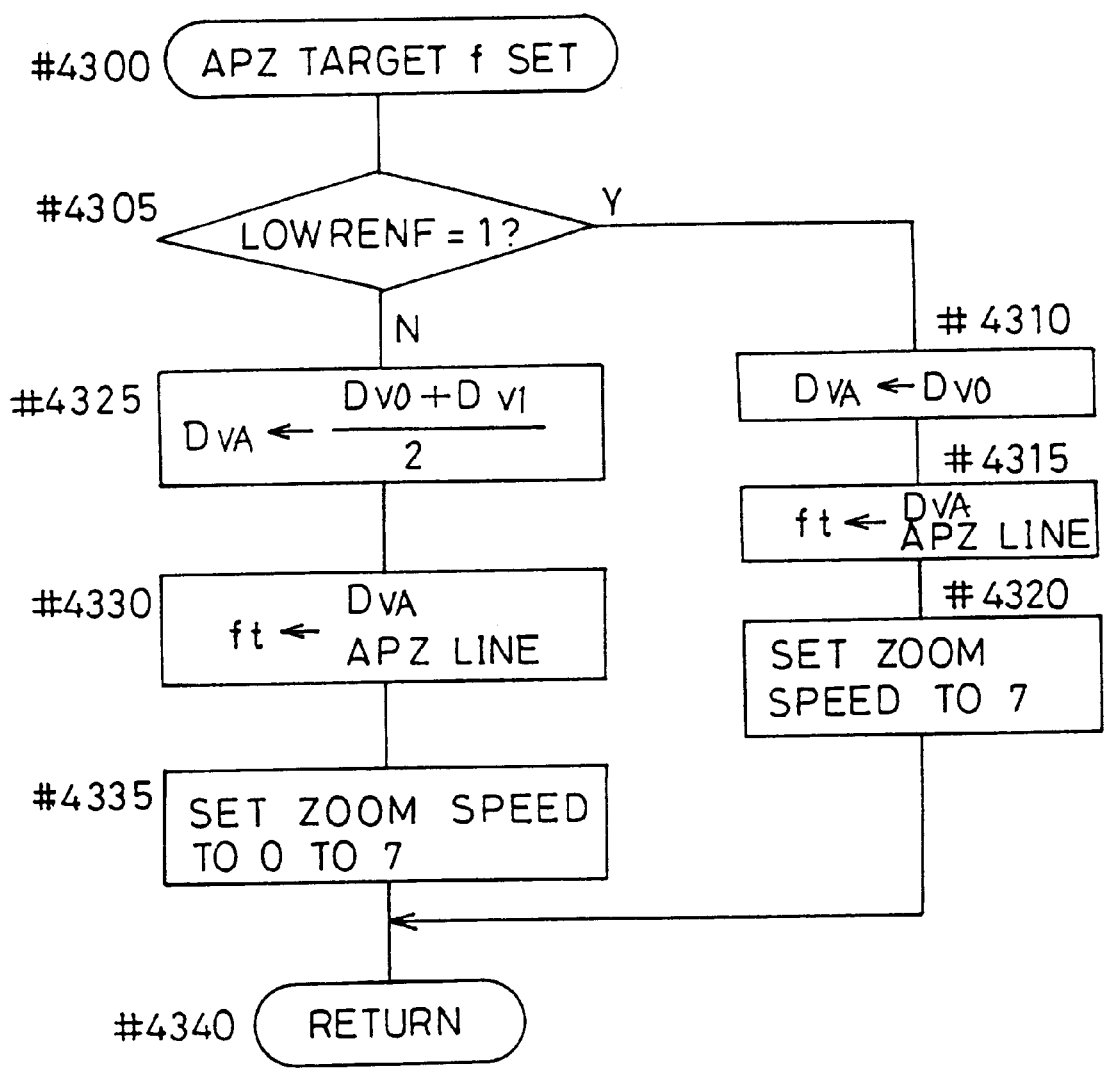
FIG. 37 is a flow chart of an APZ target f set routine of the intra-body microcomputer of the camera system embodying the present invention.

Descriptions of the APZ_MAIN routine and the APZ target f set routine (FIG. 37) are omitted since those routines are the same as the ISL_MAIN routine (FIG. 34) and the ISL target f set routine (FIG. 35) except the setting of the magnification βSET.

Hereinafter, the TRS_NL routine, the RC_NL routine and the DRV_NL routine which are called in each zooming operation will be described. Under controls of the ASZ, the MPZ, the ISL and the APZ, the TRS_NL routine, the CCD integration and data dump, the RCV_NL routine, the DRV_NL routine and the focus detection algorithm (focus detection) are performed in this order.

Figure 39:
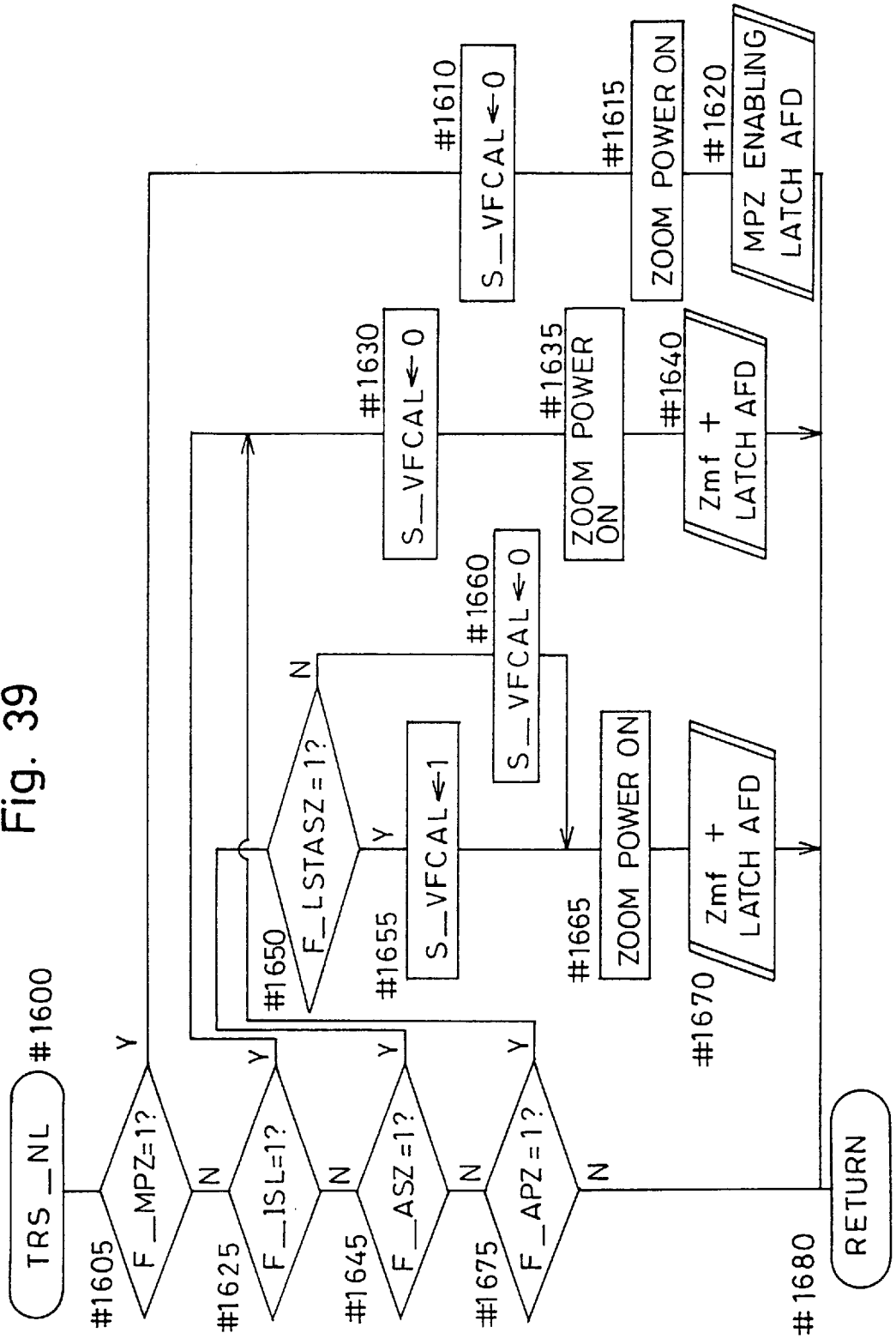
FIG. 39 is a flow chart of a TRS_NL routine of the intra-body microcomputer of the camera system embodying the present invention.

A flow chart of the TRS_NL routine is shown in FIG. 39.

At steps #1605, #1625, #1645 and #1675, which zooming is being performed is determined. When neither zooming is being performed, no process is executed, and the process returns at step #1680.

In case of the ASZ, in the process from step #1650, whether a desired distance measurement accuracy is obtained or not is determined by the flag F_LSTASZ. When the desired accuracy is obtained (i.e. when the flag F_LSTASZ is 1), the VF calculation one-shot/continuous flag S_VFCAL is set to 1 (one-shot operation). When the desired measurement accuracy is not obtained, the flag S_VFCAL is reset to 0 (continuous operation). Then, the zoom power is turned on to supply the power for driving zooming to the lens LE. Thereafter, a Zmf latch AFD routine is executed, and the process returns.

In case of the ISL and the APZ, in the process from step #1630, the flag V_VFCAL is reset to 0 (continuous operation), and the zoom power is turned on. Thereafter, the Zmf latch AFD routine is executed, and the process returns.

In case of the MPZ, in the process from step #1610, the flag V_VFCAL is reset to 0 (continuous operation), and the zoom power is turned on. Thereafter, an MPZ enabling latch AFD routine is executed, and the process returns.

Figure 40:
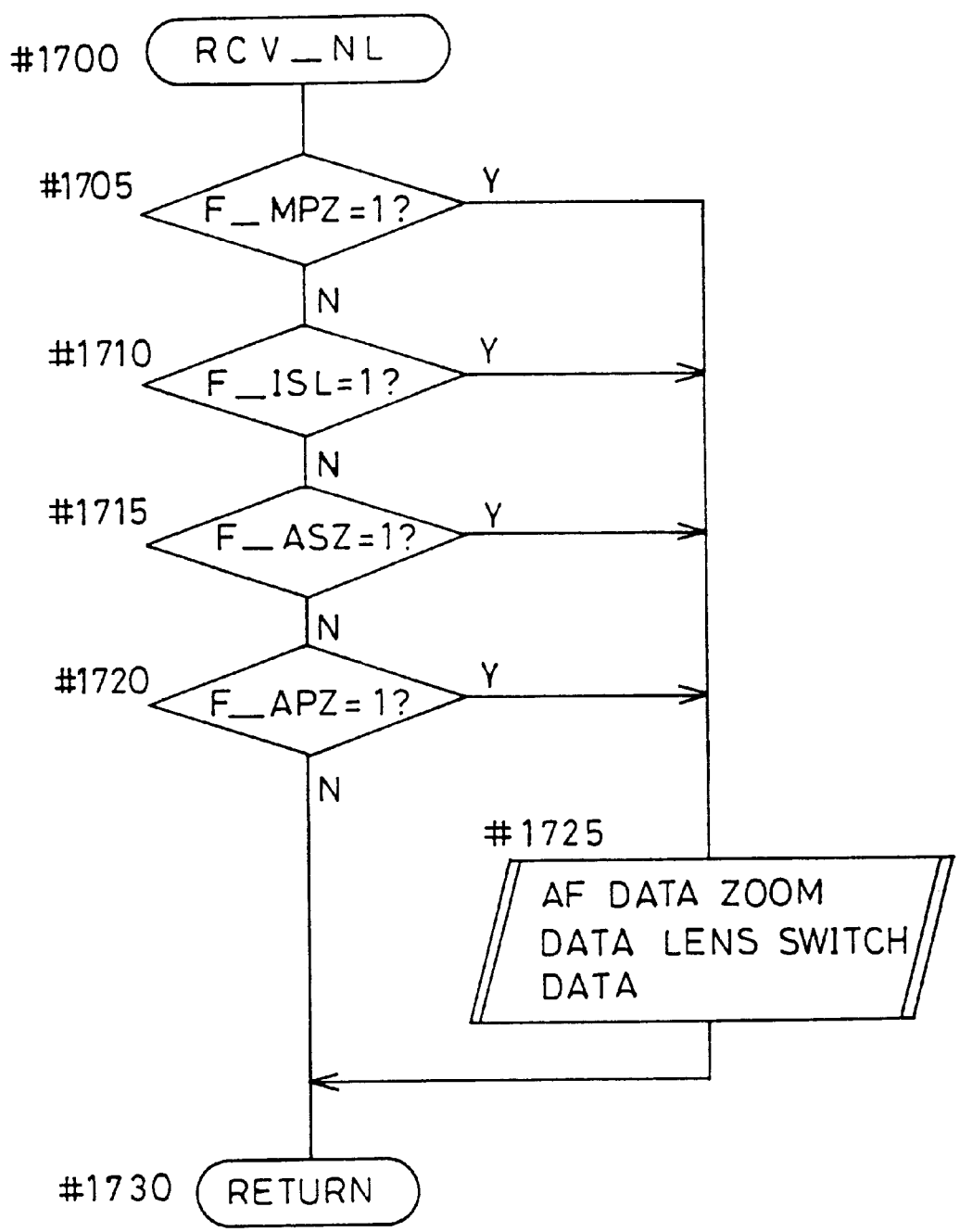
FIG. 40 is a flow chart of an RCV_NL routine of the intra-body microcomputer of the camera system embodying the present invention.

A flow chart of the RCV_NL routine is shown in FIG. 40.

At steps #1705, #1710, #1715 and #1720, which zooming is being performed is determined. When neither zooming is being performed, no process is executed, and the process returns at step #1730. When any of the zoomings is being performed, an AF data/zoom data/lens SW data routine is executed at step #1725, and the process returns. In this routine, AF data latched by a latch AFD, zoom data for the VF correction and lens switch data for checking a change of the lens switch are read-in regardless of the kind of zooming.

Figure 41:
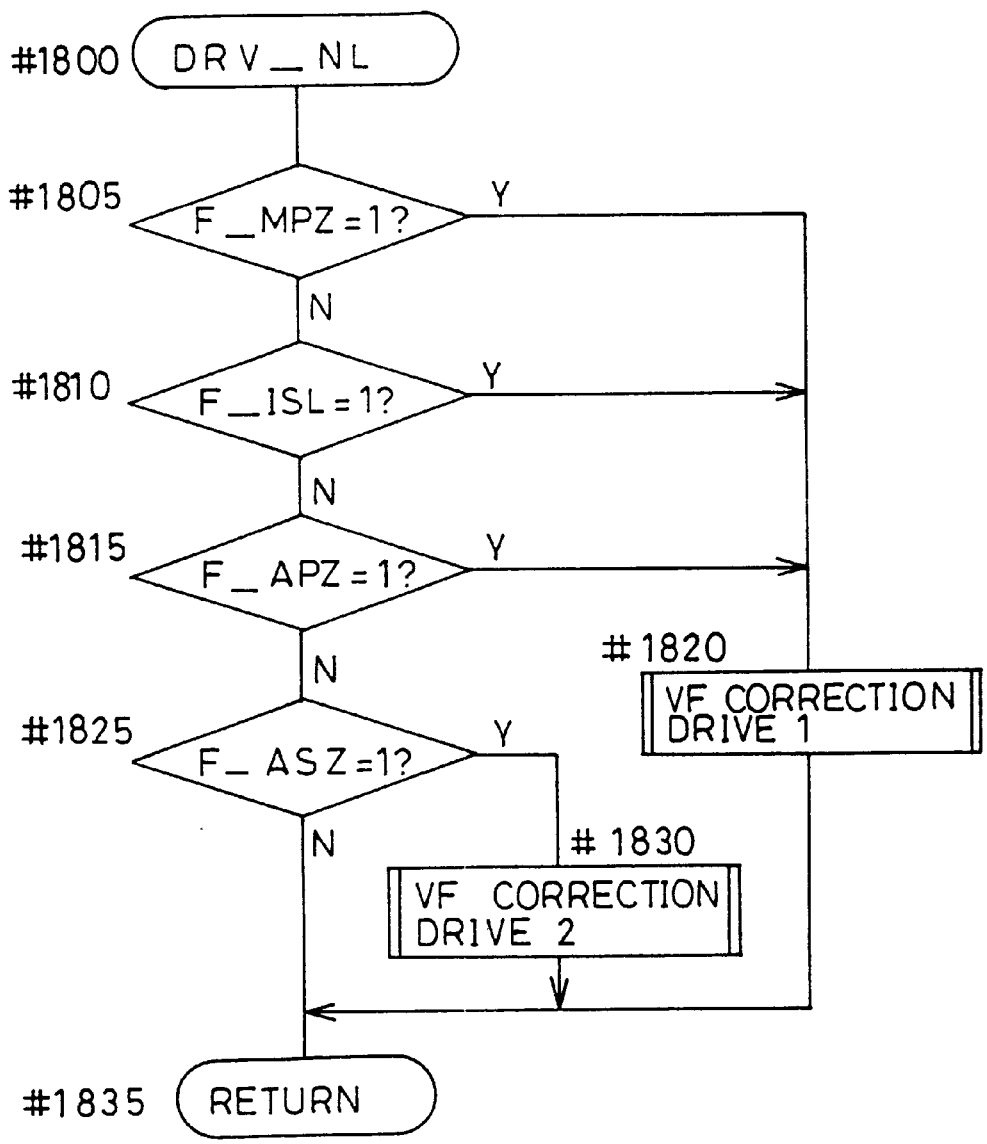
FIG. 41 is a flow chart of a DRV_NL routine of the intra-body microcomputer of the camera system embodying the present invention.

A flow chart of the DRV_NL routine is shown in FIG. 41.

At steps #1805, #1810, #1815 and #1825, which zooming is being performed is determined. When neither zooming is being performed, no process is executed, and the process returns at step #1835.

In case of the ASZ, the VF correction drive 2 routine is executed at step #1830, and the process returns. In cases of other zoomings, a VF correction drive 1 routine is executed at step #1820, and the process returns. The difference between the VF correction drive 1 routine and the VF correction drive 2 routine is that the former is for controlling so that an in-focus condition is always maintained by a one-shot operation while the latter, which is a continuous operation, is for controlling so that the defocus amount does not exceed 200 μm.

Figure 42:
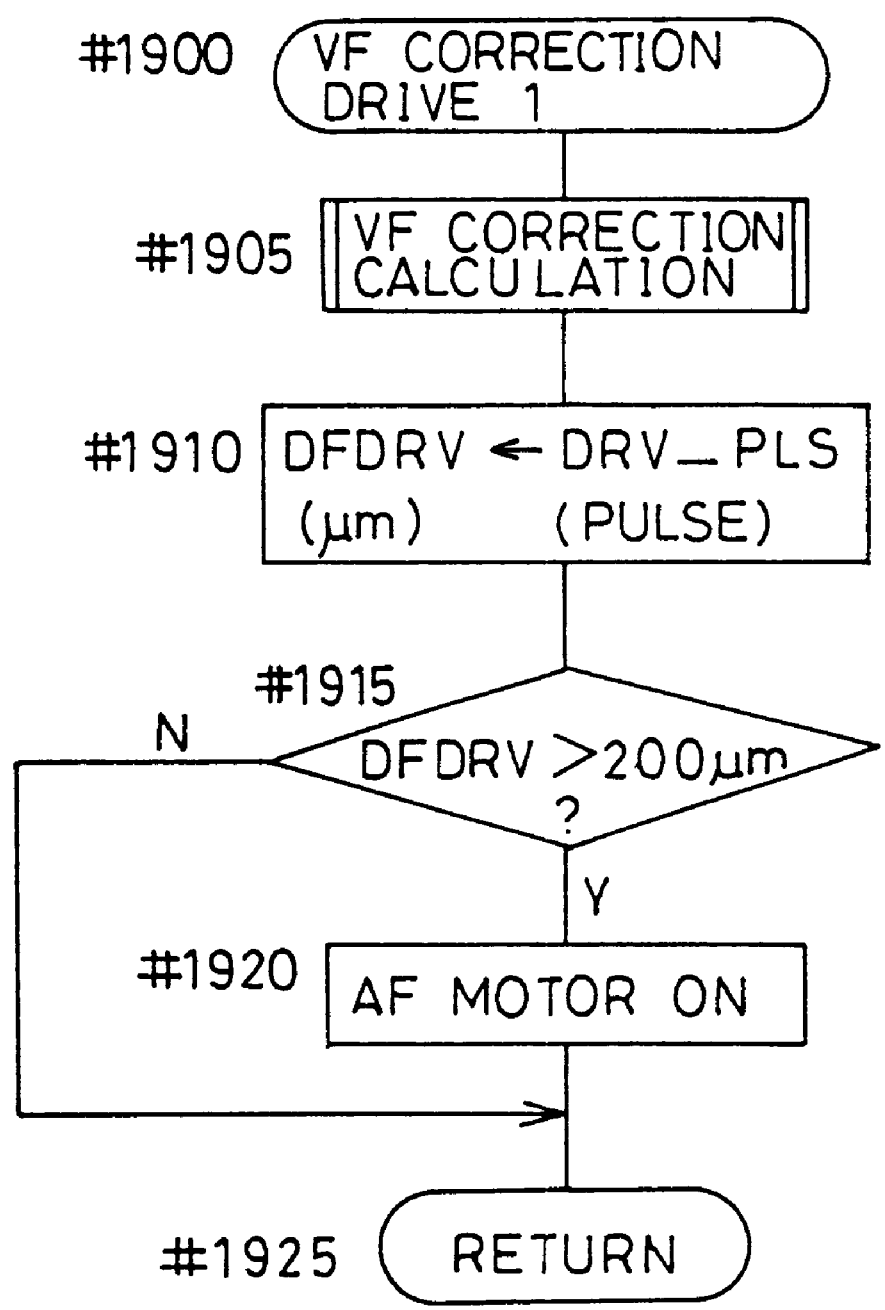
FIG. 42 is a flow chart of a VF correction drive 1 routine of the intra-body microcomputer of the camera system embodying the present invention.

A flow chart of the VF correction drive 1 routine which is a continuous control is shown in FIG. 42.

At step #1905, a VF correction calculation routine is executed to determine the drive amount and the drive direction. At step #1910, a VF correction pulse position DVCVF is calculated from the AF lens drive pulse count DRV_PLS. At step #1915, whether the VF correction pulse position DVCVF is larger than 200 μm or not is determined. When the DVCVF is larger than 200 μm, the AF lens is driven at step #1920. When the DVCVF is equal to or smaller than 200 μm, no process is executed in order to prevent hunting. Then, the process returns at step #1925.

Figure 43:
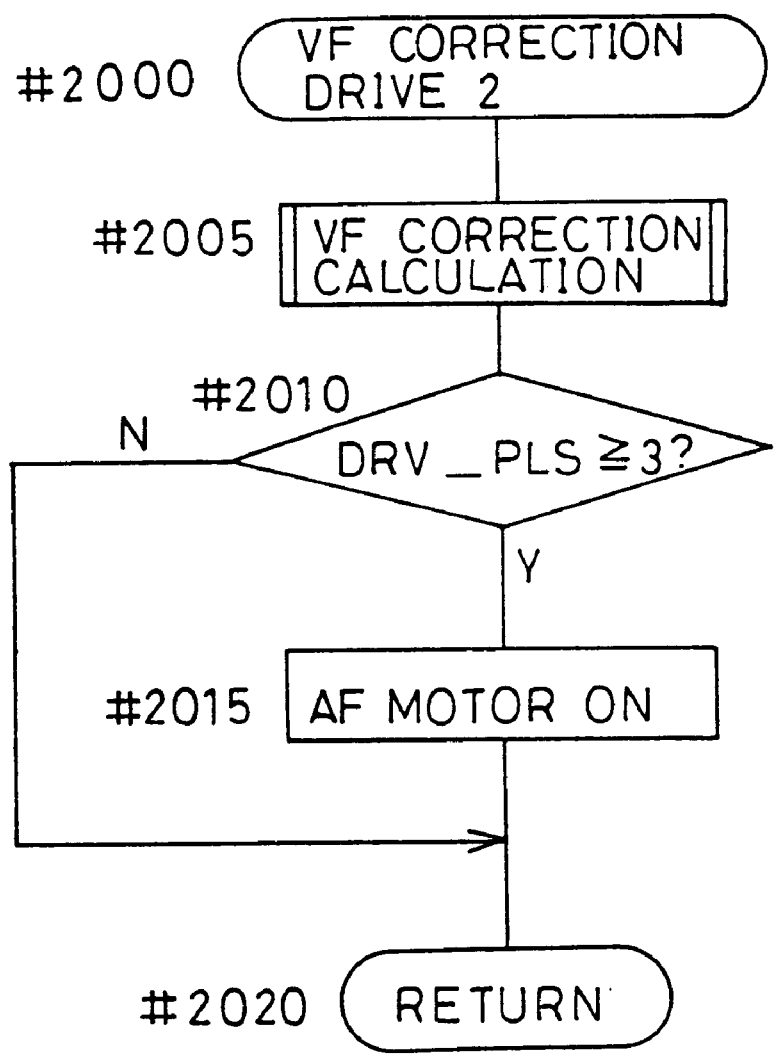
FIG. 43 is a flow chart of a VF correction drive 2 routine of the intra-body microcomputer of the camera system embodying the present invention.

A flow chart of the VF correction drive 2 routine which is a one-shot control is shown in FIG. 43.

At step #2005, the VF correction calculation routine is executed to determine the drive amount and the drive direction. At step #2010, whether or not the AF lens drive pulse count DRV_PLS is equal to or larger than 3 is determined. When the DRV_PLS is equal to or larger than 3, the AF lens is driven at step #2015. When the DRV_PLS is smaller than 3, the motor for driving the AF lens is not activated considering its performance. Then, the process returns at step #2020.

Figure 44:
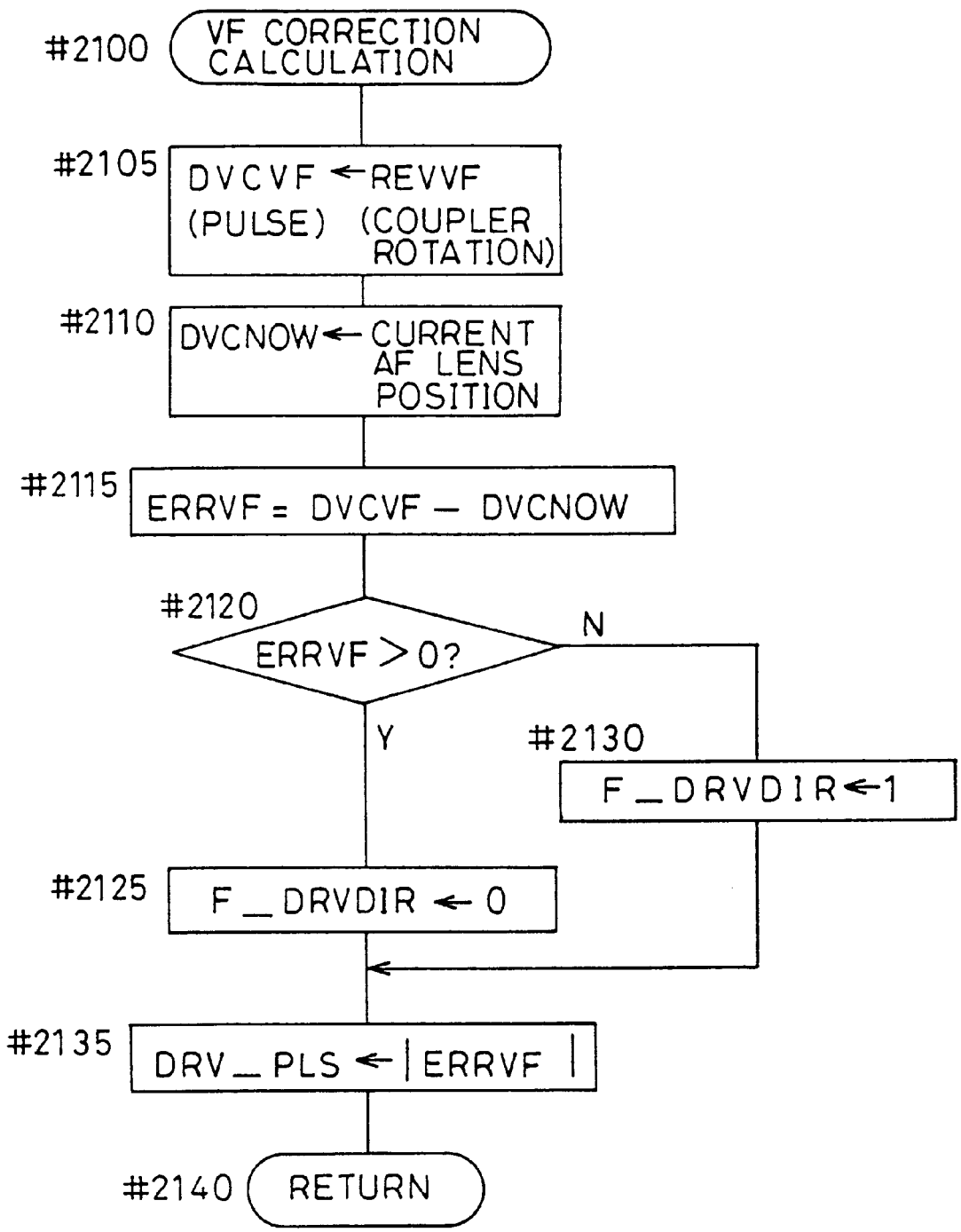
FIG. 44 is a flow chart of a VF correction calculation routine of the intra-body microcomputer of the camera system embodying the present invention.

A flow chart of the VF correction calculation routine is shown in FIG. 44.

At step #2105, a VF correction moving-out amount (coupler rotation) REVVF which has been read-in as the lens data is converted into the VF correction pulse position (pulse) DVCVF. At step #2110, the current AF lens pulse position (pulse) DVCNOW is calculated from the current AF lens position. At step #2115, a VF correction amount (pulse) ERRVF is obtained by the difference between DVCVF and DVCNOW. At step #2120, the sign of the ERRVF is determined in order to determine the correction direction. When the sign of the ERRVF is plus, the AF lens drive direction flag F_DRVDIR is reset to 0 (the wide direction) at step #2125. When the sign of the ERRVF is minus, the flag F_DRVDIR is set to 1 (the infinity direction) at step #2130. At step #2135, the absolute value of the ERRVF is set to the AF lens drive amount (pulse) DRV_PLS. Then, at step #2140, the process returns.

Subsequently, flows of the body-lens communication will be described with reference to FIGS. 50 to 57. The flows of the body-lens communication show what kind of data is set.

Figure 50:
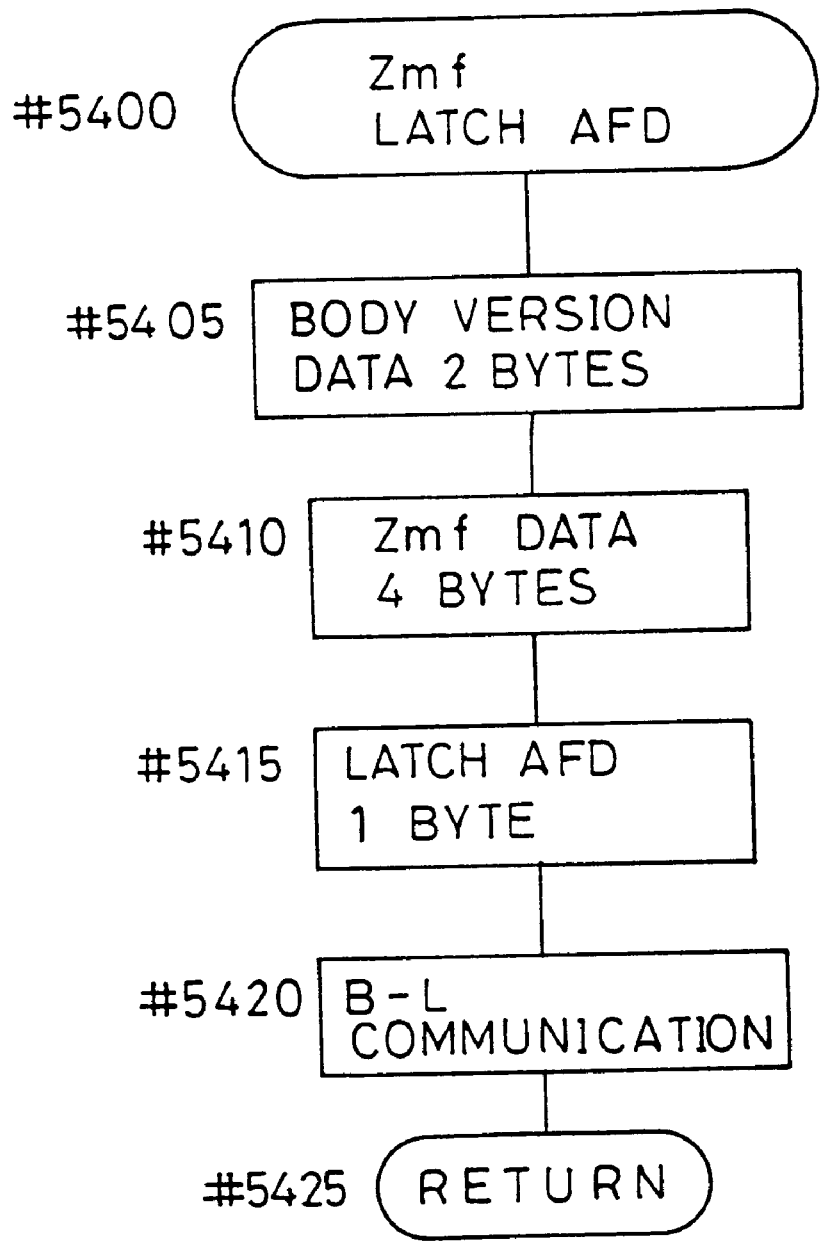
FIG. 50 is a flow chart of a Zmf latch AFD routine of the intra-body microcomputer of the camera system embodying the present invention.

In FIG. 50, the Zmf latch AFD routine is started at step #5400. At step #5405, two bytes of body version data (information for mutual determination between the intra-body microcomputer μC1 and the intra-lens microcomputer μC2) are read-in. At step #5410, four bytes of Zmf data are read-in. At step #5415, one byte of latch AFD is read-in. At step #5420, the body-lens communication is performed. Then, at step #5425, the process returns.

Figure 51:
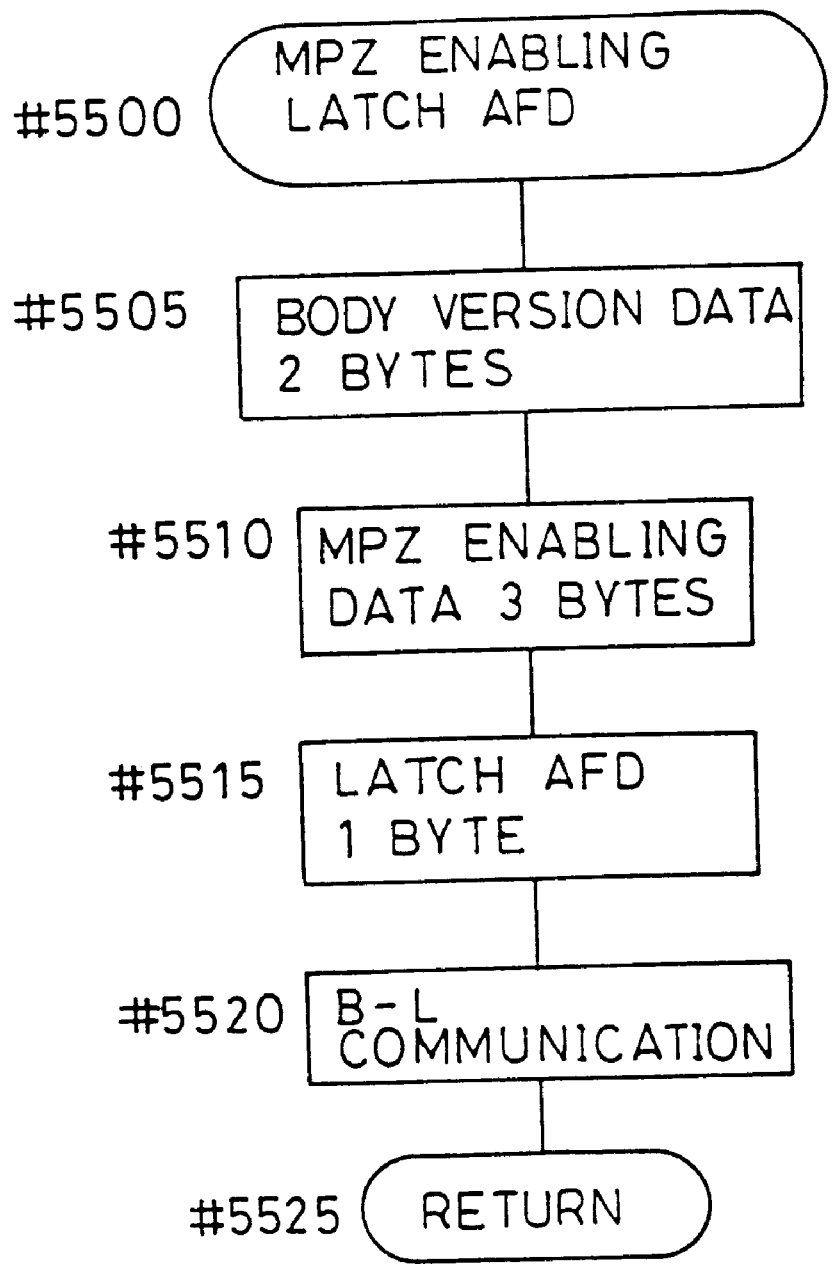
FIG. 51 is a flow chart of an MPZ enabling latch AFD routine of the intra-body microcomputer of the camera system embodying the present invention.

In FIG. 51, the MPZ enabling latch AFD routine is started at step #5500. At step #5505, two bytes of the body version data are read-in. At step #5510, three bytes of MPZ enabling data are read-in. At step #5515, one byte of the latch AFD is read-in. At step #5520, the body-lens communication is performed. Then, at step #5525, the process returns.

Figure 52:
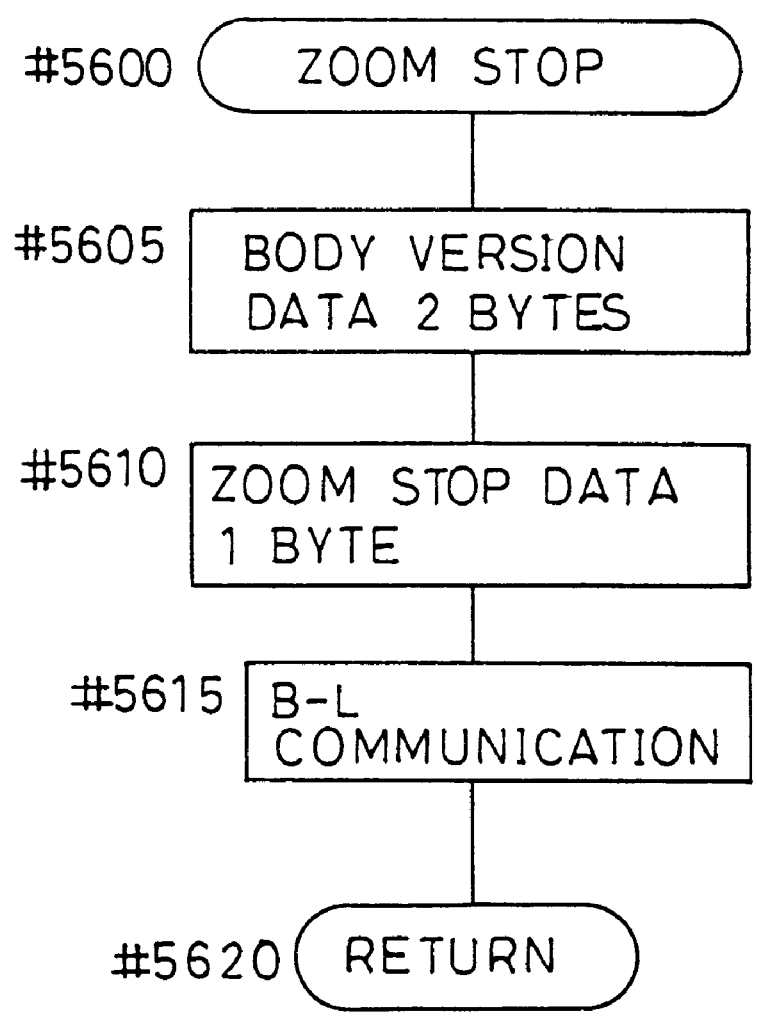
FIG. 52 is a flow chart of a zoom stop routine of the intra-body microcomputer of the camera system embodying the present invention.

In FIG. 52, the zoom stop routine is started at step #5600. At step #5605, two bytes of the body version data are read-in. At step #5610, one byte of zoom stop data is read-in. At step #5615, the body-lens communication is performed. Then, at step #5620, the process returns.

Figure 53:
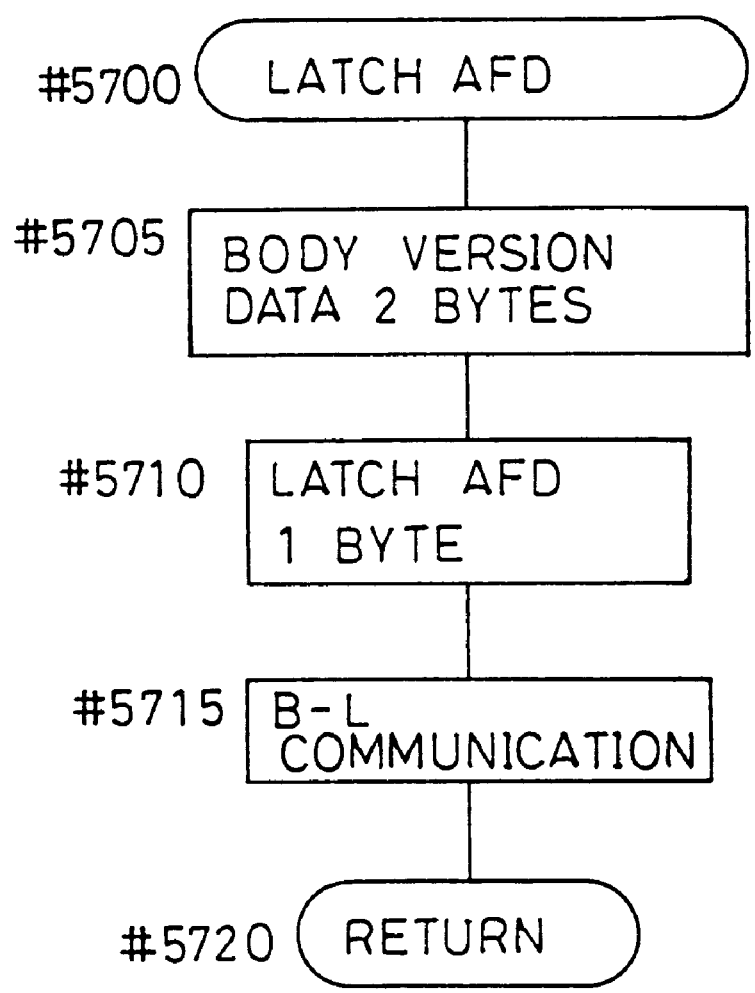
FIG. 53 is a flow chart of a latch AFD routine of the intra-body microcomputer of the camera system embodying the present invention.

In FIG. 53, the latch AFD routine is started at step #5700. At step #5705, two bytes of the body version data are read-in. At step #5710, one byte of the latch AFD data is read-in. At step #5715, the body-lens communication is performed. Then, at step #5720, the process returns.

Figure 54:
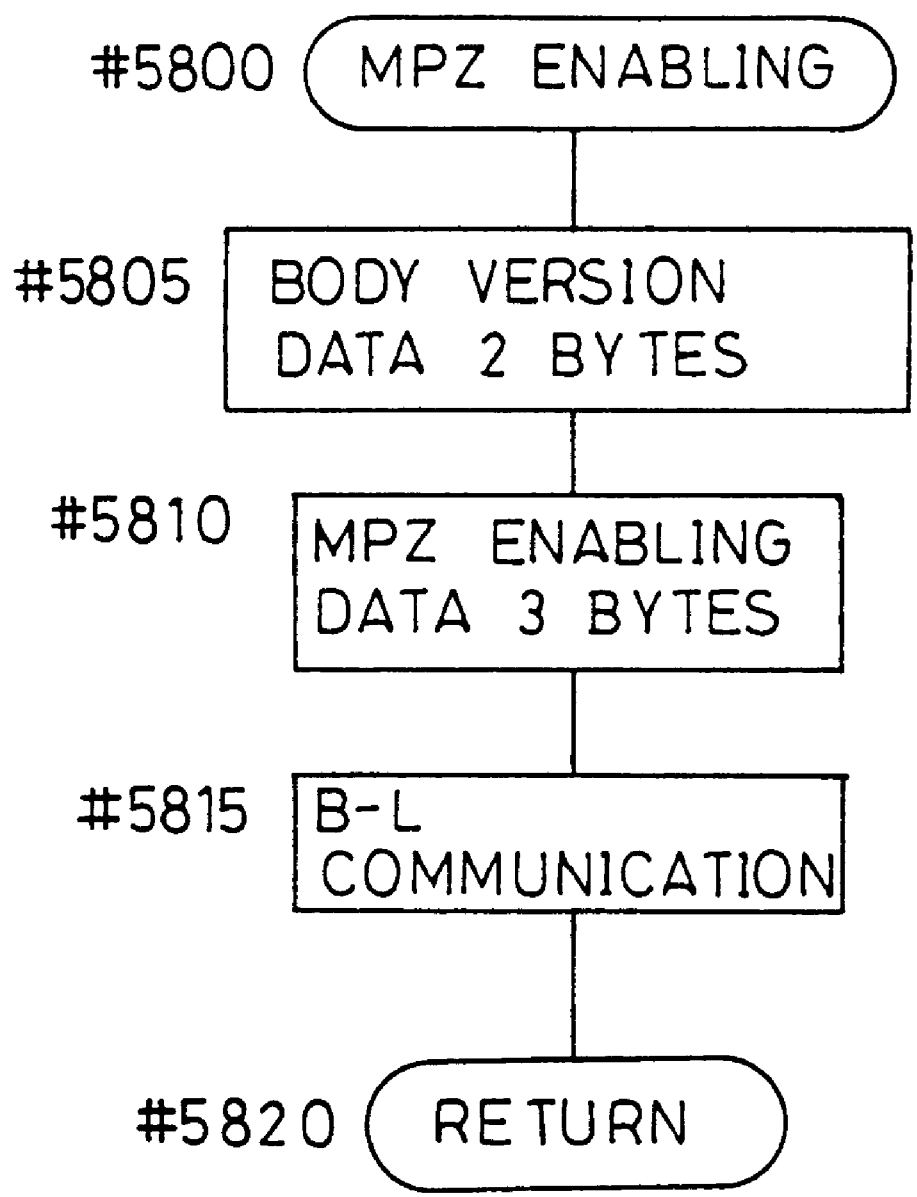
FIG. 54 is a flow chart of an MPZ enabling routine of the intra-body microcomputer of the camera system embodying the present invention.

In FIG. 54, the MPZ enabling routine is started at step #5800. At step #5805, two bytes of the body version data are read-in. At step #5810, three bytes of the MPZ enabling data are read-in. At step #5815, body-lens communication is performed. At step #5820, the process returns.

Figure 55:
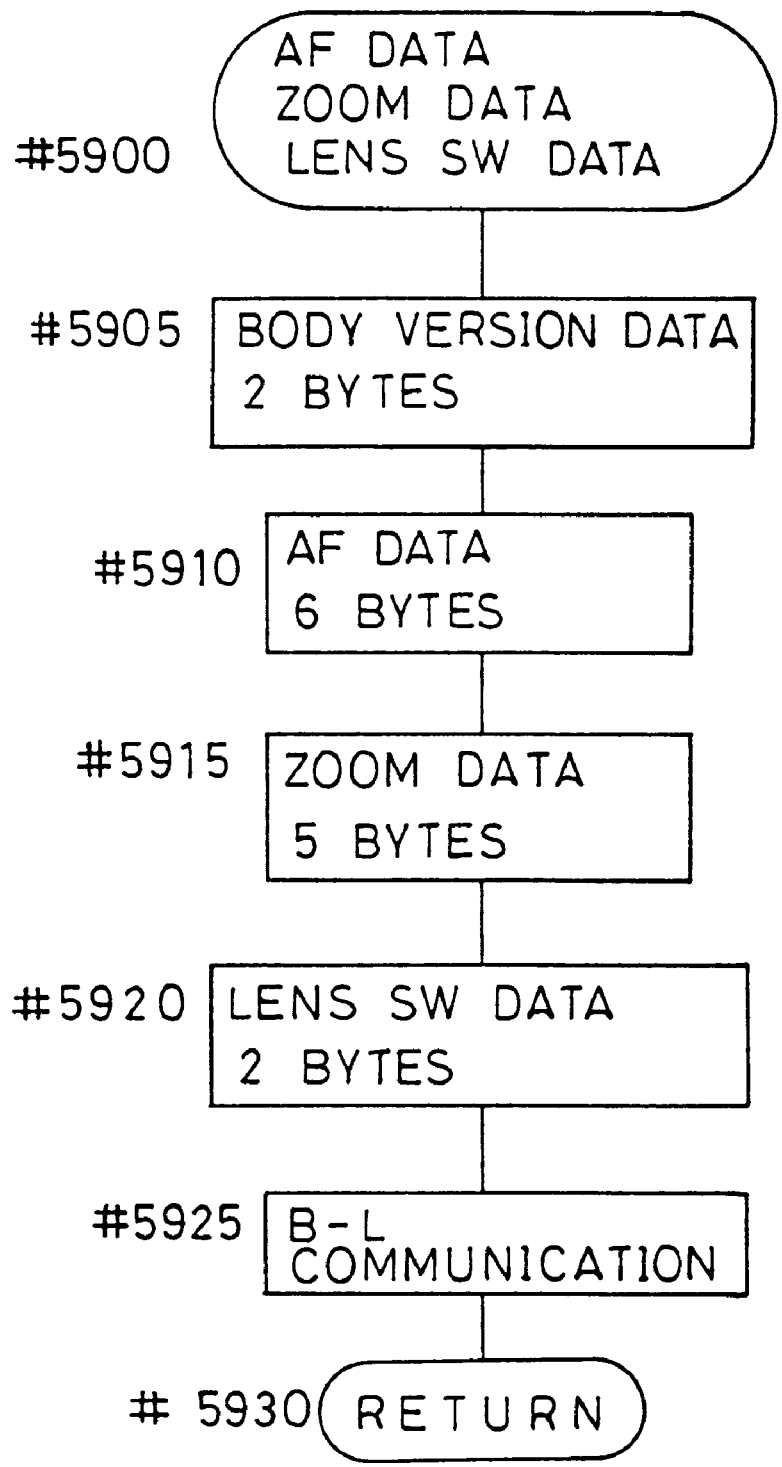
FIG. 55 is a flow chart of an AF data/zoom data/lens switch data routine of the intra-body microcomputer of the camera system embodying the present invention.

In FIG. 55, the AF data/zoom data/lens switch data routine is started at step #5900. At step #5905, two bytes of the body version data are read-in. At step #5910, six bytes of the AF data are read-in. At step #5915, five bytes of the zoom data are read-in. At step #5920, two bytes of the lens switch data are read-in. At step #5925, the body-lens communication is performed. Then, step #5930, the process returns.

Figure 56:
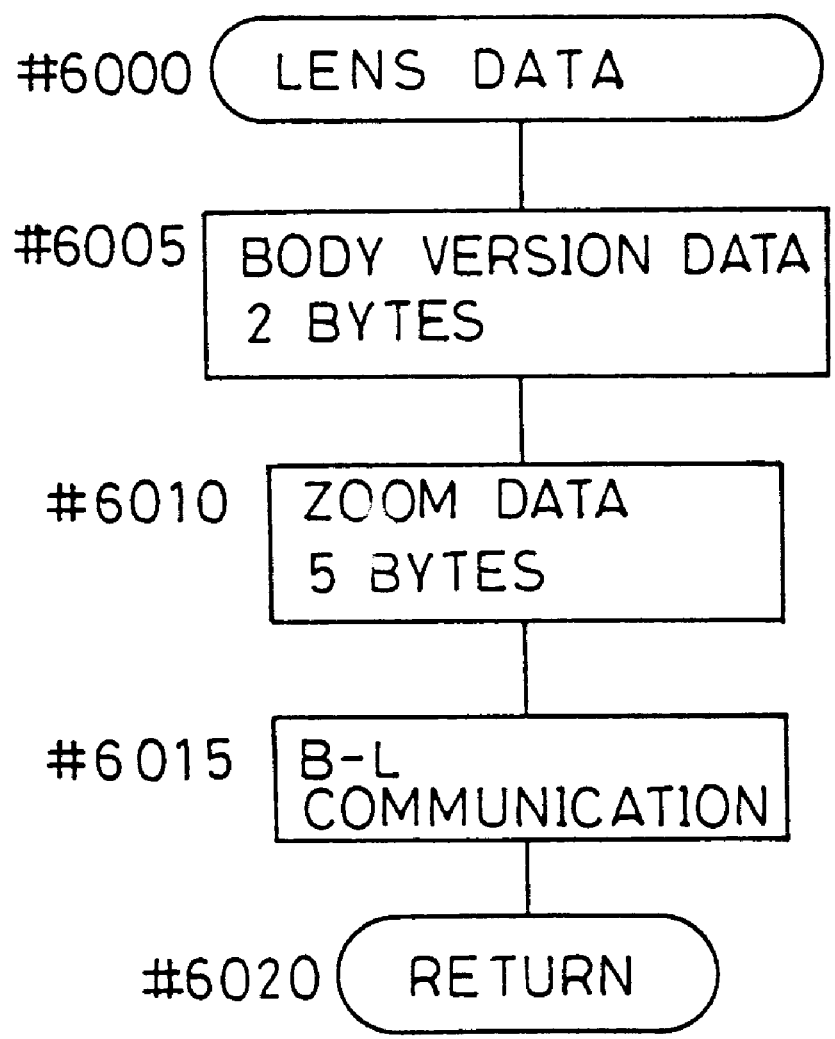
FIG. 56 is a flow chart of a lens data routine of the intra-body microcomputer of the camera system embodying the present invention.

In FIG. 56, the lens data routine is started at step #6000. At step #6005, two bytes of the body version data are read-in. At step #6010, five bytes of the zoom data are read-in. At step #6015, the body-lens communication is performed. Then, at step #6020, the process returns.

Figure 57:
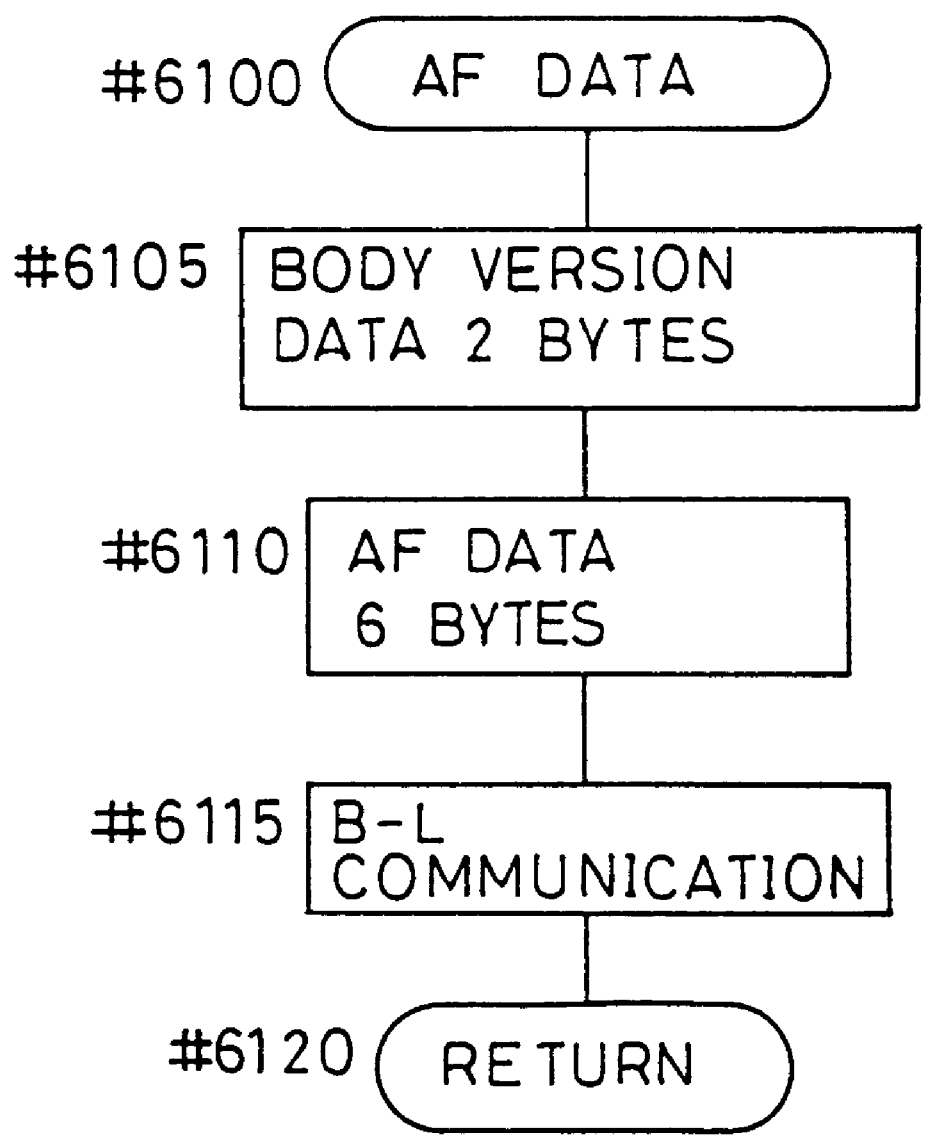
FIG. 57 is a flow chart of an AF data routine of the intra-body microcomputer of the camera system embodying the present invention.

In FIG. 57, the AF data routine is started at step #6100. At step #6105, two bytes of the body version data are read-in. At step #6110, six bytes of the AF data are read-in. At step #6115, the body-lens communication is performed. Then, at step #6120, the process returns.

When the in-focus condition is obtained by the turning on of the switch S2 during the above-described AF and NL processes, the process branches to the subsequently-described S2 interrupt routine. The process branches to the S2 interrupt routine when the switch S2 is turned on since the S2 interrupt is always permitted under the FA condition.

Figure 38:
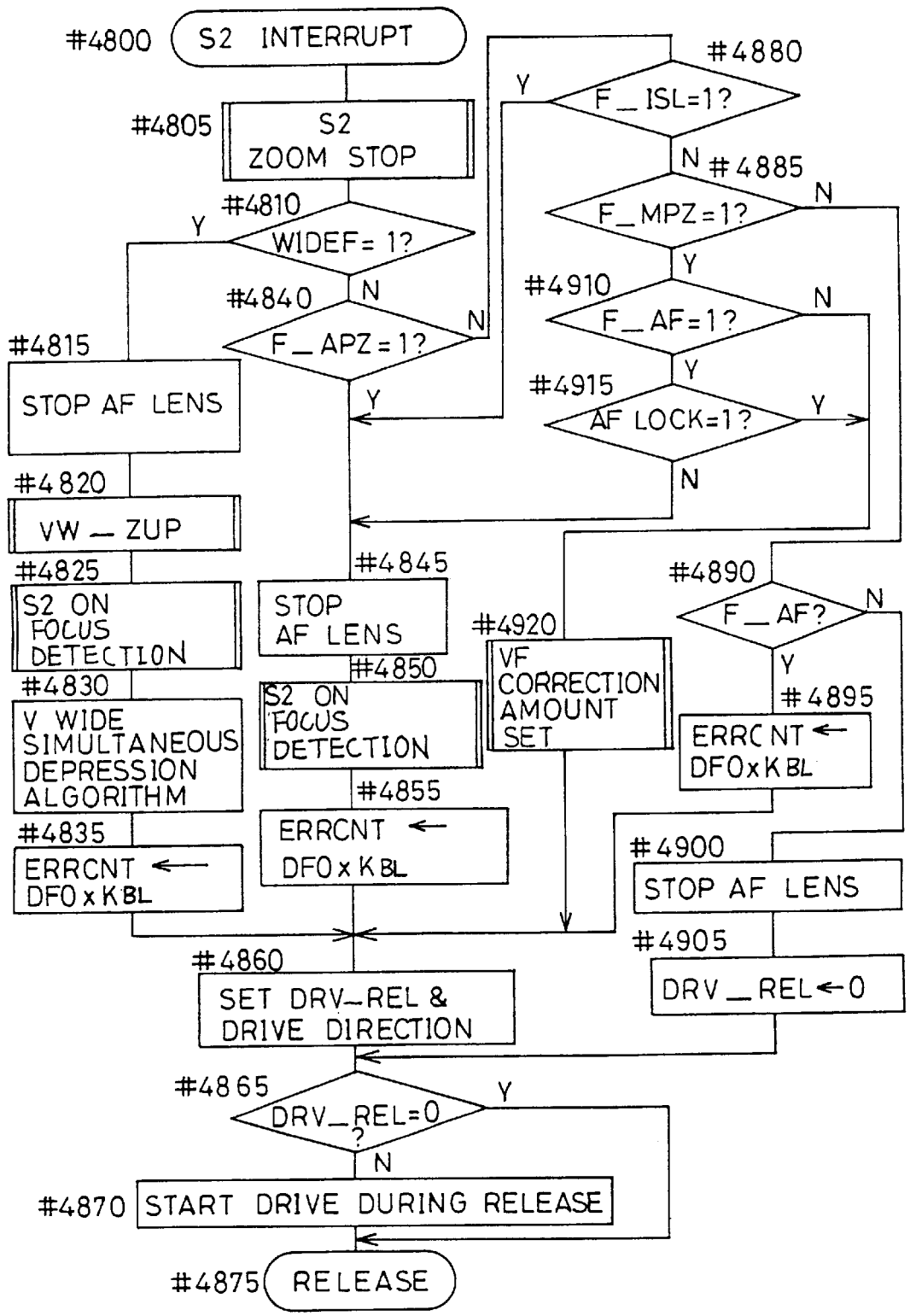
FIG. 38 is a flow chart of an S2 interrupt routine of the intra-body microcomputer of the camera system embodying the present invention.

A flow chart of the S2 interrupt routine is shown in FIG. 38.

When the switch S2 is turned on to activate this routine (step #4800), the S2 zoom stop routine is executed at step #4805. At step #4810, whether the flag WIDEF showing that the wide finder is ON is 1 or not is determined. When the flag WIDEF is 1 and the wide finder is ON, since the switches S1 and S2 are simultaneously depressed, the driving of the AF lens is stopped at step #4815, and in order to return the 150% finder to the 100% finder, the VW_ZUP routine for zooming up is executed at step #4820. At step #4825, the S2 ON focus detection routine is executed at sep #4825. At step #4830, a V wide simultaneous depression algorithm is performed. This algorithm is for selecting an island for simultaneous depression. The detail thereof is shown in Table 9. At step #4835, a vignette amount is calculated from a defocus amount. Then, the process proceeds to step #4860, where a drive amount DRV_REL and the drive direction for during release are set. At step #4865, whether the drive amount DRV_REL is 0 or not is determined. When the DRV_REL is not 0, driving during release is started at step #4870. When the DRV_REL is 0, no process is executed, and the process branches to the release process at step #4875. A description of the release process (exposure control) will be omitted, since it is well-known.

When it is determined that the wide finder is not ON at step #4810, whether the APZ control is ON or not is determined by the flag F_APZ at step #4840. When the APZ is not ON, whether the ISL control is ON or not is determined by the flag F_ISL at step #4880. When the ISL control is ON (or when the APZ control is ON), the driving of the AF lens is stopped at step #4845, and the S2 ON focus detection routine is executed at step #4850. Then, after a vignette amount is calculated at step #4855, the process from step #4869 is executed. The focus detection is performed again at step #4850 in order to avoid a vignette photograph due to poor focus detection accuracy of the focus detection data obtained during zooming.

In a case where it is determined at step #4885 that the MPZ control is ON by the flag F_MPZ and the AF process is not being executed, or in a case where the MPZ is ON, the AF process is being executed and the AF lock is ON, the VF correction amount set routine is executed at step #4920, and the process from step #4860 is executed. When the AF process is being executed and the AF lock is not ON, the process from step #4845 is executed. Under the FA condition or the AF lock condition, it is unnecessary to perform the focus detection again.

Figure 74:
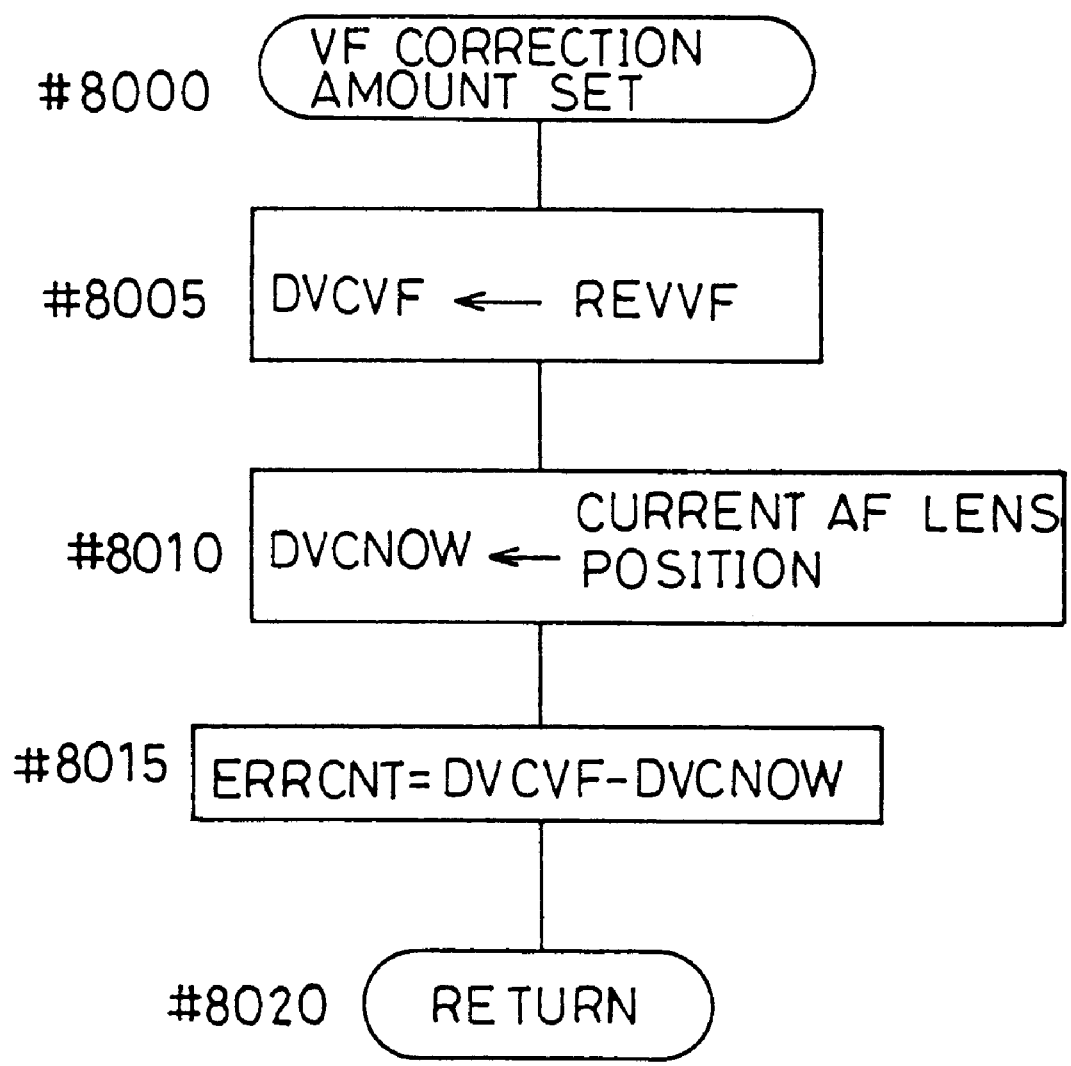
FIG. 74 is a flow chart of a VF correction amount set routine of the intra-body microcomputer of the camera system embodying the present invention.

A flow chart of the VF correction amount set routine of step #4920 of the S2 interrupt routine is shown in FIG. 74. This routine is executed in a case where the AF lock is ON under the FA or the AF condition while the MPZ control is ON to obtain a vignette amount from the VF correction moving-out amount and the AF lens position.

When this routine is started at step #8000, first, the VF correction pulse position DVCVF is calculated from the VF correction moving-out amount REVVF at step #8005. At step #8010, the current AF lens pulse position DVCNOW is calculated from the current AF lens position. At step #8015, the vignette amount (pulse) ERRCNT is calculated by DVCVF−DVCNOW. Then, the process returns at step #8020.

When it is determined that the MPZ control is not ON at step #4885, determination of the flag F_AF is made at step #4890. When the AF process is being executed, a vignette amount is calculated by use of the latest focus detection data at step #4895, and the process from step #4860 is executed. When the FA process is being executed, the driving of the AF lens is stopped at step #4900, and the drive amount DRV_REL is set to 0. Then, the process from step #4865 is executed.

Figure 68:
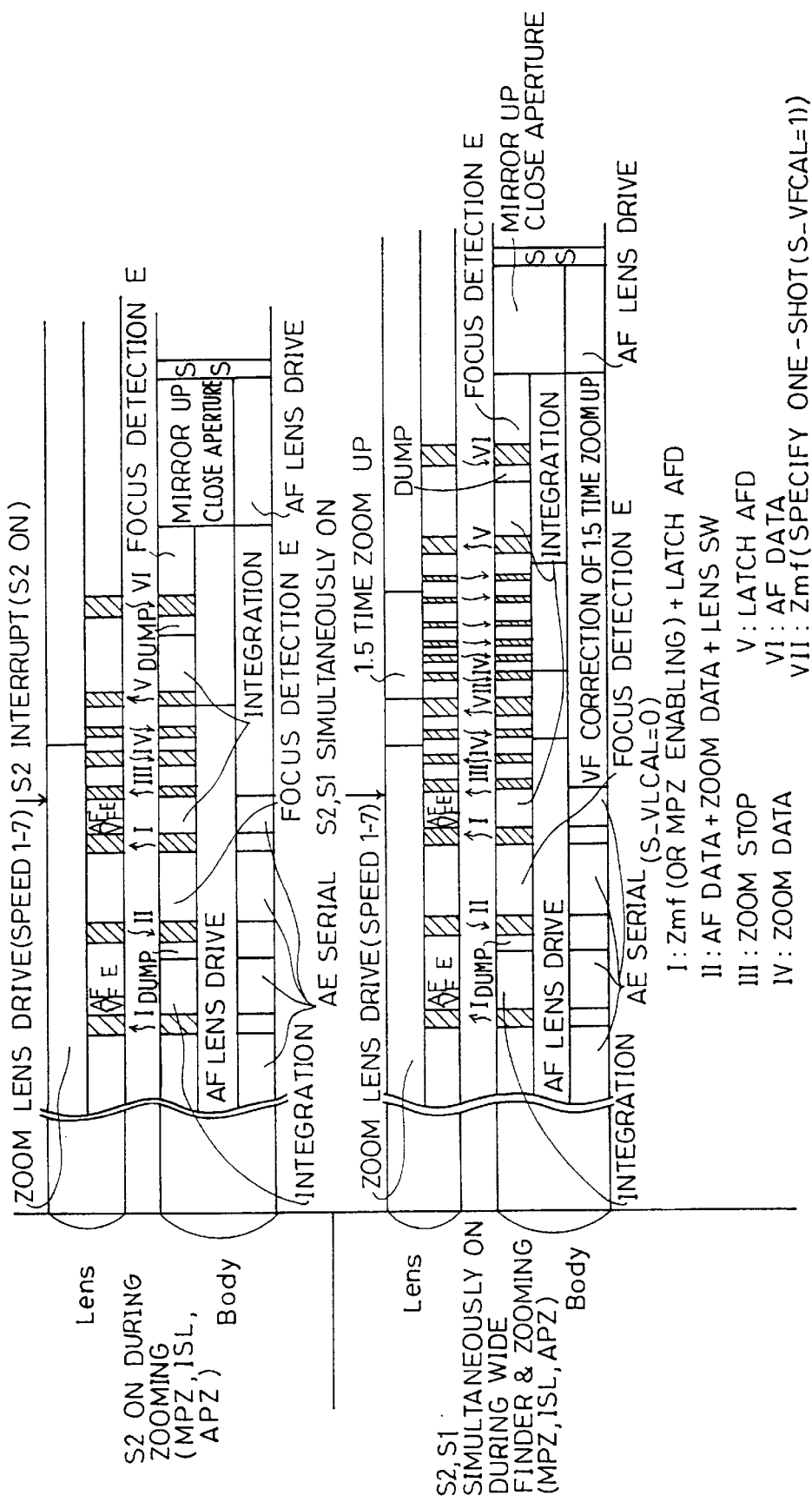
FIG. 68 is a timing chart showing the timing obtained when a switch S2 is ON during zooming and when a switch S1 and the switch S2 are simultaneously ON during zooming under wide finder condition in the camera system embodying the present invention.

Concerning the turning on of the switch S2, and the simultaneous turning on of the switches S1 and S2 during zooming, a timing chart is shown in FIG. 68.

Moreover, the continuous photographing is sometimes performed in the S2 ON process.

Figure 49:
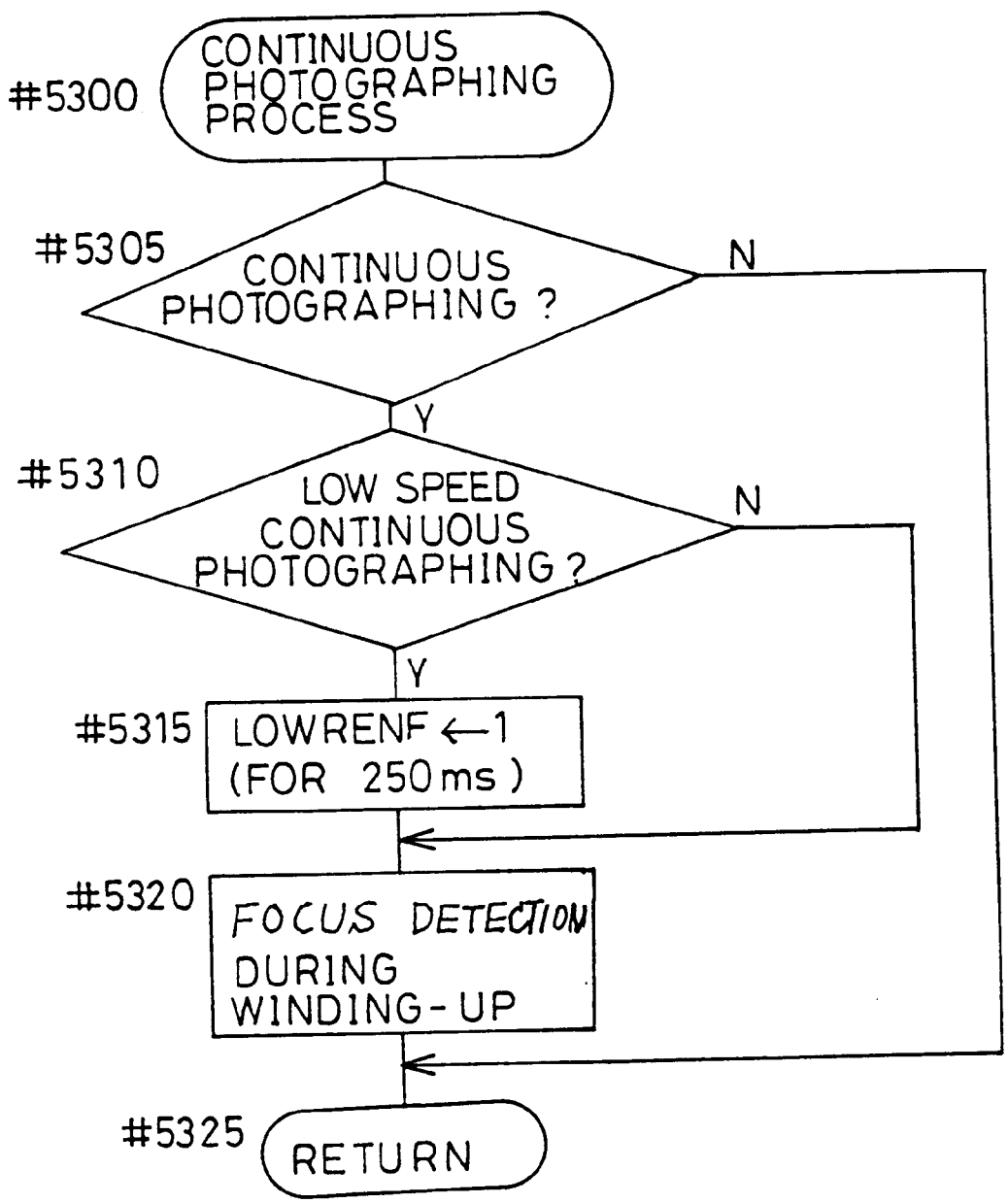
FIG. 49 is a flow chart of a continuous photographing process routine of the intra-body microcomputer of the camera system embodying the present invention.

A flow chart of a continuous photographing process routine is shown in FIG. 49. This routine is called after the exposure control under the ON condition of the switch S2.

Figure 69:
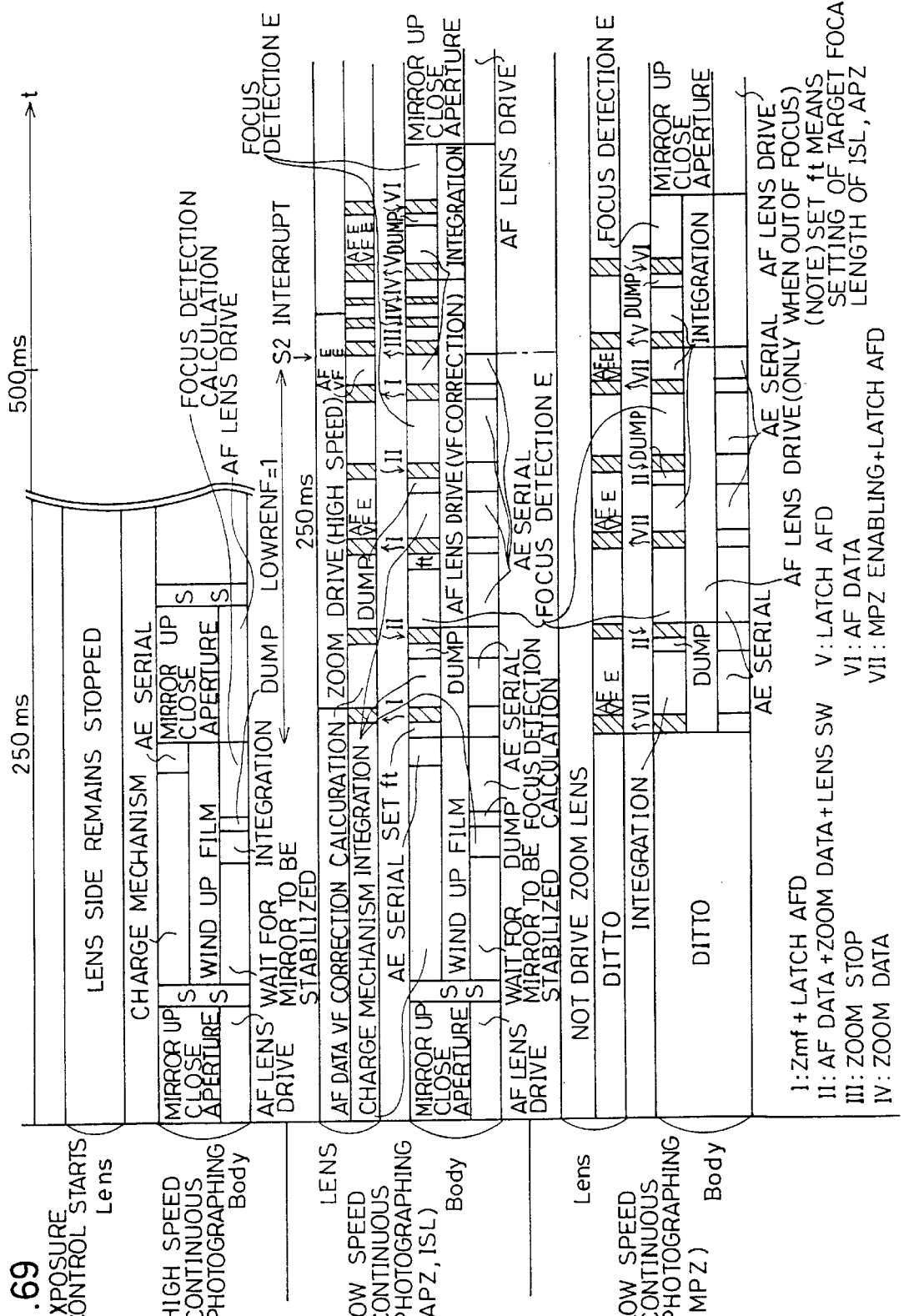
FIG. 69 is a timing chart showing the timing obtained when the continuous photographing is ON in the camera system embodying the present invention.

At step #5305, whether the continuous photography mode is ON or not is determined. When the continuous photography mode is not ON, no process is executed, and the process returns at step #5325. When the continuous photography mode is ON, whether the continuous photography mode is the low speed continuous photography mode or not is determined at step #5310. When it is the low speed continuous photography mode, the flag LOWRENF showing that the low speed continuous photography is being performed is set to 1 for 250 ms. Whether it is the low speed continuous photography mode or not, the focus detection is performed while film is being wound up at step #5320. At step #5325, the process returns. Concerning the timing of the above process, refer to the timing chart of FIG. 69.

Figure 58:
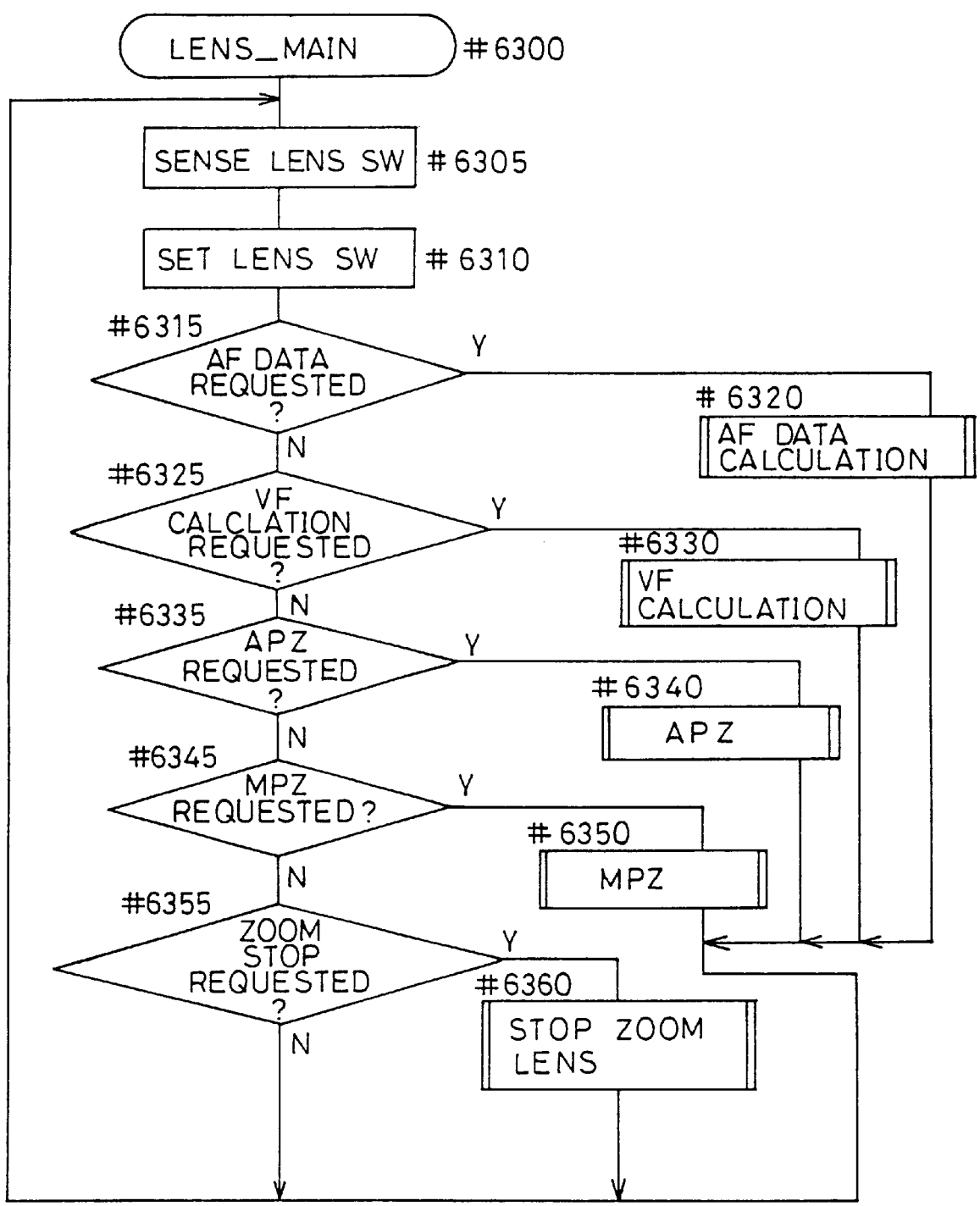
FIG. 58 is a flow chart of a LENS_MAIN routine of the intra-lens microcomputer of the camera system embodying the present invention.

Next, a flow chart of a main routine LENS_MAIN which is the control of the intra-lens microcomputer $\mu C2$ is shown in FIG. 58. When the intra-lens microcomputer $\mu C2$ is activated, it waits until each request is set while sensing lens switch information. When the request is set, intra-lens microcomputer $\mu C2$ executes a requested process. A lens interrupt by a CS (chip select) (CS interrupt) is always permitted. Hereinafter, each step of the process will specifically be described.

First, at step #6300, the LENS_MAIN routine is started. At step #6305, the lens switch is sensed. At step #6310, the lens switch is set. That is, the lens switch is set to a RAM (random access memory) for communication with the intra-body microcomputer $\mu C1$.

At step #6315, whether the AF data is requested or not is determined. When the AF data is requested, AF data calculation is performed at step #6320. When the AF data is not requested, whether VF calculation is requested or not is determined at step #6325. When the VF calculation is requested, the VF calculation is performed at step #6330. When the VF calculation is not requested, whether APZ calculation is requested or not is determined at step #6340. When the APZ calculation is requested, the APZ calculation is performed at step #6340. When the APZ calculation is not requested, whether MPZ calculation is requested or not is determined at step #6345. When the MPZ calculation is requested, the MPZ calculation is performed at step #6350. When the MPZ calculation is not requested, whether a zoom stop is requested or not is determined at step #6355. When the zoom stop is requested, the zoom lens is stopped at step #6360. When the zoom stop is not requested, the process returns to step #6305.

Figure 59:
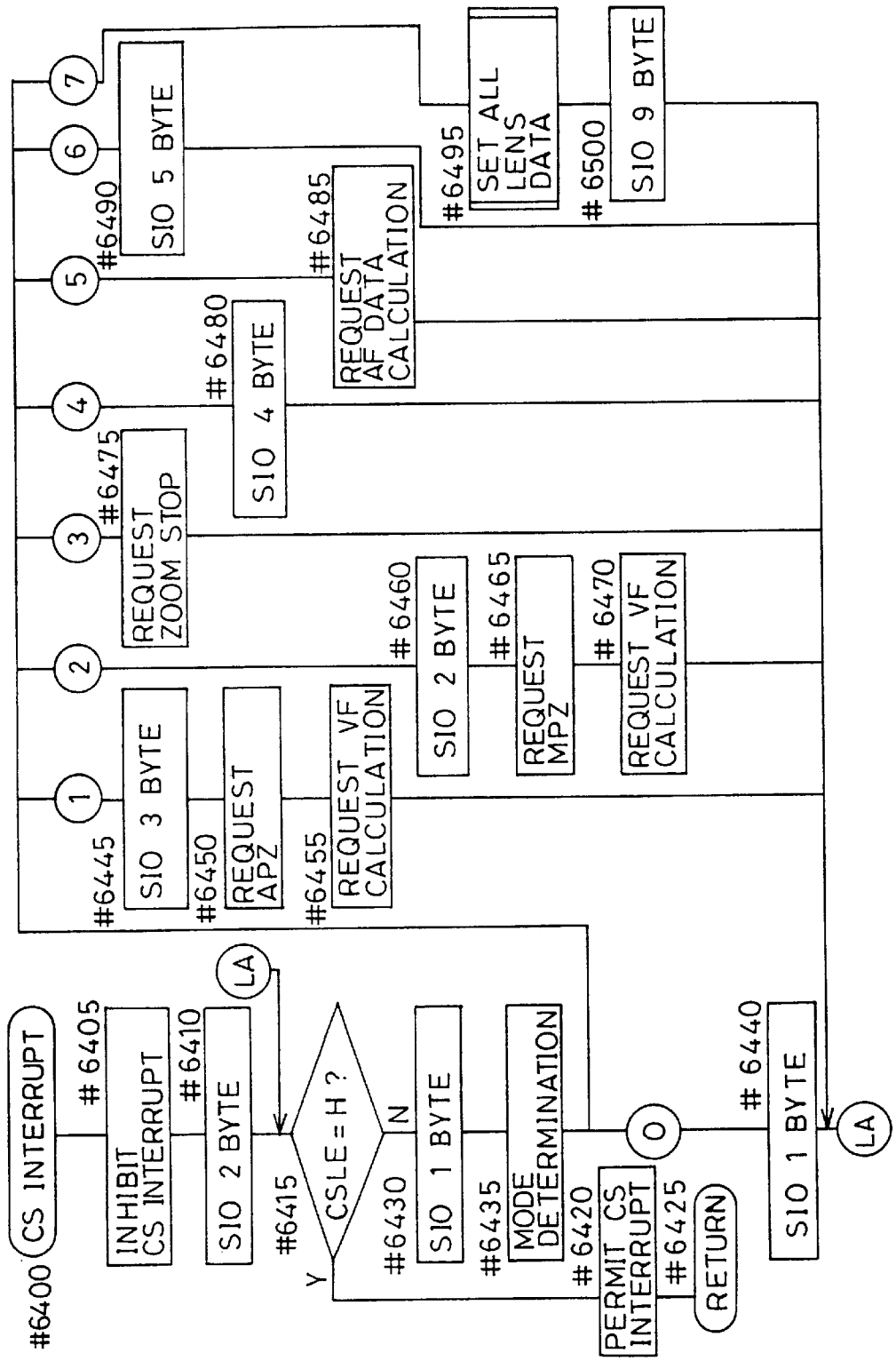
FIG. 59 is a flow chart of a CS interrupt routine of the intra-lens microcomputer of the camera system embodying the present invention.

Subsequently, the CS interrupt will be described with reference to FIG. 59.

First, the CS interrupt is started at step #6400. At step #6405, the subsequent CS interrupt is inhibited in order to avoid communication with the intra-body microcomputer $\mu C1$. At step #6410, two bytes of SIO (serial input/output) data are read-in. The two byte data is a data including information on the body BD and the lens LE (i.e. version check data of the body BD and the lens LE).

Then, when a port CSLE is "High" at step #6415, determining that the lens communication is completed, the process proceeds to step #6420, where the CS interrupt is permitted. Then, the process returns at step #6425.

When the port CSLE is "Low" at step #6415, since the lens communication is on, the process proceeds to step #6430, where one byte of SIO data (mode data) for mode determination is read-in. At step #6435, mode determination is made. The mode data is the first data in FIG. 70 corresponding to each mode (such as MLREQ, MZmg, etc.). FIG. 70 shows that two byte communication of the figure is performed when the lens information is read-in.

Then, the process proceeds to a step which corresponds to the mode determined at step #6435.

Table 2 shows the mode value, mode, direct ion (direction of data transmission between the intra-body microcomputer μC1 and the intra-lens microcomputer μC2) and content of each mode. A description thereof will hereinafter be provided with reference to the data of each mode shown in FIG. 70.

When the mode value is 0, a one byte data LReq including the lens switch information is outputted at step #6440, and the process returns to step #6415.

When the mode value is 1, a three byte data consisting of a zoom speed specifying data ZspB, the current moving-out amount REVNOW and the target focal length ft is read-in at step #6445. The process returns to step #6415 via steps #6450 to #6455.

When the mode value is 2, a two byte data consisting of the zoom speed specifying data ZspB and the current moving-out amount REVNOW is read-in at step #6460. The process returns to step #6415 via steps #6465 to #6470.

When the mode value is 3, no SIO data is read-in. The process returns to step #6415 via step #6475.

When the mode value is 4, a four byte data consisting of a zoom condition Zstat, a zoom drive speed ZspL, the VF correction position (REVVF) and the current focal length fnow is outputted, and the process returns to step #6415.

When the mode value is 5, no SIO data is read-in. The process returns to step #6415 via step #6485.

When the mode value is 6, a five byte data consisting of AF data calculation information AFDFIN, a DE→coupler rotation number KL, a pulse count→DV KN, a sensor back amount ΔSB and a latch timing focal length flat is outputted, and the process returns to step #6415.

When the mode value is 7, after all the lens data are set at step #6495, a nine byte data consisting of an open aperture value AV0, a maximum aperture value $\Delta V_{max}$, the DE→coupler rotation number KL, the current focal length fnow, a lens attachment signal $L_{ON}$, the pulse count→DV KN, the sensor back amount ΔSB, a shortest focal length fmin and a longest focal length fmax is outputted at step #6500. Then, the process returns to step #6415.

Concerning the communication, the current communication and the succeeding communication can consecutively be performed. For example, a communication MZmf for requesting a zooming to the target focal length and a communication M1 at AFD for requesting latching of the AF data may consecutively be performed.

Figure 60:
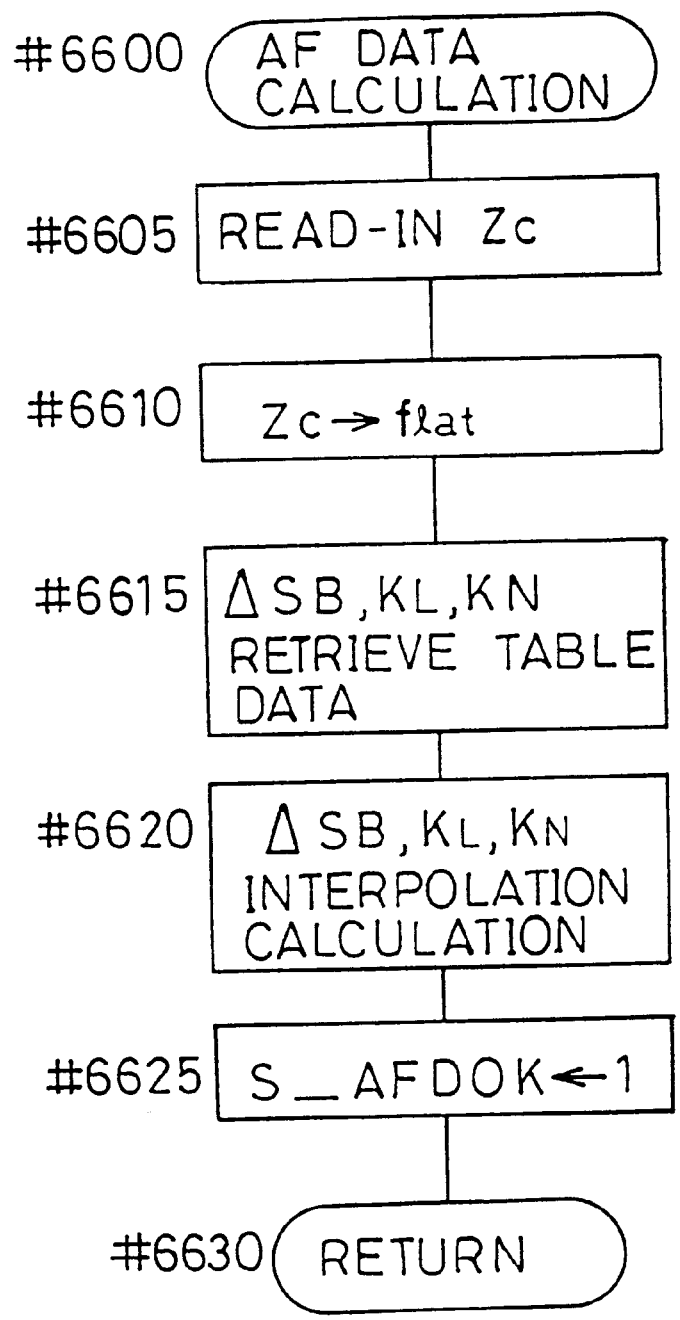
FIG. 60 is a flow chart of an AF data calculation routine of the intra-lens microcomputer of the camera system embodying the present invention.

Subsequently, the AF data calculation of step #6320 of FIG. 58 will be described with reference to the subroutine of FIG. 60.

First, the AF data calculation is started at step #6600.

At step #6605, a zoom pulse counter value Zc is read-in. At step #6610, the current latched focal length flat is set from the value Zc. The focal length flat is a data showing a focal length at a latch timing. At step #6615, a data for AF is inputted from a zoom encoder pattern. At step #6620, interpolation calculation of the ΔSB, the KL and the KN is performed based on a pulse counter value. At step #6625, an AF data calculation completion flag S_AFDOK is set to 1. Then, the process returns at step #6630.

The above-mentioned interpolation calculation in the AF data calculation can be performed by a method described in Japanese laid-open Patent Application H2-212675.

When the mode value 1 (MZmf) is received, the APZ and the VF calculation are requested at steps #6450 and #6455, respectively.

Figure 61:
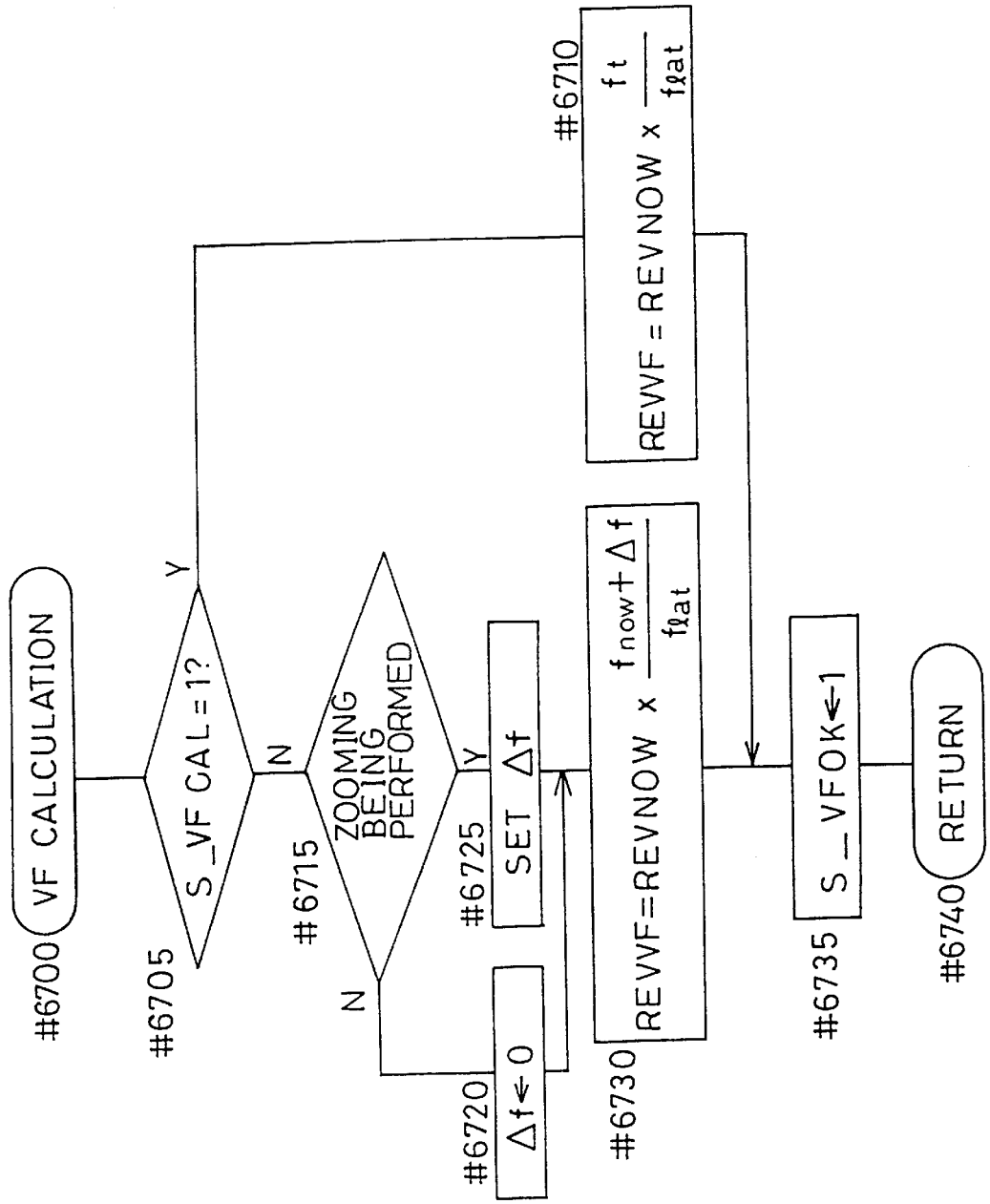
FIG. 61 is a flow chart of a VF calculation routine of the intra-lens microcomputer of the camera system embodying the present invention.

Subsequently, the VF calculation of step #6330 of FIG. 58 will be described with reference to the subroutine of FIG. 61.

First, the VF calculation is started at step #6700. At step #6705, whether the flag V_VFCAL is 1 or not is determined. That is, whether the one-shop operation is requested (1) or the continuous operation is requested (0) is determined. When the one-shot operation is requested, correction of the varifocal lens is made with respect to a specified target focal length. When the continuous operation is requested, if zooming is being performed, a predetermined focal length is added to the current focal length to make the correction of the varifocal lens.

In case of the one-shot operation, the process proceeds to step #6710, while in case of the continuous operation, the process proceeds to step #6715.

At step #6715, whether zooming is being performed or not is determined. When zooming is being performed, the process proceeds to step #6725. When zooming is not being performed, the process proceeds to step #6720. At step #6720, an estimated focal length Δf is set to 0. At step #6725, the estimated focal length Δf is set. The process proceeds to step #6730 via steps #6720 and #6725.

After calculation of the VF correction moving-out amount REVVF is performed at step #6730 or #6710, the process proceeds to step #6735, where a VF calculation completion flag S_VFOK is set to 1. Then, the process returns at step #6740.

Figure 72:
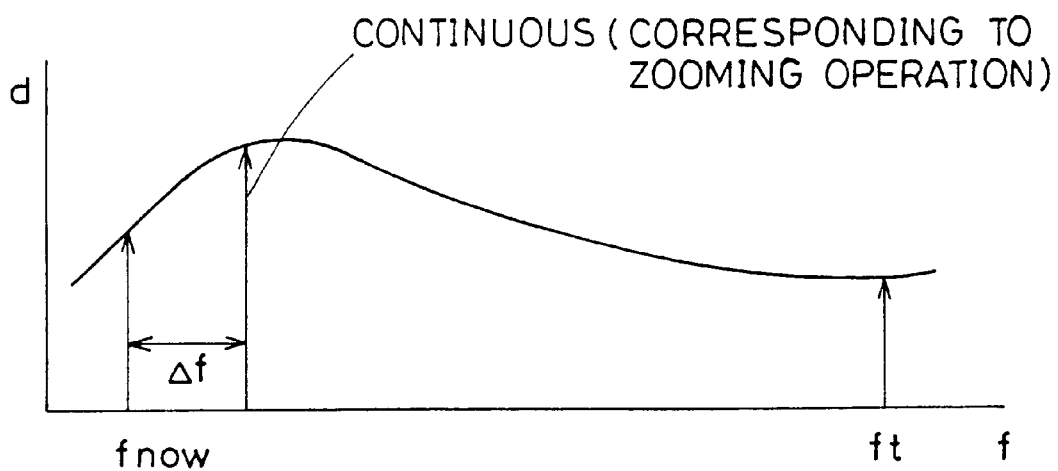
FIG. 72 is a view for explaining a VF correction in the camera system embodying the present invention.

FIG. 72 shows the manner of setting the estimated focal length Δf during zooming, i.e. in case of the continuous operation.

Figure 62:
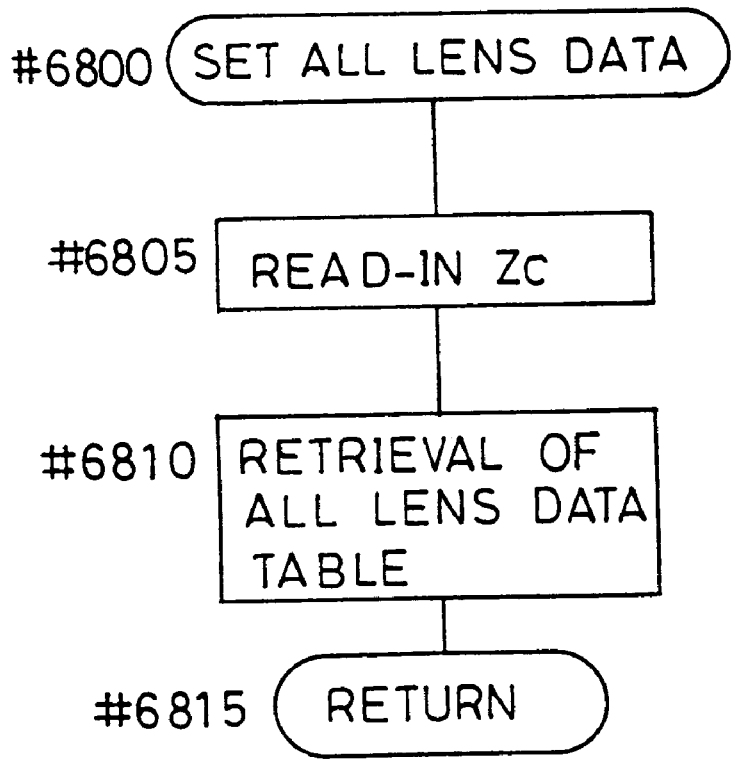
FIG. 62 is a flow chart of a set all lens data routine of the intra-lens microcomputer of the camera system embodying the present invention.

Subsequently, a set all lens data subroutine executed when the mode value is 7 will be described with reference to FIG. 62.

At step #6800, the set all lens data subroutine is started. At step #6805, the value Zc is read-in. At step #6810, retrieval of an all lens data table is performed by the encoder pattern. Then, the process returns at step #6815.

Figure 65:
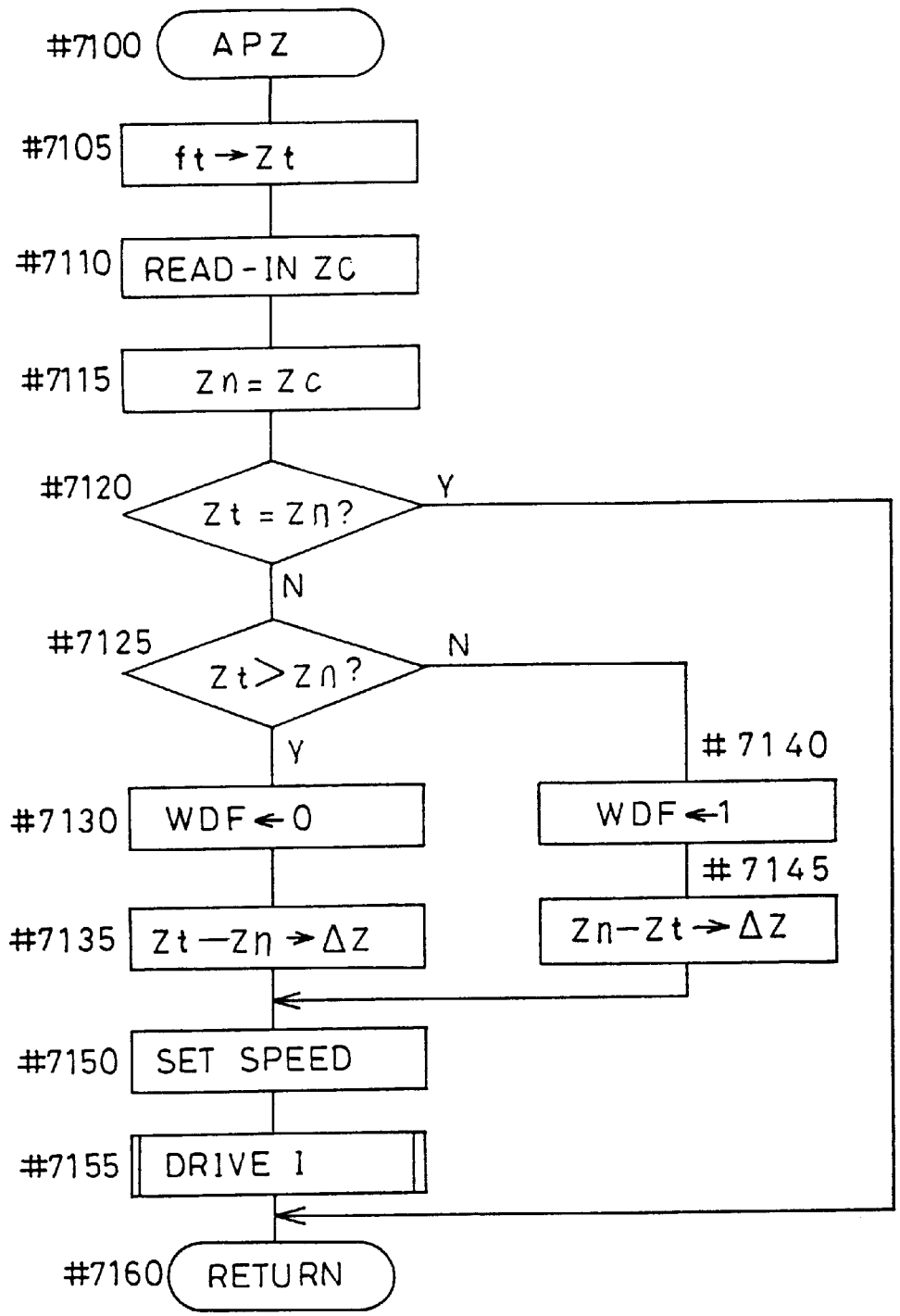
FIG. 65 is a flow chart of an APZ routine of the intra-lens microcomputer of the camera system embodying the present invention.

Subsequently, the APZ of step #6340 of FIG. 58 will be described with reference to the subroutine of FIG. 65.

When this subroutine is called, first, the target focal length ft sent from the intra-body microcomputer μC1 is converted into a target zoom counter value Zt at step #7105. Then, the zoom counter value Zc obtained at that time is read-in at step #7110, and is set as a current zoom counter value Zn at step #7115.

Then, at step #7120, the zoom direction is set by comparmig the target zoom counter value Zt and the current zoom counter value Zn. Since zooming is unnecessary if the Zt and Zn coincide, the process returns without driving the zoom lens at step #7160. When the Zt and Zn do not coincide, the process proceeds to step #7125, where whether the Zt is larger than the Zn or not is determined.

When the Zt is larger than the Zn, a flag WDF showing that zooming is performed in the wide direction is reset to 0 at step #7130, and a zoom drive pulse count ΔZ is obtained by Zt−Zn at step #7135. When the Zt is not larger than the Zn, the flag WDF is set to 1 at step #7140, and the zoom drive pulse count ΔZ is obtained by Zn−Zt at step #7145.

After the zoom drive pulse count ΔZ is obtained, a speed sent as a body condition data is set as the drive speed at step #7150. Then, the driving of the zoom lens is started by calling a drive I subroutine shown in FIG. 63 at step #7155. At this time, the zoom speed in the APZ mode can be controlled by the intra-body microcomputer μC1 since the speed sent from the intra-body microcomputer μC1 is set as the drive speed. After the drive I subroutine is completed, the process returns at step #7160.

In a case where a communication of mode III for detecting the lens condition while the zoom lens is being moved occurs in the above-described APZ subroutine (FIG. 65) or the subsequently-described MPZ subroutine (FIG. 66), the CS interrupt is given priority in order to respond to the communication while the zoom lens is being moved.

Figure 63:
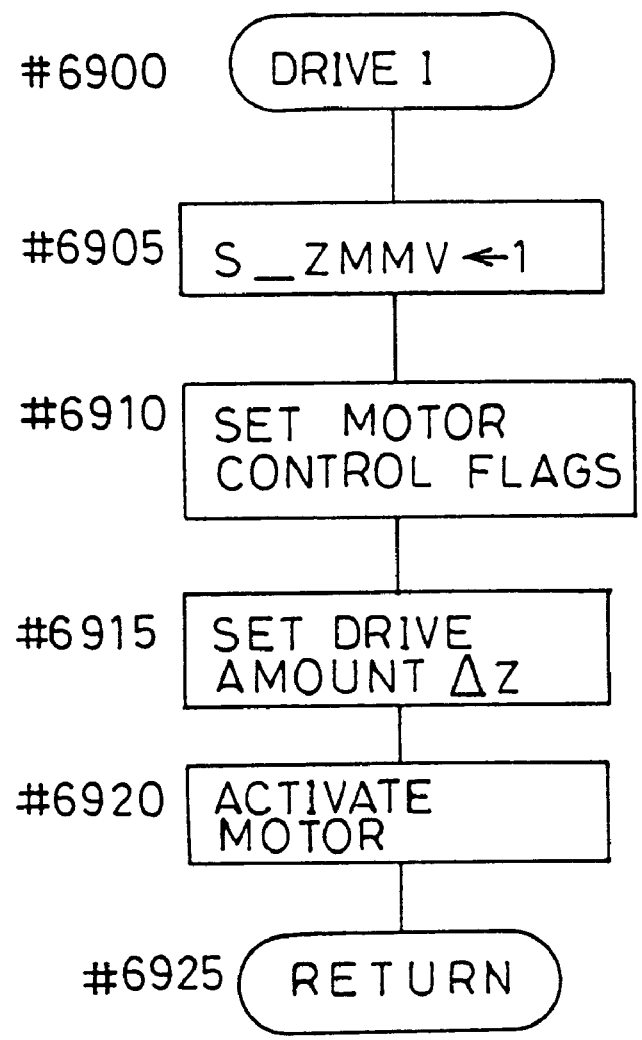
FIG. 63 is a flow chart of a drive l routine of the intra-lens microcomputer of the camera system embodying the present invention.

The drive I subroutine is shown in FIG. 63.

The drive I subroutine is a subroutine for driving the zoom lens by the zoom motor M3 (FIG. 5). When the subroutine is called at step #6900, first, the flag S_ZMMV showing that the zoom lens is being moved is set to 1 at step #6905.

Then, at step #6910, flags for controlling the motor are set to 1. After the drive amount (zoom drive pulse count) ΔZ is set at step #6915, activation of the motor M3 is started at step #6920. Then, at step #6925, the process returns.

Figure 66:
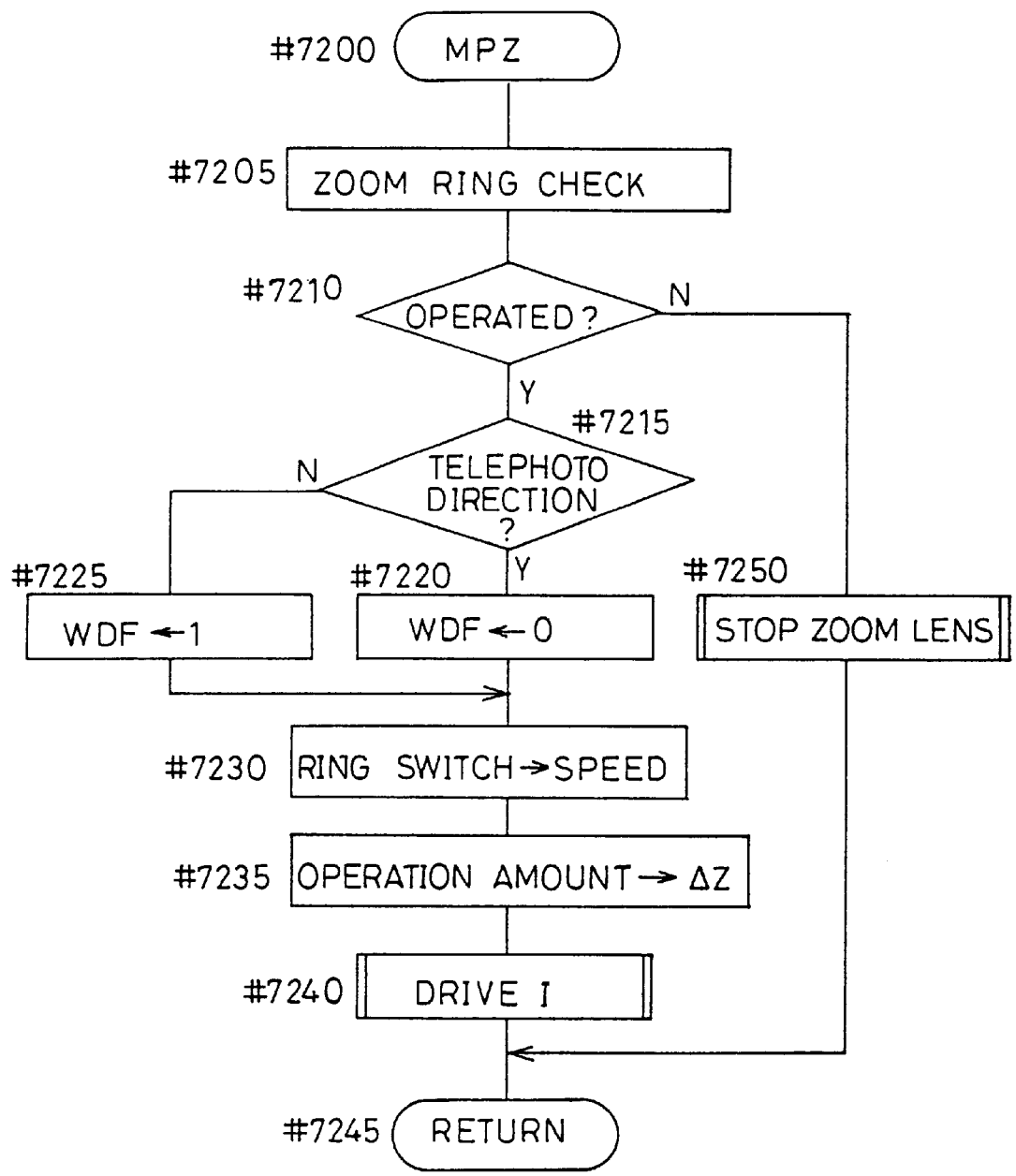
FIG. 66 is a flow chart of an MPZ routine of the intra-lens microcomputer of the camera system embodying the present invention.

Subsequently, the MPZ of step #6350 of FIG. 58 will be described with reference to the subroutine of FIG. 66.

When the subroutine is called at step #7200, first, zoom ring check is performed at step #7205. At step #7210, whether the zoom ring has been operated or not is determined. When the zoom ring has not been operated, the process proceeds to step #7250. Then, after the zoom lens is stopped by a stop zoom lens subroutine of step #7250, the process returns at step #7245. When the zoom ring has been operated at step #7210, the process proceeds to step #7215, where whether the operation direction is the telephoto direction or not is determined. When the direction is the telephoto direction, the flag WDF showing that zooming is performed in the wide direction is reset to 0 at step #7220. When the direction is not the telephoto direction, the flag WDF is set to 1 at step #7225.

Then, at step #7230, the zoom speed is set in correspondence with a ring switch. After the zoom drive pulse count ΔZ in accordance with the operation amount is set at step #7235, the drive I subroutine is called at step #7240 to start the driving of the zoom lens. Then, at step #7245, the process returns.

Figure 64:
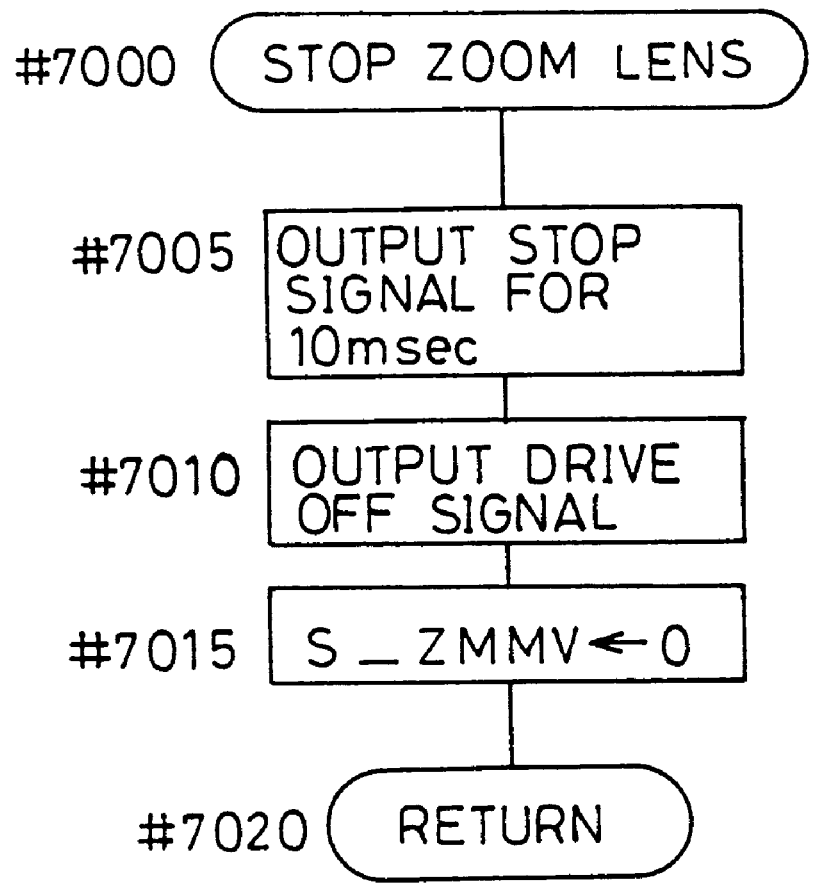
FIG. 64 is a flow chart of a stop zoom lens routine of the intra-lens microcomputer of the camera system embodying the present invention.

The above-mentioned stop zoom lens subroutine is shown in FIG. 64.

When the subroutine is called at step #7000, first, a stop signal is outputted to the motor drive circuit MD3 for 10 msec at step #7005. Thereafter, a drive OFF signal is outputted at step #7010 in order to enable the sleep state, and the flag S_ZMMV showing that the zoom lens is being moved is reset to 0 at step #7015. Then, the process returns at step #7020.

Subsequently, a variation of this embodiment will be described.

The variation intends to enable zooming where in-focus condition is suitably and smoothly obtained in accordance with a moving speed of a subject by use of a fuzzy control in image-size lock and to improve operating capability and responsibility. Moreover, this variation is a variation of steps #4601, #4602, #4625, #4630 and #4635 of the ISL target f set routine of FIG. 35 and therefore does not refer to the low speed continuous photographing of step #4605.

Figure 75:
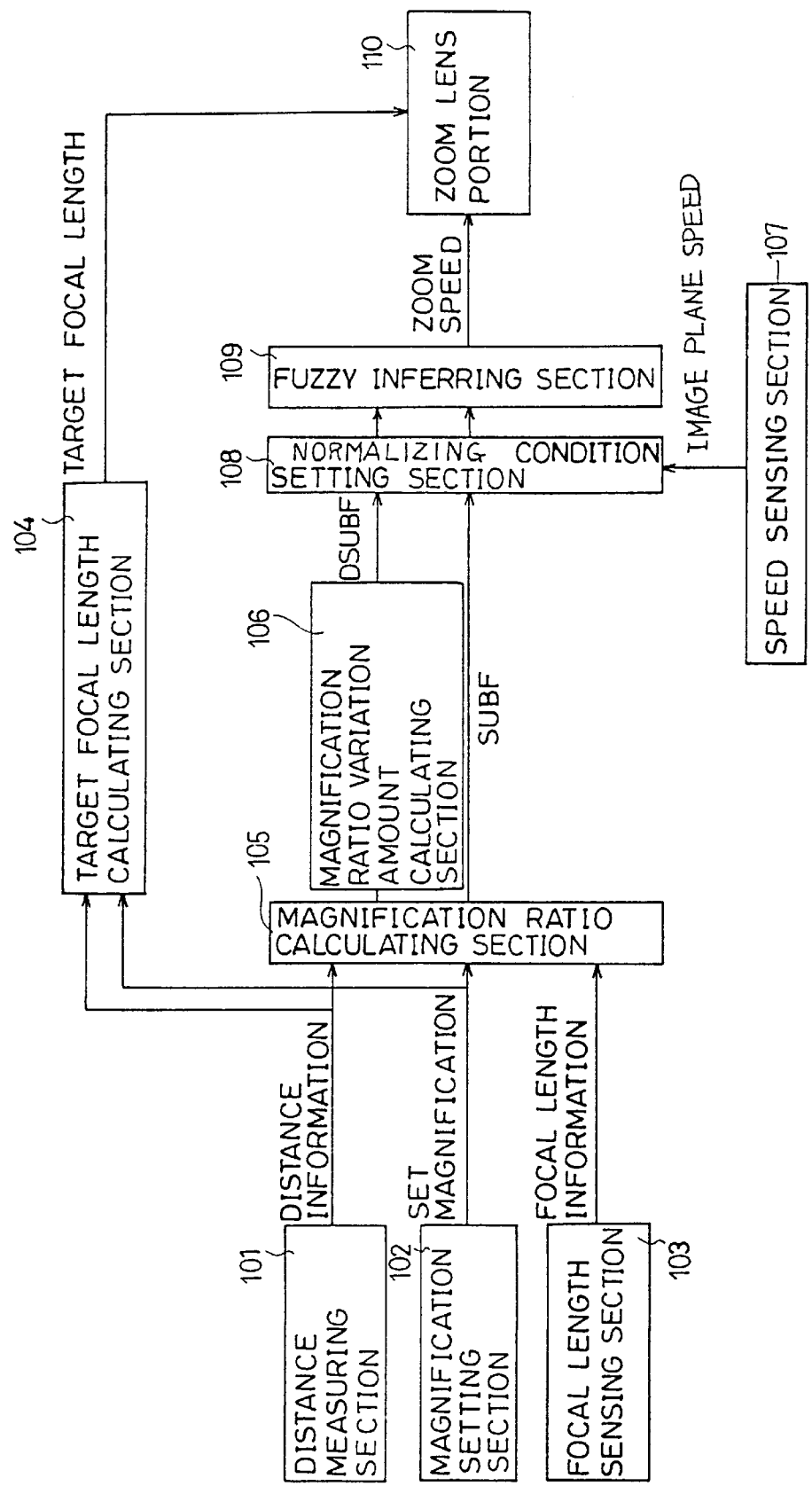
FIG. 75 is a block diagram of an arrangement for image lock control of the camera of a variation of the embodiment of the present invention.

FIG. 75 is a block diagram of an arrangement for image lock control of the camera. In the figure, the numeral 101 is the previously-described distance measuring section for measuring a distance to a subject.

A magnification setting section 102 is provided for setting by the depression of the previously-mentioned image lock button SIML a zoom lens magnification which is obtained at the point of time when the image lock button SIML (SIML corresponds to the image size lock button 28 in FIG. 3) is depressed. For example, the user aims the camera at a subject, moves the zoom lens under that condition (while looking through the finder), and depresses the above-mentioned image lock button SIML when a desired image magnification is obtained. The magnification is set which is obtained at point of time of the depression of the button SIML. The set magnification can also be obtained from a focal length and distance information which are obtained at the time of the depression of the button SIML.

The focal length sensing section 103 is provided, as previously described, for detecting a focal length position by use of a zoom encoder.

A target focal length calculating section 104 is provided for calculating a target focal length ft.

$$ft = \Delta SET \times DVA \tag{1}$$

where DVA is distance measurement information obtained by the distance measuring section 101 and ΔSET is a set magnification obtained by the magnification setting section 102.

A magnification ratio calculating section 105 is provided for calculating a ratio between a set magnification and a current magnification. The ratio can be calculated based on the distance measurement information DVA obtained by the distance measuring section 101, the set magnification SET obtained by the magnification setting section 102 and a current focal length fnow obtained by the focal length sensing section 103. In this embodiment, a focal length ratio SUBF is calculated which takes a value substantially the same as the magnification ratio. The focal length ratio SUBF is calculated based on the above-mentioned target focal length ft and the current focal length fnow by $$SUBF = \log(ft) - \log(fnow) \tag{2}$$

That is, the focal length ratio SUBF is defined as a logarithm of a ratio between both focal lengths, and indicates a relative deviation of an image magnification from a target magnification.

A magnification ratio variation amount calculating section 106 is provided for calculating a time-laps variation rate (Δ focal length ratio DSUBF) of the above-mentioned magnification ratio, that is, the focal length ratio. It is calculated by $$DSUBF = SUBF - PRESUBF \tag{3}$$

where PRESUBF is a preceding focal length ratio.

A speed sensing section 107 is provided for detecting a speed VHOSEI (hereinafter referred to as image plane speed VHOSEI) at which a subject image formed position in the camera moves along the optical axis based on distance measurement information obtained by the previously-mentioned distance measuring section 101 in a plurality of times of consecutive distance measurements. The speed sensing section 107 may be provided separately from the distance measuring section 101.

A normalizing condition setting section 108 is provided for deciding a normalizing condition of a subsequently-described membership function. That is, it is provided for, in allocating an input value to an abscissa of a membership function, causing a scale thereof to correspond to the above-mentioned image plane speed VHOSEI. Values at both ends of the axis of abscissas which values are determined by the scale are designated as normalizing constants. Normalizing constants NORMC1 and NORMC2 of the Δ focal length ratio SUBF and the focal length ratio DSUBF are set as shown in Table 10.

That is, the normalizing constants NORMC1 and NORMC2, which are changed among C1 to C3 and C4 to C6, respectively, according to the value of the image plane speed VHOSEI, are for realizing an appropriate and smooth zooming operation by improving or deteriorating zoom sensitivity according to the value of the image plane speed VHOSEI. The change of zoom sensitivity may be made according to a current focal length or a current magnification which is related to distance measurement performance instead of according to the image plane speed.

A fuzzy inferring section 109 is provided for executing subsequently-described predetermined control rules and fuzzy inference based on the focal length ratio SUBF, the Δ focal length ratio DSUBF, the membership function of a zoom speed ZSP and a program stored in a ROM (read only memory).

The previously-mentioned focal length ratio SUBF and the Δ focal length ratio DSUBF and the zoom speed ZSP consist of membership functions having five labels, respectively. For convenience, the same configuration is used for each label. FIGS. 76A to 76E show examples thereof. In each figure, an adaptation of the labels is shown with grades 0 and 1, and the axis of abscissas represents 8 bits (0 to 255). Hereinafter, the details of each membership function will be described.

(A) Membership functions of the focal length ratio SUBF
1. NB (negative big) (FIG. 76A)

When the focal length ratio SUBF is a negative value, the current focal length is larger than a target focal length. Therefore, "NB" of the focal length ratio SUBF means a condition where the current magnification is much larger than a set magnification.

2. NS (negative small) (FIG. 76B)

A condition where the current magnification is slightly larger than a set magnification.

3. ZO (zero) (FIG. 76C)

A condition where the current magnification coincides with a set magnification.

4. PS (positive small) (FIG. 76D)

A condition where the current magnification is slightly smaller than a set magnification.

5. PB (positive big) (FIG. 76E)

A condition where the current magnification is much smaller than a set magnification.

(B) Membership functions of the Δ focal length ratio DSUBF
1. NB (FIG. 76A)

A condition where an image magnification is increasing at a large variation rate.

2. NS (FIG. 76B)

A condition where an image magnification is increasing at a small variation rate.

3. ZO (FIG. 76C)

A condition where an image magnification is not varying.

4. PS (FIG. 76D)

A condition where an image magnification is decreasing at a small variation rate.

5. PB (FIG. 76E)

A condition where an image magnification is decreasing at a large variation rate.

(C) Membership functions of the zoom speed ZSP
1. NB (FIG. 76A)

A condition where the zoom lens is largely moved out.

2. NS (FIG. 76B)

A condition where the zoom lens is slightly moved out.

3. ZO (FIG. 76C)

A condition where the current moving-out condition of the zoom lens is maintained.

4. PS (FIG. 76D)

A condition where the zoom lens is slightly moved in.

5. PB (FIG. 76E)

A condition where the zoom lens is largely moved out.

Subsequently, the control rules will be described.

As the control rules employed by the fuzzy inferring section 109, for example, the one shown in Table 11 is employed.

Table 11 will be described.

Table 11 shows matrices of the zoom speed ZSP for the labels of the focal length ratio SUBF and the Δ focal length ratio DSUBF. Adaptation is obtained for each of the labels of the focal length ratio SUBF obtained by the magnification ratio calculating section 105 and the Δ focal length ratio DSUBF obtained by the magnification ratio variation amount calculating section 106. A membership function is employed therefor which has a zoom speed label shown in a corresponding matrix.

To show one of them as an example, $$\text{if SUBF=NB and DSUBF=ZO, then ZSP=NB} \qquad (4)$$

That is, the above operation expression indicates that if an obtained image magnification is much larger than a set value and the magnification is not varying, the zoom lens is largely moved out. Each of the intersection of the matrices corresponds to one rule. Therefore, there are twenty-five rules in total.

The inference method under the rules of Table 11 will subsequently be described with reference to FIGS. 76A to 76E and 77D.

As the inference method, a Mamdani method is employed.

Assume now that the normalizing constants of the focal length ratio SUBF, the Δ focal length ratio DSUBF and the zoom speed ZSP are 2, 1 and 3, respectively, and that the focal length ratio SUBF and the Δ focal length ratio DSUBF are calculated to be −1.5 and 0.3, respectively, based on the normalizing constants 2 and 1. At this time, the zoom speed ZSP is obtained in the following procedures (a) to (f).

(a) First, a label corresponding to a membership function of the zoom speed ZSP is determined by use of each of the rules of Table 11. One of them will be described with reference to the above-mentioned example. In the above operation expression (4), the portion "if SUBF=NB and DSUBF=ZO" will be referred to as an antecedent portion, and the portion "ZSP=NB", as a consequent portion. Moreover, NB and ZO of the antecedent portion will be referred to as an antecedent condition 1 and an antecedent condition 2, respectively.

Figure 77A:
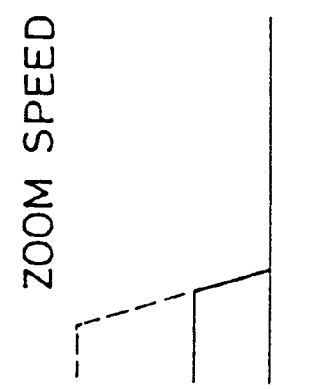
FIG. 77A shows an example of a focal length ratio SUBF and an adaptation thereof in a fuzzy inference of the variation of the embodiment of the present invention.
Figure 77B:
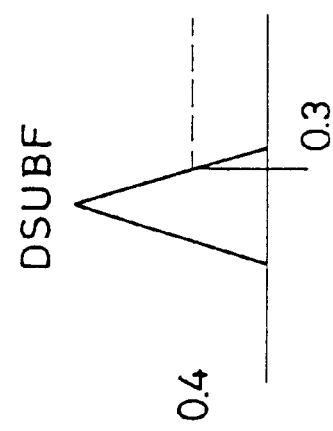
FIG. 77B shows an example of a Δ focal length ratio DSUBF and an adaptation thereof in the fuzzy inference of the variation of the embodiment of the present invention.

(b) In this example, the antecedent condition 1 of the antecedent portion is SUBF=NB. Therefore, corresponding adaptation is obtained from a membership function 1 (FIG. 76A), of the focal length ratio SUBF, having the label NB. Assume now that the value is 0.5 as shown in FIG. 77A. On the other hand, the antecedent condition 2 is DSUBF=ZO. Therefore, corresponding adaptation is obtained from a membership function 3 (FIG. 76C), of the Δ focal length ratio DSUBF, having the label ZO. Assume now that the value is 0.4 as shown in FIG. 77B.

(c) Of the obtained adaptation values, the minimum value is employed. That is, in this example, 0.4 which is the adaptation of the antecedent condition 2 is employed.

Figure 77C:
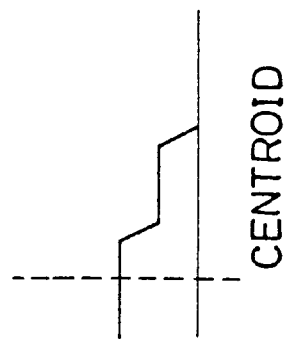
FIG. 77C shows a truncating of the membership functions of FIGS. 5A and 5B by use of MIN in the fuzzy inference of the variation of the embodiment of the present invention.
Figure 77D:
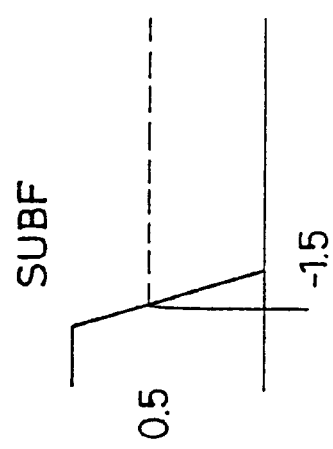
FIG. 77D is a view for explaining a centroid of the variation of the embodiment of the present invention.

(d) Since the label is determined to be NB for the consequent portion, the membership function 1 of FIG. 76A is truncated at the value 0.4 as shown in FIG. 77C. In this example, the membership function is obtained as a trapezoid with a height of 0.4 as shown in FIG. 76C.

(e) Similarly, the above-described procedures (a) to (d) are performed with respect to the other twenty-four rules. Obtained membership functions are superposed and compounded by taking an envelope curve (see FIG. 77D).

(f) Then, the centroid of the compounded membership function is obtained by a geometric calculation. The obtained value is outputted as an output value.

The output value obtained through the above-described fuzzy inference is converted as a zoom lens movement control value into an actual zoom speed ZSPB by $$ZSPB=(ZSP31\ 127)/16 \qquad (5)$$

When ZSPB=0, the zoom lens is stopped. The membership functions are not limited to those shown in FIGS. 76A to 76D. The membership function of a desired configuration may be set, or membership functions of different configuration may be set for respective labels. Further, in the above-described procedure (f), a desired calculation method may be adopted instead of the centroid method.

Figure 78:
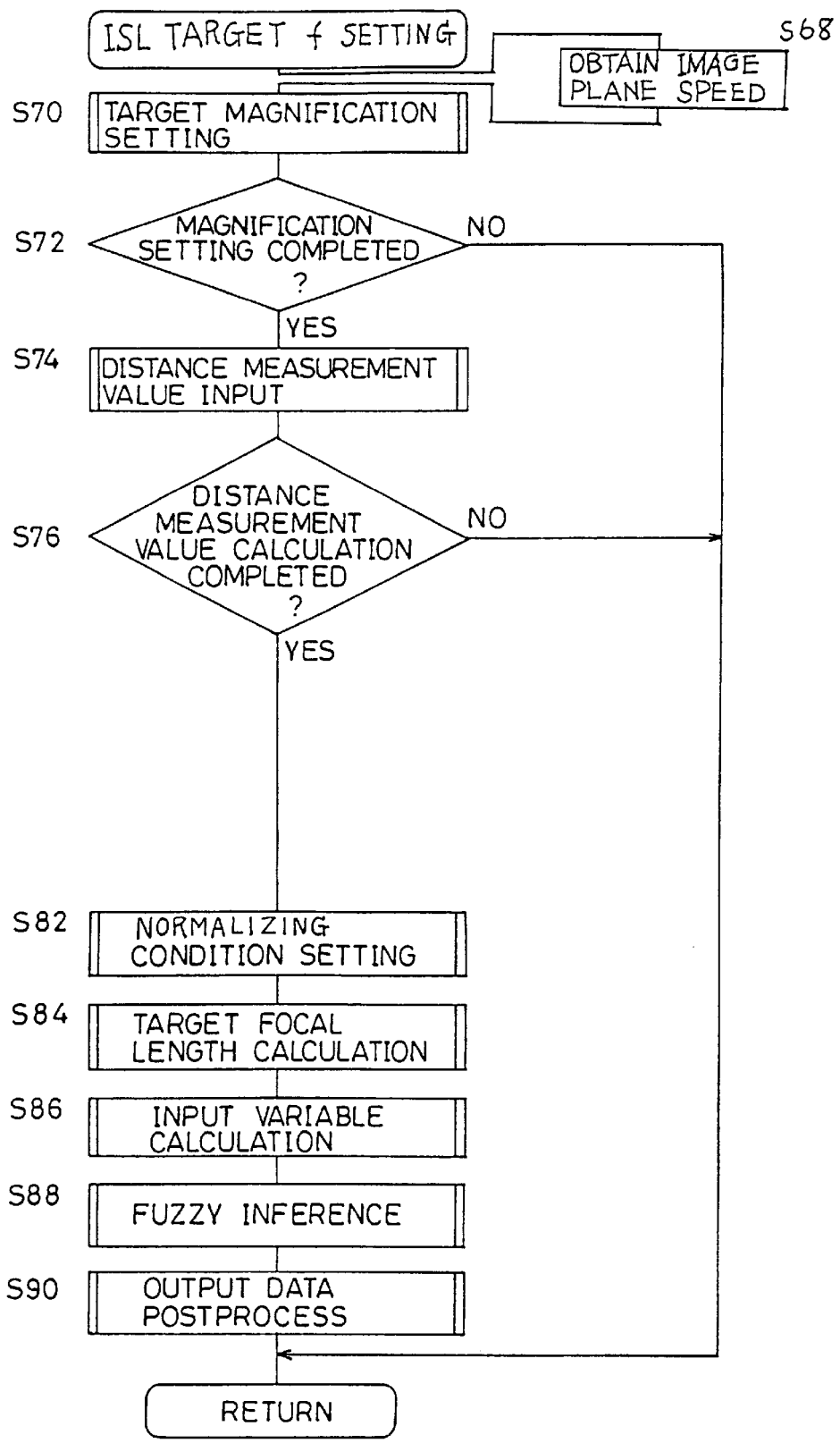
FIG. 78 is a flow chart of an ISL target f setting routine of the variation of the embodiment of the present invention.

Subsequently, an outline of the process will be described with reference to the routine of FIG. 78.

First, an image plane speed of the subject is obtained (step S68), and a target magnification is set by the depression of the image lock button SIML as described above (step S70). When the target magnification setting is started, a target magnification setting completion flag DET-BT is set. Then, whether the magnification setting has been completed or not is determined based on the condition of the target magnification setting completion flag DET-BT (step S72). When no target magnification has been set, the process directly returns. On the other hand, when a target magnification has been set, a distance measurement value obtained by the distance measuring section 101 is inputted (step S74). In order to obtain a required distance measurement accuracy, an averaging process is executed in accordance with the image plane speed as subsequently described.

When calculation of the distance measurement value input is completed (YES of step S76), a normalizing condition is set (step S82). The normalizing condition setting is a process for deciding a normalizing condition of a membership function as described above. Specifically, the normalizing condition is changed in accordance with the image plane speed.

Then, a target focal length is calculated (step S84). The target focal length is calculated based on the target magnification which is set at step S70 and the distance measurement value which is inputted at step S74. When the calculated target focal length is outputted to a zoom lens portion 110 shown in FIG. 75, an input variable is calculated (step S86). At step S86, the focal length ratio SUBF which is as an input variable and the Δ focal length ratio DSUBF which is a gradient of the focal length SUBF are obtained. They are further normalized based on the normalizing constant obtained at step S82.

Then, the fuzzy inference is executed by use of the normalized focal length ratio SUBF, and Δ focal length ratio DSUBF and the control rules of Table 11 to obtain the zoom speed ZSP (step S88). The zoom speed ZSP obtained as described above is converted into the actual zoom speed ZSPB. After a predetermined process is executed, the process returns.

Figure 79:
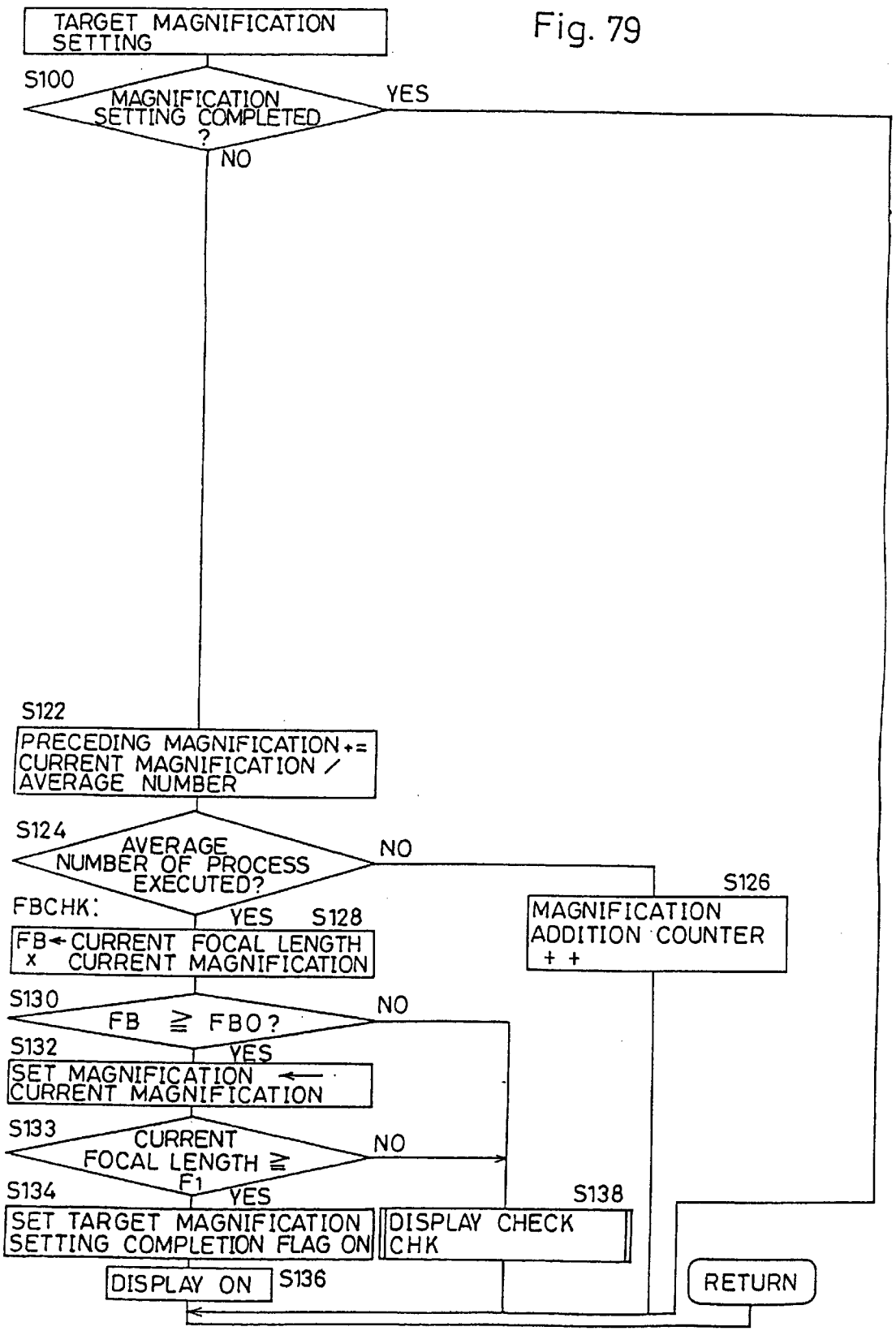
FIG. 79 is a flow chart of a target magnification setting routine of step S70 of FIG. 78 of the variation of the embodiment of the present invention.

Subsequently, a target magnification setting routine of step S70 of FIG. 78 will be described with reference to FIG. 79.

Whether the target magnification setting has been completed or not is determined based on the condition of the target magnification setting completion flag DET-BT (step S100). When the target magnification flag DET-BT is 1, that is, when the target magnification setting has been completed, the process directly returns. When it has not been completed, the process proceeds to step S122.

To calculate the set magnification, every magnification data value is divided by the average number (assume now that the average number is 2), and a result thereof is added every time a process is executed until the average number of processes are executed (NO of steps S122 and S124, and step S126). Then, when the count value of a magnification addition counter BTCNT coincides with the count value 2 of the average number counter CNTLIM (YES of step S124), determining that data are taken out by an amount corresponding to the number of times of the average number so that a current magnification BETA_S is decided. Then, the process proceeds to step S128. The average number may be varied, in consideration with reliability, according to the image plane speed of the subject.

At steps from S128, whether or not a desired accuracy is obtained even if the zoom lens is interlocked, that is, whether or not the subject is within an interlock range is determined. First, the current focal length fnow and the current magnification BETA_S are multiplied together, and a result thereof will be designated as FB (step S128). Then, the multiplication result FB is compared with a predetermined value FBO (step S130). When FB≧FBO, the current magnification BETA_S is replaced by the set magnification βSET (step S132). Further, the target magnification setting completion flag DET-BT is set on condition that the current focal length fnow is equal to or larger than a predetermined value $f_1$, and in order to indicate that the subject is within the interlock range,—the "IMAGE LOCK" display in the finder is turned on (YES of step S133, and steps S134 and S136). On the other hand, when FB<FBO at step S130, in a case where the current focal length fnow is smaller than the predetermined value $F_1$, since the subject is out of the interlock range, the process proceeds to a display check routine (FIG. 86) for changing over the "IMAGE LOCK" display in the finder (step S138).

The value FB does not have to be the result of the multiplication of a current focal length and a current magnification. It may be an amount which is related to distance measurement performance, such as functions of a current focal length, a current magnification and a distance measurement Dv value.

Figure 86:
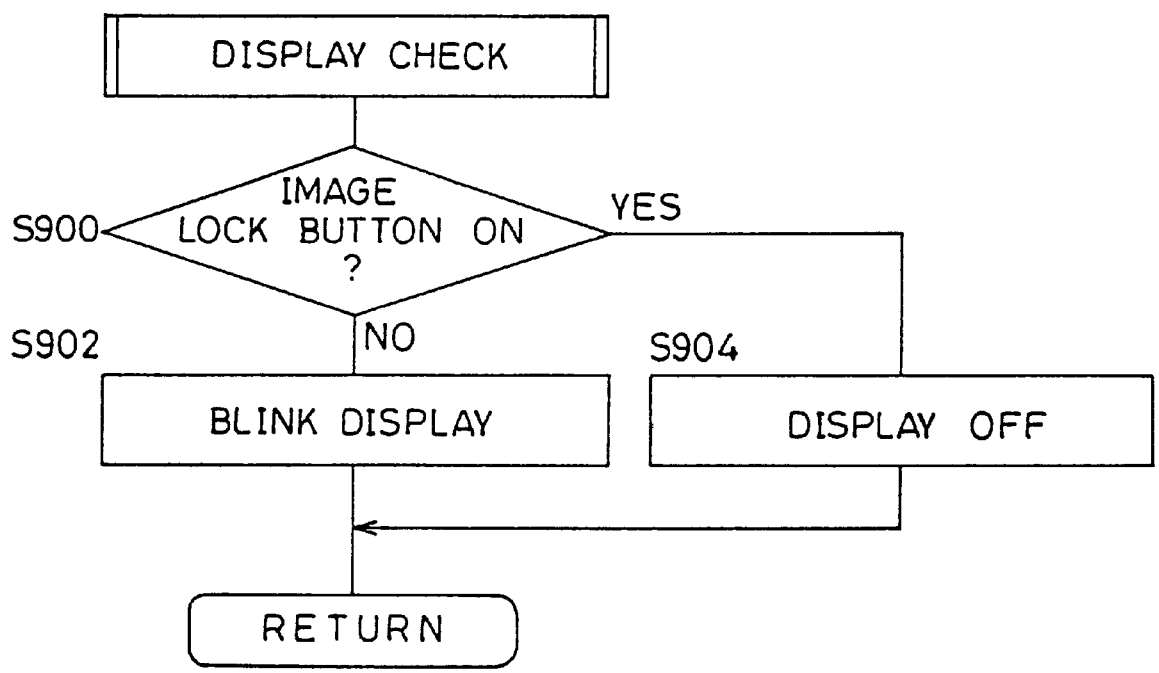
FIG. 86 is a flow chart of a display check routine of the variation of the embodiment of the present invention.

In the display check routine of FIG. 86, the condition of the image lock button SIML is determined (step S900), and when the image lock button SIML is ON, in order to indicate that the subject is out of the interlock range (NO of step S130), the "IMAGE LOCK" display is blinked (step S902). When the image lock button SIML is OFF, the "IMAGE LOCK" display is turned off (step S904).

In FIG. 87 for explaining the intra-interlocking-range determination operation, the axes of ordinate and abscissas are logarithmic axes representing a focal length f and a subject distance D, respectively, and characteristic lines with a magnification β as a parameter are shown. Hereinafter, movements (A) to (E) in the figure will be described with reference to FIGS. 88A to 88E. In the figure, a line L shows an accuracy limit line (FB=FBO).

Figure 88A:
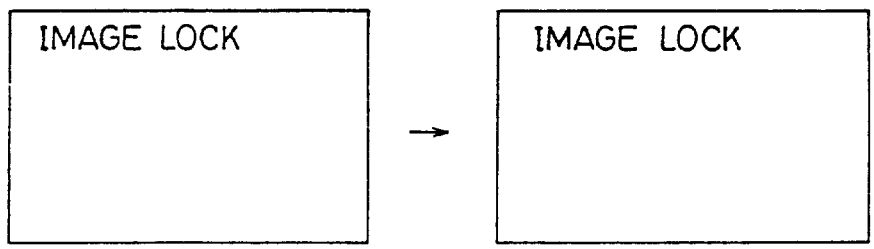
FIGS. 88A to 88E show conditions of an "IMAGE LOCK" display in the finder of the variation of the embodiment of the present invention.

In Case of the Movement (A) (FIG. 88A)

When the image lock button SIML is depressed, determining that the subject is within the interlock range since FB>FBO, the image lock mode is set. At this time, the "IMAGE LOCK" display in the finder is turned on (left of FIG. 88A). Then, as the subject gradually approaches, the focal length gradually decreases in order to maintain a magnification. In the figure, the focal length varies as shown by the straight line. Since FB>FBO, the image lock mode is ON even at the last point of time. Consequently, photographing can be performed at a desired magnification. That is, in this case, the "IMAGE LOCK" display is ON from the beginning to the end (right of FIG. 88A).

Figure 88B:
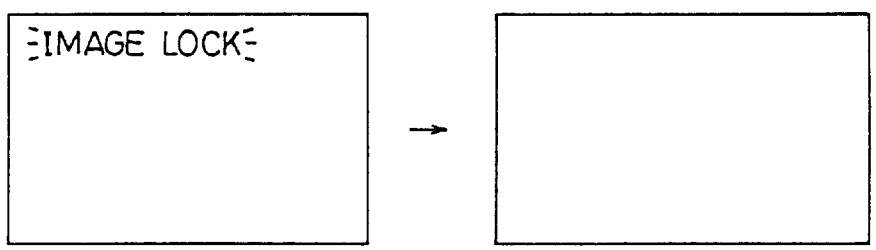

In Case of the Movement (B) (FIG. 88B)

When the image lock button SIML is depressed, determining that the subject is out of the interlock range since FB<FBO, the image lock mode is not set. Therefore, the "IMAGE LOCK" display in the finder is blinked (left of FIG. 88B). Thereafter, since FB<FBO even if the subject moves, the image lock mode is not set and the "IMAGE LOCK" display continues to blink (left of FIG. 88B). Then, when the image lock button SIML is released, the "IMAGE LOCK" display is turned off (right of FIG. 88B).

Figure 88C:
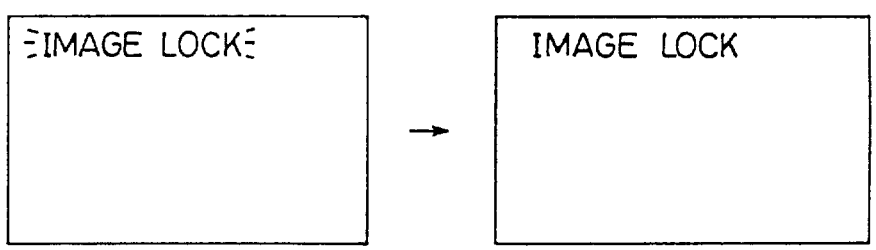

In Case of the Movement (C) (FIG. 88C)

When the image lock button SIML is depressed, determining that the subject is out of the interlock range since FB<FBO, the image lock mode is not set. Therefore, the "IMAGE LOCK" display in the finder is blinked (left of FIG. 88C). Thereafter, the focal length gradually increases by the user's operation of the power zoom ring. However, the image lock mode is not set while FB<FBO, the "IMAGE LOCK" display continues to blink (left of FIG. 88C). When FB=FBO, the image lock mode is set, the "IMAGE LOCK" display is turned on (right of FIG. 88C), and an image lock operation is started. The focal length gradually increases as the subject gradually recedes. Therefore, in this case, the "IMAGE LOCK" display is turned on from the point of time when FB=FBO to the end (right of FIG. 88C).

Figure 88D:
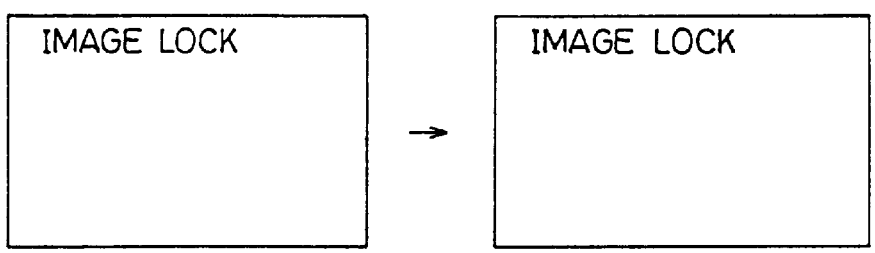

In Case of the Movement (D) (FIG. 88D)

When the image lock button SIML is depressed, determining that the subject is within the interlock range since FB>FBO, the image lock mode is set. At this time, the "IMAGE LOCK" display in the finder is turned on (left of FIG. 88D). Thereafter, the focal length gradually decreases as the subject gradually approaches. When the accuracy limit line L is exceeded under this condition, that is, when FB<FBO, the image lock operation is continued although the subject is out of the interlock range. Therefore, the "IMAGE LOCK" display continues to be ON (right of FIG. 88D). Moreover, when the subject gradually approaches and gets out of the interlock range after the image lock mode is set when FB>FBO, the zoom lens may be moved, without the image lock operation being continued, so that a magnification β which fulfills FB=FBO is maintained ((F) of FIG. 87).

Figure 88E:
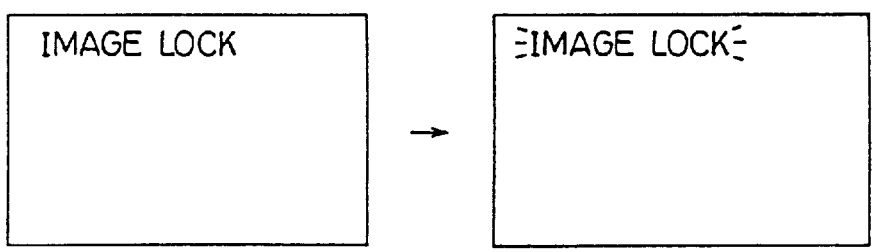

In Case of the Movement (E) (FIG. 88E)

When the image lock button SIML is depressed, determining that the subject is within the interlock range since FB>FBO, the image lock mode is set and the "IMAGE LOCK" display is turned on (left of FIG. 88E). Thereafter, as the magnification decreases, that is, the focal length decreases by the user's operation of the power zoom ring, the accuracy limit line is exceeded at a point of time. When the accuracy limit line is exceeded, that is, when FB<FBO, the image lock mode is released. Then, the image lock operation is stopped, and the "IMAGE LOCK" display is blinked in order to inform the user. that the image lock mode is released (right of FIG. 88E).

While it is determined that the subject is out of the interlock range when FB<FBO, it is also determined that the subject is out of the interlock range when a current focal length is smaller than the predetermined value.

Figure 80:
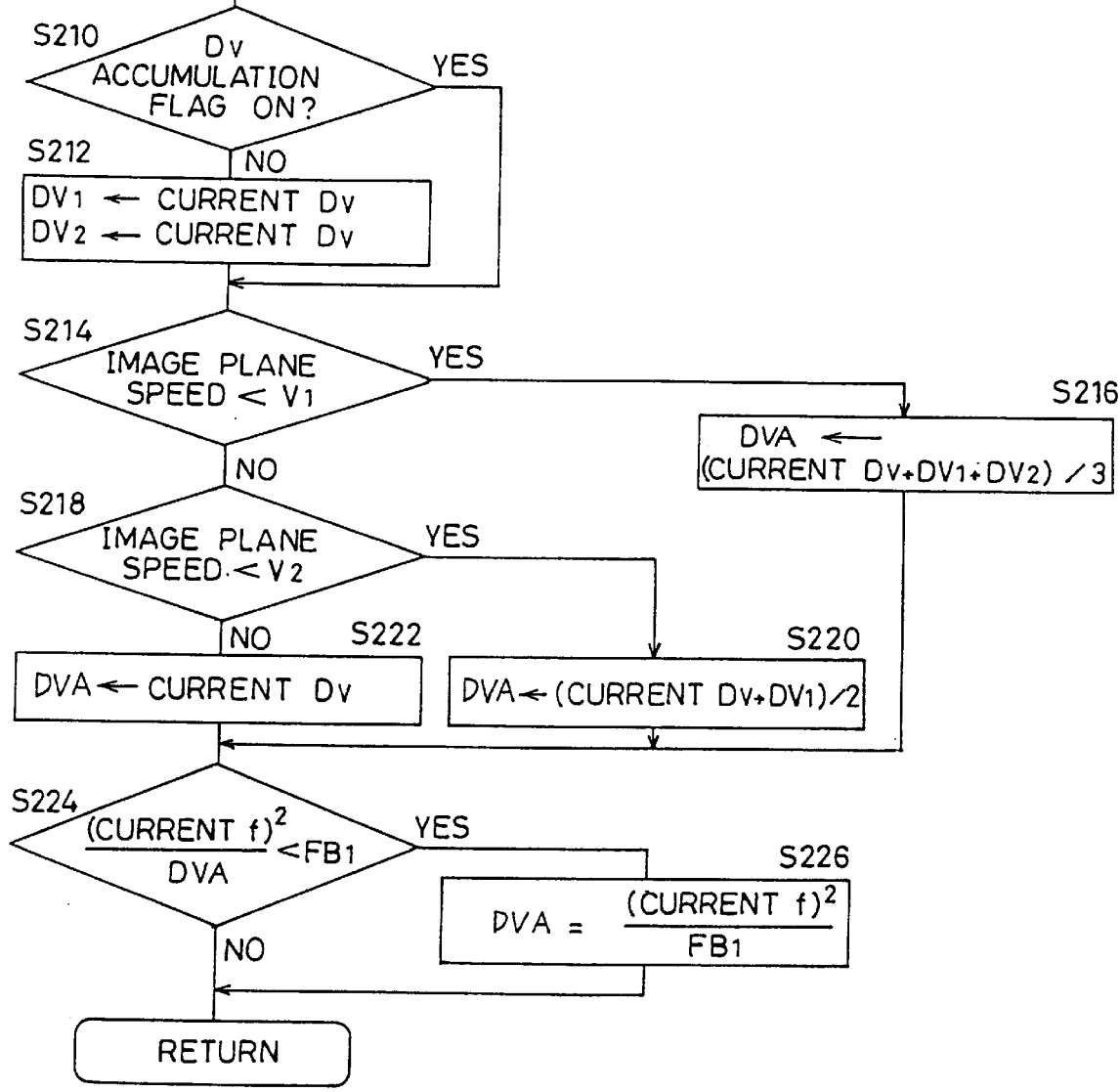
FIG. 80 is a flow chart of a distance measurement value input routine of step S74 of FIG. 78 of the variation of the embodiment of the present invention.

Subsequently, a distance measurement value input routine of step S74 of FIG. 78 will be described with reference to FIG. 80.

In this routine, first, the current distance measurement information DV value DV_S and the image plane speed VHOSEI are taken in. Then, when the $D_v$ accumulation flag ISL-VG is 0, that is, when there is no past distance measurement information Dv, the current Dv value DV_S is taken in as the preceding Dv value DV1 and a Dv value DV2 which precedes DV1. When the $D_v$ accumulation flag ISL-VG is 1, since a preceding distance measurement value Dv and a distance measurement value Dv which precedes the preceding value Dv are taken in as the Dv value DV1 and the Dv value DV2, respectively, the process proceeds directly to step S214, where the averaging process of the Dv value is executed. The Dv value averaging process is changed over according to the image plane speed VHOSEI. That is, when an image plane speed is lower than $V_1$ (YES of step S214), determining that the subject is moving at a low speed, an average distance measurement information DVA is obtained based on three consecutive data as $$DVA=(DV\_S+DV1+DV2)/3 \qquad (6)$$

Step S216

When the image plane speed VHOSEI is equal to or higher than $V_1$ and lower than $V_2$ (NO of step S214, and YES of step S218), determining that the subject is moving at a medium speed, the average distance measurement information DVA is obtained based on two consecutive data as $$DVA=(DV\_S+DV1)/2 \qquad (7)$$

Step S220

When the image plane speed VHOSEI is equal to or higher than $V_2$ (NO of step S218), determining that the subject is moving at a high speed, the current Dv value DV_S is set to the average distance measurement information DVA as $$DVA=(DV\_S) \qquad (8)$$

Step S222

Then, after the average distance measurement information DVA is calculated, the process returns.

When the calculated average distance measurement information DVA is far below the accuracy limit line (YES of step S224), that is, when FB value<FB1 (where the FB value= (current focal length)²/DVA), a value obtained by $$DVA=\text{(current focal length)}^2/FB1 \qquad (9)$$

is set as a new average distance measurement information (step S226).

Figure 81:
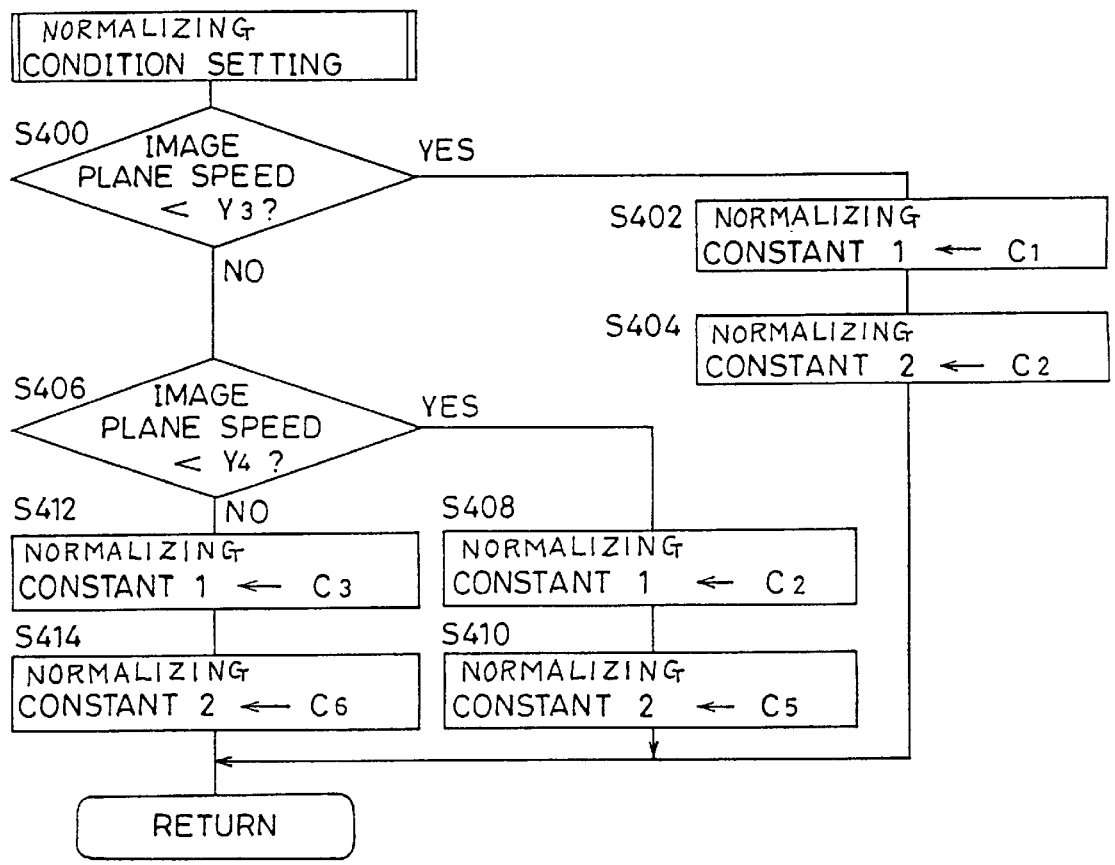
FIG. 81 is a flow chart of a normalizing condition setting routine of step S82 of FIG. 78 of the variation of the embodiment of the present invention.

Subsequently, a normalizing condition setting routine of step S82 of FIG. 78 will be described with reference to FIG. 81.

In the normalizing condition setting process, the normalizing constant of the membership function is changed over according to the image plane speed VHOSEI. First, the image plane speed VHOSEI is compared with a predetermined speed V3 (step S400). When the image plane speed VHOSEI is lower than the speed V3, the values C1 and C2 are set to the normalizing constants NORMC1 and NORMC2, respectively, as shown in Table 10 (steps S402 and S404). When the image plane speed VHOSEI is equal to or higher than the speed V3 and lower than a predetermined speed V4, (NO of step S400, YES of step S406), the values C2 and C5 are set to the normalizing constants NORMC1 and NORMC2, respectively, as shown in Table 10 (steps S408 and S410). When the image plane speed is equal to or higher than the speed V4 (NO of step S406), the values C3 and C6 are set to the normalizing constants NORMC1 and NORMC2, respectively, as shown in Table 10 (steps S412 and S414). Then, after the setting of the normalizing constants NORMC1 and NORMC2 are completed, the process returns.

Figure 82:
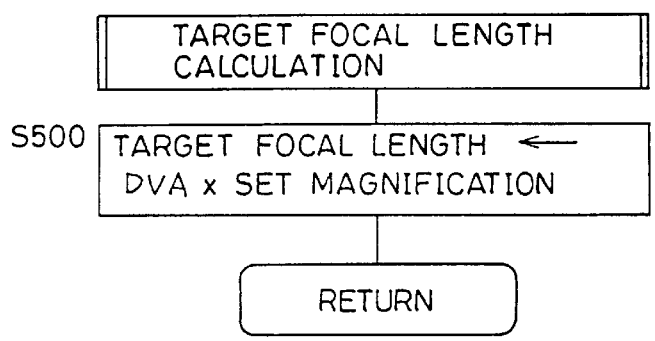
FIG. 82 is a flow chart of a target focal length calculation routine of step S84 of FIG. 78 of the variation of the embodiment of the present invention.

Subsequently, a target focal length calculation routine of step S84 of FIG. 78 will be described with reference to FIG. 82.

At step S500, the target focal length ft is obtained from the average distance measurement information DVA which is calculated through the previously-described distance measurement value process and the set magnification βSET which is set through the previously-described target magnification setting process by $$ft = DVA \times \beta SET \quad (10)$$

Figure 83:
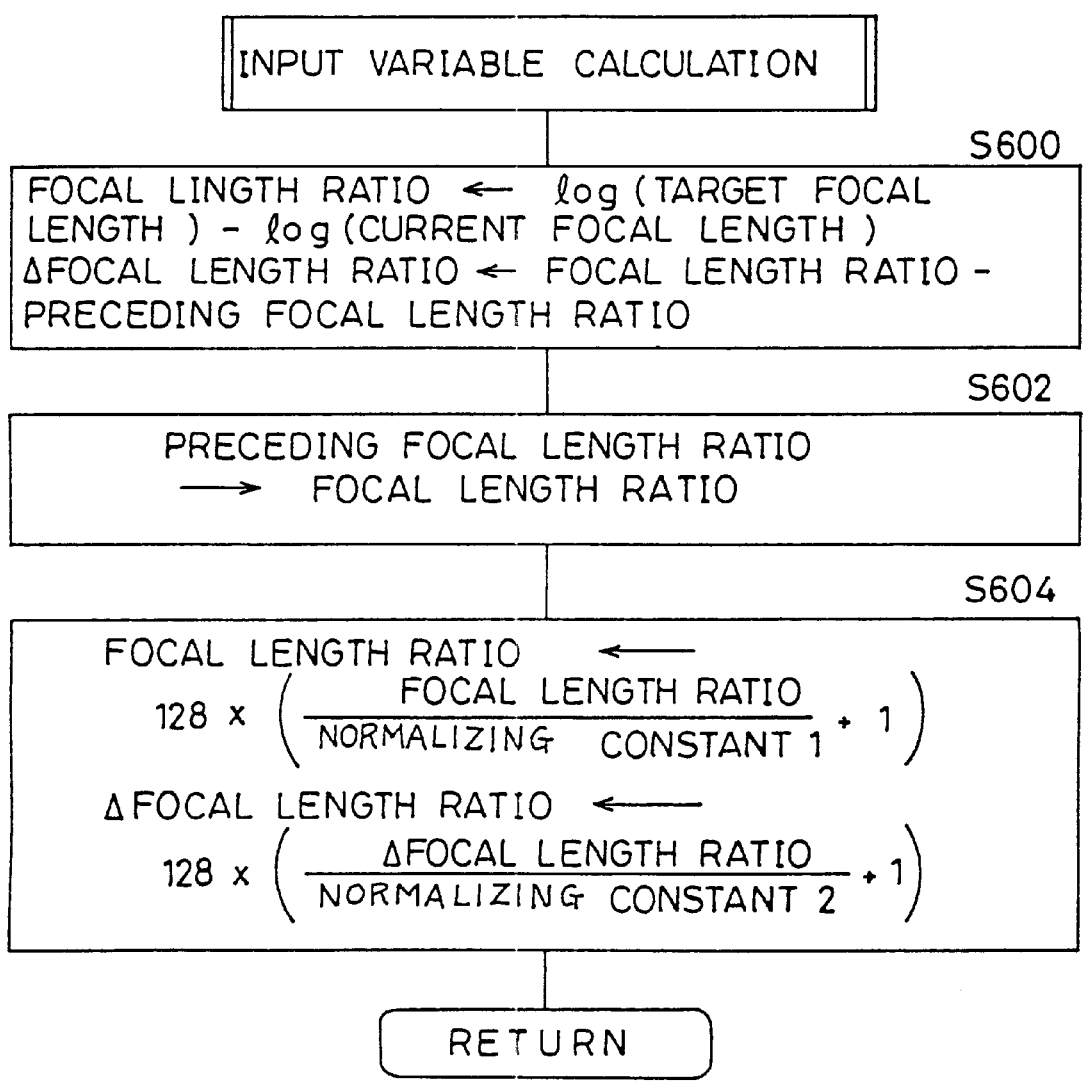
FIG. 83 is a flow chart of an input variable calculation routine of step S86 of FIG. 78 of the variation of the embodiment of the present invention.

Subsequently, an input variable calculation routine of step S86 of FIG. 78 will be described with reference to FIG. 83.

First, at step S600, the focal length ratio SUBF and the β focal length ratio DSUBF are obtained by the above-mentioned expressions (2) and (3), respectively.

Then, after the focal length ratio SUBF is stored as the preceding focal length ratio PRESUBF (step S602), the above-mentioned focal length ratio SUBF and β focal length ratio DSUBF are normalized into 0 to 255 from the above-mentioned normalizing constants NORMC1 and NORMC2 by the following expressions (11) and (12):

$$\text{Focal length ratio} = 128 \times \frac{\text{Focal length ratio}}{\text{Standardizing constant 1}} + 1 \quad (11)$$

$$\Delta \text{ focal length ratio} = 128 \times \frac{\Delta \text{ focal length ratio}}{\text{Standardizing constant 2}} + 1 \quad (12)$$

Figure 84:
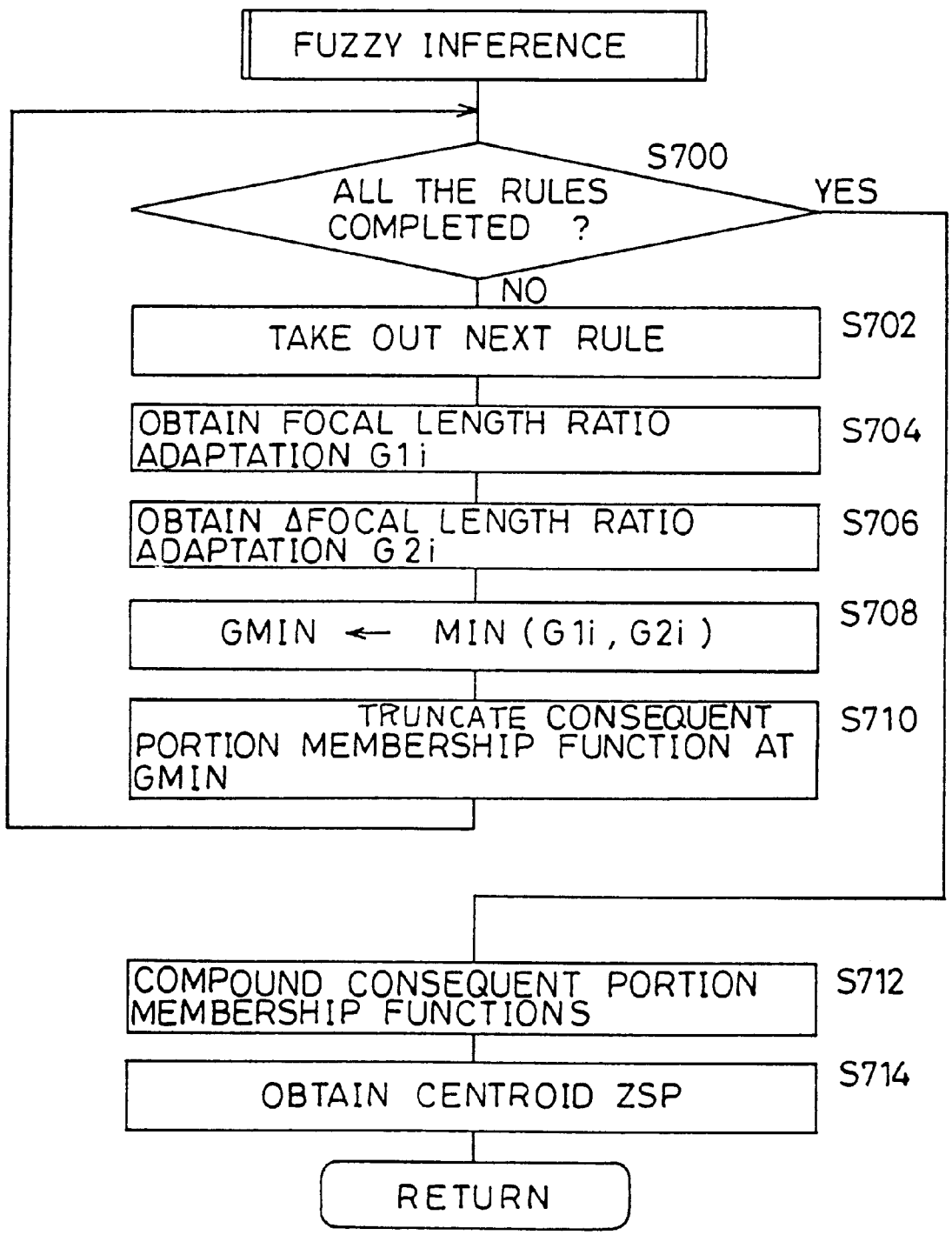
FIG. 84 is a flow chart of a fuzzy inference routine of step S88 of FIG. 78 of the embodiment of the present invention.

Subsequently, a fuzzy inference routine of step S88 of FIG. 78 will be described with reference to FIG. 84.

A process is executed with respect to the rules of Table 11 based on the focal length ratio and the β focal length ratio obtained by the above-mentioned expressions (11) and (12). Then, whether or not the process has been executed with all the rules (twenty-five rules in this embodiment) is determined (step S700). Until all the rules are completed, rules are taken out one by one in a predetermined order (step S702), and an adaptation G1i of the focal length ratio and an adaptation G2i of the β focal length ratio are obtained (steps S704 and S706). Then, a minimum adaptation GMIN is extracted from the adaptations G1i and G2i obtained in the process with respect to every rule (step S708). Then, the membership function having the previously-mentioned consequent portion label is truncated at the adaptation GMIN (step S710, see FIG. 77C).

When the process is completed with respect to all the rules (YES of step S700), the consequent portion membership functions are compounded (S712). Then, a centroid ZSP, that is, the zoom speed is obtained (step S714, see FIG. 77D).

Figure 85:
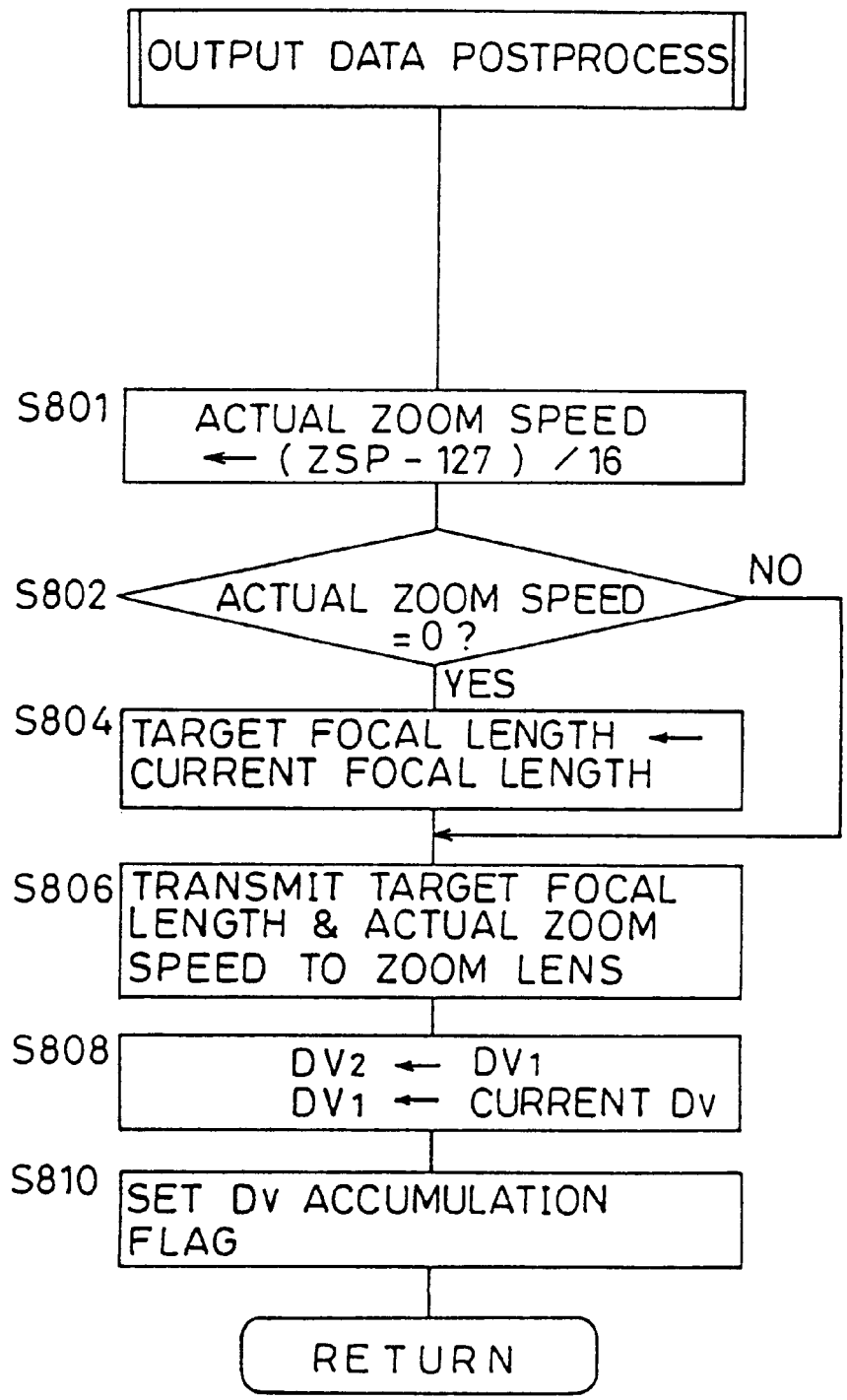
FIG. 85 is a flow chart of an output data postprocess routine of step S90 of FIG. 78 of the variation of the embodiment of the present invention.

Subsequently, an output data postprocess routine of step S90 of FIG. 78 will be described with reference to FIG. 85.

First, the fuzzy inference output ZSP is converted into the actual zoom speed ZSPB by the previously-mentioned expression (5) (step S801). Then, whether the actual zoom speed ZSPB obtained through the conversion is 0 or not is determined (step S802). When the actual zoom speed ZSPB is not 0, the obtained actual zoom speed ZSPB and the target focal length ft are transmitted to the zoom lens portion 10 (step S806). On the other hand, when the actual zoom speed ZSPB obtained through the conversion is 0, the target focal length ft is replaced by the current focal length fnow in order to stop the zoom lens (step S804), and the current focal length fnow is sent out.

Lastly, the preceding distance measurement value DV1 is set as the distance measurement value DV2 which precedes DV1, and the current distance measurement value DV is set as the preceding distance measurement value DV1 (step S808). Then, after the DV accumulation flag ISL-VG is set (step S810), the process returns.

Figure 89:
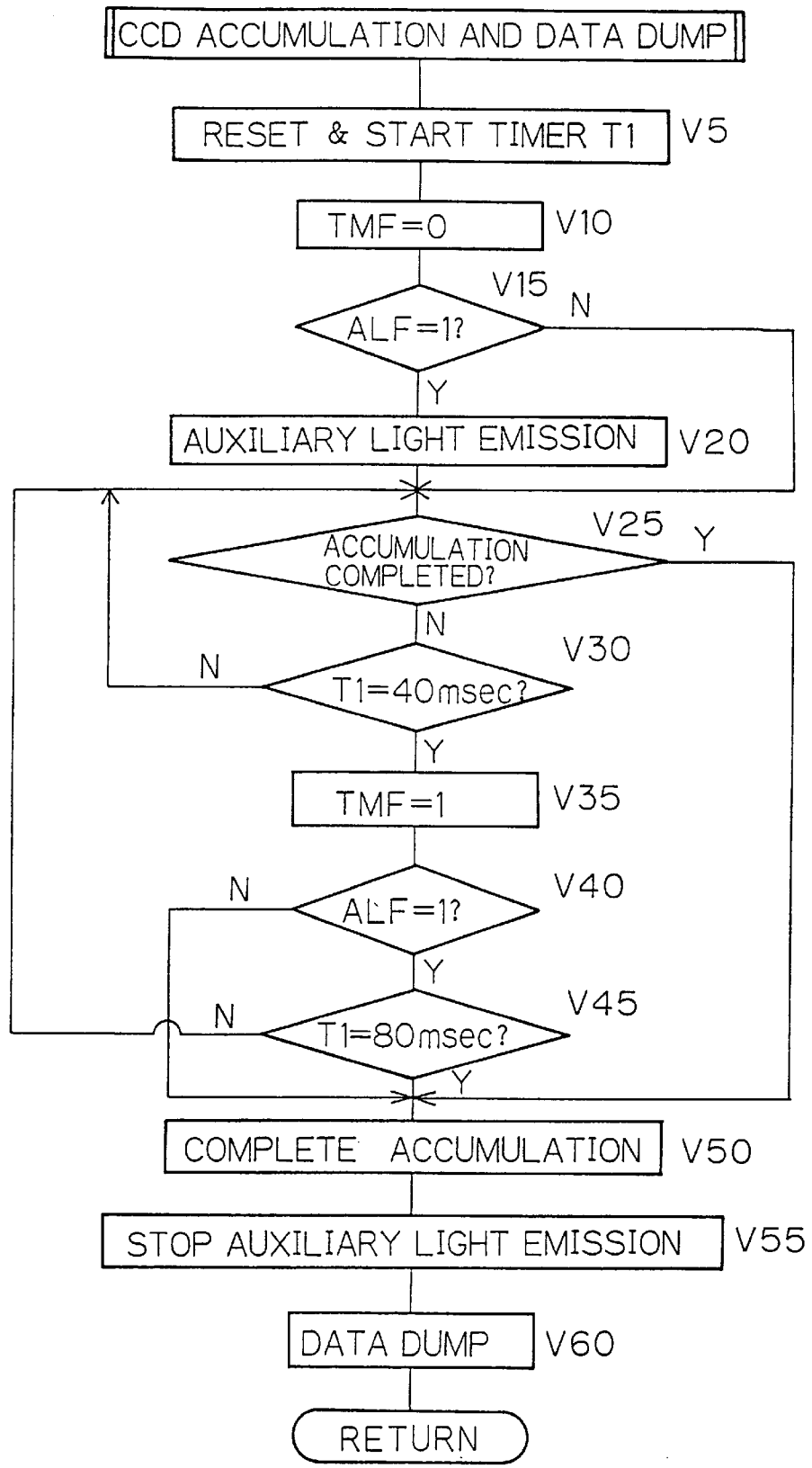
FIG. 89 is a flow chart of a CCD accumulation and data dump subroutine of another variation of the embodiment of the present invention.
Figure 90:
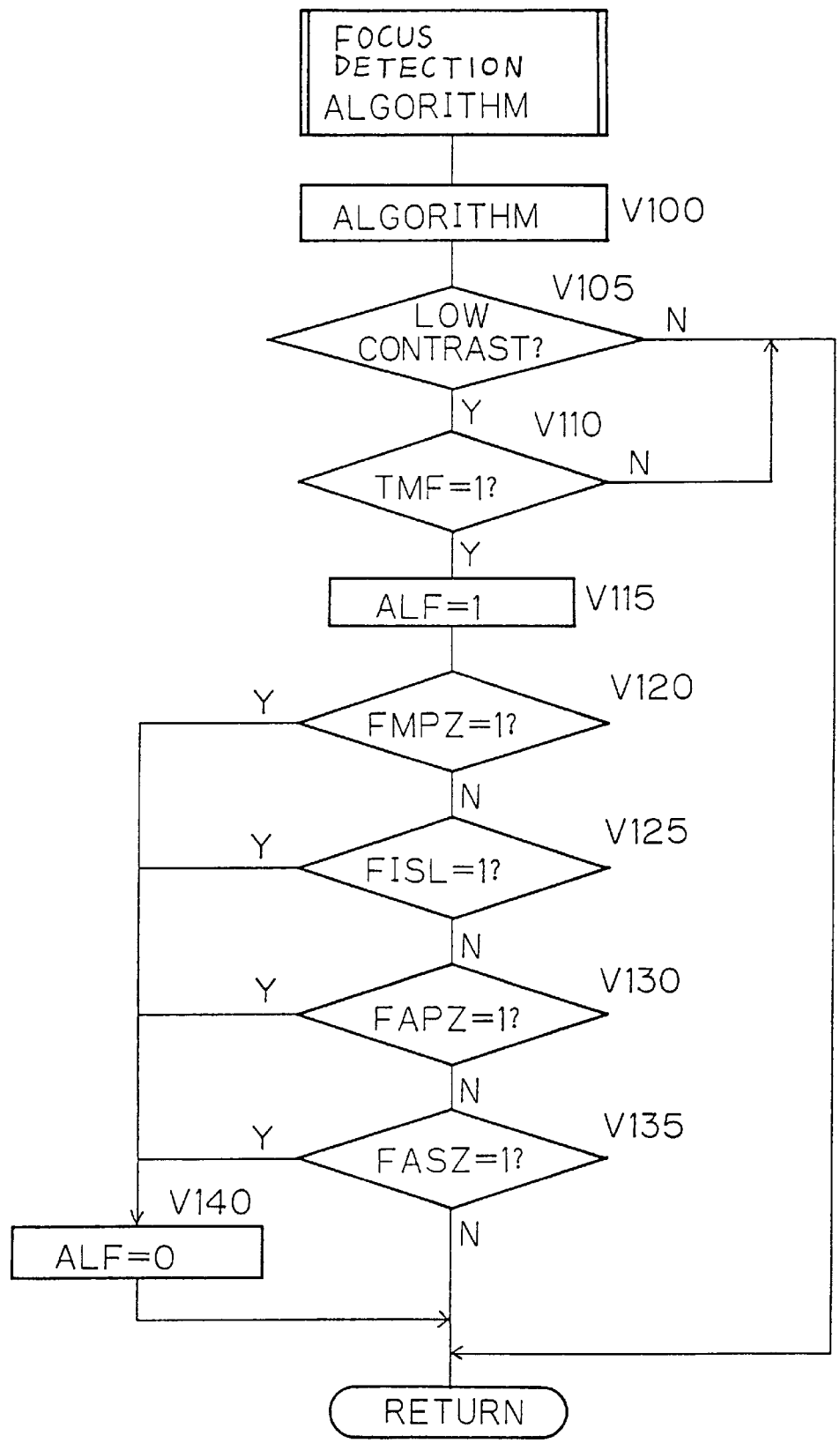
FIG. 90 is a flow chart of a focus detection algorithm subroutine of the variation of the embodiment of the present invention.
Figure 91:
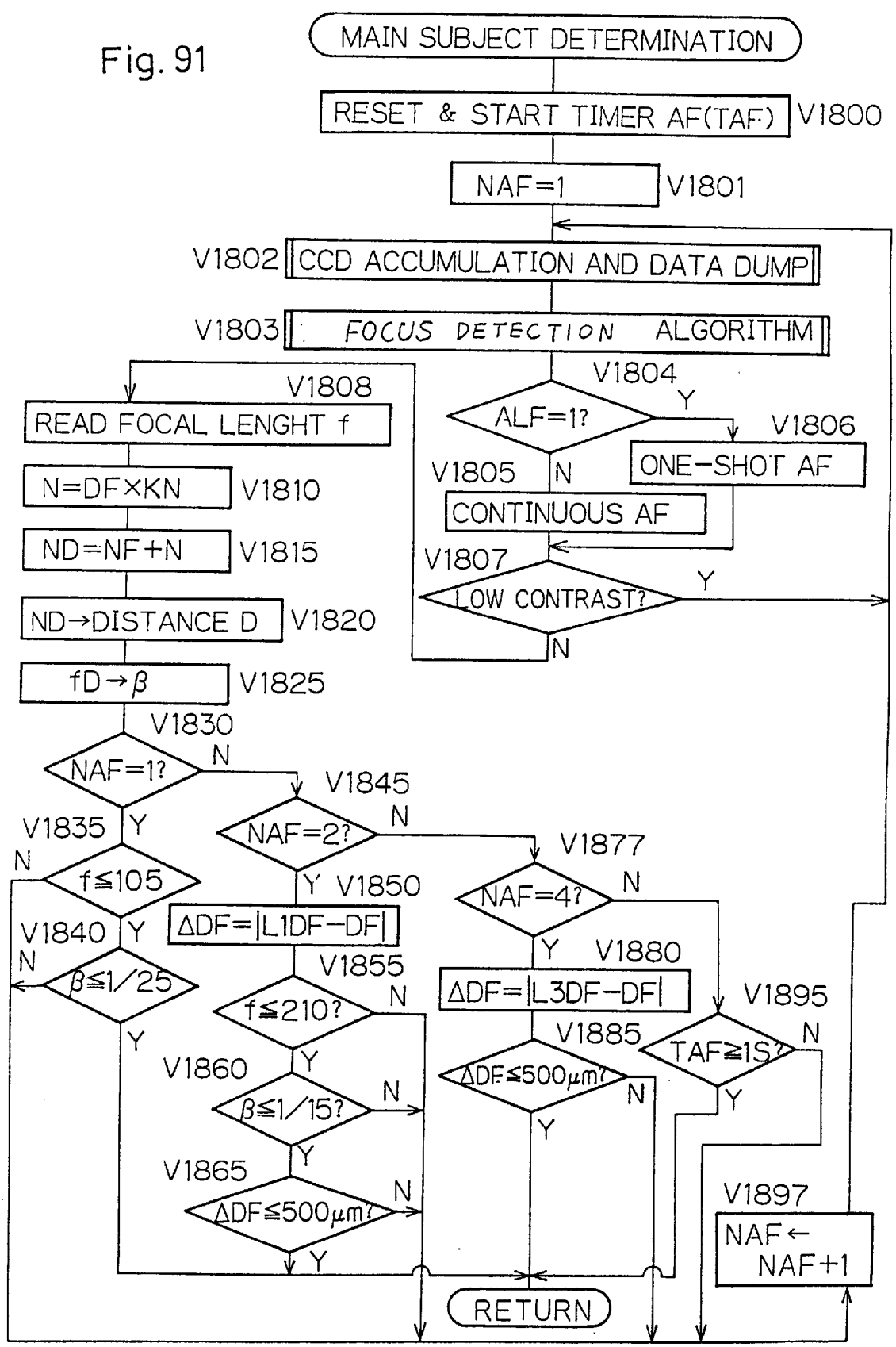
FIG. 91 is a flow chart of a main subject determination routine of the variation of the embodiment of the present invention.

Subsequently, another variation of the present invention will be described with reference to the flows of FIGS. 89, 90 and 91. These flows are executed in consideration with the addition of auxiliary light for AF. The auxiliary light is emitted by an auxiliary light generator AL shown in FIG. 4.

Considering auxiliary light control and zooming, in the variation of the present invention, auxiliary light emission is inhibited during zooming for the following reasons:

(1) Image distortion caused during zooming increases as accumulation time increases, so that the focus detection reliability deteriorates.

(2) When only one power source is provided, it is necessary to simultaneously perform zooming and auxiliary light emission, which increases the load of the power source. As a result, there may be an occasion where the auxiliary light emission and zooming cannot simultaneously be performed. For the varifocal lens, since it is further provided with a focusing lens, the load of the power source further increases. As a result, the simultaneously driving of the lenses and auxiliary light emission is more difficult.

First, a CCD accumulation and data dump subroutine of the variation will be described with reference to FIG. 89.

In the subroutine, first, an accumulation time controlling timer T1 is reset and started at step V5, and a flag TMF is reset at step V10. Then, whether an auxiliary light mode is ON or not is determined at step V15. When the auxiliary light mode is ON (auxiliary light flag ALF=1), auxiliary light is emitted at step V20. Then, the process proceeds to step V25. When the auxiliary light mode is not ON (ALF=0), the process proceeds directly to step V25. At step V25, whether the CCD accumulation has been completed or not is determined (this determination is made according to the light inputted to a sensor). When the CCD accumulation has not been completed, whether or not 40 msec have passed since the CCD accumulation was started is determined at step V30. When 40 msec have not passed, the process returns to step V25. When 40 msec have passed, the flag TMF showing this is set. Then, whether the auxiliary mode is ON or not is determined at step V45. When the auxiliary mode is not ON, whether or not 80 msec have passed since the CCD accumulation was started is determined. When 80 msec have not passed, the process returns to step V25. When the CCD accumulation has been completed at step V25, or when the flag ALF has not been set at step V40, or when 80 msec have passed at step V45, the process proceeds to step V50, where the CCD accumulation is completed. Then, auxiliary light emission is stopped at step V55, data dump is performed at step V60, and the process returns.

Subsequently, a focus detection algorithm subroutine of the variation will be described with reference to FIG. 90.

First, the focus detection algorithm is performed at step V100. Then, at step V105, whether the contrast is low or not is determined based on a focus detection algorithm result. When the contrast is not low, the process returns. When the contrast is low, whether the flag TMF has been set or not is determined at step V110. When it has not been set, determining that required brightness has been obtained, the process returns. When the flag TMF has been set, determining that auxiliary light is necessary, the flag ALF is set at step V115, and the process proceeds to step V120.

At steps V120 to V135, whether or not any of a manual zooming mode (FMPZ), an image size lock mode (FISL), the APZ mode (FAPZ) and the ASZ mode (FASZ) is ON is determined. When any of them is ON (FMPZ or FAPZ or FISL or FASZ=1), after resetting the flag ALF at step V140 so that the auxiliary light mode is not set, the process returns. When none of them is ON, the process directly returns.

For this variation, all the CCD accumulation, data dump and focus detection algorithm of the embodiment of the present invention are changed to the above-described CCD accumulation and data dump, and focus detection algorithm subroutines.

To this variation, a routine which is an example of the main subject determination routine of FIG. 14 is added. The routine will be described with reference to FIG. 91.

First, the timer AF (TAF) is reset and started at step V1800, a variable NAF showing a rotation number is set to NAF=1 at step V1801, and the CCD accumulation and data dump, focus detection algorithm subroutines (FIGS. 89 and 90) are executed at steps V1802 and V1803, respectively. Then, whether the auxiliary light mode is ON or not is determined at step V1804. When the auxiliary light mode is ON, one-shot AF is performed at step V1806. When the auxiliary light mode is not ON, continuous AF is performed at step V1805. Thereby, one-shot AF is always performed in the auxiliary light mode and no focus detection is performed during zooming in the power zoom. routine. Then, whether the contrast is low or not is determined at step V1807. When the contrast is low, the process returns to step V1802. When the contrast is not low, the process proceeds to step V1808, where a focal length f is read from the zoom encoder. At step V1810, a lens movement amount N is obtained by multiplying an obtained defocus amount DF by the coefficient KN. The coefficient KN is a coefficient which is previously set for converting the defocus amount DF to the movement amount N. At step V1815, a lens moving-out amount ND required to obtain in-focus condition is obtained by adding the movement amount N obtained at step V1810 to a current moving-out amount NF. Then, at step V1820, the distance D to the subject is obtained from the moving-out amount ND. For the method thereof, a method where a ROM table is used or a method where calculation is performed by use of a conversion coefficient may be employed. A detailed description thereof will be omitted here since they are irrelevant to this embodiment.

Then, at step V1825, the magnification $\beta$ is obtained from the obtained distance D and the focal length f. At step V1830, whether the focus detection is of first time or not is determined.

When the focus detection is of first time (NAF=1), whether or not the focal length is 105 mm or less and whether or not the magnification $\beta$ is $\frac{1}{25}$ or less are determined (steps V1835 and V1840). When both of the conditions are fulfilled, determining that the main subject has been determined, the process returns. When either of the conditions is not fulfilled, the process proceeds to step V1897, where NAF is set to NAF=NAF+1.

In the main subject determination, that the magnification is small means that the main subject is small. If the subject is small, it is easy to capture a subject in an image plane. Therefore, the subject is sufficiently captured in a first-time AF operation. Moreover, if the focal length is short, there are less possibilities that the subject is out of the image plane when the camera is shaken to the right and left. Therefore, the main subject is easier to capture.

When the focus detection is not of first time at step V1830, the process proceeds to step V1845, where whether the focus detection is of second time or not is determined.

When the focus detection is of second time (NAF=2), the difference $\beta$DF between the previous and current defocus amounts is obtained by $\Delta DF=|L1DF-DF|$ at step V1850. Then, at step V1855, whether or not the focal length f is 210 mm or less is determined.

When the focal length f is 210 mm or less (f$\leq$210), whether or not the magnification $\beta$ is $\frac{1}{15}$ or less is determined at step V1860.

When the magnification $\beta$ is $\frac{1}{15}$ or less ($\beta \leq \frac{1}{15}$), whether or not the difference $\beta$DF is 500 $\mu$m or less is determined.

When the difference $\beta$DF is 500 $\mu$m or less ($\beta DF \leq 500$ $\mu$m), determining that the main subject has been determined, the process returns.

When any of the above-described three determinations (steps V1855, V1860 and V1865) are not fulfilled, the process proceeds to step V1897. The defocus amount difference $\beta$DF is considered in order to determine whether the main subject has moved or not. The level of the main subject determination is less stern than in the first-time focus detection. This is because it is getting easier to determine the main subject as in-focus condition is approached with the laps of time.

When the focus detection is not of second time at step V1845, the process proceeds to step V1877, where the focus detection is of fourth time or not is determined.

When the focus detection is of fourth time (NAF=4), the process proceeds to step V1880, where the difference $\beta$DF between a defocus amount obtained in a third-time focus detection (L3DF) and the current defocus amount is obtained. Then, whether or not the difference $\beta$DF is 500 $\mu$m or less is determined at step V1885. When it is 500 $\mu$m or less, the process returns. When it exceeds 500 $\mu$m, the process proceeds to step V1897.

When the focus detection is not of fourth time at step V1877, the process proceeds to step V1895, where whether or not one second has passed since the focus detection was started is determined. When one second has passed (TAF$\geq$1 sec), determining that the main subject has forcibly been determined, the process returns so that the ASZ_MAIN routine of FIG. 15 is executed.

When one second has not passed at step V1895 (TAF<1 sec), the process proceeds to step V1897.

TABLE 1

| ZRSW3 | ZRSW2 | ZRSW1 | ZRSW0 | Operation |
|---|---|---|---|---|
| 0 | 0 | 0 | 0 | Not operated |
| 0 | 0 | 0 | 1 | Telephoto direction speed 1 |
| 0 | 0 | 1 | 0 | Telephoto direction speed 2 |
| 0 | 0 | 1 | 1 | Telephoto direction speed 3 |
| 0 | 1 | 0 | 0 | Telephoto direction speed 4 |
| 0 | 1 | 0 | 1 | Telephoto direction speed 5 |
| 0 | 1 | 1 | 0 | Telephoto direction speed 6 |
| 0 | 1 | 1 | 1 | Telephoto direction speed 7 |
| 1 | 0 | 0 | 0 | Not operated |
| 1 | 0 | 0 | 1 | Wide direction speed 1 |
| 1 | 0 | 1 | 0 | Wide direction speed 2 |
| 1 | 0 | 1 | 1 | Wide direction speed 3 |
| 1 | 1 | 0 | 0 | Wide direction speed 4 |
| 1 | 1 | 0 | 1 | Wide direction speed 5 |
| 1 | 1 | 1 | 0 | Wide direction speed 6 |
| 1 | 1 | 1 | 1 | Wide direction speed 7 |

TABLE 2

| Value | Mode | Direction | Content |
|---|---|---|---|
| 0 | MLREQ | B ← L | Send lens switch information |
| 1 | MZmf | B → L | Zoom to target f |
| 2 | MMPZ | B → L | Permit power zoom |
| 3 | MSTPZ | B → L | Stop zooming |
| 4 | MSndZd | B ← L | Send zoom condition data |
| 5 | M1atAFD | B → L | Latch AF data |
| 6 | MSndAFD | B ← L | Send latched AF data |
| 7 | MLALL | B ← L | Read-in all lens data |

TABLE 3

B-L Communication Data

| | |
|---|---|
| LReq | Lens switch information |
| ZspB | Zoom speed specifying data (0–7) |
| ZspL | Current zoom drive speed (0–7) |
| REVNOW | Current moving-out amount (Coupler rotation) |
| REVVF | VF correction moving-out amount (Coupler rotation) |
| ft | Target focal length (mm) |
| fnow | Current focal length (mm) |
| flat | Latch timing focal length (mm) |
| Zstat | Zoom condition |
| AFDFIN | AF data calculation information |
| KL | Lens K value (Defocus → coupler rotation) |
| KN | DV conversion coefficient (Pulse → DV) |
| Δ SB | Sensor back amount |
| AVO | Open aperture value |
| $AV_{max}$ | Maximum aperture value |
| fmin | Minimum focal length |
| fmax | Maximum focal length |
| $L_{ON}$ | Lens attachment signal |

TABLE 4

Intra-lens control data

| | |
|---|---|
| Δ f | Estimated focal length for zoom drive |
| Zc | Count value (pulse count) of zoom encoder by zoom counter ZC |
| Zt | Zoom counter value of ft |
| Zn | Current zoom counter value |
| Δ Z | Drive amount (pulse count) of zoom lens |

TABLE 5

Intra-lens control flag

| | | |
|---|---|---|
| WDF | | Specified zoom drive direction<br>0: Wide direction<br>1: Telephoto direction |

TABLE 6

B-L flag

| | | |
|---|---|---|
| S_SWMPZT | LReq | MPZ Telephoto direction switch ON/OFF |
| S_SWMPZW | | MPZ Wide direction switch ON/OFF |
| S_SWISL | | ISL Switch ON/OFF |
| S_ZMMV | Zstat | Zooming ON/OFF |
| S_ZMT | | Zoom direction Telephoto/Wide |
| S_ZMLIM | | Zoom lens Drive limit/Not drive limit |
| S_VFOK | | VF correction calculation Completed/Not completed |
| S_VFCAL | ZspB | VF calculation One-shot/Continuous |
| S_AFDOK | AFDFIN | AF data calculation Completed/Not completed |

TABLE 7

Intra-body control data

| | |
|---|---|
| ERRCNT | Defocus amount (pulse) |
| ERRVF | VF correction amount (pulse) |
| DVCNOW | Current AF lens pulse position (pulse) |
| DVCVF | VF correction pulse position (pulse) |
| DRV_PLS | AF lens drive amount (pulse) |
| DFO | Defocus amount of selected island ($\mu$m) |
| KB | Coupler rotation → pulse conversion coefficient (pulse/coupler rotation) |
| KBL | Defocus → pulse conversion coefficient (pulse/$\mu$m) |
| DRV_REL | Drive amount during release (pulse) |
| DVA | Average DV |
| DV0 | DV obtained from the current distance measurement result |
| DV1 | DV obtained from the previous distance measurement result |
| β SET | Magnification β while image lock is ON |
| ftA | Target focal length at a DV value of DV0 + 0.5 (for ASZ) |
| ftB | Target focal length at a DV value of DV0 − 0.5 (for ASZ) |
| ftX | Focal length at a distance measurement accuracy equal to or higher than 0.5 DV (for ASZ) |
| DFDRV | Defocus amount obtained from VF correct ion pulse count ($\mu$m) |

TABLE 8

Intra-body control flag

| | |
|---|---|
| F_MPZ | MPZ is ON |
| F_ISL | Image size lock is ON |
| F_APZ | APZ is ON |
| F_ASZ | ASZ is ON |
| F_RQMPZ | Request MPZ |
| F_RQISL | Request ISL |
| F_RQAPZ | Request APZ |
| VWDOWN | Request wide finder zoom down |
| VWUP | Request wide finder zoom up |
| WIDEF | Wide finder is ON |
| WVMODE | Wide finder mode |
| APZMODE | APZ mode |
| F_DRVDIR | AF lens drive direction Near/Infinity |
| F_NLJUMP | Jump to lens control |
| F_WLIM | Inhibit zooming in the same direction since zoom lens is at zoom limit |
| F_WZMT | Inhibited zoom direction Telephoto/Wide |
| F_STPASZ | Stop ASZ |
| F_WAIT | Wait until ASZ stops |
| F_ASZFIN | ASZ is completed |
| F_LSTASZ | Last ASZ zooming |
| F_ASZOK | ASZ Necessary/Unnecessary |
| F_DVASZ | Desired ASZ distance measurement accuracy is obtained |
| F_RQZMT | Requested ASZ drive direction Telephoto/Wide |
| F_DIASZ | Inhibit ASZ drive |
| F_AF | AF/FA |
| LOWRENF | Low continuous photographing is ON |
| F_LPONLY | Calculate REVNOW from only current AF lens position |

TABLE 9

| Focus detection result at 150% | Focus detection result at 100% | Control island |
|---|---|---|
| Select second island | Second island not low contrast | Release with 100% island b |
| | Second island low contrast | Only VF correction Release based on focus detection result at 150% |

TABLE 9-continued

| Focus detection result at 150% | Focus detection result at 100% | Control island |
|---|---|---|
| Select island other than second island | — | Nearest island at 100% |
| Out of focus | — | Nearest island at 100% |

TABLE 10

| VHOSEI | - V3 | V3 - V4 | V4 - |
|---|---|---|---|
| NORMC1 | C1 | C2 | C3 |
| NORMC2 | C4 | C5 | C6 |

TABLE 11

|   |   | DSUBF |   |   |   |   |
|---|---|---|---|---|---|---|
|   |   | NB | NS | ZO | PS | PB |
| S | NB | NB | NB | NB | NS | ZO |
| U | NS | NB | NS | NS | ZO | PS |
| B | ZO | NB | NS | ZO | PS | PB |
| F | PS | NS | ZO | PS | PS | PB |
|   | PB | ZO | PS | PB | PB | PB |

Obviously, many modifications and variations of the present invention are possible in light of the above teachings. It is therefore to be understood that within the scope of the appended claims, the invention may be practiced other than as specifically described.

What is claimed is:

1. A camera comprising:

manual operation means for starting a sequence of operations;

starting means for performing preparatory operations before the manual operation means starts the sequence of operations;

means for setting a first angle of view while the starting means is performing the preparatory operations and setting a second angle of view narrower than the first angle of view in response to manual operations performed through the manual operation means when the first angle of view is already set; and exposure means that performs exposure after the second angle of view has been set by the setting means.

2. A camera as claimed in claim 1, wherein said preparatory operations are performed to confirm depth of focus.

3. A camera comprising:

a viewing system having at least two selectable angles of view;

a manually operated member that is actuated by a user to initiate a sequence of automatic operations which result in the recording of an image by an image sensing medium;

at least one preparatory system for establishing a photographic condition, related to the recording of an image, prior to the initiation of said sequence of operations by actuation of said manually operated member;

a controller for setting said viewing system to a first view angle during operation of said preparatory system, prior to actuation of said manually operated member, and for setting said viewing system to a second view angle, narrower than said first view angle, in response to actuation of said manually operated member; and an exposure system for exposing said image sensing medium to an image after said second view angle has been set.

4. The camera of claim 3, wherein said exposure system said image sensing medium in response to actuation of said manually operated member.

* * * * *